US009926620B2

(12) United States Patent
Kamat et al.

(10) Patent No.: US 9,926,620 B2
(45) Date of Patent: Mar. 27, 2018

(54) 2XXX ALUMINUM ALLOYS, AND METHODS FOR PRODUCING THE SAME

(71) Applicant: ALCOA INC., Pittsburgh, PA (US)

(72) Inventors: Rajeev G. Kamat, Marietta, GA (US); John M. Newman, Export, PA (US); Ralph R. Sawtell, Gibsonia, PA (US); Jen C. Lin, Export, PA (US)

(73) Assignee: Arconic Inc., Pittsburgh, PA (US)

( * ) Notice: Subject to any disclaimer, the term of this patent is extended or adjusted under 35 U.S.C. 154(b) by 469 days.

(21) Appl. No.: 14/473,141

(22) Filed: Aug. 29, 2014

(65) Prior Publication Data

US 2014/0366999 A1 Dec. 18, 2014

Related U.S. Application Data

(63) Continuation of application No. PCT/US2013/027718, filed on Feb. 26, 2013.

(60) Provisional application No. 61/608,050, filed on Mar. 7, 2012.

(51) Int. Cl.
| | |
|---|---|
| *C22C 21/12* | (2006.01) |
| *C22F 1/057* | (2006.01) |
| *B22D 21/04* | (2006.01) |
| *B22D 11/00* | (2006.01) |
| *B62D 29/00* | (2006.01) |
| *C22F 1/00* | (2006.01) |

(52) U.S. Cl.
CPC ............ *C22F 1/057* (2013.01); *B22D 11/003* (2013.01); *B22D 21/04* (2013.01); *B62D 29/008* (2013.01); *C22C 21/12* (2013.01); *C22F 1/002* (2013.01)

(58) Field of Classification Search
CPC ...................... C22C 21/12–21/18; C22F 1/057
See application file for complete search history.

(56) References Cited

U.S. PATENT DOCUMENTS

| | | | |
|---|---|---|---|
| 1,510,590 A | 10/1924 | Fahrenwald | 102/464 |
| 1,695,044 A | 12/1928 | Hallmann | 148/695 |
| 2,220,652 A | 11/1940 | Irmann | 148/697 |
| 2,349,970 A | 5/1944 | Lambeek | 102/464 |
| 2,394,546 A | 2/1946 | Harrington | 148/21.1 |
| 2,790,216 A | 4/1957 | Hunter | 164/480 |
| 2,887,422 A | 5/1959 | Stone et al. | 148/691 |
| 3,032,448 A | 5/1962 | Siebel et al. | 148/537 |

(Continued)

FOREIGN PATENT DOCUMENTS

| | | |
|---|---|---|
| CN | 101509115 | 8/2009 |
| EP | 0097319 | 1/1984 |

(Continued)

OTHER PUBLICATIONS

"Aluminum and Aluminum Alloys", ASM Specialty Handbook, *Metals*, Metals Park, OH, pp. 41-42, 1993, J. R. Davis, editor.

(Continued)

*Primary Examiner* — Lois Zheng
(74) *Attorney, Agent, or Firm* — Greenberg Traurig, LLP

(57) ABSTRACT

New 2xxx aluminum alloy bodies and methods of producing the same are disclosed. The new 2xxx aluminum alloy bodies may be produced by preparing the aluminum alloy body for post-solutionizing cold work, cold working by at least 25%, and then thermally treating. The new 2xxx aluminum alloy bodies may realize improved strength and other properties.

8 Claims, 75 Drawing Sheets

(56) References Cited

U.S. PATENT DOCUMENTS

| | | | | |
|---|---|---|---|---|
| 3,219,491 A | 11/1965 | Anderson et al. | | 148/552 |
| 3,329,537 A | 7/1967 | Loach | | 148/693 |
| 3,418,177 A | 12/1968 | Pryor | | 148/689 |
| 3,464,866 A | 9/1969 | Pryor | | 148/690 |
| 3,498,221 A | 3/1970 | Hilton et al. | | 102/464 |
| 3,613,767 A | 10/1971 | Cofer et al. | | 164/476 |
| 3,659,528 A | 5/1972 | Santala | | 102/468 |
| 3,706,118 A | 12/1972 | Hilton et al. | | 29/1.3 |
| 3,706,606 A | 12/1972 | Di Russo et al. | | 148/697 |
| 3,761,322 A | 9/1973 | Winter et al. | | 148/689 |
| 3,765,297 A | 10/1973 | Skochko et al. | | 89/1.1 |
| 3,770,515 A | 11/1973 | Besel | | 148/690 |
| 3,787,248 A | 1/1974 | Setzer et al. | | 148/502 |
| 3,791,880 A | 2/1974 | Hunsicker et al. | | 428/553 |
| 3,847,681 A | 11/1974 | Waldman et al. | | 148/692 |
| 3,924,534 A | 12/1975 | Gruner | | 102/464 |
| 3,930,895 A | 1/1976 | Moser et al. | | 148/550 |
| 3,935,007 A | 1/1976 | Baba et al. | | 420/535 |
| 3,945,860 A | 3/1976 | Winter et al. | | 148/502 |
| 3,984,259 A | 10/1976 | Rogers, Jr. et al. | | 148/690 |
| 4,028,141 A | 6/1977 | Chia et al. | | 148/550 |
| 4,065,326 A | 12/1977 | Nicoud | | 148/550 |
| 4,092,181 A | 5/1978 | Paton et al. | | 148/694 |
| 4,111,721 A | 9/1978 | Hitchler et al. | | 148/689 |
| 4,151,013 A | 4/1979 | Thompson et al. | | 148/502 |
| 4,151,896 A | 5/1979 | Nicoud et al. | | 148/551 |
| 4,174,232 A | 11/1979 | Lenz et al. | | 148/552 |
| 4,235,646 A | 11/1980 | Neufeld et al. | | 148/551 |
| 4,238,248 A | 12/1980 | Gyongyos et al. | | 148/551 |
| 4,260,419 A | 4/1981 | Robertson | | 420/534 |
| 4,269,632 A | 5/1981 | Robertson et al. | | 148/550 |
| 4,282,044 A | 8/1981 | Robertson et al. | | 148/523 |
| 4,294,625 A * | 10/1981 | Hyatt | | C22C 21/16 148/416 |
| 4,318,755 A | 3/1982 | Jeffrey et al. | | 148/439 |
| 4,334,935 A | 6/1982 | Morris | | 148/551 |
| 4,405,385 A | 9/1983 | Cloostermans-Huwaert | | 148/690 |
| 4,511,409 A | 4/1985 | Ferton et al. | | 148/550 |
| 4,517,034 A | 5/1985 | Merchant et al. | | 148/551 |
| 4,605,448 A | 8/1986 | Baba et al. | | 148/537 |
| 4,618,382 A | 10/1986 | Miyagi et al. | | 148/415 |
| 4,637,842 A | 1/1987 | Jeffrey et al. | | 148/535 |
| 4,648,913 A | 3/1987 | Hunt, Jr. et al. | | 148/693 |
| 4,722,754 A | 2/1988 | Ghosh et al. | | 75/236 |
| 4,797,164 A | 1/1989 | Hollrigl et al. | | 148/552 |
| 4,806,174 A | 2/1989 | Cho et al. | | 148/693 |
| 5,098,490 A | 3/1992 | Huu | | 148/693 |
| 5,192,378 A | 3/1993 | Doherty et al. | | 148/691 |
| 5,342,459 A | 8/1994 | Klemp et al. | | 148/690 |
| 5,362,341 A | 11/1994 | Palmer et al. | | 148/692 |
| 5,383,986 A | 1/1995 | Cho | | 148/697 |
| 5,393,357 A | 2/1995 | Cho | | 148/437 |
| 5,413,650 A | 5/1995 | Jarrett et al. | | 148/690 |
| 5,518,064 A | 5/1996 | Romanowski et al. | | 164/453 |
| 5,888,320 A | 3/1999 | Dorward | | 148/690 |
| 5,938,867 A | 8/1999 | Dorward et al. | | 148/693 |
| 5,976,279 A | 11/1999 | Selepack et al. | | 148/551 |
| 5,985,058 A | 11/1999 | Selepack et al. | | 148/551 |
| 5,993,573 A | 11/1999 | Selepack et al. | | 148/551 |
| 6,290,785 B1 | 9/2001 | Selepack et al. | | 148/439 |
| 6,325,872 B1 | 12/2001 | Newton et al. | | 148/551 |
| 6,350,329 B1 | 2/2002 | Troeger et al. | | 148/564 |
| 6,450,583 B2 | 9/2002 | Hale, Jr. et al. | | 301/63.101 |
| 6,537,392 B2 | 3/2003 | Magnusen et al. | | 148/417 |
| 6,579,387 B1 | 6/2003 | Selepack et al. | | 148/552 |
| 6,672,368 B2 | 1/2004 | Unal | | 164/480 |
| 7,182,825 B2 | 2/2007 | Unal et al. | | 148/551 |
| 7,503,378 B2 | 3/2009 | Unal | | 164/480 |
| 7,780,802 B2 | 8/2010 | Dif et al. | | 148/551 |
| 2002/0031681 A1 | 3/2002 | Heinz et al. | | 428/654 |
| 2003/0070734 A1 | 4/2003 | Heinz et al. | | 148/552 |
| 2003/0079856 A1 | 5/2003 | Kilmer et al. | | 164/461 |
| 2005/0011630 A1 | 1/2005 | Anderson et al. | | 164/461 |
| 2006/0011272 A1 | 1/2006 | Lin et al. | | 148/439 |
| 2006/0157172 A1 | 7/2006 | Fischer et al. | | 148/690 |
| 2008/0182122 A1 | 7/2008 | Chu et al. | | 428/615 |
| 2009/0180920 A1 | 7/2009 | Reichlinger et al. | | 420/532 |
| 2010/0059151 A1* | 3/2010 | Iwamura | | C22C 21/12 148/690 |
| 2010/0180992 A1* | 7/2010 | Giummarra | | C22C 21/00 148/698 |
| 2010/0247954 A1 | 9/2010 | Chu et al. | | 428/636 |
| 2010/0279143 A1 | 11/2010 | Kamat et al. | | 428/615 |
| 2010/0319820 A1 | 12/2010 | Koma | | 148/695 |
| 2011/0017055 A1 | 1/2011 | Mooy et al. | | 89/36.02 |
| 2011/0100579 A1 | 5/2011 | Chu et al. | | 164/94 |
| 2011/0252956 A1 | 10/2011 | Sawtell et al. | | 89/36.02 |
| 2012/0055588 A1 | 3/2012 | Kamat et al. | | 148/551 |
| 2012/0055589 A1 | 3/2012 | Kamat et al. | | 148/551 |
| 2012/0055590 A1 | 3/2012 | Kamat et al. | | 148/551 |
| 2012/0055591 A1 | 3/2012 | Kamat et al. | | 148/551 |

FOREIGN PATENT DOCUMENTS

| | | |
|---|---|---|
| EP | 2184375 | 5/2010 |
| GB | 1055687 | 1/1967 |
| GB | 1593899 | 7/1981 |
| JP | 52-94817 | 8/1977 |
| JP | H01-259147 | 10/1989 |
| JP | 02-294454 | 12/1990 |
| JP | 03-044452 | 2/1991 |
| JP | 05-132745 | 5/1993 |
| JP | 08-325664 | 12/1996 |
| JP | 09-111426 | 4/1997 |
| JP | 09-248649 | 9/1997 |
| JP | 09-256129 | 9/1997 |
| JP | 10-168536 | 6/1998 |
| JP | 11-209857 | 8/1999 |
| JP | 2002-053924 | 2/2002 |
| JP | 2003-321754 | 11/2003 |
| JP | 2004-176134 | 6/2004 |
| JP | 2005-213529 | 8/2005 |
| JP | 2007-009262 | 1/2007 |
| JP | 2007-031819 | 2/2007 |
| JP | 2009-263720 | 11/2009 |
| KR | 92-0007926 | 9/1992 |
| WO | WO92/03586 | 3/1992 |
| WO | WO98/33947 | 8/1998 |
| WO | WO02/066181 | 8/2002 |
| WO | WO2004/018124 | 3/2004 |
| WO | WO2004/106566 | 12/2004 |
| WO | WO2008/128061 | 10/2008 |
| WO | WO2009/036953 | 3/2009 |
| WO | WO2009/132436 | 11/2009 |

OTHER PUBLICATIONS

"Aluminum Properties and Physical Metallurgy," *American Society for Metals*, Metals Park, OH, pp. 188-191, May 1984, John E. Hatch, editor.

"Aluminum: vol. I. Properties, Physical Metallurgy and Phase Diagrams," *American Society for Metals*, Metals Park, OH, pp. 197-198, 1967, Kent R. Van Horn, editor.

"American National Standard Alloy and Temper Designation Systems for Aluminum", The Aluminum Association, Inc., ANSI H35.1(M), pp. 1-11, 2009.

"Chassis Handbook: Fundamentals, Driving Dynamics, Components, Mechatronics, Perspectives" pp. 291-299, Bernd Heibing et al., Eds., Vieweg & Teubner Verlag, 2011.

"Registration Record Teal Sheets: International Alloy Designations and Chemical Composition Limits for Wrought Aluminum and Wrought Aluminum Alloys", The Aluminum Association, Inc. pp. 1-28, Feb. 2009.

British Standard, "Aluminium and aluminium alloys—wrought products—temper designations," BS EN 515:1993, p. 16.

Benedyk, Joseph, C., "Thermomechanical Treatment of Precipitation Hardening Aluminum Alloys", *Light Metal Age*, vol. 26, Nos. 3, 4, Apr. 1968, pp. 10, 12.

Di Russo, E., et al., "Thermomechanical Treatments on High Strength Al—Zn—Mg(—Cu) Alloys", *Metallurgical Transactions* 4:1133-1144, Apr. 1973.

(56) References Cited

OTHER PUBLICATIONS

Esmaeili, S., "A novel thermomechanical processing method to achieve fine-grained heat treatable aluminum sheet", University of Waterloo, Dept. of Mechanical & Mechatronics Engineering, Sep. 2010.

Gang, Z., et al., "Thermo-mechanical aging of 2014 Aluminum Alloy", *Journal of Northeastern University (Natural Science)* vol. 22, No. 6, pp. 664-667, Dec. 2001 (with English Translation).

Giarda, A., et al., "Investigations on Al—Mg—Si Alloys Containing 0.8 Percent Mg2Si with Different Amounts of Excess Si, Treated by T-HA (T8) Cycles," *Alluminio*, Jul.-Aug. 1976, 45 (7-8):387-399 (with English translation).

Harrington, R. H., "The Modern Metallurgy of Alloys," John Wiley & Sons, Inc. New York, 1948, pp. 71-118.

Harrington, R. H., "Precipitation-hardening and Double Aging", *American Institute of Mining and Metallurgical Engineers*, Technical Publication No. 759, pp. 1-15, Dec. 1936.

Hyatt, M. V., "Program to Improve the Fracture Toughness and Fatigue Resistance of Aluminum Sheet and Plate for Airframe Applications", pp. 1-188, prepared by The Boeing Commercial Airplane Company for air Force Materials Laboratory, Air Force Systems Command, U.S. Air Force, Sep. 1973.

Leymarie, F., "Aluminium Alloys and the Can Industry", The Effective and Economic Use of the Special Characteristics of Aluminum and its Alloys, Institute of Metals Conference, 1972, pp. 229-232.

McEvily, Jr., A. J., et al., "Effect of Thermal-Mechanical Processing on the Fatigue and Stress-Corrosion Properties of an Al—Zn—Mg Alloy", Transaction of American Society for Metals 60(4):661-671, Dec. 1967.

Mercier, J., et al., "Treatment of the Quenching—Strain Hardening—Recovery Type on Heat Treated Aluminum Alloys", *Memoires Scientifiques Rev. Metallurg.*, LX, No. 1, pp. 60-71, 1963 (with translation).

Ning, A., et al., "Effect of large cold deformation after solution treatment on precipitation characteristic and deformation strengthening of 2024 and 7A04 aluminum alloys", *Trans. Nonferrous Met. Soc. China* (2006), pp. 1341-1347, Transactions of Nonferrous Metals Society of China.

Nourbakhshi, S. et al., "The high strain deformation of an aluminum-4% copper alloy in the supersaturated and aged conditions", *Acta Metallurgica*, vol. 28, pp. 357-365, Pergamon Press Ltd., 1980.

Ostermann, F. G., et al., "Thermomechanical Processing and Fatigue of Aluminum Alloys", American Society for Testing and Materials, Symposium on Achievement of High Fatigue Resistance in Metals and Alloys, Jun. 1969, pp. 169-186.

Ostermann, F., "Improved Fatigue Resistance of Al—Zn—Mg—Cu (7075) Alloys Through Thermomechanical Processing", *Metallurgical Transactions* 2(10):2897-2902, Oct. 1971, pp. 2897-2902.

Poorganji, B., et al., "Effect of cold work and non-isothermal annealing on the recrystallization behavior and texture evolution of a precipitation-hardenable aluminum alloy", Scripta Materialia 63(12):1157-1160, Dec. 2010.

Pfost, D., et al., "The effect of solution treatment and rolling mode on the mechanical properties of 2090 Al—Li Alloy", *Journal of Materials Processing Technology*, vol. 56, pp. 542-551, Journal of Materials Processing Technology, 1996.

Rack, H. J., et al., "Thermomechanical Treatment of 6000 Aluminum Alloys", *Proceedings TMS/AIME Heat Treatment Committee*, Oct. 18, 1978, pp. 86-104.

Rack, H. J., et al., "Thermomechanical Treatment of High Purity 6061 Aluminum" *Metallurgical Transactions A* 8A:335-346, Feb. 1977.

Reimann, W. H., "Improved Fracture Resistance of 7075 Through Thermomechanical Processing", *Engineering Fracture Mechanics*, 5:67-78, 1973.

Sawtell, R. R., "Effects of FTMT Versus Alloying on Fatigue and Fracture of 7XXX Alloy Sheet", Thermomechanical Processing of Aluminum Alloys, Proceedings of Heat Treatment Committee, TMS Fall Meeting, Oct. 18, 1978.

Sepehrband, P., et al., "Interactions between Precipitation and Annealing Phenomena during Non-isothermal Processing of an AA6xxx Alloy", Proceeding of the $12^{th}$ International Conference on Aluminum Alloys, Yokohama, Japan, The Japan Institute of Light Metals, pp. 308-313, Sep. 2010.

Shteyunberg, M.M., et al., "Low Temperature Thermomechanical Treatment of an Aluminum Magnesium Silicon Alloy," *Light Metal Age*, pp. 13-15, Aug. 1974.

Thompson, D. S., et al., "Thermomechanical Aging of Aluminum Alloys," Proceedings $3^{rd}$ International Conference on the Strength of Metals and Alloys, Cambridge England, vol. 1, pp. 119-123, Aug. 1973.

Thompson, D. S., et al., "Thermomechanical Aging of Aluminum Alloys (II)*", *Aluminum*, 50(11):719-725, Nov. 1974.

Vruggink, J. E., "Study of Improved Aluminum Materials for Vehicular Armor", 1977, Doc. No. FA-TR-76073, U.S. Army Armament Command, Frankford Arsenal, PhiladelphiA, PA, 19137, pp. 1-172.

International Search Report and Written Opinion, dated Apr. 12, 2012, from co-owned International Application No. PCT/US2011/050894.

International Search Report and Written Opinion, dated Apr. 23, 2012, from co-owned International Application No. PCT/US2011/050876.

International Search Report and Written Opinion, dated Apr. 12, 2012, from co-owned International Application No. PCT/US2011/050868.

International Search Report and Written Opinion, dated Apr. 12, 2012, from co-owned International Application No. PCT/US2011/050884.

International Search Report and Written Opinion, dated Dec. 24, 2013, from co-owned International Application No. PCT/US2013/027718.

Australian Office Action, dated Nov. 12, 2014, from corresponding Australian Patent Application No. 2013204114.

MIL-HDBK-694A[MR], "Military Standardization Handbook—aluminum and Aluminum Alloys," Dept. of Defense, pp. 34, 35, 42-43, 45, 47, 49-51, 54, 57-60, 65, and 88-93 (Dec. 1966).

Various 7xxx alloy properties from the document MIL-HDBK-5J, "Metallic Materials and Elements for Aerospace Vehicle Structures," Dept. of Defense, pp. 3-293 to 3-485 (Jan. 2003).

* cited by examiner

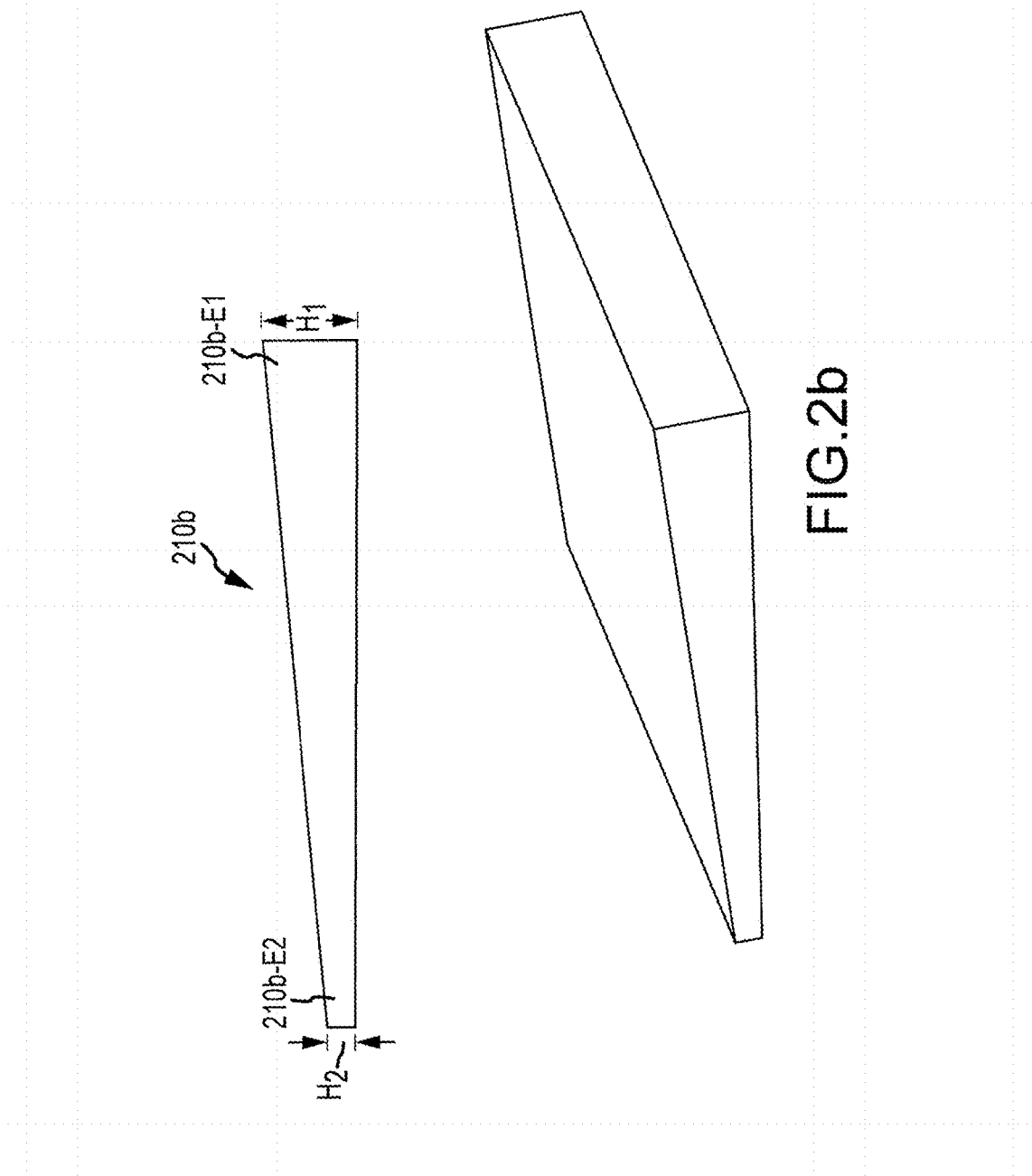

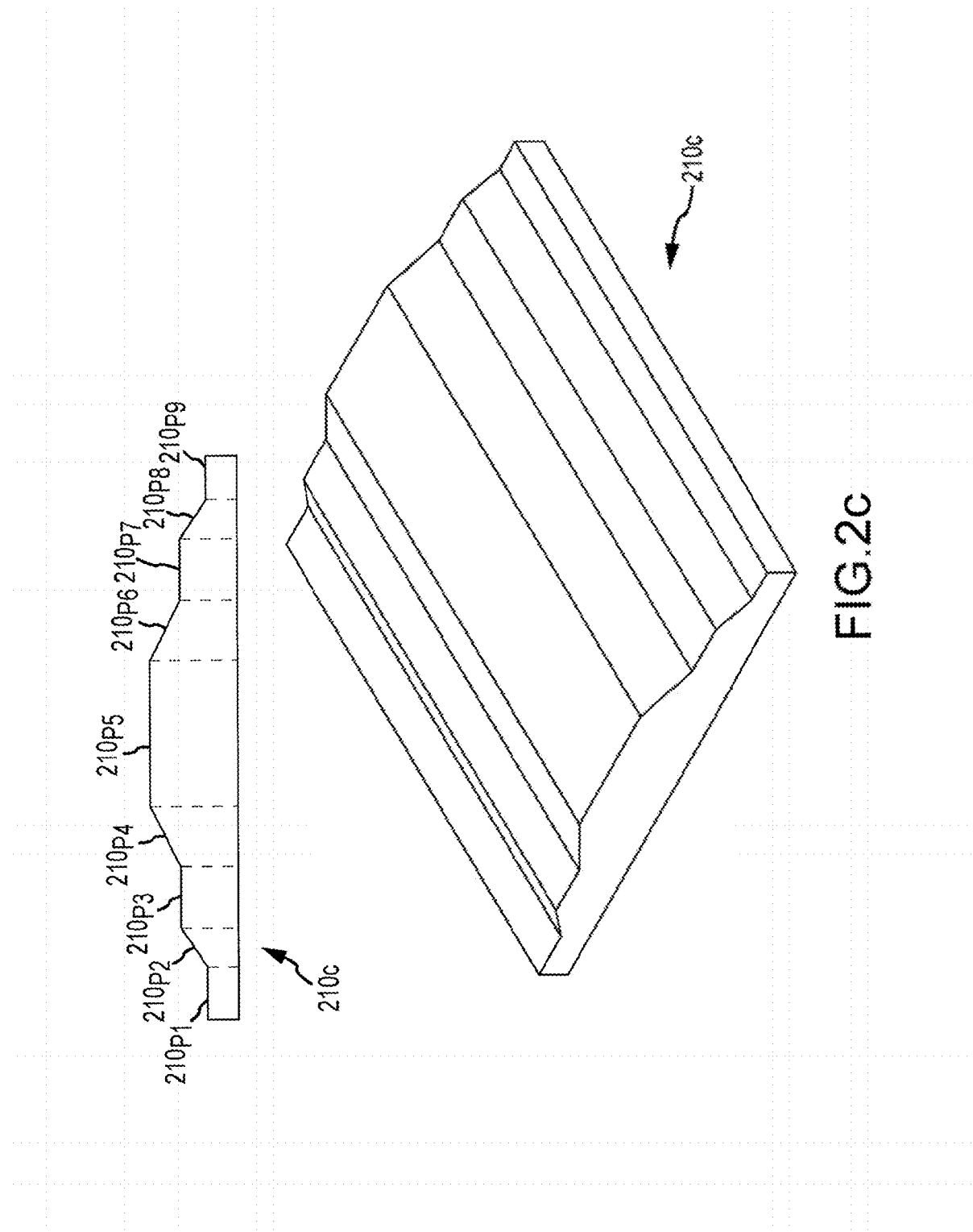

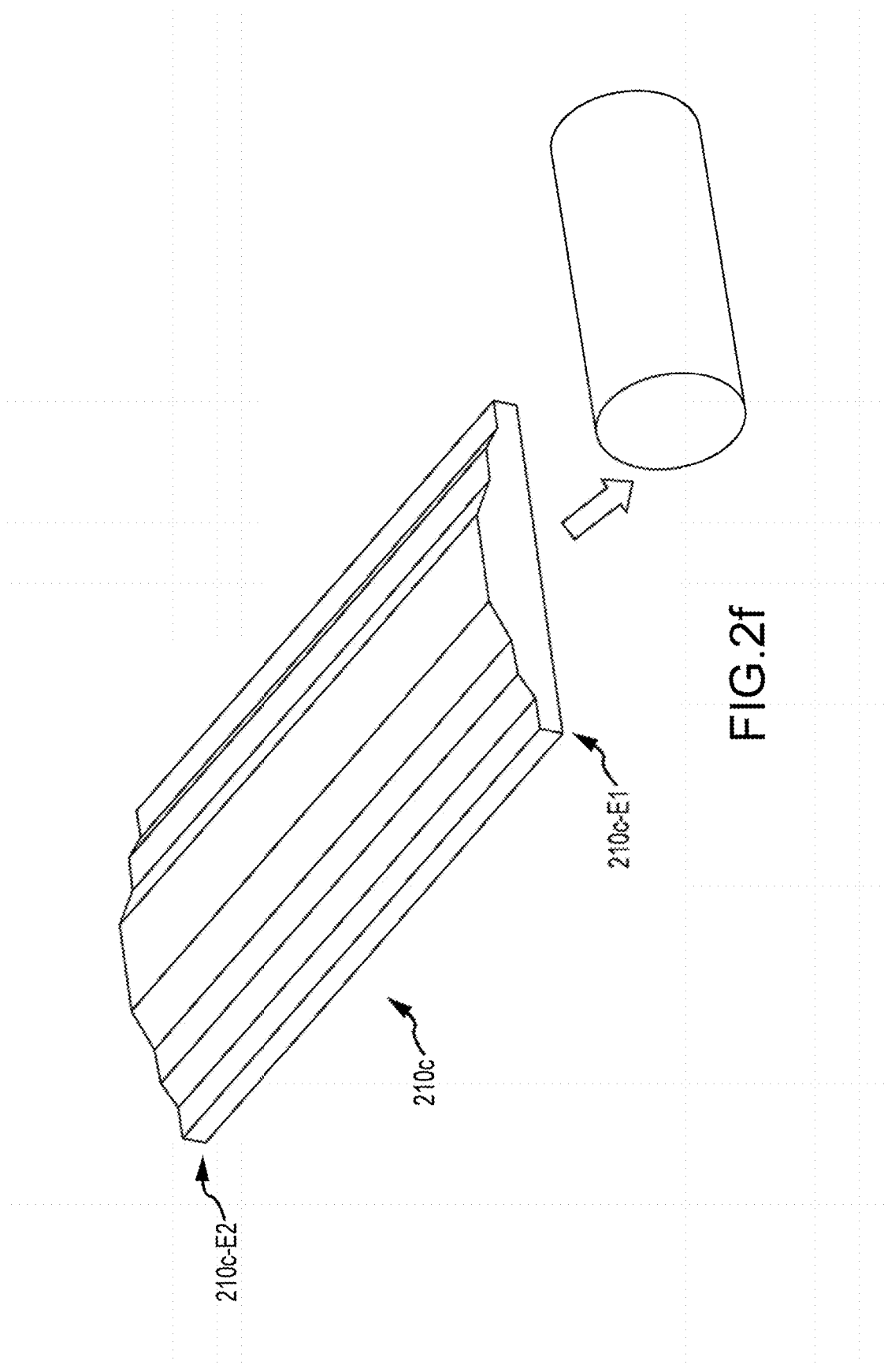

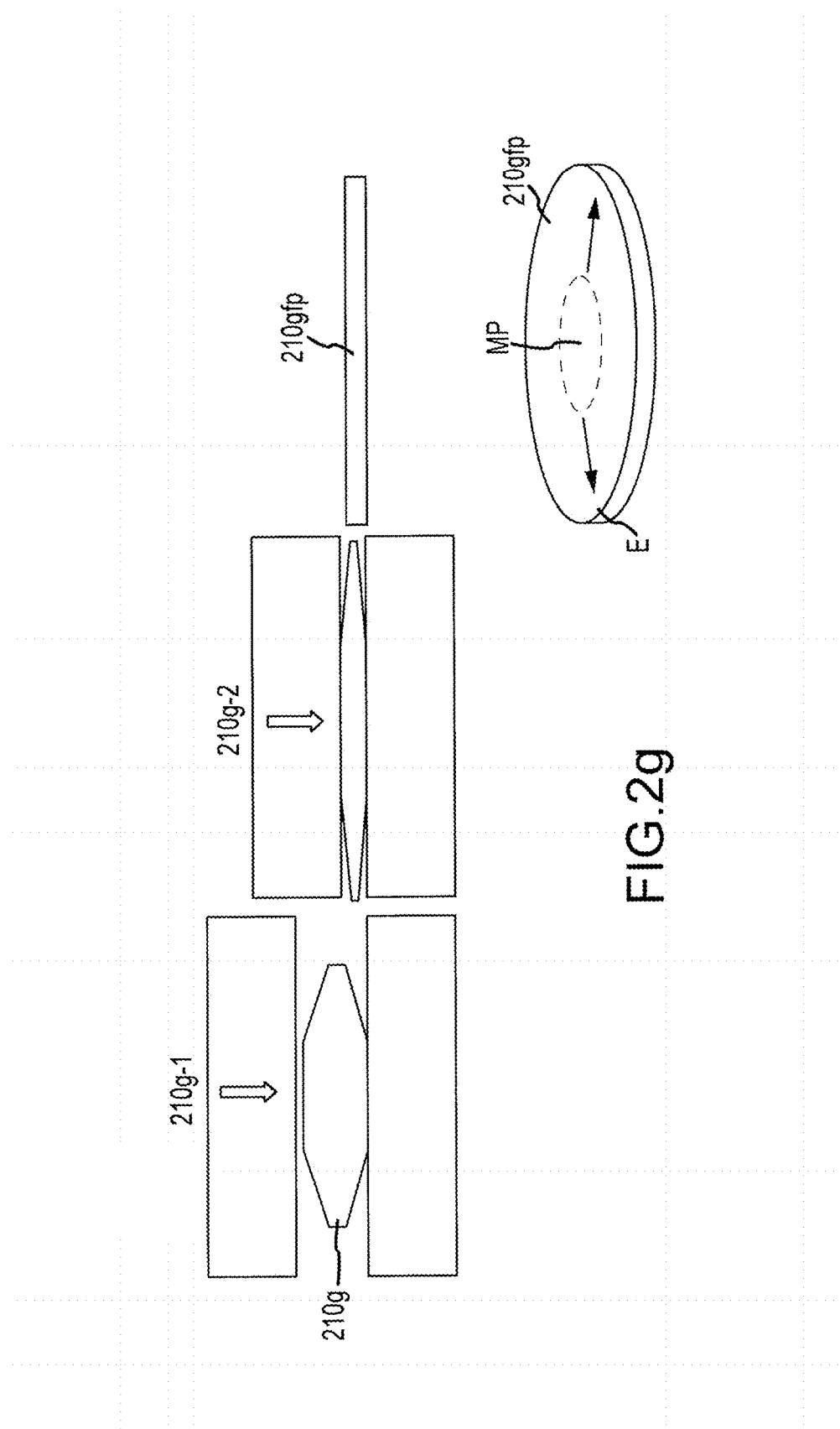

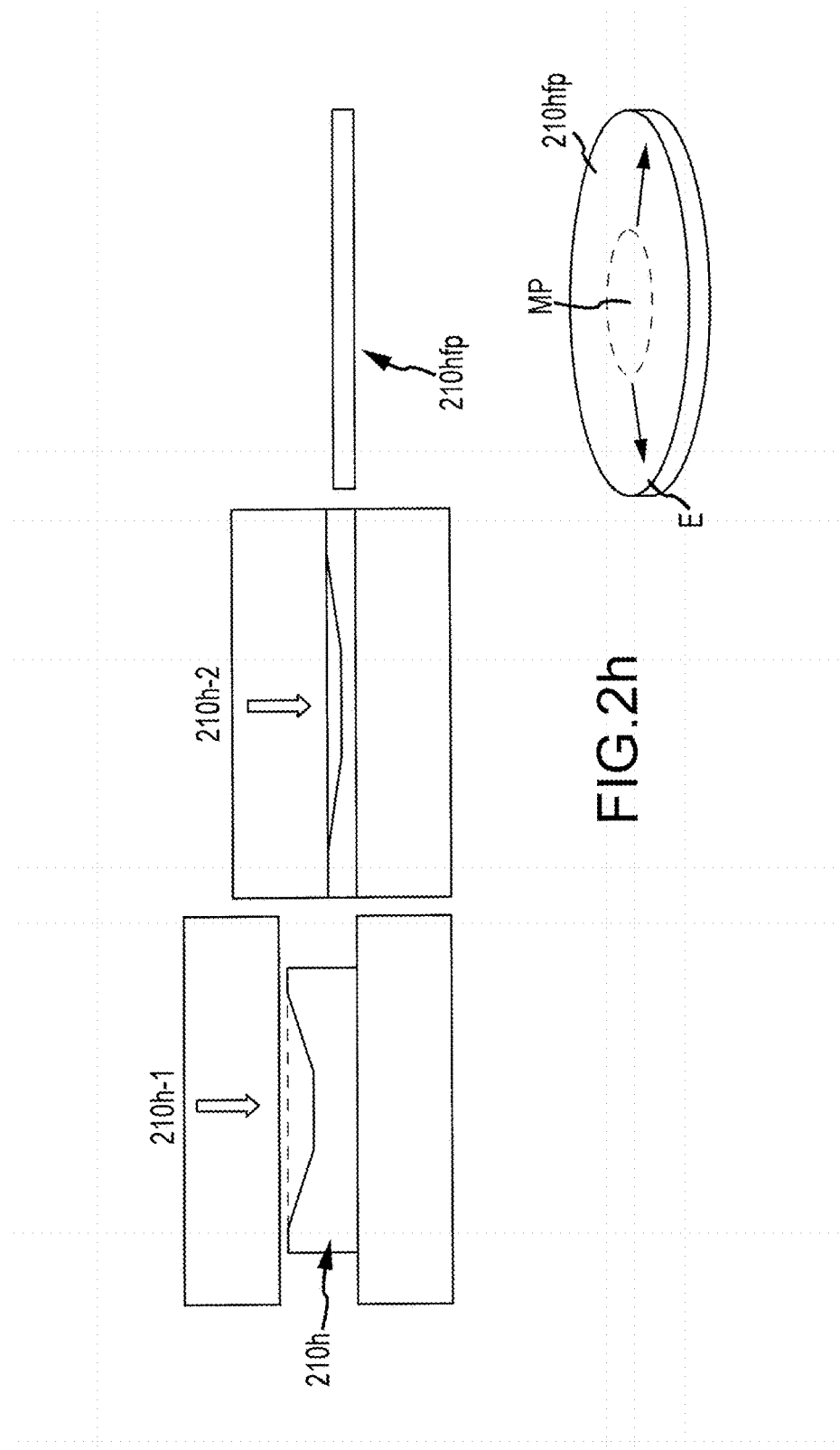

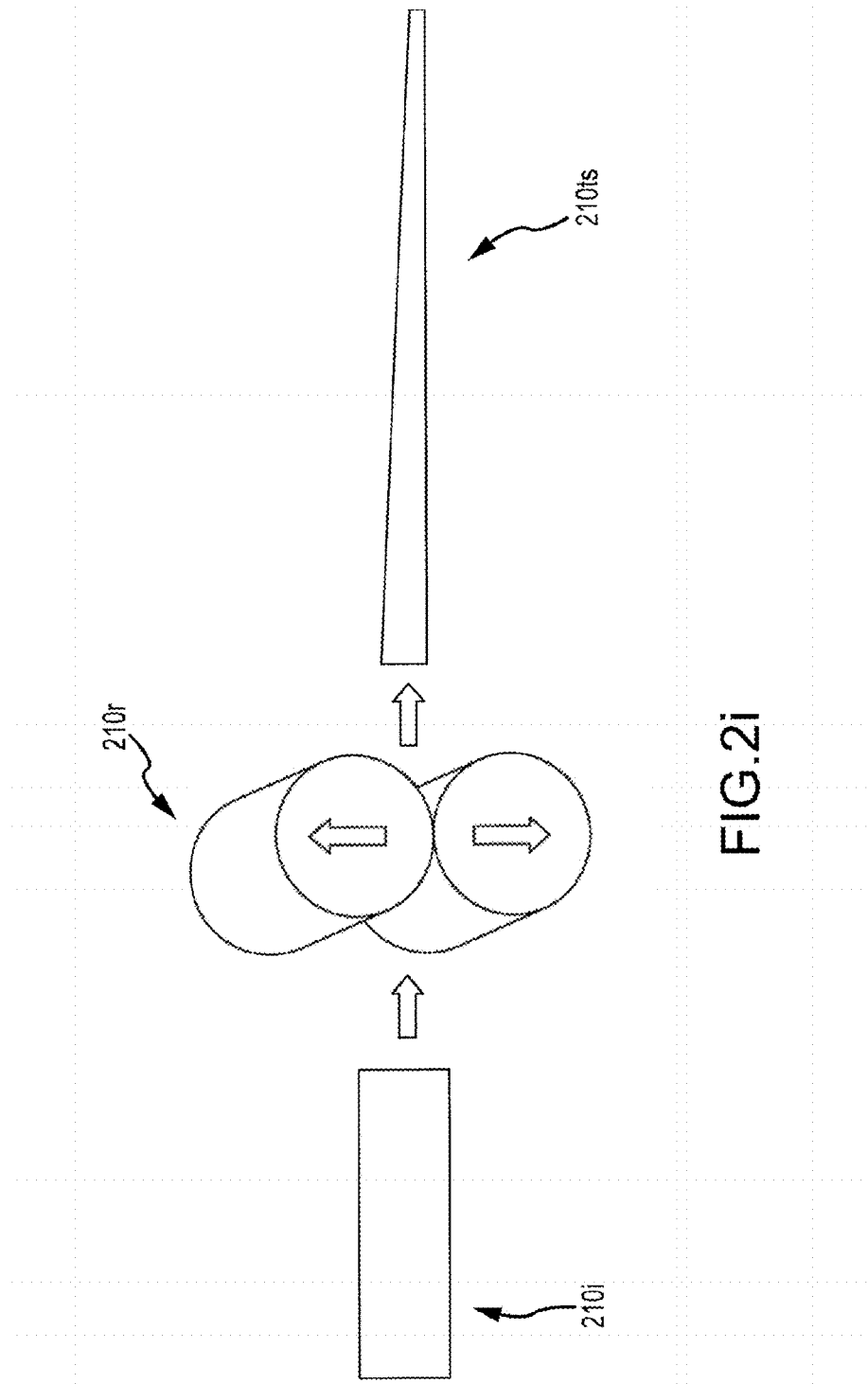

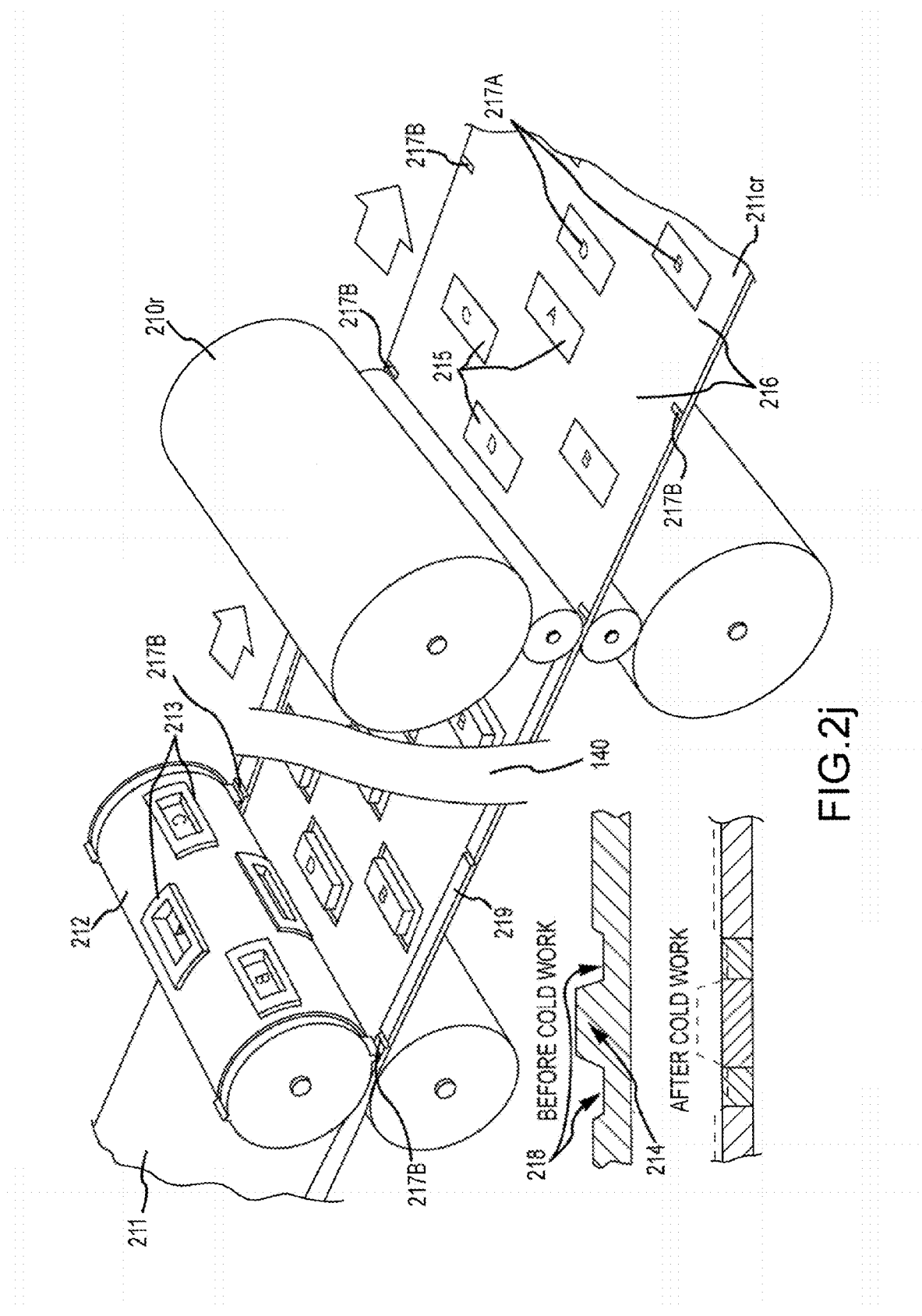

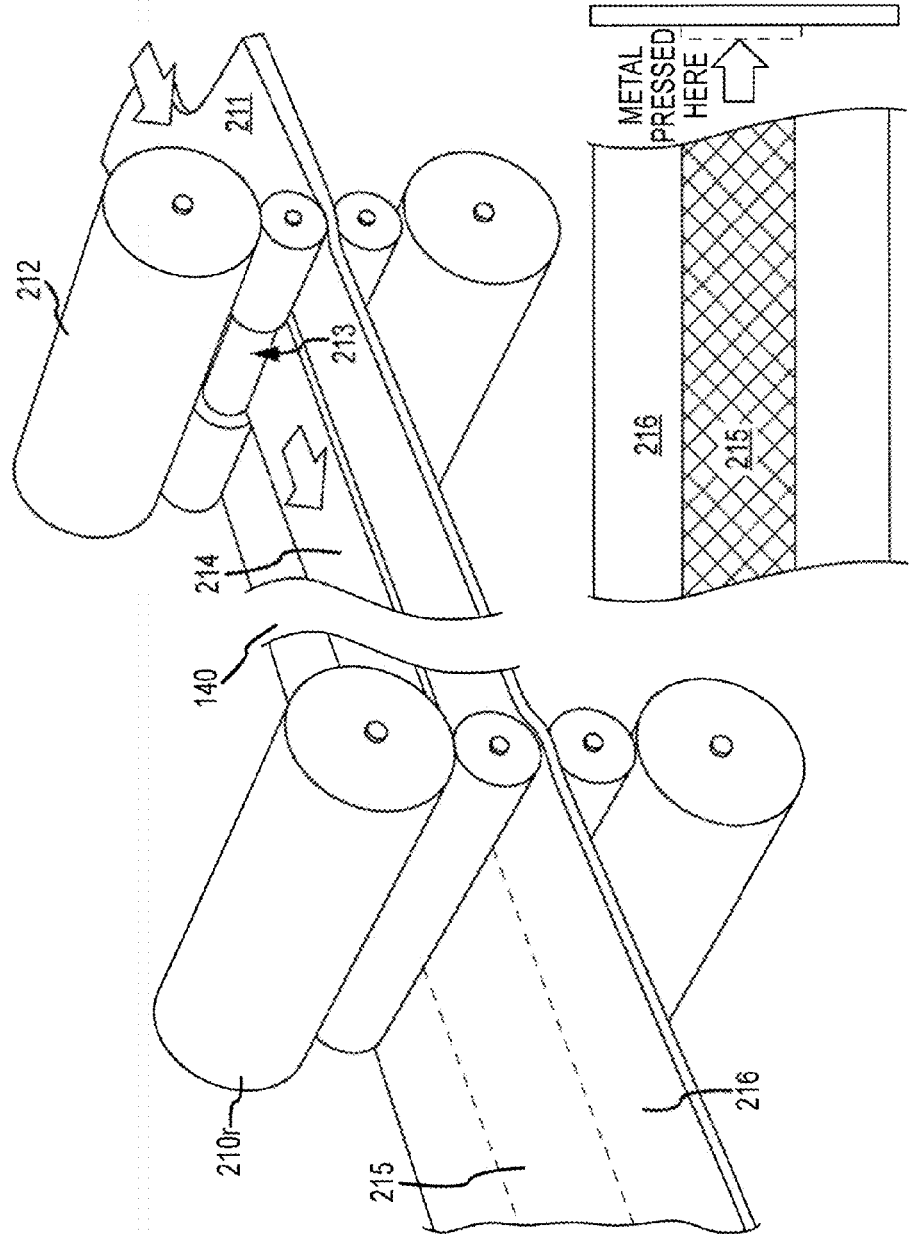

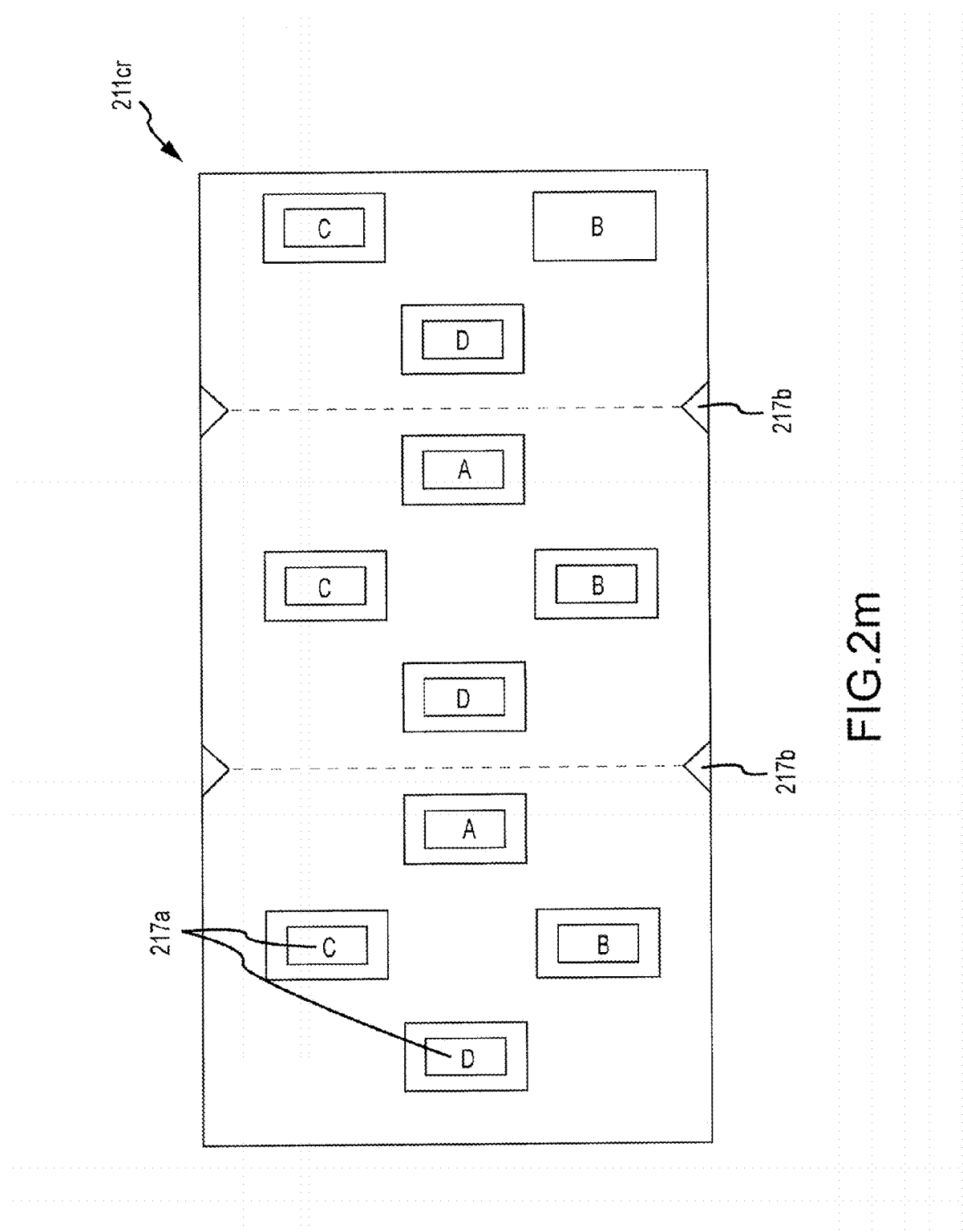

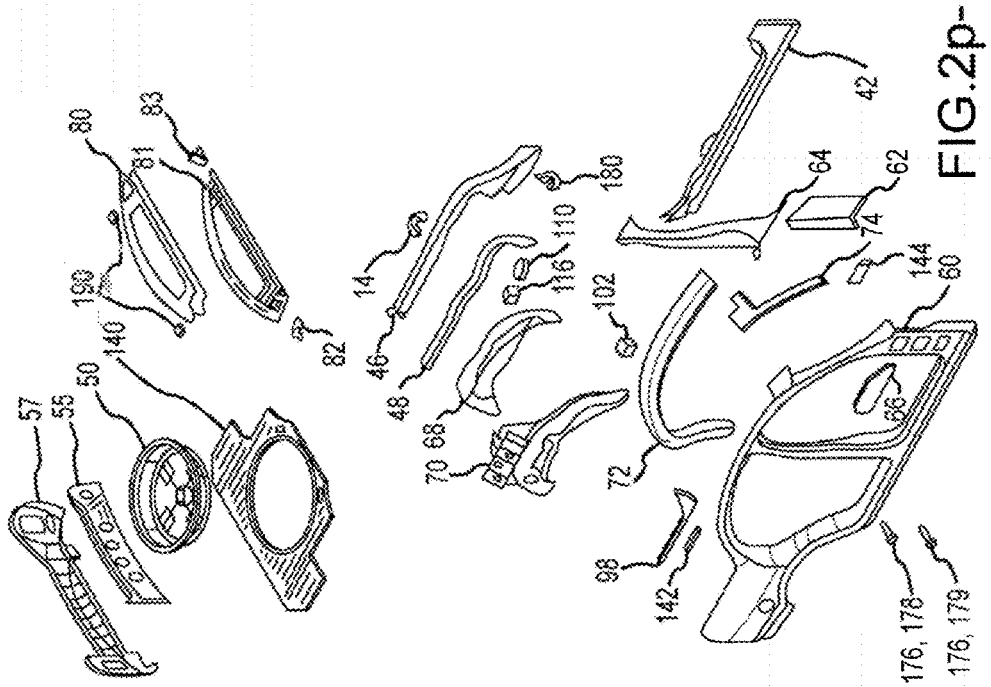

FIG.2p-1

| | |
|---|---|
| 57 | PANEL BACK |
| 55 | MEMBER PANEL BACK |
| 50 | PANEL SPARE TIRE TUB |
| 140 | PAN REAR FLOOR |
| 190 | ASSY REINF SEAT BELT RETRACTOR REAR |
| 80 | PANEL PACKAGE TRAY UPPER |
| 81 | PANEL PACKAGE TRAY LOWER |
| 83 | SUPPORT PACKAGE TRAY LH |
| 14 | BRACKET ROOF RAIL MOUNT LOWER RH |
| 82 | SUPPORT PACKAGE TRAY RH |
| 46 | ASSY RAIL REAR INNER RH |
| 48 | ASSY RAIL REAR OUTER RH |
| 68 | PANEL WHEELHOUSE INNER RH |
| 70 | PANEL WHEELHOUSE OUTER RH |
| 72 | RAIL SIDE ROOF RH |
| 98 | PANEL GUTTER DECKLID RH |
| 142 | ASSY REINF HINGE DECKLID |
| 102 | SUPPORT PANEL REAR HEADER RH |
| 116 | ASSY BRACKET REAR SHOCK ABSORBER MOUNT RH |
| 110 | PLATE REAR SPRING UPPER |
| 180 | BRACKET TRAILING ARM MOUNT RH |
| 176 | HINGE BASE RH (2 REQ'D) |
| 178 | HINGE STEM 119 (2-REQ'D) |
| 179 | HINGE STEM 141 (2 REQ'D) |
| 66 | REINF B-PILLAR LOWER |
| 60 | PANEL BODY SIDE OUTER RH |
| 144 | REINF A-PILLAR RH |
| 74 | PANEL A-PILLAR INNER UPPER RH |
| 62 | PANEL A-PILLAR INNER LOWER RH |
| 64 | PANEL B-PILLAR INNER RH |
| 42 | PANEL ROCKER INNER RH |

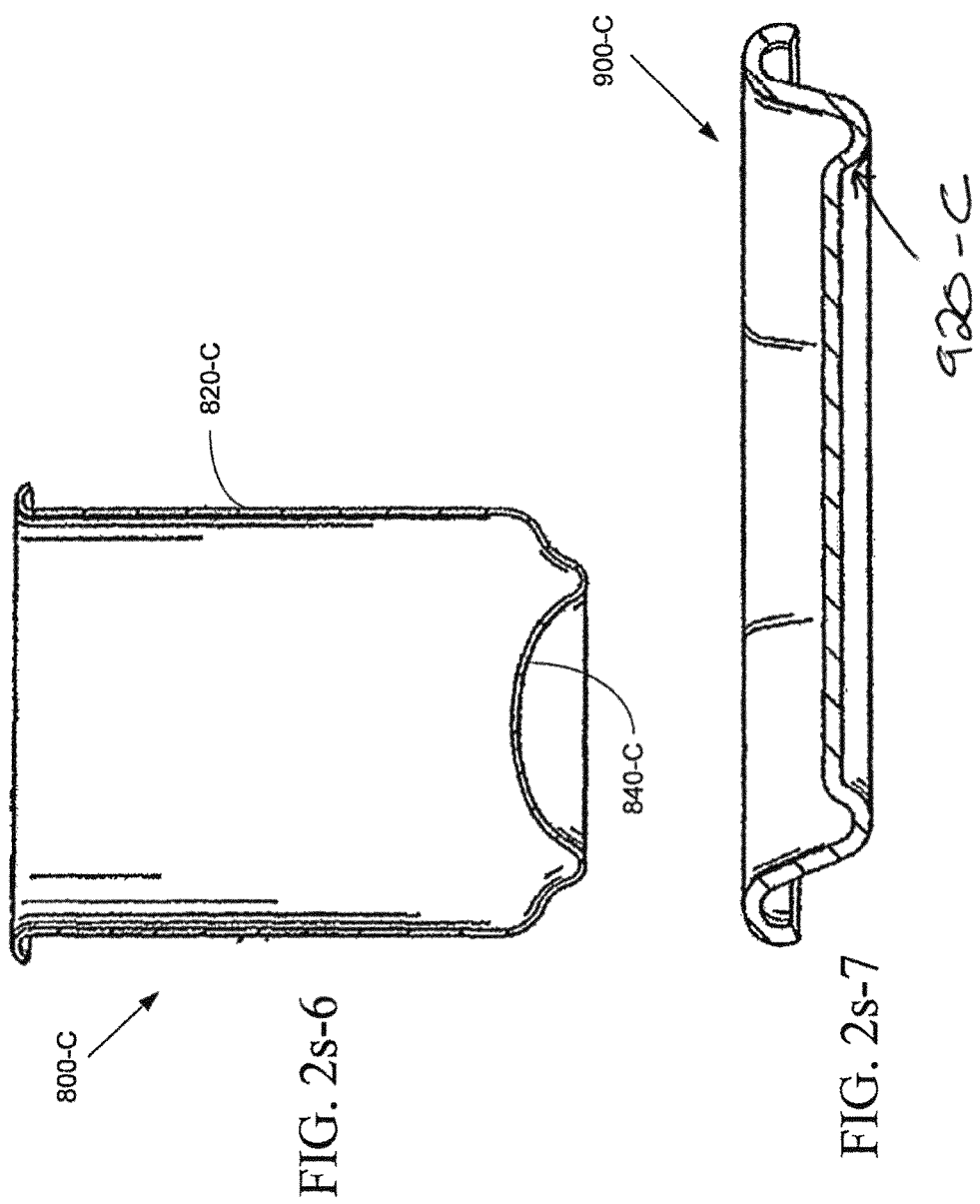

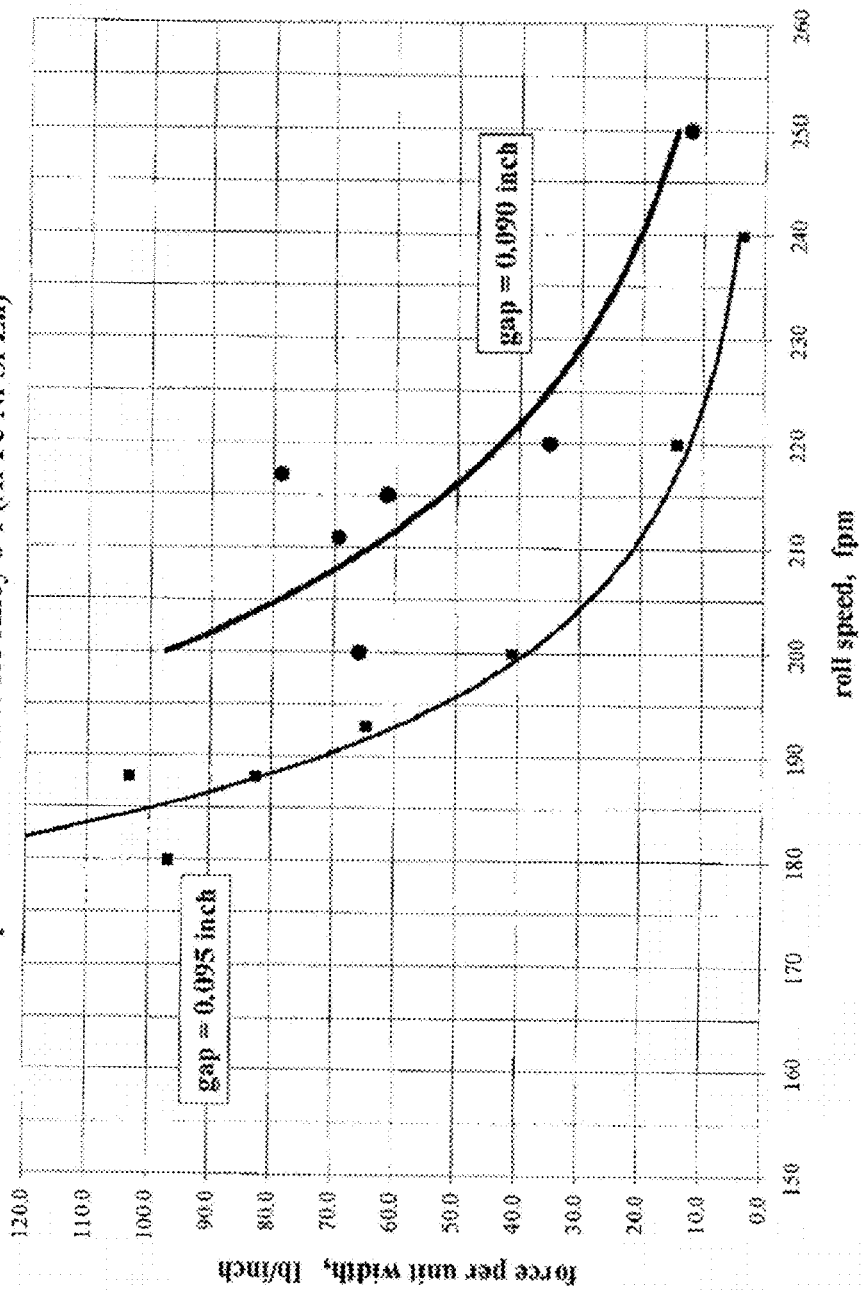

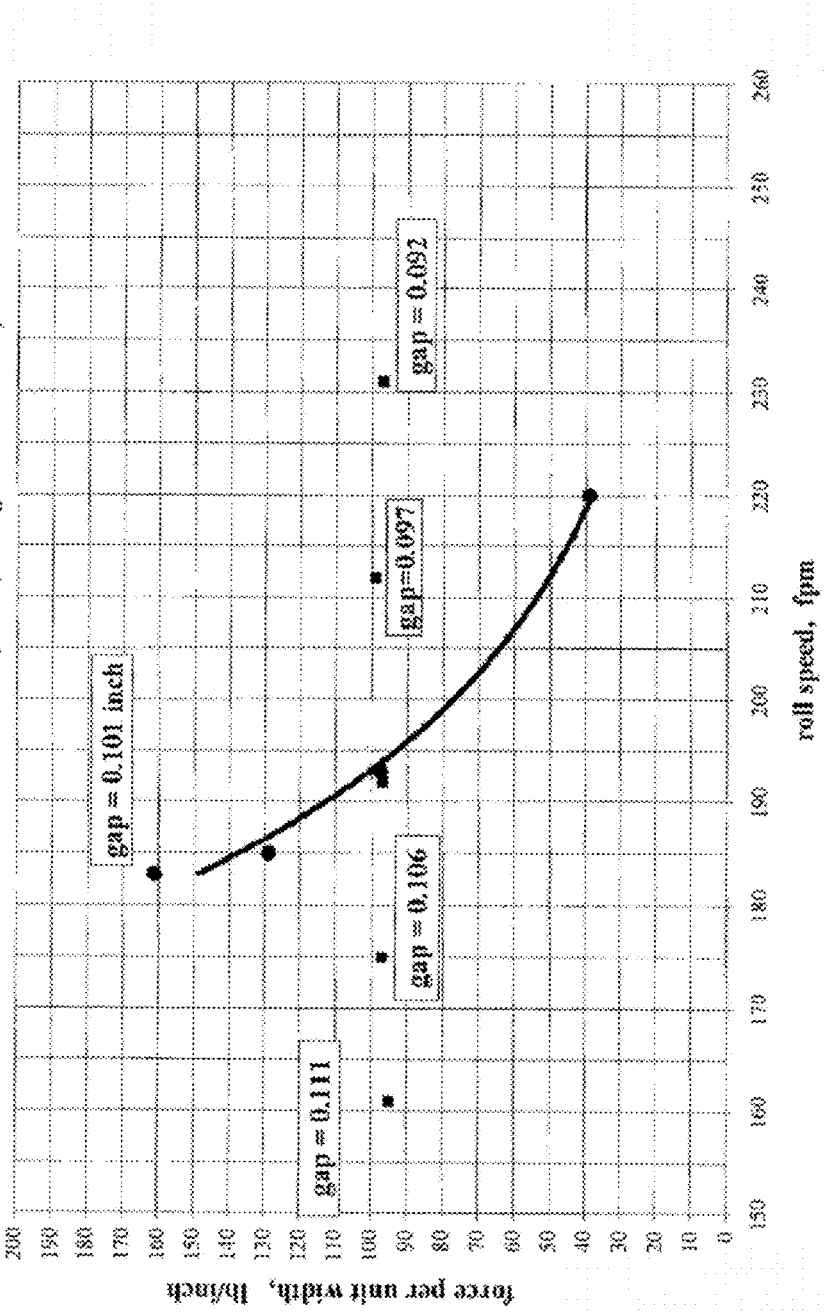

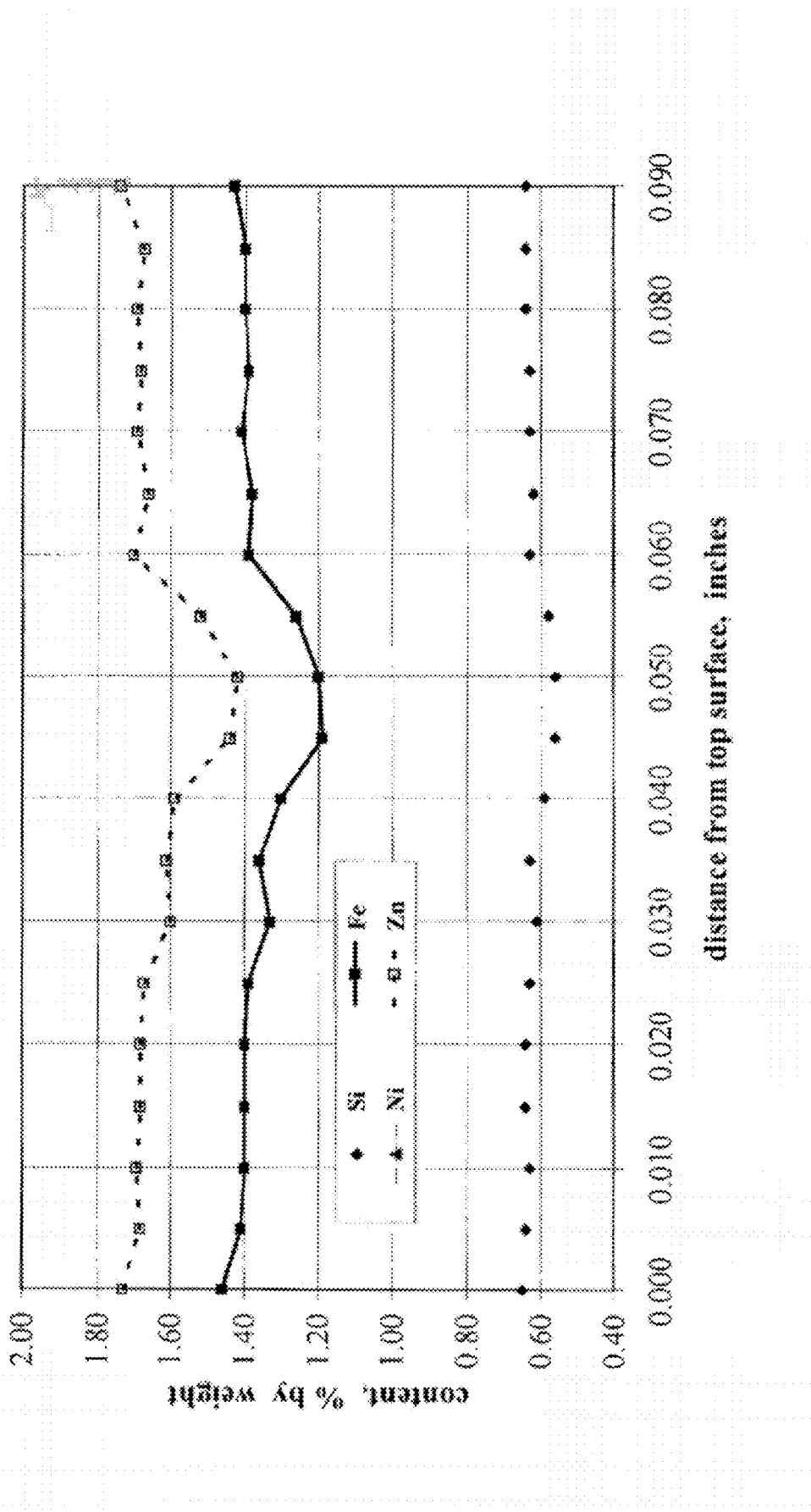

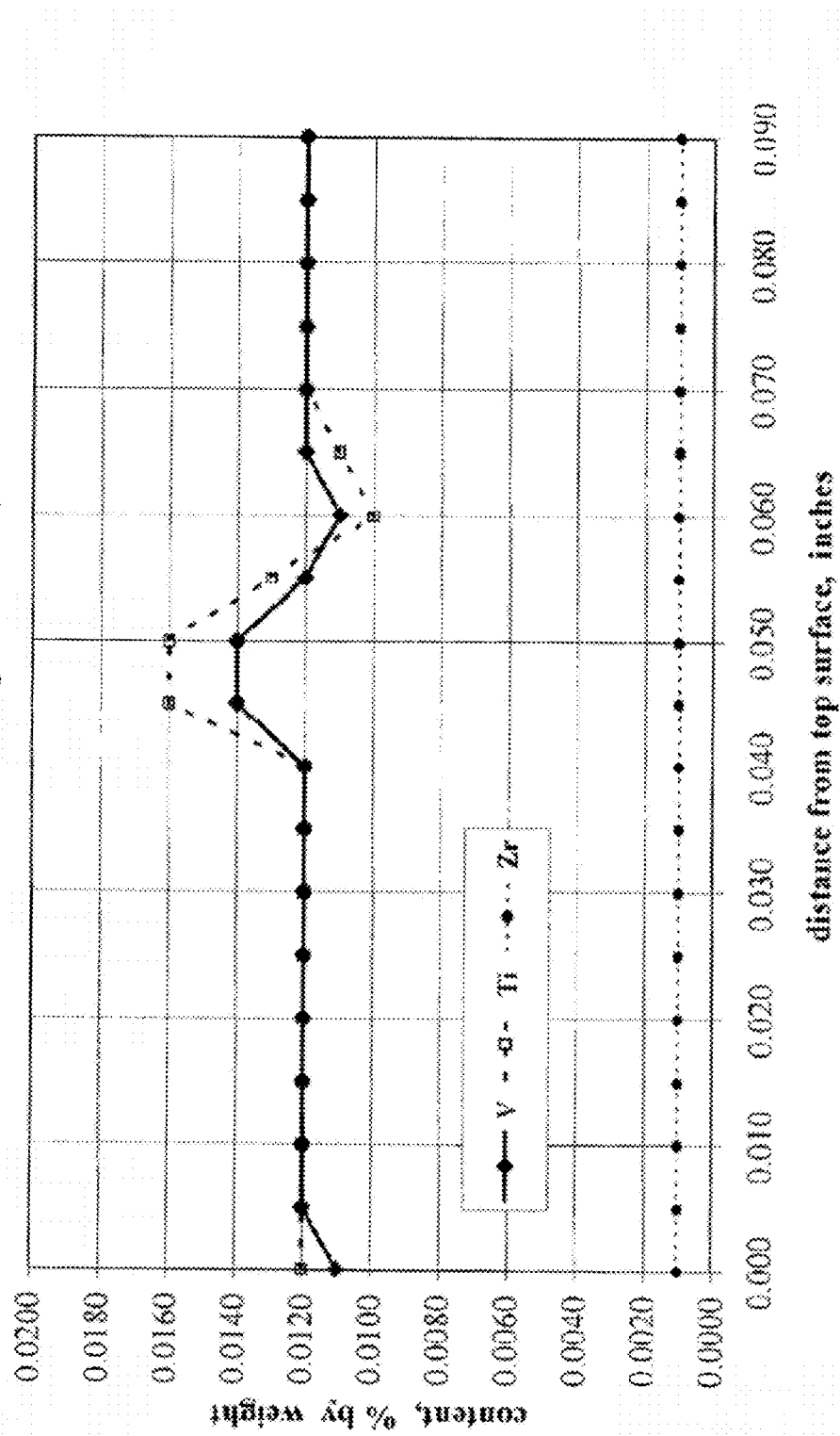

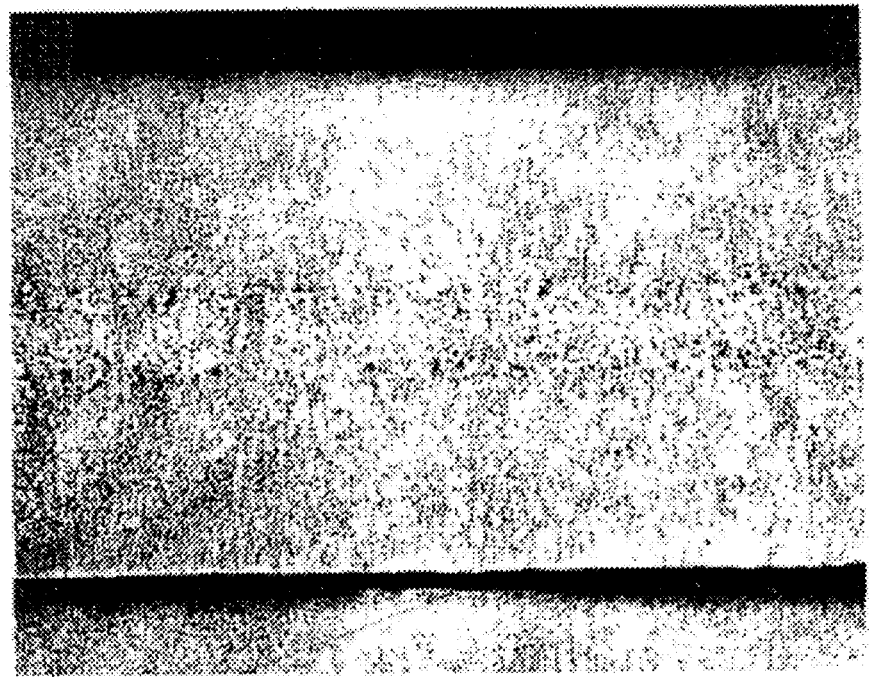
FIG. 6i  X25
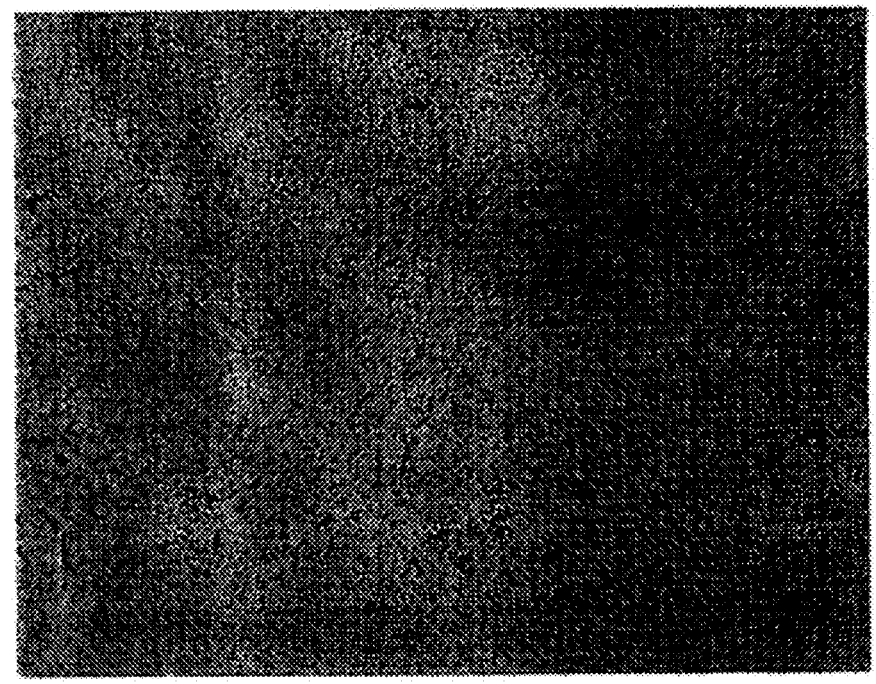
FIG. 6j  X100

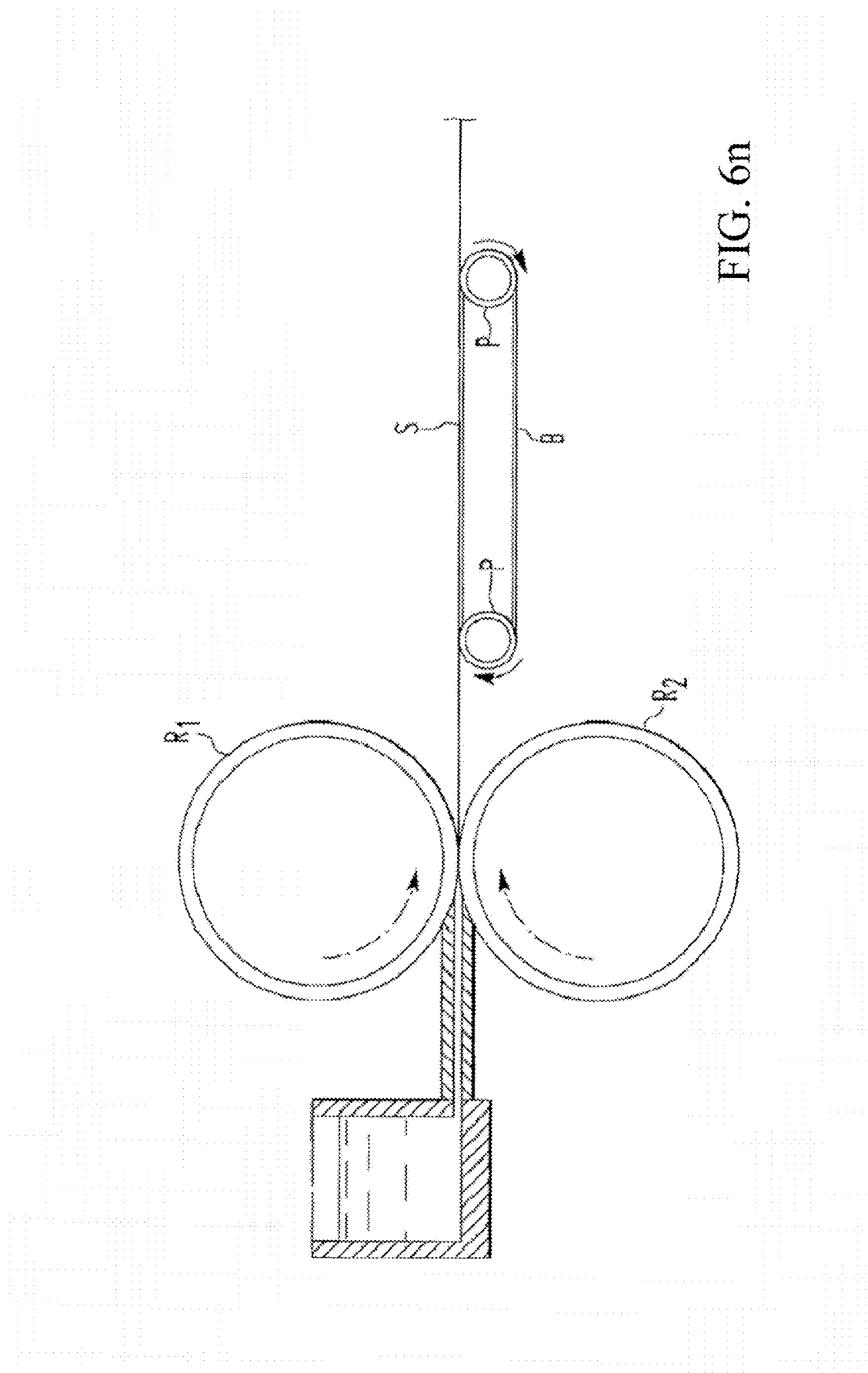

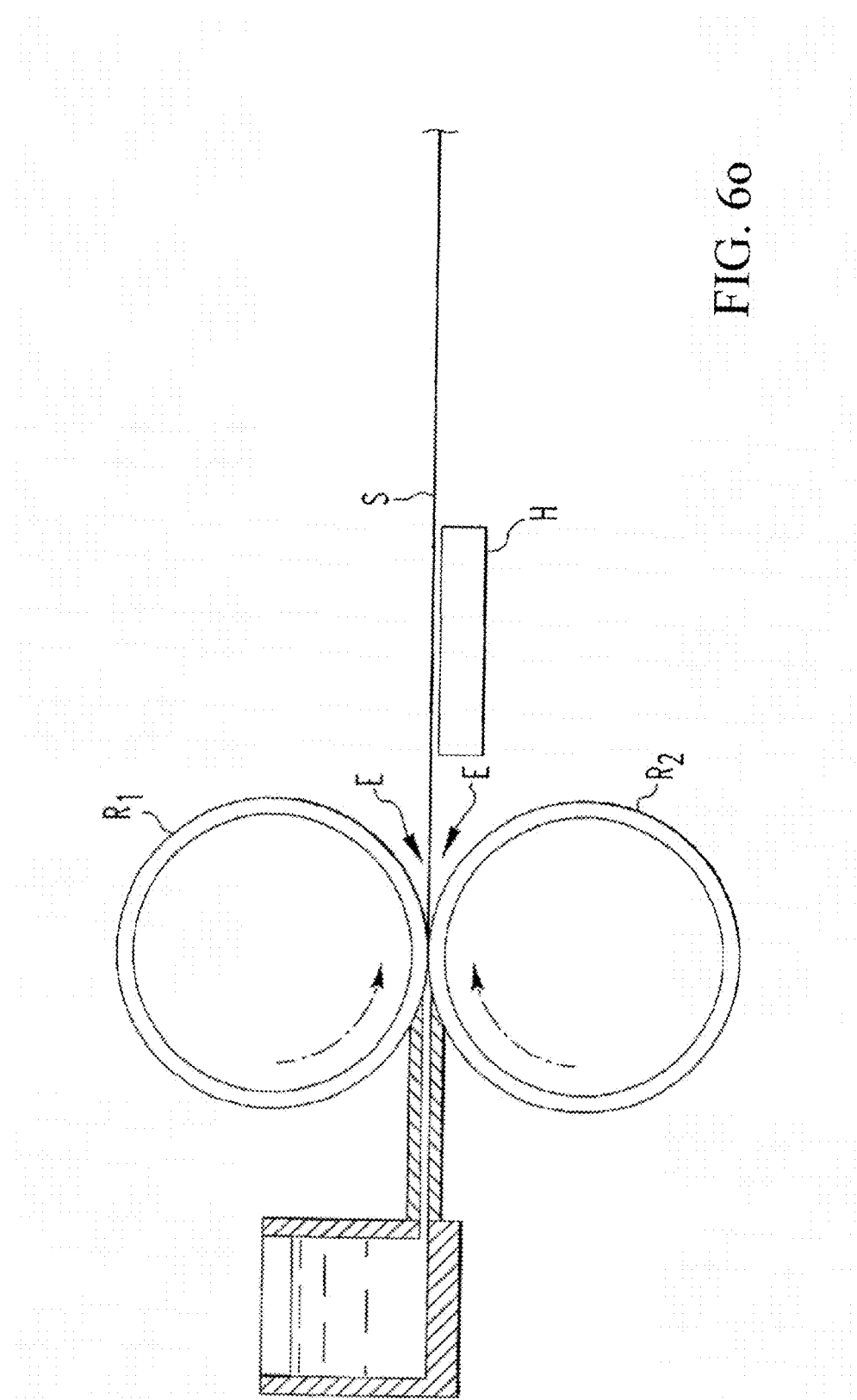

FUNCTIONALLY GRADED MMC STRIP – METALLIC OUTER LAYERS FOR GOOD FORMABILITY, MMC CENTER FOR IMPROVED RIGIDITY (Al-15 VOLUME % $Al_2O_3$ COMPOSITE IN ROLLED CONDITION AT 0.2 mm THICKNESS)

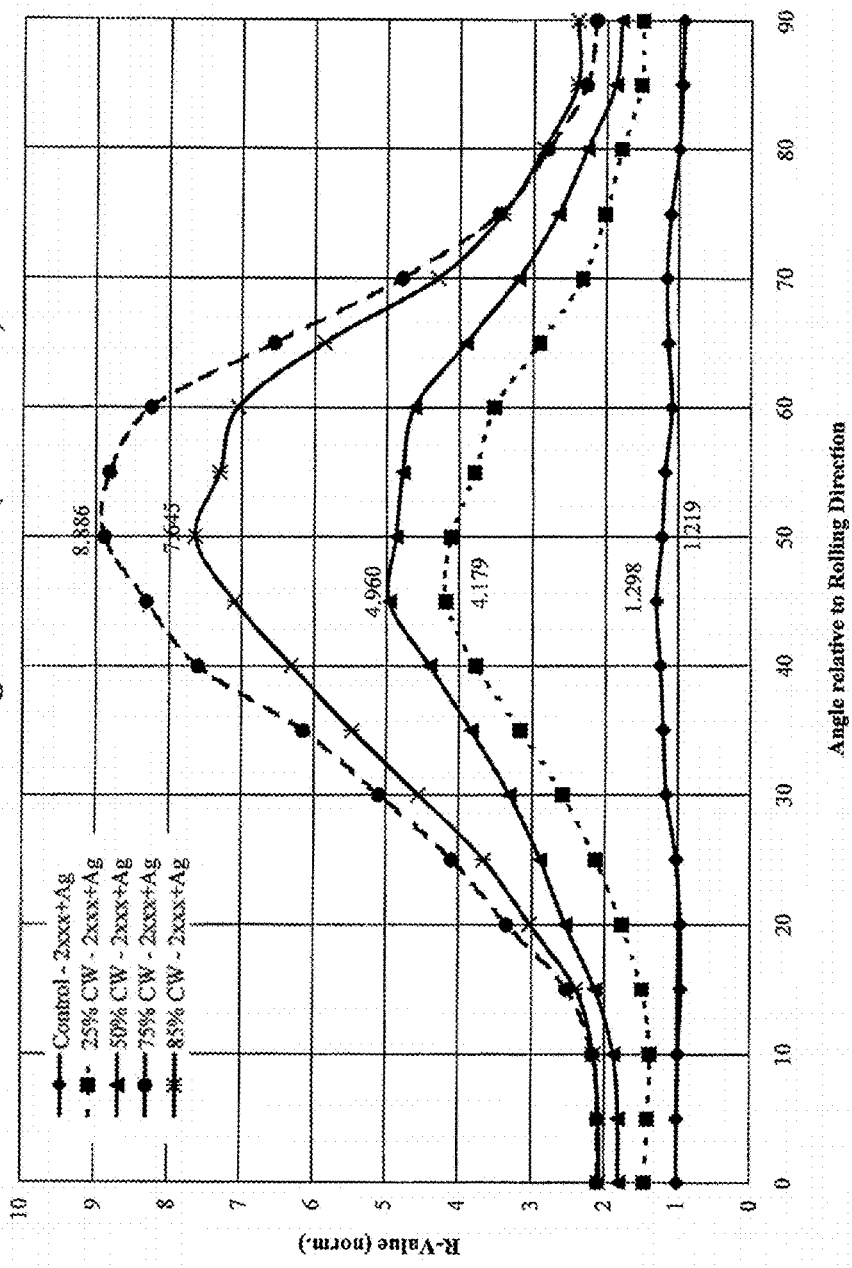

2xxx+Ag Aluminum Alloy - Control

2xxx+Ag Aluminum Alloy – 25% CW

2xxx+Ag Aluminum Alloy – 50% CW

2xxx+Ag Aluminum Alloy – 75% CW

2xxx+Ag Aluminum Alloy – 85% CW

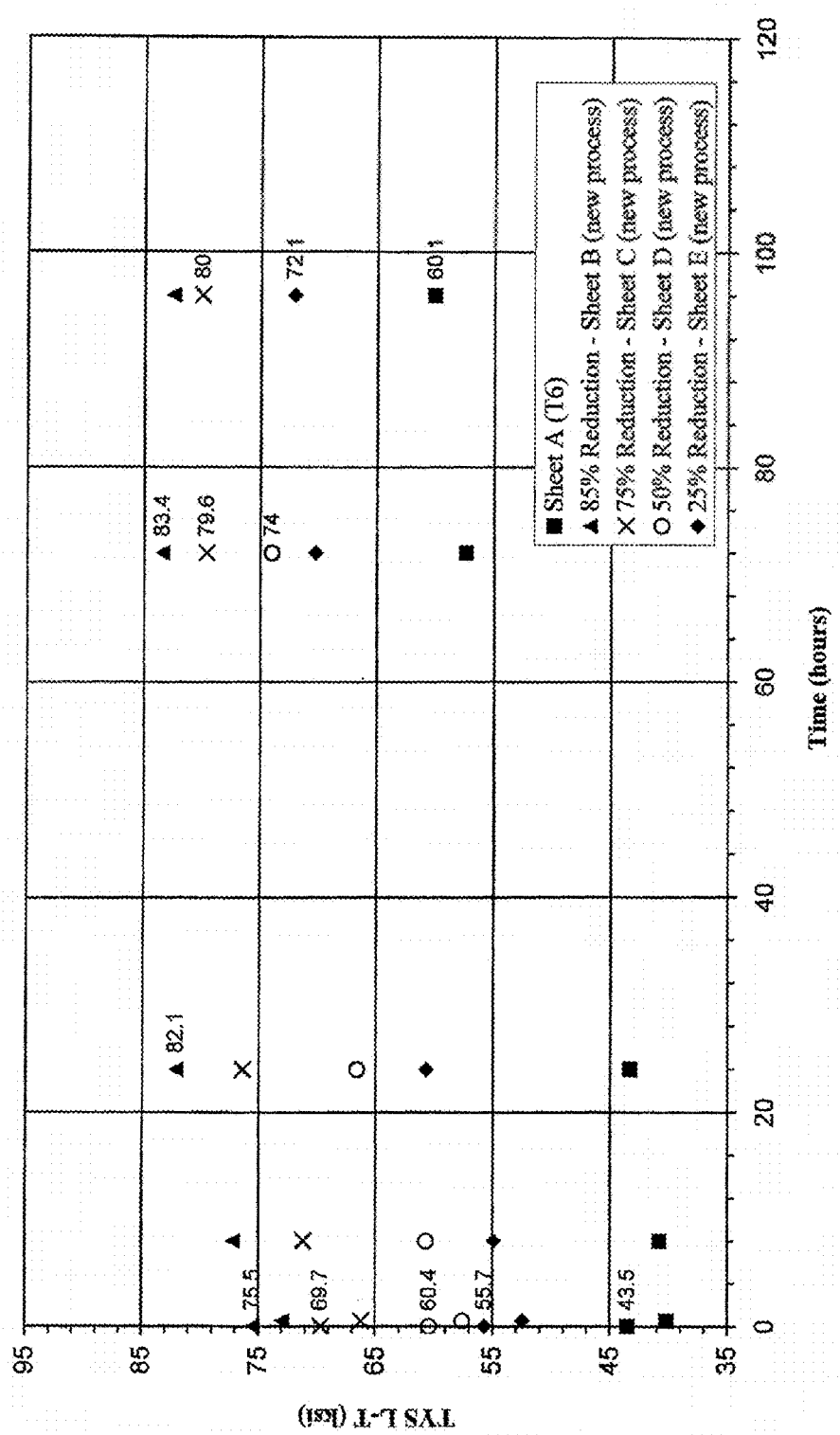

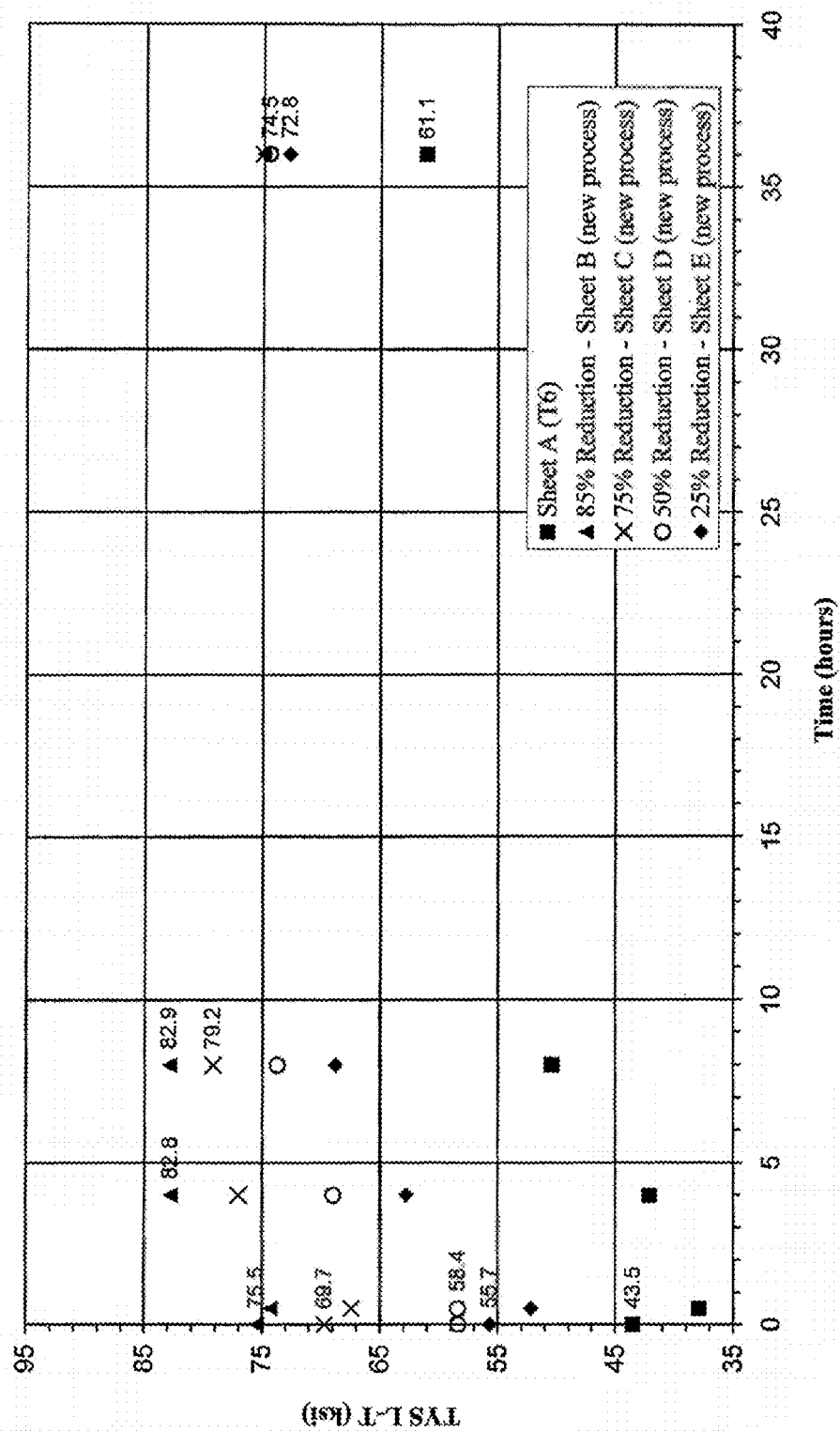
FIG. 15 – 2xxx+Ag – TYS v. Time at 330F

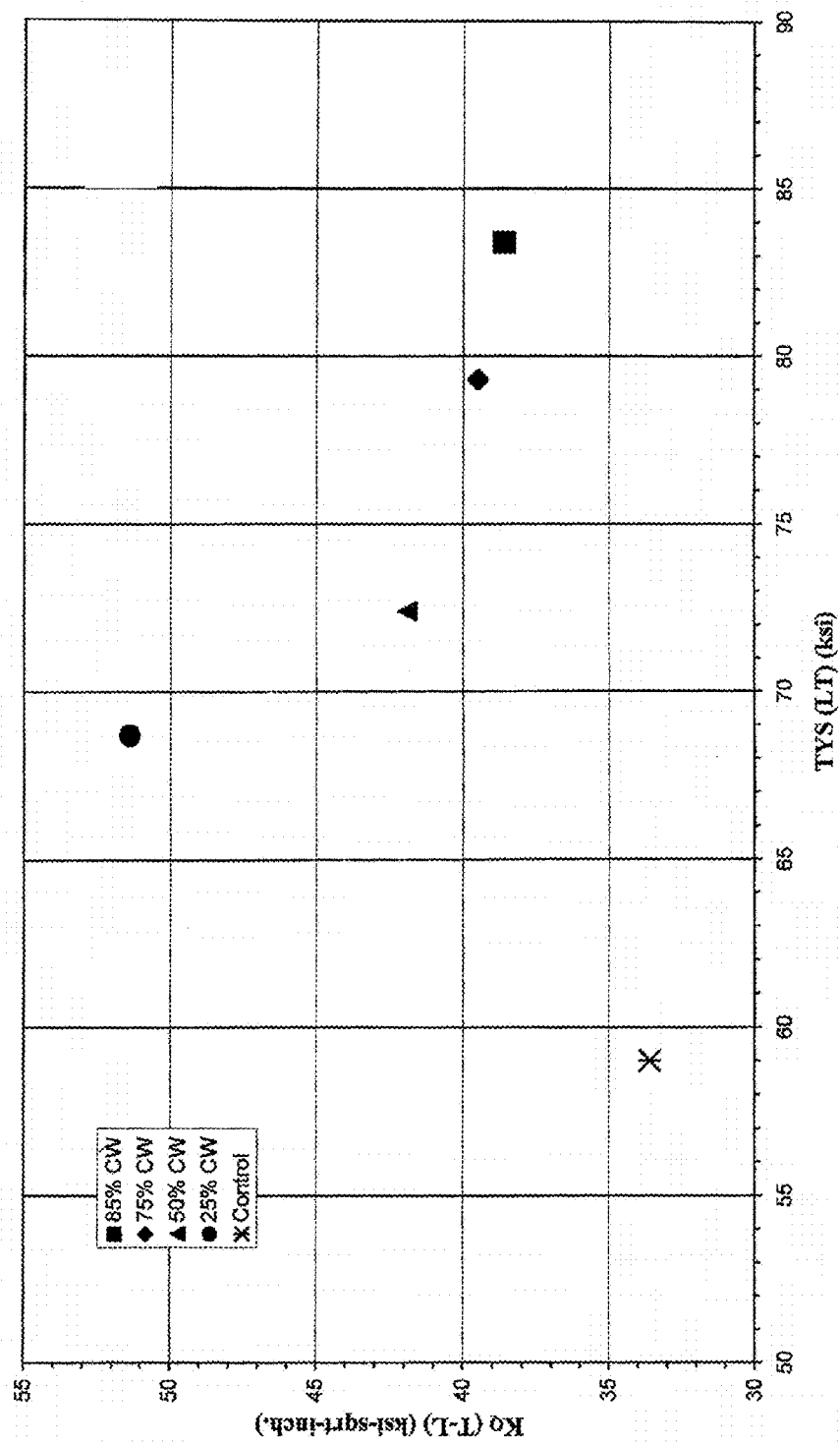

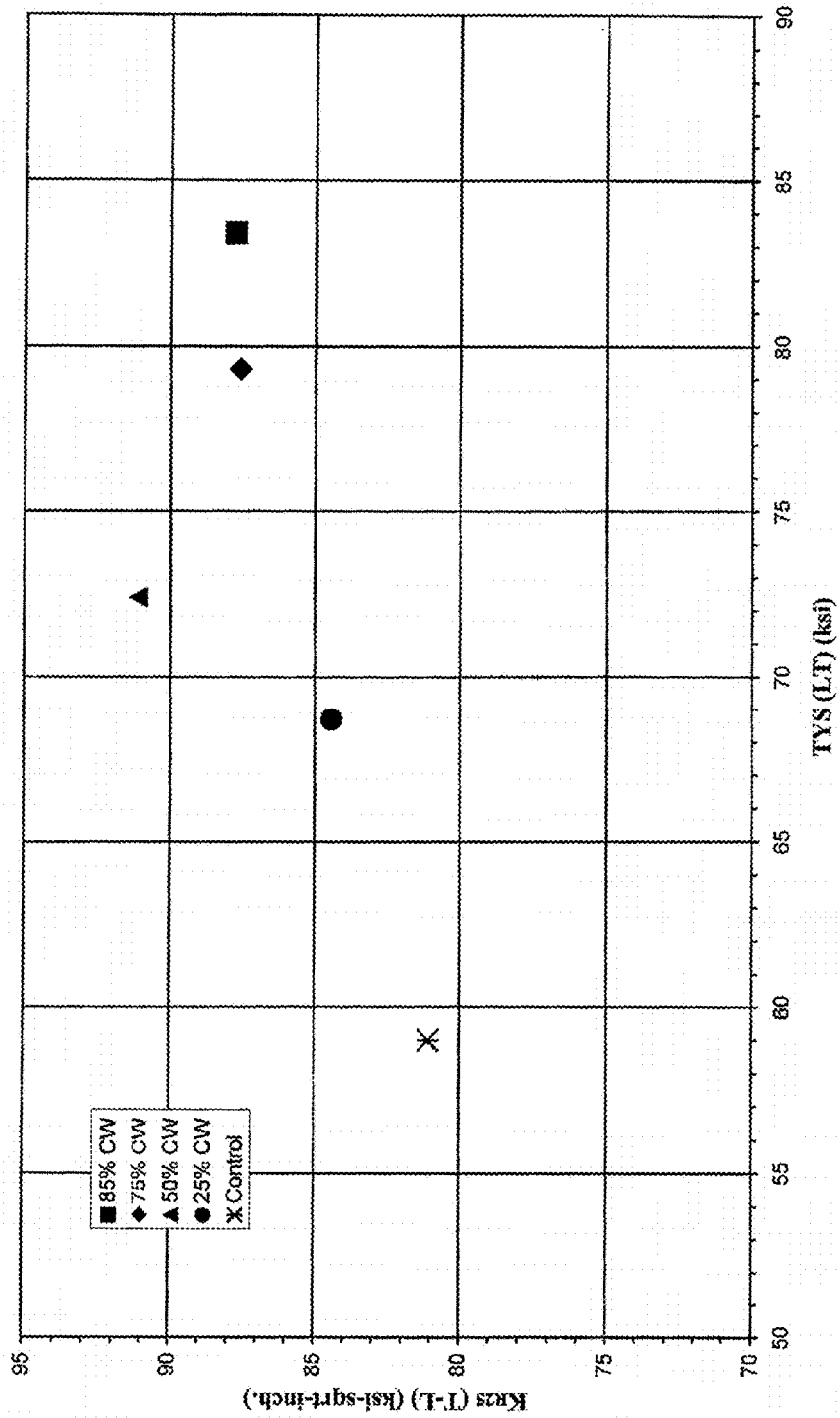

2XXX ALUMINUM ALLOYS, AND METHODS FOR PRODUCING THE SAME

CROSS-REFERENCE TO RELATED APPLICATIONS

This patent application is a continuation of International Patent Application No. PCT/US2013/027718, filed Feb. 26, 2013, which claims priority to U.S. Provisional Patent Application No. 61/608,050, filed Mar. 7, 2012, entitled, "IMPROVED 2XXX ALUMINUM ALLOYS, AND METHODS FOR PRODUCING THE SAME", both of which are incorporated herein by reference in their entirety.

This patent application is related to (a) U.S. Provisional Patent Application No. 61/608,034, filed Mar. 7, 2012, and (b) U.S. Provisional Patent Application No. 61/608,075, filed Mar. 7, 2012, and (c) U.S. Provisional Patent Application No. 61/608,092, filed Mar. 7, 2012, and (d) U.S. Provisional Patent Application No. 61/608,098, filed Mar. 7, 2012.

BACKGROUND

Aluminum alloys are useful in a variety of applications. However, improving one property of an aluminum alloy without degrading another property is elusive. For example, it is difficult to increase the strength of an alloy without decreasing the toughness of an alloy. Other properties of interest for aluminum alloys include corrosion resistance and fatigue crack growth resistance, to name two.

SUMMARY OF THE DISCLOSURE

Broadly, the present patent application relates to improved wrought, heat treatable aluminum alloys, and methods for producing the same. Specifically, the present patent application relates to improved wrought, 2xxx aluminum alloy products, and methods for producing the same. Generally, the 2xxx aluminum alloy products achieve an improved combination of properties due to, for example, the post-solutionizing cold work and post-cold-working thermal treatments, as described in further detail below.

2xxx aluminum alloys are aluminum alloys containing copper as the predominate alloying ingredient other than aluminum. For purposes of the present application, 2xxx aluminum alloys are aluminum alloys having at least 0.5 wt. % Cu, and up to 8.0 wt. % Cu, with the copper being the predominate alloying element other than aluminum.

One conventional process for producing 2xxx aluminum alloy products in rolled form is illustrated in FIG. 1. In the conventional process, a 2xxx aluminum alloy body is cast (10), after which it is homogenized (11) and then hot rolled to an intermediate gauge (12). Next, the 2xxx aluminum alloy body is cold rolled (13) to final gauge, after which it is solution heat treated and quenched (14). "Solution heat treating and quenching" and the like, generally referred to herein as "solutionizing", means heating an aluminum alloy body to a suitable temperature, generally above the solvus temperature, holding at that temperature long enough to allow soluble elements to enter into solid solution, and cooling rapidly enough to hold the elements in solid solution. The solid solution formed at high temperature may be retained in a supersaturated state by cooling with sufficient rapidity to restrict the precipitation of the solute atoms as coarse, incoherent particles. After solutionizing (14), the 2xxx aluminum alloy body may be optionally stretched a small amount (e.g., 1-5%) for flatness (15), thermally treated (16) and optionally subjected to final treatment practices (17). FIG. 1 is consistent with a process path for producing aluminum alloys in a T6 temper (the T6 temper is defined later in this patent application).

One embodiment of a new process for producing new 2xxx aluminum alloy products is illustrated in FIG. 2a. In this new process, a 2xxx aluminum alloy body is prepared for post-solutionizing cold work (100), after which it is cold worked (200), and then thermally treated (300). The new process may also include optional final treatment(s) (400), as described in further detail below. "Post-solutionizing cold work" and the like means cold working of an aluminum alloy body after solutionizing. The amount of post-solutionizing cold work applied to the 2xxx aluminum alloy body is generally at least 25%. By first solutionizing, and then cold working by at least 25%, and then appropriately thermally treating the 2xxx aluminum alloy body, the 2xxx aluminum alloy body may realize improved properties, as described in further detail below. For example, strength increases of 5-40%, or more, may be realized relative to conventional aluminum alloy products in the T6 and/or T87 temper, and in a fraction of the time required to process those conventional aluminum alloy products to the T6 and/or T87 temper (e.g., 10%-90% faster than T6 and/or T87 temper processed alloys). The new 2xxx aluminum alloy body may also realize good ductility, generally realizing an elongation of more than 4%, such as elongations of 6-16%, or higher. The new aluminum alloy body may realize such strength improvements with no loss in fracture toughness. In some instances, the new 2xxx aluminum alloy body realizes improved fracture toughness, such as 5-25% better fracture toughness than conventional aluminum alloy products in the T6 and/or T87 temper. Other properties may also be maintained and/or improved (e.g., fatigue crack growth resistance).

a. Preparing for Post-Solutionizing Cold Work

As illustrated in FIG. 2a, the new process includes preparing an aluminum alloy body for post-solutionizing cold work (100). The aluminum alloy body may be prepared for post-solutionizing cold work (100) in a variety of manners, including the use of conventional semi-continuous casting methods (e.g., direct chill casting of ingot) and continuous casting methods (e.g., twin-roll casting). As illustrated in FIG. 3, the preparing step (100) generally comprises placing the aluminum alloy body in a form suitable for the cold working (120) and solutionizing the aluminum alloy body (140). The placing step (120) and solutionizing step (140) may occur sequentially or concomitant to one another. Some non-limiting examples of various preparing steps (100) are illustrated in FIGS. 4-8, which are described in further detail below. Other methods of preparing an aluminum alloy body for post-solutionizing cold work (100) are known to those skilled in the art, and these other methods are also within the scope of the preparing step (100), even though not explicitly described herein.

In one approach, the preparing step (100) comprises a semi-continuous casting method. In one embodiment, and with reference now to FIG. 4, the placing step (120) includes casting the aluminum alloy body (122) (e.g., in the form of an ingot or billet), homogenizing the aluminum alloy body (124), hot working the aluminum alloy body (126), and optionally cold working the aluminum alloy body (128). After the placing step (120), the solutionizing step (140) is completed. Similar steps may be completed using continuous casting operations, although the aluminum alloy body would not be in the form of an ingot/billet after casting (120).

In another embodiment, and with reference now to FIG. 5, a preparing step (100) includes casting the aluminum alloy body (122), homogenizing the aluminum alloy body (124) and hot working the aluminum alloy body (126). In this embodiment, the hot working step (126) may be completed to place soluble elements in solid solution, after which the aluminum alloy body is quenched (not illustrated), thereby resulting in the solutionizing step (140). This is one example of the placing step (120) and solutionizing step (140) being completed concomitant to one another. This embodiment may be applicable to press-quenched products (e.g., extrusions) and hot rolled products that are quenched after hot rolling, among others.

In another approach, the preparing step (100) comprises a continuous casting method, such as belt casting, rod casting, twin roll casting, twin belt casting (e.g., Hazelett casting), drag casting, and block casting, among others. One embodiment of a preparing step (100) employing a continuous casting methodology is illustrated in FIG. 6a. In this embodiment, the aluminum alloy body is cast and solutionized at about the same time (142), i.e., concomitant to one another. The casting places the aluminum alloy body in a form sufficient to cold work. When the solidification rate during casting is sufficiently rapid, the aluminum alloy body is also solutionized. In this embodiment, the casting/solutionizing step (142) may include quenching of the aluminum alloy body after casting (not illustrated). This embodiment may be applicable to twin-roll casting processes, among other casting processes. Some twin-roll casting apparatus and processes capable of completing the process of FIG. 6a are described in U.S. Pat. No. 7,182,825, U.S. Pat. No. 7,125,612, U.S. Pat. No. 7,503,378, and U.S. Pat. No. 6,672,368, and are described relative to FIGS. 6b-1 through 6x, below.

In another embodiment, and with reference now to FIG. 7, a preparing step (100) includes casting the aluminum alloy body (122) and, after the casting step (122), then solutionizing the aluminum alloy body (140). In this embodiment, the placing step (120) comprises the casting (122). This embodiment is applicable to twin-roll casting processes, among other casting processes.

In another embodiment, and with reference now to FIG. 8, a preparing step (100) includes casting the aluminum alloy body (122), hot working the aluminum alloy body (126), and optionally cold working the aluminum alloy body (128). In this embodiment, the placing step (120) includes the casting (122), the hot working (126), and optional cold working (128) steps. After the placing step (120), the solutionizing step (140) is completed. This embodiment may be applicable to continuous casting processes.

Many of the steps illustrated in FIGS. 2a, 3-6a and 7-8 can be completed in batch or continuous modes. In one example, the cold working (200) and thermal treatment step (300) are completed continuously. In this example, a solutionized aluminum alloy body may enter the cold working operation at ambient conditions. Given the relatively short thermal treatment times achievable with the new processes described herein, the cold worked aluminum alloy body could be immediately thermally treated (300) after cold working (e.g., in-line) (e.g., the thermally treating step (300) is completed concomitant to the cold working step (200)). Conceivably, such thermal treatments could occur proximal the outlet of the cold working apparatus, or in a separate heating apparatus connected to the cold working apparatus. This could increase productivity. In another example, and as described in the Cold Working section (Section B), below, the preparing step (100) and cold working step (200) are completed continuously (e.g., when a continuously casting apparatus is used, and such that the continuously as-cast aluminum alloy body may immediately and continuously proceed to the cold working step (200), such as shown in FIG. 6a. In this embodiment, the casting/solutionizing step (142) may include quenching the aluminum alloy body to a suitable cold working temperature (e.g., less than 150° F.). In another embodiment, all three of the preparing step (100), the cold working step (200) and the thermal treatment step (300) are completed continuously.

As described above, the preparing step (100) generally comprises solutionizing of the aluminum alloy body. As noted above, "solutionizing" includes quenching (not illustrated) of the aluminum alloy body, which quenching may be accomplished via a liquid (e.g., via an aqueous or organic solution), a gas (e.g., air cooling), or even a solid (e.g., cooled solids on one or more sides of the aluminum alloy body). In one embodiment, the quenching step includes contacting the aluminum alloy body with a liquid or a gas. In some of these embodiments, the quenching occurs in the absence of hot working and/or cold working of the aluminum alloy body. For example, the quenching may occur by immersion, spraying and/or jet drying, among other techniques, and in the absence of deformation of the aluminum alloy body. As shown in the FIGS. 2a, 3-6a, 7-9, and 12, the solutionizing step is generally the last step of the preparing step and immediately precedes the cold working step.

Those skilled in the art recognize that other preparing steps (100) can be used to prepare an aluminum alloy body for post-solutionizing cold work (e.g., powder metallurgy methods), and that such other preparing steps fall within the scope of the preparing step (100) so long as they place the aluminum alloy body in a form suitable for cold working (120) and solutionize the aluminum alloy body (140), and irrespective of whether these placing (120) and solutionizing (140) steps occur concomitantly (e.g., contemporaneously) or sequentially, and irrespective of whether the placing step (120) occurs before the solutionizing step (140), or vice-versa.

i. Continuous Casting Embodiments a. Twin-Roll Continuous Casting—Continuous Casting and Solutionizing In one embodiment, the aluminum alloy bodies of the present disclosure may be prepared for post-solutionizing cold work by being continuously cast between a horizontal two-roll or two-belt caster, wherein the solutionizing occurs concomitant to the continuous casting (e.g., due to the continuous casting methodology). In such embodiments, the aluminum alloy bodies may be continuously cast by being juxtaposed and in communication with a pair of internally cooled rolls. Referring to now to FIGS. 6b-1 to 6b-2, one embodiment of a horizontal twin-roll continuous casting apparatus is illustrated. This apparatus uses a pair of counter-rotating cooled rolls $R_1$ and $R_2$ rotating in the directions of the arrows $A_1$ and $A_1$, respectively. The term horizontal means that the cast strip (S) is produced in a horizontal orientation or at an angle of plus or minus 30 degrees from horizontal. As shown in more detail in FIG. 6b-2, a feed tip T, which may be made from a ceramic material, may distribute molten metal M in the direction of the arrow. Gaps $G_1$ and $G_2$ between the feed tip T and the respective rolls $R_1$ and $R_2$ may be maintained as small as possible; however, contact between the tip T and the rolls $R_1$ and $R_2$ should be avoided. Without wishing to be bound by the theory, it is believed that maintaining small gaps aids to prevent molten metal from leaking out and to minimize the exposure of the molten metal to the atmosphere along the $R_1$ and $R_2$. A suitable dimension of the gaps $G_1$ and $G_2$ may be 0.01 inch (0.254 mm). A plane L through the centerline of the rolls $R_1$ and $R_2$ passes through a region of minimum clearance between the rolls $R_1$ and $R_2$ referred to as the roll nip N.

The molten metal M may directly contact the cooled rolls $R_1$ and $R_2$ at regions 2-6 and 4-6, respectively. Upon contact with the rolls $R_1$ and $R_2$, the metal M begins to cool and solidify. The cooling metal produces an upper shell 6-6 of solidified metal adjacent the roll $R_1$ and a lower shell 8-6 of solidified metal adjacent to the roll $R_2$. The thickness of the shells 6-6 and 8-6 increases as the metal M advances towards the nip N. Large dendrites 10-6 of solidified metal (not shown to scale) may be produced at the interfaces between each of the upper and lower shells 6-6 and 8-6 and the molten metal M. The large dendrites 10-6 may be broken and dragged into a center portion 12-6 of the slower moving flow of the molten metal M and may be carried in the direction of arrows $C_1$ and $C_2$. The dragging action of the flow can cause the large dendrites 10-6 to be broken further into smaller dendrites 14-6 (not shown to scale). In the central portion 12-6 upstream of the nip N referred to as a region 16-6, the metal M is semi-solid and may include a solid component (the solidified small dendrites 14-6) and a molten metal component. The metal M in the region 16-6 may have a mushy consistency due in part to the dispersion of the small dendrites 14-6 therein. At the location of the nip N, some of the molten metal may be squeezed backwards in a direction opposite to the arrows $C_1$ and $C_2$. The forward rotation of the rolls $R_1$ and $R_2$ at the nip N advances substantially only the solid portion of the metal (the upper and lower shells 6-6 and 8-6 and the small dendrites 14-6 in the central portion 12-6) while forcing molten metal in the central portion 12-6 upstream from the nip N such that the metal may be completely solid as it leaves the point of the nip N. Downstream of the nip N, the central portion 12-6 may be a solid central layer, or region, 18-6 containing the small dendrites 14-6 sandwiched between the upper shell 6-6 and the lower shell 8-6. In the central layer, or region, 18-6, the small dendrites 14-6 may be 20 microns to 50 microns in size and have a generally globular shape. The three layers, or regions of a single cast metal sheet/layer, of the upper and lower shells 6-6 and 8-6 and the solidified central layer 18-6 constitute a solid cast strip 20-6. Thus, the aluminum alloy strip 20-6 includes a first layer, or region, of an aluminum alloy and a second layer, or region, of the aluminum alloy (corresponding to the shells 6-6 and 8-6) with an intermediate layer, or region, (the solidified central layer 18-6) therebetween. The solid central layer, or region, 18-6 may constitute 20 percent to 30 percent of the total thickness of the strip 20-6. The concentration of the small dendrites 14-6 may be higher in the solid central layer 18-6 of the strip 20-6 than in the semi-solid region 16-6 of the flow, or the central portion 12-6. The molten aluminum alloy may have an initial concentration of alloying elements including peritectic forming alloying elements and eutectic forming alloying elements, such as any of the alloying elements described in the Composition section (Section G), below. Examples of alloying elements that are peritectic formers with aluminum include Ti, V, Zr and Cr. Examples of eutectic formers with aluminum include Si, Fe, Ni, Zn, Mg, Cu, Li and Mn.

As noted above, the aluminum alloy body includes 0.5-8.0 wt. % copper, where the copper is the predominate alloying element of the aluminum alloy body other than aluminum. During solidification of an aluminum alloy melt, dendrites typically have a lower concentration of eutectic formers than the surrounding mother melt and higher concentration of peritectic formers. In the region 16-6, in the center region upstream of the nip, the small dendrites 14-6 are thus partially depleted of eutectic formers while the molten metal surrounding the small dendrites is somewhat enriched in eutectic formers. Consequently, the solid central layer, or region, 18-6 of the strip 20-6, which contains a large population of dendrites, is depleted of eutectic formers and is enriched in peritectic formers in comparison to the concentration of the eutectic formers and the peritectic formers in the upper shell 6-6 and the lower shell 8-6. In other words, the concentration of eutectic forming alloying elements in the central layer, or region, 18-6 is generally less than in the first layer, or region, 6-6 and second layer, or region, 8-6. Similarly, the concentration of peritectic forming alloying elements in the central layer, or region, 18-6 is generally greater than in the first layer, or region, 6-6 and second layer, or region, 8-6. Thus, in some embodiments, an alloy comprises a larger amount (higher average through thickness concentration in that region) of Cu in the upper region or lower region of the alloy product as compared to the amount of Cu at the centerline of the aluminum alloy product, wherein the concentration in these regions is determined using the Concentration Profile Procedure, described below. In one embodiment, an alloy comprises a higher concentration of Cu in both the upper region and the lower region of the alloy product. In one embodiment, the alloy comprises at least a 1% higher Cu concentration (average concentration in the upper or lower region, as applicable) relative to the Cu concentration at the centerline of the product. In one embodiment, the alloy comprises at least a 3% higher Cu concentration (average concentration in the upper or lower region, as applicable) relative to the Cu concentration at the centerline of the product. In one embodiment, the alloy comprises at least a 5% higher Cu concentration (average concentration in the upper or lower region, as applicable) relative to the Cu concentration at the centerline of the product. In one embodiment, the alloy comprises at least a 7% higher Cu concentration (average concentration in the upper or lower region, as applicable) relative to the Cu concentration at the centerline of the product. In one embodiment, the alloy comprises at least a 9% higher Cu concentration (average concentration in the upper or lower region, as applicable) relative to the cu concentration at the centerline of the product.

Concentration Profile Procedure—For Si, Mg, Cu, Zn, Mn, and Fe

1. Sample Preparation

Aluminum sheet samples are mounted in Lucite and the longitudinal surface is polished using the standard metallographic preparation procedure (ref: ASTM E3-01 (2007) Standard Guide for Preparation of Metallographic Specimens). The polished surface of the samples is coated with carbon using commercially available carbon coating equipment. The carbon coating is a few microns thick.

2. Electron Probe Micro Analysis (EPMA) Equipment

A JEOL JXA8600 Superprobe is used to obtain through-thickness composition profiles in the prepared aluminum sheet samples. The Superprobe has four Wave Dispersive Spectrometer (WDS) detectors, two of which are gas flow (P-10) counters, and the others being Xe-gas sealed counters. The detection range of elements is from Beryllium (Be) to Uranium (U). The quantitative analysis detection limit is 0.02 wt %. The instrument is equipped with Geller Microanalytical Dspec/Dquant automation which allows stage control and unattended quantitative and qualitative analysis.

3. Electron Probe Micro Analysis (EPMA) Analysis Procedure

The Superprobe is set to the following conditions: accelerating voltage 15 kV, beam intensity 100 nA, defocus electron beam to an appropriate size such that a minimum of 13 different sections of the sample can be measured (e.g., defocused to 100 µm for a 0.060 inch thick specimen), and exposure time for each element is 10 seconds. Background correction was done for the sample surface at three random locations with a counting time of 5 seconds on positive and negative backgrounds.

One EPMA linescan is defined as scanning the whole thickness of the sheet samples at multiple locations along a straight line perpendicular to the rolling direction of the sample. An odd number of spots are used, with the mid-number spots at the center line of the sheet sample. The spacing between the spots is equivalent to the beam diameter. At each spot, any of the following elements may be analyzed, as appropriate: Mn, Cu, Mg, Zn, Si, and Fe. Si is analyzed by a PET diffracting crystal with a gas flow (P-10) counter; Fe, Cu, Zn, and Mn are by a LIF diffracting crystal with a Xe-gas sealed counter; Mg is analyzed by a TAP diffracting crystal with a gas flow (P-10) counter. The counting time for each element is 10 seconds. This linescan is repeated 30 times down the length of the sheet sample. At any one location of the sample, the reported composition of each element should be the averaged value of 30 measurements at the same thickness locations The concentration in the upper and lower regions is the average measured concentration in each of these regions, excluding (i) the edge (surface) of the upper region and the lower region and (ii) the transition zone between the center region and each of the upper region and the lower region. The concentration of an element must be measured at a minimum of four (4) different locations in each of the upper and lower regions to determine the average concentration of such element in each of those regions.

Elements measured were calibrated using the DQuant analysis package CITZAF, v4.01 with ZAF/Phi(pz) correction model Heinrich/Duncumb-Reed. This technique comes from Dr. Curt Heinrich of NIST, using a traditional Duncumb-Reed absorption correction. (see, Heinrich, Microbeam Analysis—1985, 79;—1989, 223)

Concentration Profile Procedure—For Li (Serial Sectioning)

For products containing lithium, serial sectioning is used wherein a section (through thickness) is obtained by (i) machining for samples having a thickness of 0.030 or higher, or (ii) chemical thinning via an appropriate chemical etchant for samples having a thickness of less than 0.030. At least 13 different through thickness samples are obtained and such that a centerline sample is always produced. Each of samples is then analyzed for its Li content by atomic absorption.

The rolls $R_1$ and $R_2$ may serve as heat sinks for the heat of the molten metal M. In one embodiment, heat may be transferred from the molten metal M to the rolls $R_1$ and $R_2$ in a uniform manner to ensure uniformity in the surface of the cast strip 20-6. Surfaces $D_1$ and $D_2$ of the respective rolls $R_1$ and $R_2$ may be made from steel or copper and may be textured and may include surface irregularities (not shown) which may contact the molten metal M. The surface irregularities may serve to increase the heat transfer from the surfaces $D_1$ and $D_2$ and, by imposing a controlled degree of non-uniformity in the surfaces $D_1$ and $D_2$, result in uniform heat transfer across the surfaces $D_1$ and $D_2$. The surface irregularities may be in the form of grooves, dimples, knurls or other structures and may be spaced apart in a regular pattern of 20 to 120 surface irregularities per inch, or about 60 irregularities per inch. The surface irregularities may have a height ranging from 5 microns to 50 microns, or alternatively about 30 microns. The rolls $R_1$ and $R_2$ may be coated with a material to enhance separation of the cast strip from the rolls $R_1$ and $R_2$ such as chromium or nickel.

The control, maintenance and selection of the appropriate speed of the rolls $R_1$ and $R_2$ may impact the ability to continuously cast strips using the present apparatus and methods. The roll speed determines the speed that the molten metal M advances towards the nip N. If the speed is too slow, the large dendrites 10-6 will not experience sufficient forces to become entrained in the central portion 12-6 and break into the small dendrites 14-6. In an embodiment, the roll speed may be selected such that a freeze front, or point of complete solidification, of the molten metal M may form at the nip N. Accordingly, the present casting apparatus and methods may be suited for operation at high speeds such as those ranging from 25 to 400 feet per minute; alternatively from 50 to 400 feet per minute; alternatively from 100 to 400 feet per minute; and alternatively from 150 to 300 feet per minute. The linear rate per unit area that molten aluminum is delivered to the rolls $R_1$ and $R_2$ may be less than the speed of the rolls $R_1$ and $R_2$ or about one quarter of the roll speed. High-speed continuous casting may be achievable with the presently disclosed apparatus and methods, at least in part, because the textured surfaces $D_1$ and $D_2$ ensure uniform heat transfer from the molten metal M. Due to such high casting speeds and associated rapid solidification rates, the soluble constituents may be substantially retained in solid solution, i.e., the solutionizing step may occur concomitant to the casting step.

The roll separating force may be a parameter in using the presently disclosed casting apparatus and methods. One benefit of the presently disclosed continuous casting apparatus and methods may be that solid strip is not produced until the metal reaches the nip N. The thickness is determined by the dimension of the nip N between the rolls $R_1$ and $R_2$. The roll separating force may be sufficiently great to squeeze molten metal upstream and away from the nip N. Excessive molten metal passing through the nip N may cause the layers of the upper and lower shells 6-6 and 8-6 and the solid central region 18-6 to fall away from each other and become misaligned. Insufficient molten metal reaching the nip N may cause the strip to form prematurely. A prematurely formed strip may be deformed by the rolls $R_1$ and $R_2$ and experience centerline segregation. Suitable roll separating forces may range from 25 to 300 pounds per inch of width cast, or 100 pounds per inch of width cast. In general, slower casting speeds may be needed when casting thicker gauge strips in order to remove the heat. Such slower casting speeds do not result in excessive roll separating forces because fully solid aluminum strip is not produced upstream of the nip. The grains in the aluminum alloy strip 20-6 are substantially undeformed because the force applied by the rolls is low (300 pounds per inch of width or less). Furthermore, since the strip 20-6 is not solid until it reaches the nip N; it will not be "hot rolled". Thus, the strip 20-6 does not receive a thermo-mechanical treatment due to the casting process itself, and when not subsequently hot rolled, the grains in the strip 20-6 will generally be substantially undeformed, retaining their initial structure achieved upon solidification, i.e. an equiaxial structure, such as globular, prior to the cold working step (200).

Thin gauge aluminum strip products may be cast using the presently described continuously casting apparatus and methods. Aluminum alloy strips may be produced at thicknesses of 0.100 inch or less at casting speeds ranging from 25 to 400 feet per minute; alternatively from 50 to 400 feet per minute; and alternatively from 100 to 400 feet per minute. Thicker gauge aluminum alloy strips may also be produced using the presently disclosed methods, for example at a thickness of 0.249 inch, or less. Thus, the continuously cast strips generally have a thickness of a sheet or foil product, per aluminum association standards.

The roll surfaces $D_1$ and $D_2$ may heat up during casting and are may be prone to oxidation at elevated temperatures. Non-uniform oxidation of the roll surfaces during casting can change the heat transfer properties of the rolls $R_1$ and $R_2$. Hence, the roll surfaces $D_1$ and $D_2$ may be oxidized prior to use to minimize changes thereof during casting. It may be beneficial to brush the roll surfaces $D_1$ and $D_2$ from time-to-time, or continuously, to remove debris which may build up during casting of aluminum and aluminum alloys. Small pieces of the cast strip may break free from the strip S and adhere to the roll surfaces $D_1$ and $D_2$. These small pieces of aluminum alloy strip may be prone to oxidation, which may result in non-uniformity in the heat transfer properties of the roll surfaces $D_1$ and $D_2$. Brushing of the roll surfaces $D_1$ and $D_2$ avoids the non-uniformity problems from debris which may collect on the roll surfaces $D_1$ and $D_2$.

Continuous casting of aluminum alloys according to the present disclosure may be achieved by initially selecting the desired dimension of the nip N corresponding to the desired gauge of the strip S. The speed of the rolls $R_1$ and $R_2$ may be increased to a desired production rate or to a speed which is less than the speed which causes the roll separating force increases to a level which indicates that rolling is occurring between the rolls $R_1$ and $R_2$. Casting at the rates contemplated by the present invention (i.e. 25 to 400 feet per minute) solidifies the aluminum alloy strip about 1000 times faster than aluminum alloy cast as an ingot cast and improves the properties of the strip over aluminum alloys cast as an ingot. The rate at which the molten metal is cooled may be selected to achieve rapid solidification of the outer regions of the metal. Indeed, the cooling of the outer regions of metal may occur at a rate of at least 1000 degrees centigrade per second.

As mentioned above, due to high casting speeds and associated rapid solidification rates, soluble constituents may be substantially retained in solid solution, i.e., the solutionizing step may occur concomitant to the casting step. The amount of solute retained in solid solution is related to an electrical conductivity of an alloy, with lower electrical conductivity values translated to more solute in solid solution. Thus, in one embodiment, an aluminum alloy body made by the continuous casting processes disclosed above may realize low electrical conductivity values. In one embodiment, due to the concomitant casting and solutionizing, an aluminum alloy processed according to such methods is within 50% of the theoretical minimum electrical conductivity of the alloy. As used in this subsection ((A)(i)), when an aluminum alloy body is "within XX % of the theoretical minimum electrical conductivity of the alloy", the alloy has a measured electrical conductivity that places the aluminum alloy body with XX % of the difference between the maximum theoretical electrical conductivity and minimum theoretical electrical conductivity". In other words, "within XX % of the theoretical minimum electrical conductivity=((MeasuredEC minus MinimumTheoreticalEC)/(MaximumTheoreticalEC minus MinimumTheoreticalEC)*100%, wherein the measured electrical conductivity is measured after the preparing (100), cold working (200) and thermally treating (300) steps have been completed, and in accordance with ASTM E1004 (2009). For example, if an aluminum alloy has a minimum theoretical conductivity of 23.7% IACS and has a maximum theoretical conductivity of 55.3% IACS, the difference between the maximum and minimum theoretical values would be 31.6% IACS. If the actual measured electrical conductivity of this same aluminum alloy was 27.7% IACS, it would be within about 12.7% of the minimum theoretical value (12.6582%=(MeasuredEC minus MinimumTheoreticalEC) divided by (MaximumTheoreticalEC minus MinimumTheoreticalEC), or ((27.7−23.7)/31.6). Values for minimum and maximum resistivity may be calculated using the constants provided in *Aluminum: Properties and Physical Metallurgy*, ed. J. E. Hatch, American Society for Metals, Metals Park, Ohio, 1984, p. 205, which describe the effects of various elements in and out of solution on resistivity. Values for resistivity may then be converted to values for electrical conductivity in % IACS (assumes a base resistivity of pure aluminum of 2.65 micro-ohm-cm). The theoretical minimum electrical conductivity relates to a situation where all alloying elements are in solid solution. The theoretical maximum electrical conductivity relates to a situation where all alloying elements are out of solid solution.

In one embodiment, an aluminum alloy body made by the continuous casting processes disclosed above is within 40% of the theoretical minimum electrical conductivity of the alloy. In another embodiment, an aluminum alloy processed according to such methods is within 30% of the theoretical minimum electrical conductivity of the alloy. In yet another embodiment, an aluminum alloy processed according to such methods is within 20% of the theoretical minimum electrical conductivity of the alloy. In another embodiment, an aluminum alloy processed according to such methods is within 15% of the theoretical minimum electrical conductivity of the alloy, or less. Similar electrical conductivity values may be realized in the continuous casting embodiments described below in subsections (C) and (D).

b. Example of Continuously Casting with Solutionizing

Molten aluminum alloys having alloying elements present in the percentage by weight indicated in the below table were continuously cast on a heat sink belt caster where the upper belt did not contact the solidifying metal downstream of the nip. The tests reported herein were not performed on a roll caster. However, the processes were designed to simulate casting onto a pair of rolls without working the solidified metal.

| Alloy | Alloying elements (% by weight) |
|---|---|
| 6-1 | 0.6 Si—1.4 Fe—1.7 Ni—0.6 Zn |
| 6-2 | 0.9 Mg—0.9 Mn—0.5 Cu—0.45 Fe—0.3 Si |
| 6-3 | 1.4 Mg—0.25 Mn—0.15 Cu—0.30 Fe—0.4 Si |

The force per unit width applied to Alloys 6-1 and 6-2 versus the roll speed for various gap settings is shown graphically in FIGS. 6c and 6d, respectively. In all instances, the force applied by the rolls was less than 200 lbs/inch of width.

A strip of Alloy 6-1 (0.09 inch thick) was analyzed for segregation of alloying elements. The concentration of alloying elements through the thickness of the strip is presented graphically FIG. 6e for eutectic forming elements (Si, Fe, Ni and Zn) and in FIG. 6f for peritectic forming elements (Ti, V and Zr). The eutectic forming alloying elements are partially depleted in the central portion of the strip while the peritectic forming alloying elements are enriched in the central portion of the strip.

FIG. 6g is a photomicrograph at 25 times magnification of a transverse section through a stack of three strips of Alloy 6-1 produced at a casting speed of 188 feet per minute, mean strip thickness of 0.094 inch, strip width of 15.5 inches, and applied force of 103 pounds per inch of width. The full thickness of one strip is seen in FIG. 6g between a pair of thin, dark bands. The central, darker band in the full strip corresponds to the central layer 18-6 described above which is partially depleted of eutectic forming alloying elements while the outer, lighter portions of the fall strip correspond to the upper and lower shells 6-6 and 8-6, described above. FIG. 6h is a photomicrograph of the central strip of FIG. 6g at 100 times magnification. The globular nature of the grains in the central, darker band indicates no working of the strip occurred in the caster.

FIG. 6i is a photomicrograph at 25 times magnification of a transverse section through a stack of two strips of Alloy 6-2 produced at a casting speed of 231 feet per minute, roll gap of 0.0925 inch, strip width of 15.5 inches and applied force of 97 pounds per inch of width. The full thickness of one strip and a portion of the other strip are illustrated by FIG. 6i. The strip of FIG. 6i also exhibits a central, darker band depleted of eutectic forming alloying elements. FIG. 6j is a photomicrograph of the center portion of the strip of FIG. 6i at 100 times magnification. The globular nature of the grains in the central, darker band also indicates no working of the strip occurred in the caster.

A strip of Alloy 6-2 (0.1 inch thick) was analyzed for segregation of alloying elements. The concentration of alloying elements through the thickness of the strip is presented graphically in FIG. 6k for eutectic forming elements (Mg, Mn, Cu, Fe and Si) and in FIG. 6l for peritectic forming elements (Ti and V). The eutectic forming alloying elements are partially depleted in the central portion of the strip while the peritectic forming alloying elements are enriched in the central portion of the strip.

FIG. 6m is a photomicrograph at 50 times magnification of a transverse section through an anodized strip of Alloy 6-3 produced at a casting speed of 196 feet per minute, mean strip thickness of about 0.098 inch, strip width of 15.6 inches, and applied force of 70 pounds per inch of width. The photomicrograph shows the central portion of the strip sandwiched between upper and lower portions without showing the top and bottom surfaces of the strip. The central, lighter band in the strip corresponds to the central layer 18-6 described above which is partially depleted of eutectic forming alloying elements while the outer, darker portions of the full strip correspond to the upper and lower shells 6-6 and 8-6 described above. The grains shown in the strip are globular, indicating absence of working thereof.

It may be beneficial to support the hot strip S exiting the rolls $R_1$ and $R_2$ until the strip S cools sufficiently to be self-supporting. One support mechanism is shown FIG. 6n, and includes a continuous conveyor belt B positioned beneath the strip S exiting the rolls $R_1$ and $R_2$. The belt B travels around pulleys P and supports the strip S for a predetermined distance (e.g., about 10 feet). The length of the belt B between the pulleys P may be determined by the casting process, the exit temperature of the strip S and the alloy of the strip S. Suitable materials for the belt B include fiberglass and metal (e.g. steel) in solid form or as a mesh. Alternatively, as shown in FIG. 6o, the support mechanism may include a stationary support surface H such as a metal shoe over which the strip S travels while it cools. The shoe H may be made of a material to which the hot strip S does not readily adhere. In certain instances where the strip S is subject to breakage upon exiting the rolls $R_1$ and $R_2$, the strip S may be cooled at locations E with a fluid such as air or water. Typically, the strip S exits the rolls $R_1$ and $R_2$ at about 1100° F. It may be desirable to lower the strip temperature to about 1000° F. within about 8 to 10 inches of the nip N. One suitable mechanism for cooling the strip at locations E to achieve that amount of cooling is described in U.S. Pat. No. 4,823,860. A separate quenching apparatus may be used to further quench the strip and achieve the above-noted cooling rates.

In one embodiment, a method comprises quenching of the as-cast sheet. In these embodiments, the solutionizing step includes solution heat treating and quenching, where the solution heat treating is accomplished due to the continuous casting. The preparing step further comprises removing the aluminum alloy sheet from the continuous casting apparatus, and, after the removing step, but before the aluminum alloy sheet reaches a temperature of 700° F., quenching the aluminum alloy sheet, where the quenching reduces the temperature of the aluminum alloy sheet at a rate of at least 100° F. per second, thereby accomplishing the solutionizing. To accomplish the solutionizing step, the temperature of the aluminum alloy sheet exiting the continuous casting apparatus is higher than the temperature of the aluminum alloy sheet during the quenching step.

In one embodiment, the quenching step is initiated before the aluminum alloy sheet reaches a temperature of 800° F. In another embodiment, the quenching step is initiated before the aluminum alloy sheet reaches a temperature of 900° F. In yet another embodiment, the quenching step is initiated before the aluminum alloy sheet reaches a temperature of 1000° F. In another embodiment, the quenching step is initiated before the aluminum alloy sheet reaches a temperature of 1100° F.

In one embodiment, the quenching step reduces the temperature of the aluminum alloy sheet at a rate of at least 200° F. per second. In another embodiment, the quenching step reduces the temperature of the aluminum alloy sheet at a rate of at least 400° F. per second. In yet another embodiment, the quenching step reduces the temperature of the aluminum alloy sheet at a rate of at least 800° F. per second. In another embodiment, the quenching step reduces the temperature of the aluminum alloy sheet at a rate of at least 1600° F. per second. In yet another embodiment, the quenching step reduces the temperature of the aluminum alloy sheet at a rate of at least 3200° F. per second. In another embodiment, the quenching step reduces the temperature of the aluminum alloy sheet at a rate of at least 6400° F. per second. In yet another embodiment, the quenching step reduces the temperature of the aluminum alloy sheet at a rate of at least 10,000° F. per second.

The quenching step may be accomplished to bring the aluminum alloy sheet to a low temperature (e.g., due to a subsequent cold working step). In one embodiment, the quenching comprises cooling the aluminum alloy sheet to a temperature of not greater than 200° F. (i.e., the temperature of the aluminum alloy sheet upon completion of the quenching step is not greater than 200° F.). In another embodiment, the quenching comprises cooling the aluminum alloy sheet to a temperature of not greater than 150° F. In yet another embodiment, the quenching comprises cooling the aluminum alloy sheet to a temperature of not greater than 100° F. In another embodiment, the quenching comprises cooling the aluminum alloy sheet to ambient temperature.

The quenching step may be accomplished via any suitable cooling medium. In one embodiment, the quenching comprises contacting the aluminum alloy sheet with a gas. In one embodiment, the gas is air. In one embodiment, the quenching comprises contacting the aluminum alloy sheet with a liquid. In one embodiment, the liquid is aqueous based, such as water or another aqueous based cooling solution. In one embodiment, the liquid is an oil. In one embodiment, the oil is hydrocarbon based. In another embodiment, the oil is silicone based.

In some embodiments, the quenching is accomplished via a quenching apparatus downstream of the continuous casting apparatus. In other embodiments, ambient air cooling is used.

c. Twin-Roll Continuous Casting—Continuous Casting With Particulate Matter

In one embodiment, the twin-roll casting apparatus and processes may generate an aluminum alloy product having particulate matter therein. The particulate matter can be any non-metallic material such as aluminum oxide, boron carbide, silicon carbide and boron nitride or a metallic material created in-situ during casting or added to a molten aluminum alloy. For purposes of this embodiment, the terms "upper", "lower", "right", "left", "vertical", "horizontal," "top", "bottom", and derivatives thereof shall relate to the disclosure, as it is oriented in the drawing FIGS. 6*p* through 6*s*, as applicable.

Referring now to FIG. 6*p*, in this embodiment the casting/solutionizing step 142 may include continuously casting strips with particulate matter there is provided. In step 1006, a molten aluminum alloy containing particulate matter may be delivered to a casting apparatus, such as the casting apparatus described above relative to FIGS. 6*b*-1 and 6*b*-2. In step 1026, the casting apparatus may rapidly cool at least a portion of the molten metal to solidify an outer region (also referred to as an area, shell, and layer) of the molten metal, and inner region (also referred to as an area, shell, and layer) enriched with particulate matter. The solidified outer regions may increase in thickness as the alloy is cast.

The product exiting the casting apparatus may be a single-layered product and may include the solid inner regions formed in step 1026 containing the particulate matter sandwiched within the outer solid regions. The single-layered product can be generated in various forms such as but not limited to a sheet, a plate, or a foil. In extrusion casting, the product may be in the form of a wire, rod, bar or other extrusion.

Similar to FIG. 6*b*-2, but referring now to FIG. 6*q*, the molten aluminum alloy metal M containing particulate matter 100-6 may be provided between rolls $R_1$ and $R_2$ of the roll caster. One skilled in the art would understand that the rolls $R_1$ and $R_2$ are the casting surfaces of the roll caster. Typically, $R_1$ and $R_2$ are cooled to aid in the solidification of the molten metal M, which directly contacts the rolls $R_1$ and $R_2$ at regions 2-6 and 4-6, respectively. Upon contact with the rolls $R_1$ and $R_2$, the metal M begins to cool and solidify. The cooling metal solidifies as a first region or shell 6-6 of solidified metal adjacent the roll $R_1$ and a second region or shell 8-6 of solidified metal adjacent to the roll $R_2$. The thickness of each of the region or shell 8-6 and 6-6 increases as the metal M advances towards the nip N. Initially, the particulate matter 100-6 may be located at the interfaces between each of the first and second regions 8-6 and 6-6 and the molten metal M. As the molten metal M travels between the opposing surfaces of the cooled rolls $R_1$, $R_2$, the particulate matter 100-6 may be dragged into a central region (or portion) 12-6, also referred to in this embodiment as an "inner portion," of the slower moving flow of the molten metal M and may be carried in the direction of arrows $C_1$ and $C_2$. In the central region 12 upstream of the nip N referred to as region 16-6, the metal M is semi-solid and includes a particulate matter 100-6 component and a molten metal M component. The molten metal M in the region 16-6 may have a mushy consistency due in part to the dispersion of the particulate matter 100-6 therein. The forward rotation of the rolls $R_1$ and $R_2$ at the nip N advances substantially only the solid portion of the metal, i.e. the first and second regions 6-6 and 8-6 and the particulate matter in the central region 12-6 while forcing molten metal M in the central region 12-6 upstream from the nip N such that the metal is substantially solid (and alternatively completely solid) as it leaves the point of the nip N. Downstream of the nip N, the central region 12-6 is a solid central region (or layer) 18-6 containing particulate matter 100-6 sandwiched between the first region 6-6 and the region shell 8-6. For clarity, the single-layer, single-continuously-cast aluminum article described above having a central layer or region 18-6 with a high concentration of particulate matter 100-6 sandwiched between the first and second regions 6-6 and 8-6 shall also be referred to as a functionally graded MMC structure. The size of the particulate matter 100-6 in the central layer 18-6 may be at least 30 microns. In a strip product, the solid inner region (or portion) may constitute 20 to 30 percent of the total thickness of the strip. While the caster of FIG. 6*q* is shown as producing strip 20-6 in a generally horizontal orientation, this is not meant to be limiting as the strip 20-6 may exit the caster at an angle or vertically.

The casting process described in relation to FIG. 6*q* follows the method steps outlined above in FIG. 6*p*. Molten metal delivered in step 1006 to the roll caster begins to cool and solidify in step 1026. The cooling metal develops outer layers of solidified metal, i.e. first and second regions 6-6 and 8-6, near or adjacent the cooled casting surfaces $R_1$, $R_2$. As stated in the preceding paragraphs, the thickness of the first region (or shell) 6-6 and the second region (or shell) 8-6 increases as the metal advances through the casting apparatus. Per step 1026, the particulate matter 100-6 may be drawn into the central portion 12-6, which is partially surrounded by the solidified outer regions 6-6 and 8-6. In FIG. 6*q*, the first and second regions 6-6 and 8-6 substantially surround the central region 18-6. In other words, the central region 18-6 that contains the particulate matter 100-6 is located between the first region 6-6 and the second region 8-6, within a single-layered product along a concentration gradient. Said differently, the central region 18-6 is sandwiched between the first shell 6-6 and the second shell 8-6. In other casting apparatuses, the first and/or second shells may completely surround the inner layer. After step 1026, the central region 18-6 may be solidified to produce an inner region (or layer). Prior to complete solidification, the central region 12-6 of the strip 20-6 is semi-solid and includes a particulate matter component and a molten metal component. The metal at this stage has a mushy consistency due in part to the dispersion of particulate matter therein.

Sometime after step 1026, the product is completely solidified and includes the inner region (or layer), which contains the particulate matter and a first and second shell, i.e. outer regions or layers, that substantially surrounds the inner region (or layer). The thickness of the inner region (or layer) may be about 10-40% of the thickness of the product. In an alternative embodiment, the inner region (or layer)

may be comprised of about 70% particulate matter 100-6 by volume, while the first and second shells are each independently comprised of about 15% particulate matter 100-6 by volume. In a still further embodiment, the inner region (or layer) may be comprised of at least 70% particulate matter 100-6 by volume, while the first and second shells are each independently comprised of less than 15% particulate matter 100-6 by volume.

During casting, movement of the particulate matter 100-6 into the inner region may be caused by the shear forces that result from the speed differences between the inner regions of molten metal and the solidified outer regions. In order to facilitate movement into the inner region, the roll casters may be operated at speeds of at least 30 fpm, alternatively at least 40 fpm, and alternatively at least 50 fpm (feet per minute). In other words, during casting, particulate matter 100-6 having a size of at least 30 microns moves from being evenly distributed to a more concentrated state, i.e., into the inner region during casting. Without wishing to be bound by the theory, it is believed that roll casters operated at speeds of less than 10 feet per minute do not generate the shear forces required to move the particulate matter (which has a size of at least 30 microns) into the inner region (or layer).

The control, maintenance and selection of the appropriate speed of the rolls $R_1$ and $R_2$ may impact the operability of the casting apparatus. The roll speed determines the speed that the molten metal M advances towards the nip N. If the speed is too slow, the particulate matter 100-6 may not experience sufficient forces to become entrained in the central portion 18-6 of the metal product. In one embodiment, the apparatus is operated at speeds ranging from 50 to 300 feet per minute. The linear speed that molten aluminum is delivered to the rolls $R_1$ and $R_2$ may be less than the speed of the rolls $R_1$ and $R_2$, or about one quarter of the roll speed.

Referring now to FIG. 6r, depicted therein is a microstructure of a functionally graded MMC cast in accordance with the present disclosure. The strip 400-6 shown comprises 15% alumina by weight and is at 0.004 inch gauge. The particulate matter 410-6 can be seen distributed throughout the strip 400-6 with a higher concentration of particulates concentrated in a central region (or layer or portion) 401-06 while lower concentrations can be seen in outer regions (or layers or shells) 402-06 and 403-06 respectively. It is believed that, without wishing to be bound by the same, there is no reaction between the particulate matter 410-6 and the aluminum matrix due to the rapid solidification of the molten during casting. Moreover, there is no damage at the interface between the particulate and the metal matrix as may be seen in FIG. 6s. Because the particulate matter does not protrude above the surface of the product it does not wear or abrade the rolling mill rolls.

d. Twin-Roll Continuous Casting—Continuous Casting of Immiscible Metals

In another embodiment, the twin-roll casting apparatus and processes may generate an aluminum alloy product having immiscible phases therein. Suitable immiscible phase elements include Sn, Pb, Bi, and Cd and may be present in the amounts disclosed below in the Compositions section (Section G), below. For purposes of this embodiment, the terms "upper", "lower", "right", "left", "vertical", "horizontal," "top", "bottom", and derivatives thereof shall relate to the disclosure, as it is oriented in the drawing FIGS. 6t through 6x, as applicable.

Referring now to FIG. 6t, in this embodiment the casting/solutionizing step 142 may include continuously casting strips with at least one immiscible phase therein is provided. In step 1046, a molten aluminum alloy and at least one immiscible phase element are introduced into a suitable casting apparatus, such as the casting apparatus described above relative to FIGS. 6b-1 and 6b-2. In step 1066, the casting apparatus is operated at a casting speed ranging from 50 to 300 feet per minute.

The process will now be illustrated with respect to the apparatus depicted in FIGS. 6u-6w, but is also applicable to the equipment depicted in FIGS. 6b-1, 6b-2, 6n, 6o, 6q, and 7a-7b, among other types of continuous casting apparatus. As is depicted in FIG. 6u, the apparatus includes a pair of endless belts 1067 and 1267 that act as casting molds carried by a pair of upper pulleys 1467 and 1667 and a pair of corresponding lower pulleys 1867 and 2067. Each pulley may be mounted for rotation about an axis 2167, 2267, 2467, and 2667 respectively. The pulleys may be of a suitable heat resistant type, and either or both of the upper pulleys 1467 and 1667 is driven by a suitable motor means (not shown). The same is true for the lower pulleys 1867 and 2067. Each of the belts 1067 and 1267 is an endless belt, and is generally formed of a metal which has low reactivity or is non-reactive with the metal being cast. Good results have been achieved using steel and copper alloy belts, but other belts can also be used such as aluminum. It should be noted that in this embodiment of the invention casting molds are implemented as casting belts 1067 and 1267. However casting molds can comprise a single mold, one or more rolls or a set of blocks for example.

The pulleys are positioned, as illustrated in FIGS. 6u and 6v, one above the other with a molding gap therebetween. The gap is dimensioned to correspond to the desired thickness of the metal strip being cast. Thus, the thickness of the metal strip being cast is determined by the dimensions of the nip between belts 1067 and 1267 passing over pulleys 1467 and 1867 along a line passing through the axis of pulleys 1467 and 1867 which is perpendicular to the casting belts 1067 and 1267. Molten metal to be cast may be supplied to the molding zone through metal supply means 2867 such as a tundish. The interior of tundish 2867 corresponds in width to the width of the product to be cast, and can have a width up to the width of the narrower of the casting belts 1067 and 1267. The tundish 28 includes a metal supply delivery casting tip 3067 to deliver a horizontal stream of molten metal to the molding zone between the belts 1067 and 1267.

Thus, the tip 3067, as shown in FIG. 6v, defines, along with the belts 1067 and 1267 immediately adjacent to tip 3067, a molding zone into which the horizontal stream of molten metal flows. Thus, the stream of molten metal flowing substantially horizontally from the tip fills the molding zone between the curvature of each belt 1067 and 1267 to the nip of the pulleys 1467 and 1867. It begins to solidify and is substantially solidified by the point at which the cast strip reaches the nip of pulleys 1467 and 1867. Supplying the horizontally flowing stream of molten metal to the molding zone where it is in contact with a curved section of the belts 1067 and 1267 passing about pulleys 1467 and 1867 serves to limit distortion and thereby maintain better thermal contact between the molten metal and each of the belts as well as improving the quality of the top and bottom surfaces of the cast strip.

The casting apparatus shown in FIGS. 6u-6w may include a pair of cooling apparatus 3267 and 3467 positioned opposite that portion of the endless belt in contact with the metal being cast in the molding gap between belts 1067 and 1267. The cooling means 3267 and 3467 thus serve to cool the belts 1067 and 1267 just after they pass over pulleys 1667 and 2067, respectively, and before they come into contact with the molten metal. As illustrated in FIGS. 6u and 6*w*, the coolers 3267 and 3467 are positioned as shown on the return run of belts 1067 and 1267, respectively. The cooling apparatus 3267 and 3467 can be conventional cooling apparatus, such as fluid cooling tips positioned to spray a cooling fluid directly on the inside and/or outside of belts 1067 and 1267 to cool the belts through their thicknesses.

Thus, molten metal flows horizontally from the tundish through the casting tip 3067 into the casting or molding zone defined between the belts 1067 and 1267 where the belts 1067 and 1267 are heated by heat transfer from the cast strip to the belts 1067 and 1267. The cast metal strip remains between and is conveyed by the casting belts 1067 and 1267 until each of them is turned past the centerline of pulleys 1667 and 2067. Thereafter, in the return loop, the cooling apparatus 3267 and 3467 cool the belts 1067 and 1267, respectively, and remove therefrom substantially all of the heat transferred to the belts in the molding zone. The supply of molten metal from the tundish through the casting tip 3067 is shown in greater detail in FIG. 6*w*, where the casting tip 3067 is formed of an upper wall 4067 and a lower wall 4267 defining a central opening 4467 therebetween whose width may extend substantially over the width of the belts 1067 and 1267.

The distal ends of the walls 4067 and 4267 of the casting tip 3067 are proximal the surface of the casting belts 1067 and 1267, respectively, and define with the belts 1067 and 1267 a casting cavity or molding zone 4667 into which the molten metal flows through the central opening 4467. As the molten metal in the casting cavity 4667 flows between the belts 1067 and 1267, it transfers its heat to the belts 1067 and 1267, simultaneously cooling the molten metal to form a solid strip 5067 maintained between casting belts 1067 and 1267. Sufficient setback (defined as the distance between first contact 4767 of the molten metal 4667 and the nip 4867 defined as the closet approach of the entry pulleys 1467 and 1867) is provided to allow substantially complete solidification prior to the nip 4867.

In operation, a molten aluminum alloy comprising a phase that is immiscible in the liquid state is introduced via tundish 2867, through casting tip 3067, and into the casting zone defined between belts 1067 and 1267. In one embodiment, the dimensions of the nip between belts 1067 and 1267 passing over pulleys 1467 and 1867 is in the range of 0.08 to 0.249 inches, and the casting speed is 50-300 fpm. Under these conditions, droplets of the immiscible liquid phase may nucleate ahead of the solidification front and may be engulfed by the rapidly moving freeze front into the space between the secondary dendrite arm ("SDA") spaces. Thus, the resulting cast strip may contain a uniform distribution of the droplets of the immiscible phase.

Turning now to FIG. 6*x*, a photomicrograph of a section of a Al-6Sn (aluminum alloy having 6 percent by weight tin) strip 40067 produced in accordance with the present invention is shown. The strip shows a uniform distribution of fine Sn particles 40167 which are 3 micrometers or smaller. This result is several times smaller than particles that would result from material made from an ingot or by roll casting which are typically from 40 microns to 400 microns in size.

B. Cold Working

Referring back to FIG. 2*a*, and as noted above, the new process includes cold working (200) the aluminum alloy body a high amount. "Cold working" and the like means deforming an aluminum alloy body in at least one direction and at temperatures below hot working temperatures (e.g., not greater than 400° F.). Cold working may be imparted by one or more of rolling, extruding, forging, drawing, ironing, spinning, flow-forming, and combinations thereof, among other types of cold working methods. These cold working methods may at least partially assist in producing various 2xxx aluminum alloy products (see, Product Applications, below).

i. Cold Rolling

In one embodiment, and with reference now to FIG. 9, the cold working step (200) comprises cold rolling (220) (and in some instances consists of cold rolling (220), with optional stretching or straightening for flatness (240)). In this embodiment, and as described above, the cold rolling step (220) is completed after the solutionizing step (140). Cold rolling (220) is a fabrication technique where an aluminum alloy body is decreased in thickness, generally via pressure applied by rollers, and where the aluminum alloy body enters the rolling equipment at a temperature below that used for hot rolling (124) (e.g., not greater than 400° F.). In one embodiment, the aluminum alloy body enters the rolling equipment at ambient conditions, i.e., the cold rolling step (220) is initiated at ambient conditions in this embodiment.

The cold rolling step (220) reduces the thickness of a 2xxx aluminum alloy body by at least 25%. The cold rolling step (220) may be completed in one or more rolling passes. In one embodiment, the cold rolling step (220) rolls the aluminum alloy body from an intermediate gauge to a final gauge. The cold rolling step (220) may produce a sheet, plate, or foil product. A foil product is a rolled product having a thickness of less than 0.006 inch. A sheet product is a rolled product having a thickness of from 0.006 inch to 0.249 inch. A plate product is a rolled product having a thickness of 0.250 inch or greater.

"Cold rolled XX %" and the like means $XX_{CR}\%$, where $XX_{CR}\%$ is the amount of thickness reduction achieved when the aluminum alloy body is reduced from a first thickness of $T_1$ to a second thickness of $T_2$ by cold rolling, where $T_1$ is the thickness prior to the cold rolling step (200) (e.g., after solutionizing) and $T_2$ is the thickness after the cold rolling step (200). In other words, $XX_{CR}\%$ is equal to:

$$XX_{CR}\% = (1 - T_2/T_1) * 100\%$$

For example, when an aluminum alloy body is cold rolled from a first thickness ($T_1$) of 15.0 mm to a second thickness of 3.0 mm ($T_2$), $XX_{CR}\%$ is 80%. Phrases such as "cold rolling 80%" and "cold rolled 80%" are equivalent to the expression $XX_{CR}\% = 80\%$.

In one embodiment, the aluminum alloy body is cold rolled (220) at least 30% ($XX_{CR}\% \geq 30\%$), i.e., is reduced in thickness by at least 30%. In other embodiments, the aluminum alloy body is cold rolled (220) at least 35% ($XX_{CR}\% \geq 35\%$), or at least 40% ($XX_{CR}\% \geq 40\%$), or at least 45% ($XX_{CR}\% \geq 45\%$), or at least 50% ($XX_{CR}\% \geq 50\%$), or at least 55% ($XX_{CR}\% \geq 55\%$), or at least 60% ($XX_{CR}\% \geq 60\%$), or at least 65% ($XX_{CR}\% \geq 65\%$), or at least 70% ($XX_{CR}\% \geq 70\%$), or at least 75% ($XX_{CR}\% \geq 75\%$), or at least 80% ($XX_{CR}\% \geq 80\%$), or at least 85% ($XX_{CR}\% \geq 85\%$), or at least 90% ($XX_{CR}\% \geq 90\%$), or more.

In some embodiments, it may be impractical or non-ideal to cold roll (220) by more than 90% (XXCR %≤90%). In these embodiments, the aluminum alloy body may be cold rolled (220) by not greater than 87% (XXCR %≤87%), such as cold rolled (220) not more than 85% (XXCR %≤85%), or not greater than 83% (XXCR %≤83%), or not greater than 80% (XXCR %≤80%).

In one embodiment, the aluminum alloy body is cold rolled in the range of from more than 50% to not greater than 85% (50%<XXCR %≤85%). This amount of cold rolling may produce an aluminum alloy body having preferred properties. In a related embodiment, the aluminum alloy body may be cold rolled in the range of from 55% to 85% (55%≤XX$_{CR}$%≤85%). In yet another embodiment, the aluminum alloy body may be cold rolled in the range of from 60% to 85% (60%≤XX$_{CR}$%≤85%). In yet another embodiment, the aluminum alloy body may be cold rolled in the range of from 65% to 85% (65%≤XX$_{CR}$%≤85%). In yet another embodiment, the aluminum alloy body may be cold rolled in the range of from 70% to 80% (70%≤XX$_{CR}$%≤80%).

Still referring to FIG. 9, in this embodiment of the process, optional pre-cold rolling (128) may be completed. This pre-cold rolling step (128) may further reduce the intermediate gauge of the aluminum alloy body (due to the hot rolling 126) to a secondary intermediate gauge. As an example, the optional cold rolling step (128) may be used to produce a secondary intermediate gauge that facilitates production of a final cold rolled gauge during the cold rolling step (220).

ii. Other Cold Working Techniques

Aside from cold rolling, and referring back to FIG. 2a, cold working may be imparted by one or more of extruding, forging, drawing, ironing, spinning, flow-forming, and combinations thereof, among other types of cold working methods, alone or in combination with cold rolling. As noted above, the aluminum alloy body is generally cold worked by at least 25% after solutionizing. In one embodiment, the cold working works the aluminum alloy body to its substantially final form (i.e., no additional hot working and/or cold working steps are required to achieve the final product form).

"Cold working by XX %" ("XXCW %") and the like means cold working the aluminum alloy body an amount sufficient to achieve an equivalent plastic strain (described below) that is at least as large as the amount of equivalent plastic strain that would have been achieved if the aluminum alloy body had been cold rolled XX % (XX$_{CR}$%). For example, the phrase "cold working 68.2%" means cold working the aluminum alloy body an amount sufficient to achieve an equivalent plastic strain that is at least as large as the amount of equivalent plastic strain that would have been achieved if the aluminum alloy body had been cold rolled 68.2%. Since XX$_{CW}$% and XX$_{CR}$% both refer to the amount of equivalent plastic strain induced in an aluminum alloy body as if the aluminum alloy body was cold rolled XX % (or actually is cold rolled XX % in the case of actual cold rolling), those terms are used interchangeably herein to refer to this amount of equivalent plastic strain.

Equivalent plastic strain is related to true strain. For example, cold rolling XX %, i.e., XX$_{CR}$%, may be represented by true strain values, where true strain ($\epsilon_{true}$) is given by the formula:

$$\epsilon_{true} = \ln(1 - \% \ CR/100) \quad (1)$$

Where % CR is XX$_{CR}$%, true strain values may be converted to equivalent plastic strain values. In the case where biaxial strain is achieved during cold rolling, the estimated equivalent plastic strain will be 1.155 times greater than the true strain value (2 divided by the √3 equals 1.155). Biaxial strain is representative of the type of plastic strain imparted during cold rolling operations. A table correlating cold rolling XX % to true strain values and equivalent plastic strain values is provided in Table 1, below.

TABLE 1

| Cold Rolling Thickness Reduction (XX$_{CR}$ %) | Cold Rolling True Strain Value | Estimated Equivalent Plastic Strain |
|---|---|---|
| 25% | 0.2877 | 0.3322 |
| 30% | 0.3567 | 0.4119 |
| 35% | 0.4308 | 0.4974 |
| 40% | 0.5108 | 0.5899 |
| 45% | 0.5978 | 0.6903 |
| 50% | 0.6931 | 0.8004 |
| 55% | 0.7985 | 0.9220 |
| 60% | 0.9163 | 1.0583 |
| 65% | 1.0498 | 1.2120 |
| 70% | 1.2040 | 1.3902 |
| 75% | 1.3863 | 1.6008 |
| 80% | 1.6094 | 1.8584 |
| 85% | 1.8971 | 2.1906 |
| 90% | 2.3026 | 2.6588 |

These equivalent plastic strain values assume:
A. no elastic strain;
B. the true plastic strains preserve volume constancy; and
C. the loading is proportional.

For proportional loading, the above and/or other principles may be used to determine an equivalent plastic strain for various cold working operations. For non-proportional loading, the equivalent plastic strain due to cold working may be determined using the formula:

$$d\varepsilon_p = \frac{\sqrt{2}}{3}\left[\sqrt{(d\varepsilon_1^p - d\varepsilon_2^p)^2 + (d\varepsilon_1^p - d\varepsilon_3^p)^2 + (d\varepsilon_3^p - d\varepsilon_2^p)^2}\right] \quad (2)$$

where de$_p$ is the equivalent plastic strain increment and d$\epsilon_i^p$ (i=1, 2, 3) represent the increment in the principal plastic strain components. See, Plasticity, A. Mendelson, Krieger Pub Co; 2nd edition (August 1983), ISBN-10: 0898745829.

Those skilled in the art appreciate that the cold working step (200) may include deforming the aluminum alloy body in a first manner (e.g., compressing) and then deforming the aluminum alloy body in a second manner (e.g., stretching), and that the equivalent plastic strain described herein refers to the accumulated strain due to all deformation operations completed as a part of the cold working step (200). Furthermore, those skilled in the art appreciate that the cold working step (200) will result in inducement of strain, but not necessarily a change in the final dimensions of the aluminum alloy body. For example, an aluminum alloy body may be cold deformed in a first manner (e.g., compressing) after which it is cold deformed in a second manner (e.g., stretching), the accumulated results of which provide an aluminum alloy body having about the same final dimensions as the aluminum alloy body before the cold working step (200), but with an increased strain due to the various cold deformation operations of the cold working step (200). Similarly, high accumulated strains can be achieved through sequential bending and reverse bending operations.

The accumulated equivalent plastic strain, and thus XXCR %, may be determined for any given cold working operation, or series of cold working operations, by computing the equivalent plastic strain imparted by those cold working operations and then determining its corresponding XXCR % value, via the methodologies shown above, and other methodologies known to those skilled in the art. For example, an aluminum alloy body may be cold drawn, and those skilled in the art may compute the amount of equivalent plastic strain imparted to the aluminum alloy body based on the operation parameters of the cold drawing. If the cold drawing induced, for example, an equivalent plastic strain of about 0.9552, then this cold drawing operation would be equivalent to an XXCR % of about 56.3% (0.9552/1.155 equals a true strain value of 0.8270 (ctrue); in turn, the corresponding XXCR % is 56.3% using equation (1), above). Thus, in this example, XXCR %=56.3, even though the cold working was cold drawing and not cold rolling. Furthermore, since "cold working by XX %" ("XXCW %") is defined (above) as cold working the aluminum alloy body an amount sufficient to achieve an equivalent plastic strain that is at least as large as the amount of equivalent plastic strain that would be achieved if the aluminum alloy body had been reduced in thickness XX % solely by cold rolling ("XXCR %"), then XXCW is also 56.3%. Similar calculations may be completed when a series of cold working operations are employed, and in those situations the accumulated equivalent plastic strain due to the series of cold working operations would be used to determine the XXCR %.

As described earlier, the cold working (200) is accomplished such that the aluminum alloy body realizes an $XX_{CW}\%$ or $XX_{CR}\% \geq 25\%$, i.e., $\geq 0.3322$ equivalent plastic strain. "Cold working XX %" and the like means $XX_{CW}\%$. Phrases such as "cold working 80%" and "cold worked 80%" are equivalent to the expression $XX_{CW}\%=80$. For tailored non-uniform cold working operations, the amount of equivalent plastic strain, and thus the amount of $XX_{CW}$ or $XX_{CR}$, is determined on the portion(s) of the aluminum alloy body receiving the cold work (200).

In one embodiment, the aluminum alloy body is cold worked (200) sufficiently to achieve, and realizes, an equivalent plastic strain ("EPS") of at least 0.4119 (i.e., $XX_{CW}\% \geq 30\%$). In other embodiments, the aluminum alloy body is cold worked (200) sufficiently to achieve, and realizes, an EPS of at least 0.4974 ($XX_{CW}\% \geq 35\%$), or at least 0.5899 ($XX_{CW}\% \geq 40\%$), or at least 0.6903 ($XX_{CW}\% \geq 45\%$), or at least 0.8004, ($XX_{CW}\% \geq 50\%$), or at least 0.9220 ($XX_{CW}\% \geq 55\%$), or at least 1.0583 ($XX_{CW}\% \geq 60\%$), or at least 1.2120 ($XX_{CW}\% \geq 65\%$), or at least 1.3902 ($XX_{CW}\% \geq 70\%$), or at least 1.6008 ($XX_{CW}\% \geq 75\%$), or at least 1.8584 ($XX_{CW}\% \geq 80\%$), or at least 2.1906 ($XX_{CW}\% \geq 85\%$), or at least 2.6588 ($XX_{CW}\% \geq 90\%$), or more.

In some embodiments, it may be impractical or non-ideal to cold work (200) by more than 90% ($XX_{CW}\% \leq 90\%$ and EPS$\leq 2.6588$). In these embodiments, the aluminum alloy body may be cold worked (200) not more than 87% ($XX_{CW}\% \leq 87\%$ and EPS$\leq 2.3564$), such as cold worked (200) not more than 85% ($XX_{CW}\% \leq 85\%$ and EPS$\leq 2.1906$), or not more than 83% ($XX_{CW}\% \leq 83\%$ and EPS$\leq 2.0466$), or not more than 80% ($XX_{CW}\% \leq 80\%$ and EPS$\leq 1.8584$).

In one embodiment, the aluminum alloy body is cold worked (200) in the range of from more than 50% to not greater than 85% ($50\% \leq XX_{CW}\% \leq 85\%$). This amount of cold working (200) may produce an aluminum alloy body having preferred properties. In a related embodiment, the aluminum alloy body is cold worked (200) in the range of from 55% to 85% ($55\% \leq XX_{CW}\% \leq 85\%$). In yet another embodiment, the aluminum alloy body is cold worked (200) in the range of from 60% to 85% ($60\% \leq XX_{CW}\% \leq 85\%$). In yet another embodiment, the aluminum alloy body is cold worked (200) in the range of from 65% to 85% ($65\% \leq XX_{CW}\% \leq 85\%$). In yet another embodiment, the aluminum alloy body is cold worked (200) in the range of from 70% to 80% ($70\% \leq XX_{CW}\% \leq 80\%$).

iii. Gradients

The cold working step (200) may be tailored to deform the aluminum alloy body in a generally uniform manner, such as via rolling, described above, or conventional extruding processes, among others. In other embodiments, the cold working step may be tailored to deform the aluminum alloy body in a generally non-uniform manner. Thus, in some embodiments, the process may produce an aluminum alloy body having tailored cold working gradients, i.e., a first portion of the aluminum alloy body receives a first tailored amount of cold work and a second portion of the aluminum alloy body receives a second tailored amount of cold work, where the first tailored amount is different than the second tailored amount. Examples of cold working operations (200) that may be completed, alone or in combination, to achieve tailored non-uniform cold work include forging, burnishing, shot peening, flow forming, and spin-forming, among others. Such cold working operations may also be utilized in combination with generally uniform cold working operations, such as cold rolling and/or extruding, among others. As mentioned above, for tailored non-uniform cold working operations, the amount of equivalent plastic strain is determined on the portion(s) of the aluminum alloy body receiving the cold work (200). Thus, after the thermal treatment step (300), such products may have a first portion having a first strength and a second portion having a second strength, with the first strength being different than the second strength.

Tailored products may be useful, for example, in situations where higher strength is required in one part of a material, but lower strength and/or higher ductility may be required in another part of a material. For example, an automotive component or aerospace component may have forming requirements, such as tight bend radii and/or deep draw requirements around its perimeter, but may also require high strength were it is attached to other components (e.g., via bolting, riveting or welding). Typically, these two characteristics oppose each other. However, with the use of selective strengthening, a single panel could meet both requirements.

As described in further detail below, tailored cold working may be used to produce a monolithic aluminum alloy body (e.g., a sheet, plate, or tubulars) having a first portion and a second portion, wherein the first portion has at least 25% cold work, and wherein second portion has at least 5% less cold work than the first portion, i.e., the first and second portions have different amounts of induced cold work (e.g., see FIGS. 2b-2m, described below). In the context of this subsection (B)(iii) "at least XX % less cold work" and the like means that the XX % value is subtracted from the first cold work percent value. For example, when a second portion has at least XX % less cold work than a first portion having at least YY % cold work, the second portion would have a cold work of ≤YY %–XX %.

In one embodiment, the second portion is adjacent the first portion (e.g., see FIG. 2j, below). For purposes of this subsection (B)(iii), "adjacent" means near or close to, but not necessarily touching. In one embodiment, an adjacent second portion touches the first portion. In another embodiment, the second portion is not adjacent and is remote of the first portion, such as when the first portion is a first end of the monolithic aluminum alloy body and the second portion is a second end of the monolithic aluminum alloy body (e.g., see FIGS. 2b and 2d, described below).

In one embodiment, the monolithic aluminum alloy body having the first and second portions is a sheet or plate. In one embodiment, this sheet or plate has a uniform thickness (e.g., see FIGS. 2d, 2e, 2g, 2h, 2j, and 2k, described below). In another embodiment, the sheet or plate has a non-uniform thickness, where the first portion is associated with a first thickness of the sheet or plate, and the second portion is associated with a second thickness of the sheet or plate (e.g., see FIGS. 2i and 2l, described below).

In one embodiment, the first portion of the monolithic aluminum alloy body has at least 30% cold work. In other embodiments, the first portion has at least 35% cold work, such as at least 40% cold work, or at least 45% cold work, or at least 50% cold work, or at least 55% cold work, or at least 60% cold work, or at least 65% cold work, or at least 70% cold work, or at least 75% cold work, or at least 80% cold work, or at least 85% cold work, or at least 90% cold work, or more. In any of these embodiments, the second portion may have at least 10% less cold work than the first portion. In one of these embodiments, the second portion may have at least 15% less cold work than the first portion. In others of these embodiments, the second may have at least 20% less cold work than the second portion, or at least 25% less cold work, or at least 30% less cold work, or at least 35% less cold work, or at least 40% less cold work, or at least 45% less cold work, or at least 50% less cold work, or at least 55% less cold work, or at least 60% less cold work, or at least 65% less cold work, or at least 70% less cold work, or at least 75% less cold work, or at least 80% less cold work, or at least 85% less cold work, or at least 90% less cold work, than the first portion. In one embodiment, the second portion receives no cold work during the cold working operation.

In one embodiment, the first portion of the monolithic aluminum alloy body has at least 5% higher strength (tensile yield strength and/or ultimate tensile strength) as compared to the second portion. In other embodiments the first portion of the monolithic aluminum alloy body has at least 10% higher, or at least 20% higher, or at least 30% higher, or at least 40% higher, at least 50% higher, or at least 60% higher, or at least 70% higher, or at least 80% higher, at least 90% higher, or at least 100% higher (2×) or more as compared to the second portion. In one embodiment, the first portion has an elongation of at least 4%. In other embodiments, the first portion has an elongation of at least 6%, or at least 8%, or at least 10%, or at least 12%, or higher. In one embodiment, the second portion has higher elongation than the first portion (relates to ductility/formability).

These monolithic aluminum alloy bodies having the first portion and the second portion may be formed into a component of an assembly. A component may be formed into a predetermined shaped product (defined in Section F, below). However, it is not required that a component be a predetermined shaped product since a component does not necessarily require forming. In one embodiment, a component having the first portion is a component of an assembly, and the first portion is associated with an attachment point of that assembly, such as an attachment point of a mobile apparatus (e.g., of a vehicle) or a stationary apparatus (e.g., a building).

In one embodiment, the component is a component of a vehicle. In one embodiment the component comprises the first portion and the second portion of the monolithic aluminum alloy body, and the first portion has a higher strength than the second portion. In one embodiment, the vehicle is an automotive vehicle, and an attachment point relates to a "point-load position" of the vehicle. A "point load position" is a position characterized by a point load condition, and may relate to a mobile body or a stationary body. A "point-load condition" is a condition in a structure (mobile or stationary) characterized by a high load transfer, concentrated at a location. This load transfer may occur at the attachment location(s) of the structure, such as in an area typically joined by welding, riveting, bolting, and the like. A point load position may be potentially subjected to high stresses (e.g., a crash event for a ground-based vehicle; wing attachment locations for aerospace vehicles). The following automotive components may be related to a point-load position of an automotive vehicle: seat rail attachment points (front and rear), seat belt attachment points, accessory attachment points (e.g., firewalls), door guard beam attachment points (e.g., hinges, anchor points, locking mechanisms/latches, door guard beam attachment points), engine mounts, body mounts, shock towers and suspension control arms, among others. Many of these components are illustrated in FIGS. 2n-2o and 2p-1 to 2p-3. In another embodiment, the vehicle may be another ground-based vehicle, such as a bus, van, truck tractor, box trailer, flatbed trailer, recreational vehicles (RVs), motorcycles, all-terrain vehicles (ATVs), and the like, and a component may be tailored for these vehicles such that the first portion is associated with an attachment point. In another embodiment, the vehicle may be an aerospace vehicle, the component is an aerospace component, and the first portion of the component may be associated with an attachment point of the aerospace vehicle, for example. In another embodiment, the vehicle may be a marine vessel, the component is a marine component, and the first portion of the component may be associated with an attachment point of the marine vehicle. In another embodiment, the vehicle may be a rail car or locomotive, the component is a rail car or locomotive component, and the first portion of the component may be associated with an attachment point of the rail car or locomotive. These components may be used in other non-vehicle assemblies, such as armor components in a ballistics assembly or a component for an offshore platform, for example.

In another embodiment, the monolithic aluminum alloy body having the first portion and the second portion may be processed to achieve a predetermined condition, such as any of the predetermined conditions described in the Thermal Treatment section (Section C(i)), described below. In such embodiments, at least one of the first portion and the second portion achieve the predetermined condition (322) so as to facilitate production of monolithic aluminum alloy bodies having tailored properties. For example, the first portion may be processed to achieve a first predetermined condition (e.g., a first predetermined strength and/or elongation), and the second portion may be processed to achieve a second predetermined condition (e.g., a second predetermined strength and/or elongation), wherein the second predetermined condition is different than the first predetermined condition. In one embodiment, the first portion is processed to a first predetermined strength (e.g., a predetermined tensile yield strength and/or a predetermined ultimate tensile strength), and the second portion is processed to a second predetermined strength, where the first predetermined strength is higher than the second predetermined strength. In one embodiment, the first predetermined strength is at least 5% higher than the second predetermined, such as any of strength differentials between the first and second portions described above. In any of these embodiments, the second portion may realize a higher elongation than the first portion. Such aluminum alloy bodies may be useful, for example, to provide tailored energy absorption properties, potentially in combination with tailored reinforcement properties. For example, a component made from a monolithic aluminum alloy body having the first portion and the second portion may be designed and produced such that the second portion is associated with an energy absorption zone (e.g., with higher ductility, optionally with lower strength) and the first portion is associated with a reinforcement zone (e.g., with higher strength, optionally with lower ductility). Such components may be useful, for example, in automotive and armor applications, among others. In one embodiment, such a component is an automotive component designed for lightweight crash management. Examples of such automotive components include: front crash cans, pillars (e.g., A-pillars, B-pillars), rocker or sill panels, front upper rails (shotgun), lower longitudinals, windshield headers, upper roof siderails, seat rails, door guard beams, rear longitudinals, and door panels, among others. Many of these components are illustrated in FIGS. 2n-2o and 2p-1 to 2p-3.

As described above, the second portion may be adjacent the first portion. In other embodiments, the second portion is remote of the first portion. In some of the latter embodiments, the first portion is a first end of the monolithic aluminum alloy body and the second portion is a second end of the monolithic aluminum alloy body, wherein the first end comprises at least 25% cold work, and wherein second end has at least 5% less cold work as compared to the first end. In another embodiment, such bodies may be of non-uniform thickness, where the first end has a first thickness, the second end has a second thickness, and the first thickness is at least 10% thinner than the second thickness. Such bodies may alternatively have a uniform thickness where the first end has a first thickness, the second end has a second thickness, and where the first thickness is within 3% of the second thickness (e.g., within 1% of the second thickness, or within 0.5% of the second thickness, or within 0.1% of the second thickness, or less). In either embodiment, the aluminum alloy body may have a middle portion separating the first end and the second end. In one embodiment, the amount of cold work in the middle portion tapers from the first end to the second end, or vice versa (e.g., see FIGS. 2b, 2d and 2i, described below). In one embodiment, the middle portion generally uniformly tapers from the first end to the second end (e.g., see FIGS. 2b and 2d). In another embodiment, the amount of cold work non-uniformly changes from the first end to the second (e.g., see FIGS. 2c, 2e and 2f, described below). In one embodiment the first end and the second ends are associated with the longitudinal direction of the monolithic aluminum alloy body, and thus properties may be tailored relative to in the "L" direction of the product. In another embodiment, the first end and the second ends are associated with the transverse direction of the sheet or plate, and thus properties may be tailored relative to in the "LT" or transverse direction of the product.

The first and/or second portions may achieve improved properties, such as any of the properties listed in the properties listed in the Properties section (Section H), below. In one embodiment, both the first and second portions achieve an improvement in strength as compared to one or more of (a) the aluminum alloy body in the as-cold worked condition and (b) a reference version of aluminum alloy body in one the T6 temper, such as any of the improved strength properties/values listed in the Properties section (Section H), below. The terms "as-cold worked condition", and "a referenced aluminum alloy body in the T6 temper" are defined in Section D, below. In one embodiment, both the first and second portions achieve an improvement in strength and elongation as compared to one or more of (a) the aluminum alloy body in the as-cold worked condition and (b) a reference version of aluminum alloy body in one the T6 temper, such as any of the improved strength properties/values listed in the Properties section (Section H), below.

Some embodiments of aluminum alloy bodies, apparatus and methods for producing tailored amounts of cold work within an aluminum alloy bodies having a tailored amount of cold work are illustrated in FIGS. 2b-2l. In one approach, a monolithic aluminum alloy body having non-uniform profiles prior to the cold working step (200) is used. Examples of aluminum alloy bodies having a non-uniform profile are illustrated in FIGS. 2b and 2c. In FIG. 2b, the aluminum alloy body 210b is in the form of a trapezoidal solid (wedge-shaped), having a first height H1 associated with a first end 210b-E1 and a second height H2 associated with a second end 210b-E2, the second height H2 being different than the first height H1, in this case being shorter than the first height. An aluminum alloy body having such a profile may be produced via extruding (or other forming processes), or by machining the aluminum alloy body prior to, or concomitant to, the solutionizing step (140).

Referring now to FIG. 2d, when an aluminum alloy body is subjected to a cold working step (cold rolling via rollers 210r, in this case), the aluminum alloy body 210b exits the cold working apparatus 210r at a single gauge (e.g., final gauge), but, due to the height differential, the second end 210b-E2 will receive less cold work than the first end 210-E1, and the amount of cold work will vary across the aluminum alloy body 210b between these two ends 210b-E1 and 210b-E2 due to the slope of the trapezoidal solid. The amount of cold work induced at first end 210b-E1 is at least 25%, and may be any of the cold work levels described above in Sections (B)(i) or (B)(ii). Thus, after cold working, aluminum alloy body 210b may have a first level of cold work associated with first end 210b-E1 and a second level of cold work associated with second end 210b-E2, and with the amount of cold work generally uniformly decreasing between first end 210b-E1 and second end 210b-E2. That is, the amount of cold work induced in the aluminum alloy body in the rolling direction (L direction) will generally uniformly decreasing between first end 210b-E1 and second end 210b-E2. However, the amount of cold work in the long transverse (LT) direction will generally be the same for any given LT plane. Such products may be useful as, for example, automotive panels where high strength is desired in one location and high ductility for forming in another, or aerospace structures such as spars or wing skins where high strength is desired in one location and high damage tolerance in another. For example, a wing skin may have an inboard end (adjacent the fuselage) and an outboard end, with the outboard end receiving more cold work (i.e., associated with the first end), and thus having higher strength (possibly with higher stiffness), and with the inboard end receiving less cold work (i.e., associated with the second end) and thus having improved damage tolerance (toughness and/or fatigue crack growth resistance).

While FIGS. 2b and 2d illustrate a situation where the thickness of the aluminum alloy body generally uniformly tapers from one end to another due to a linear slope, non-linear bodies can be used so as to induce non-uniform cold working. In one embodiment, an aluminum alloy body that is to be rolled comprises at least one curved surface, which may be concave or convex, depending on application. When multiple curved surfaces are used, multiple different curves will be present, each of which may be concave or convex, depending on application.

In another embodiment, aluminum alloy body 210b could be rotated about 90° such that first end 210b-E1 and second end 210b-E2 enter the rollers 210r at about the same time.

The amount of cold work induced at first end 210*b*-E1 is at least 25%, and may be any of the cold work levels described above in Sections (B)(i) or (B)(ii). However, in this embodiment, the amount of cold work induced in the aluminum alloy body in the transverse direction will generally uniformly decrease between first end 210*b*-E1 and second end 210*b*-E2. However, the amount of cold work in the L direction will generally be the same for any given L direction plane. These embodiments may be useful, for example, in producing wing spars, with a first spar cap having a first property (e.g., higher strength) and a second spar cap having a second property (e.g., lower strength, higher damage tolerance (toughness and/or fatigue crack growth resistance)), where the first end of the rolled product is associated with the first spar cap (receives more work) and the second end of the rolled product is associated with the second spar cap (receives less work).

In another embodiment, and with reference now to FIG. 2*c*, an aluminum alloy body 210*c* may have a plurality of different profiles 210*p*1-210*p*9 prior to the cold working step (200) so as to induce variable cold work across the aluminum alloy body after the cold working step (200). Specifically, aluminum alloy body 210*c* includes a plurality of generally flat profiles 210*p*1, 210*p*3, 210*p*5, 210*p*7, and 210*p*9 and a plurality of stepped, tapered profiles 210*p*2, 210*p*4, 210*p*6, 210*p*8 separating the plurality of flat profiles. Such profiles may be produced by, for example, extruding or machining an aluminum alloy body prior to the solutionizing step (140).

Referring now to FIG. 2*e*, when aluminum alloy body 210 is cold worked (cold rolling via rollers 210*r*, in this case), the aluminum alloy body 210*c* exits the cold working apparatus 210*r* at a single uniform gauge (e.g., final gauge, intermediate gauge), but with various sections of the aluminum alloy body 210*c* having tailored amounts of cold work (210CW1-210CW9). In the illustrated embodiment, rolled aluminum alloy body 210*d* receives a first amount of cold work in sections 210CW1 and 210CW9, a second amount of cold work in sections 210CW2 and 210CW8, a third amount of cold work in sections 210CW3 and 210CW7, a fourth amount of cold work in sections 210CW4 and 210CW6, and a fifth amount of cold work in section 210CW5, with the fifth amount of cold work being higher than the fourth amount of cold work, which is higher than the third amount of cold work, which is higher than the second amount of cold work, which is higher than the first amount of cold work. At least one of these sections of cold work receives at least 25% cold work. In one embodiment, at least two of the sections receive at least 25% cold work. In another embodiment, at least three of these sections receive at least 25% cold work. In yet another embodiment, at least four of these sections receive at least 25% cold work. In another embodiment, all sections receive at least 25% cold work. In one embodiment, at least one of the sections receives no cold work (e.g., is at final gauge before cold working). While FIG. 2*e* illustrates several different sections, the principles of FIG. 2*e* may be applied to any aluminum alloy body having at least two different sections, each section having a different height so as to a cold work differential upon rolling.

In one embodiment, the difference in cold work between one section of the aluminum alloy body and at least one other section of the aluminum alloy body is at least 10%, i.e., a first section has at least 10% more or less cold work, as the case may be, than at least one other section. In another embodiment, a first section has at least 15% more or less cold work, as the case may be, than at least one other section. In yet another embodiment, a first section has at least 20% more or less cold work, as the case may be, than at least one other section. In another embodiment, a first section has at least 25% more or less cold work, as the case may be, than at least one other section. In yet another embodiment, a first section has at least 30% more or less cold work, as the case may be, than at least one other section. In another embodiment, a first section has at least 35% more or less cold work, as the case may be, than at least one other section. In yet another embodiment, a first section has at least 40% more or less cold work, as the case may be, than at least one other section. In another embodiment, a first section has at least 45% more or less cold work, as the case may be, than at least one other section. In yet another embodiment, a first section has at least 50% more or less cold work, as the case may be, than at least one other section. In another embodiment, a first section has at least 55% more or less cold work, as the case may be, than at least one other section. In yet another embodiment, a first section has at least 60% more or less cold work, as the case may be, than at least one other section. In another embodiment, a first section has at least 65% more or less cold work, as the case may be, than at least one other section. In yet another embodiment, a first section has at least 70% more or less cold work, as the case may be, than at least one other section. In another embodiment, a first section has at least 75% more or less cold work, as the case may be, than at least one other section. In yet another embodiment, a first section has at least 80% more or less cold work, as the case may be, than at least one other section. In another embodiment, a first section has at least 85% more or less cold work, as the case may be, than at least one other section. In yet another embodiment, a first section has at least 90% more or less cold work, as the case may be, than at least one other section. The above-described tailored cold working differentials apply to any of the tailored cold working embodiments illustrated in FIGS. 2*b*-2*m*, and also to any other embodiments where tailored cold working may be induced.

In the embodiment illustrated in FIG. 2*d*, the amount of cold work induced in the aluminum alloy body in the rolling direction (L direction) will vary according to the profiles 210*p*1-210*p*9 and corresponding cold work sections 210CW1-210CW9. However, the amount of cold work in the long transverse (LT) direction will generally be the same for any given LT plane. Such products may be useful as, for example, a component or part that requires high formability on one end, but high strength on the other, such as stiffeners for aerospace components, buses, trucks, railcars, pressure vessels, and marine components, among others.

In another embodiment, and as illustrated in FIG. 2*f*, aluminum alloy body 210*c* could be rotated about 90° such that first end 210*c*-E1 and second end 210*c*-E2 enter the rollers 210*r* at about the same time. In this embodiment, the amount of cold work induced in the aluminum alloy body in the LT direction will vary according to the profiles 210*p*1-210*p*9 and corresponding cold work sections 210CW1-210CW9. However, the amount of cold work in the L direction will generally be the same for any given L direction plane. This embodiment might be useful, for example, as a rocker panel of a door for a car, where high formability is required at the ends, but high strength in desired the center, among others, and as an automotive pillar (A-pillar, B-pillar, C-pillar), or other body-in-white components.

In another embodiment, and with reference now to FIG. 2*g*, an aluminum alloy body 210*g* having variable profiles may be cold worked into a generally uniform gauge final product 210*gfp*, such as into a cylindrical shape, as illustrated. In this embodiment, the cold working may be accomplished by, for example, cold forging steps 210g-1 and 210g-2. Fewer or more cold forging steps may be employed. Similar to the FIGS. 2d-2f, above, the final product 210gfp may have variable sections of cold work due to the variable profile of the aluminum alloy body prior to the cold working. In the illustrated embodiment, the final product 210gfp would generally contain a first amount of cold work in the middle portion (MP) of the cylinder, a second portion of cold work near the edges (E) of the cylinder, and a generally uniformly decreasing amount of cold work extending from the middle portion (MP) to the edges (E), with at least the middle portion (MP) receiving at least 25% cold work, such as any of the cold work levels described above in Sections (B)(i) or (B)(ii).

In yet another embodiment, and as illustrated in FIG. 2h, an aluminum alloy body 210h having variable profiles may be cold worked into a generally uniform gauge final product 210hfp, such as into a cylindrical shape, as illustrated. In this embodiment, the cold working may be accomplished by, for example, cold forging steps 210h-1 and 210h-2. Fewer or more cold forging steps may be employed. Similar to the FIGS. 2d-2g, above, the final product 210hfp may have variable sections of cold work due to the variable profile of the aluminum alloy body prior to the cold working. In the illustrated embodiment, the final product 210hfp would generally contain a first amount of cold work in the middle portion (MP) of the cylinder, a second portion of cold work near the edges (E) of the cylinder, and a generally uniformly increasing amount of cold work extending from the middle portion (MP) to the edges (E), with at least the edges (E) receiving at least 25% cold work, such as any of the cold work levels described above in Sections (B)(i) or (B)(ii).

In another approach, a cold working apparatus is varied to induce variable cold work in an aluminum alloy body. For example, and with reference now to FIG. 2i, an intermediate gauge product 210i may be rolled via rollers 210r, wherein, during the rolling, the rollers are gradually separated so as to produce trapezoidal solid (wedge piece) 210ts having variable cold work in the L direction. Aluminum alloy body 210ts will have variable cold work from a first end to a second end, and, in this case, such variable cold work will generally uniformly taper from a first end to a second end, with at least one of the ends receiving at least 25% cold work, such as any of the cold work levels described above in Sections (B)(i) or (B)(ii). Rollers 210r may also be non-uniformly varied to produce any appropriate profiled end product.

In another embodiment, an apparatus may produce a predetermined pattern in the aluminum alloy body prior to the solutionizing step (140). For example, and with reference now to FIGS. 2j and 2m, an aluminum alloy body 211 may be fed to one or more forming/embossing rolls 212, which may roll the aluminum alloy body 211 to a first gauge (e.g., an intermediate gauge) and may also produce a plurality of raised portions 214 via its indented portions 213. Next the aluminum alloy body may be solutionized 140, after which it may be cold rolled to a second gauge via cold roller 210r. The second gauge may be a final gauge, and may be the same or different than the first gauge. The cold rolled aluminum alloy body 211cr may thus include a plurality of segregated first portions 215 having a first amount of cold work, and a plurality of second portions 216 having a second amount of cold work, with at least some of the first portions 215 receiving at least 25% cold work, such as any of the cold work levels described above in Sections (B)(i) or (B)(ii). Thus, monolithic aluminum alloy bodies having tailored three-dimensional cold working amounts may be produced, and with the first portions being deterministically placed in one or more of the longitudinal direction and the long transverse direction of the rolled product (i.e., anywhere in the X-Y coordinate plane, where X relates to the longitudinal direction and Y relates to the transverse direction). As may be appreciated, any number of rollers can be used to produce the products having tailored levels of cold work. Furthermore, while the features have been illustrated relative to the top of the rolled product, it will be appreciated that the features may be implemented on the bottom of the rolled product, or on both the top and bottom of the rolled product. Also, each rolling apparatus may include multiple roll stands and/or may use multiple passes to accomplish the rolling.

In the illustrated embodiment, the first portions 215 receive a higher amount of cold work than the second portions 216, and the second portions 216 generally surround the first portions 215. In one embodiment, at least some of the first portions receive at least 5% more cold work than the second portions (such as any of the cold work differences described above). In one embodiment, the second portions receive at least some cold work. In one embodiment, the second portions also receive at least 25% cold work. In another embodiment, the second portions receive little or no cold work (i.e., the first gauge is generally equivalent to the second gauge).

In some embodiments, gripping portions 219 may be utilized on the aluminum alloy body so that the body can be forced though one or more rollers, e.g., utilized at the edges of aluminum alloy body, as illustrated in FIG. 2j. While such gripping portions 219 are illustrated as being on the edges of the aluminum alloy body, they may also or alternatively be located in one or more middle portions of the body, if appropriate, to facilitate movement of the body through the rolling apparatus.

In some embodiments, the first portions 215 may each receive generally the same amount of cold work, such as when indents 213 of roll 212 are of generally the same size so as to produce raised portions 214 of generally the same size. In other embodiments, at least one of the first portions receives a first amount of cold work and at least another of the first portions receives a second amount of cold work, such as when indents 213 of roll 212 have at least two different sizes, and thus produce raised portions 214 of different sizes. In these embodiments, at least some of the first portions receive at least 25% cold work, while others of the first portions may receive less then 25% cold work. These products may be useful, for example, as door panels, where the strengthened areas are located at, for example, attachment points, but the non-strengthened areas are located where the aluminum alloy body requires formability.

The first portions 215 may include one or more identifiers. In one embodiment, the visual identifiers 217a may be imparted by embossing roll 212, and carried over through the cold rolling operation. Such identifier(s) 217a may be used to identify where the patterns of first portions 215 are located, so that the material can be separated appropriately. In other embodiments, the first portions 215 may be visually identified by embossed markings on the first portions themselves. These indicators 217a can be used, for example, to identify high strength areas, and/or so that the recipient of the material can verify that such areas were, in fact, produced in the material. In another embodiment, a visual identifier 217b may be used to identify where to separate the material after the cold working step, such as registration marks and the like (e.g., to set the start/finish of a material blank).

Aside from automotive components, the monolithic bodies produced as shown in FIG. 2*j* may be useful, for example, in producing an aerospace component having tailored high strength portions. For example, such monolithic bodies may be useful as a wing skin or a fuselage panel. The high strength portions (e.g., first portions) may be used relative to attachment points, or may be located where the stringers, ribs or frames attach to the wing skin or fuselage panel, as appropriate.

In one embodiment, and with continued reference to FIG. 2*j*, a plurality of recessed portions 218 may be imparted into the aluminum alloy body, with these recessed portions 218 being adjacent to one or more raised portions 214 prior to the cold rolling 210*r*. Such recessed portions 218 may accommodate the material of the raised portions 214 during the cold working process. The recessed portions 218 may be imparted, for example, by using an appropriate rolling wheel (e.g., one having at least one raised surface so as to produce a channel/recessed portion), or by machining, for example. The recessed portions 218 may be appropriately shaped for the cold working process. For example, when a vertical press die is used to cold work the material, generally symmetrical recessed portions 218 may be used, with such recessed portions generally surrounding the raised portions 214. When the aluminum alloy body is cold rolled, non-symmetrical recessed portions 218 may be used to accommodate flow of the raised portions 214, such as by having recessed portions 218 located adjacent to the back and/or lateral sides of each of the raised portions 218, among other configurations. Such recessed portions 218 can be appropriately sized and/or shaped to facilitate an appropriate level of residual stress.

In another embodiment, and with reference now to FIG. 2*k*, the roller 212 may include an indentation 213 that produces an aluminum alloy body having an extended raised portion 214. In the illustrated embodiment, the raised portion 214 extends the length of the body until it reaches the cold rollers 210*r*. To facilitate production of a uniform gauge, recessed portions 218 (not illustrated) may be located adjacent one side (or both sides) of the extended raised portion 214. This body may be solutionized and, after solutionizing 140, the cold rolling 210*r* will flatten and work the raised portion 214, and may produce an aluminum alloy body having a generally uniform gauge (e.g., a final gauge), but with a first cold worked portion 215 extending the length of the body. One or more second portions 216 may extend adjacent the high cold work portion 215, which second portions may or may not receive cold work. In the illustrated embodiment, the first portion 215 extends the length of the aluminum alloy body in the L direction, and is surrounded by, and is adjacent to, two second portions 216 that also extend the length of the aluminum alloy body in the L direction. Such aluminum alloy bodies may be useful, for example, as automotive rocker panels.

As may be appreciated, the embodiment of FIG. 2*k* may be reversed (not illustrated), where roller 212 includes two indentations 213 on either edge of roller 212, thus producing first portions 215 located on the edges of the rolled product. In this embodiment, a second portion 216 separates the first portions 215, and is located in the middle portion of the rolled product. In this embodiment, the first and second portions may be of generally similar thickness, but with the edges 215 having high cold work and with the middle 216 having lower or no cold work. Such aluminum alloy bodies may be useful for example, as a component where attachments are made on the edges of the product, and the middle of the product may require, for example, higher ductility.

While not shown in FIG. 2*k*, the aluminum alloy body may include as many generally parallel first portions 215 and second portions 214, as appropriate for any particular application.

In another embodiment, and with reference now to FIG. 2*l*, a generally uniform rolled product of intermediate gauge is supplied to cold roller 210*r*. The cold roller 210*r* includes indentation 213, which produces second portion 216 that extends the length of the body after it exits the cold roller 210*r*. The cold roller 210*r* also produces first portions 215, with at least one of the first portions having at least 25% cold work. The second portion 216 may or may not receive cold work. In the illustrated embodiment, the two first portions 215 extend the length of the aluminum alloy body in the L direction, and are separated by a second portion 216 that also extends the length of the aluminum alloy body in the L direction, but has a different (larger) thickness than first portions 215. Such aluminum alloy bodies may be useful in, for example, in product applications where extra thickness is required to provide stiffness (e.g., aerospace wing skins, rail cars). In another similar embodiment (not illustrated), a cold roller may be of varying diameter relative to the LT direction, thus producing a plurality of portions, each of the portions having a different amount of cold work, but with at least one of the portions receiving at least 25% cold work. While not shown in FIG. 2*l*, the aluminum alloy body may include as many generally parallel first portions 215 and second portions 214, as appropriate for any particular application.

In another embodiment (not illustrated), a cold working apparatus may include a device that selectively removes only a portion of an aluminum alloy body (e.g., via machining), which may also produce materials similar to those illustrated in FIG. 2*l*. In one embodiment, the device perforates a portion of the aluminum alloy body, e.g., to facilitate removal of stresses so that the aluminum alloy body does not twist, warp or otherwise distort. In another embodiment, the device removes a portion of the thickness of the aluminum alloy body. In one embodiment, the device separates the produced materials so that the aluminum alloy body does not twist, warp or otherwise distort.

In another embodiment (not illustrated), variable amounts of cold work can be imparted along the length of tubular products by one or more of swaging, flow forming, shear forming, cold forging, or cold expansion, to name a few. As described above for rolled products, variable levels of cold work can be imparted after the solutionizing step and before the thermal treating step or can by imparted prior to the solutionizing step, in which case machining may also be used to create the initial geometry. In this case, the cold working step can provide an aluminum alloy product that is either uniform in final cross section or having variable final geometry. Such methods might be useful, for example, in creating pipes or tubes with different properties in one or both ends compared to the central sections. In one embodiment, a monolithic aluminum alloy tubular product is provided, the tubular product having a first portion and a second portion adjacent the first portion, wherein the first portion comprises at least 25% cold work, and wherein second portion has at least 5% less cold work as compared to the first portion, such as any of the above-described cold work differentials. In one embodiment, the monolithic aluminum alloy tubular product has a uniform inner diameter. In one embodiment, the monolithic aluminum alloy tubular product has a uniform outer diameter. In one embodiment, the monolithic aluminum alloy tubular product has a uniform inner and outer diameter.

While the features of FIGS. 2b-2m have generally been described relative to cold rolling and/or cold forging, other cold working mechanisms may also be employed to produce aluminum alloy bodies having tailored cold work. Furthermore, aluminum alloy bodies having variable profiles can be produced in a variety of known manners, including those described above, and also via extruding, forging, and machining, among others. Such profiled aluminum alloy bodies can then be cold worked in any of the above described manners to produce aluminum alloy bodies having tailored cold work.

iv. Cold Working Temperature

The cold working step (200) may be initiated at temperatures below hot working temperatures (e.g., not greater than 400° F.). In one approach, the cold working step (200) is initiated when the aluminum alloy body reaches a sufficiently low temperature after solutionizing (140). In one embodiment, the cold working step (200) may be initiated when the temperature of the aluminum alloy body is not greater than 250° F. In other embodiments, the cold working step (200) may be initiated when the temperature of the aluminum alloy body is not greater than 200° F., or not greater than 175° F., or not greater than 150° F., or not greater than 125° F., or less. In one embodiment, a cold working step (200) may be initiated when the temperature of the aluminum alloy body is around ambient. In other embodiments, a cold working step (200) may be initiated at higher temperatures, such as when the temperature of the aluminum alloy body is in the range of from 250° F. to less than hot working temperatures (e.g., less than 400° F.).

In one embodiment, the cold working step (200) is initiated and/or completed in the absence of any purposeful/meaningful heating (e.g., purposeful heating that produces a material change in the microstructure and/or properties of the aluminum alloy body). Those skilled in the art appreciate that an aluminum alloy body may realize an increase in temperature due to the cold working step (200), but that such cold working steps (200) are still considered cold working (200) because the working operation began at temperatures below those considered to be hot working temperatures. When a plurality of cold working operations are used to complete the cold working step (200), each one of these operations may employ any of the above-described temperature(s), which may be the same as or different from the temperatures employed by a prior or later cold working operation.

As noted above, the cold working (200) is generally initiated when the aluminum alloy body reaches a sufficiently low temperature after solutionizing (140). Generally, no purposeful/meaningful thermal treatments are applied to the aluminum alloy body between the end of the solutionizing step (140) and the beginning of the cold working step (200), i.e., the process may be absent of thermal treatments between the completion of the solutionizing step (140) and the initiation of the cold working step (200). In some instances, the cold working step (200) is initiated soon after the end of the solutionizing step (140) (e.g., to facilitate cold working). In one embodiment, the cold working step (200) is initiated not more than 72 hours after the completion of the solutionizing step (140). In other embodiments, the cold working step (200) is initiated in not greater than 60 hours, or not greater than 48 hours, or not greater than 36 hours, or not greater than 24 hours, or not greater than 20 hours, or not greater than 16 hours, or not greater than 12 hours, or less, after the completion of the solutionizing step (140). In one embodiment, the cold working step (200) is initiated within a few minutes, or less, of completion of the solutionizing step (140) (e.g., for continuous casting processes). In another embodiment, the cold working step (200) is initiated concomitant to completion of the solutionizing step (140) (e.g., for continuous casting processes).

In other instances, it may be sufficient to begin the cold working (200) after a longer elapse of time relative to the completion of the solutionizing step (140). In these instances, the cold working step (200) may be completed one or more weeks or months after the completion of the solutionizing step (140).

C. Thermally Treating

Referring still to FIG. 2a, a thermally treating step (300) is completed after the cold working step (200). "Thermally treating" and the like means purposeful heating of an aluminum alloy body such that the aluminum alloy body reaches an elevated temperature. The thermal treatment step (300) may include heating the aluminum alloy body for a time and at a temperature sufficient to achieve a condition or property (e.g., a selected strength, a selected ductility, among others).

After solutionizing, most heat treatable alloys, such as 2xxx aluminum alloys, exhibit property changes at room temperature. This is called "natural aging" and may start immediately after solutionizing, or after an incubation period. The rate of property changes during natural aging varies from one alloy to another over a wide range, so that the approach to a stable condition may require only a few days or several years. Since natural aging occurs in the absence of purposeful heating, natural aging is not a thermal treatment step (300). However, natural aging may occur before and/or after the thermal treatment step (300). Natural aging may occur for a predetermined period of time prior to the thermal treatment step (300) (e.g., from a few minutes or hours to a few weeks, or more). Natural aging may occur between or after any of the solutionizing (140), the cold working (200) and the thermal treatment steps (300).

The thermally treating step (300) heats the aluminum alloy body to a temperature within a selected temperature range. For the purposes of the thermally treating step (300), this temperature refers to the average temperature of the aluminum alloy body during the thermally treating step (300). The thermally treating step (300) may include a plurality of treatment steps, such as treating at a first temperature for a first period of time, and treating at a second temperature for a second period of time. The first temperature may be higher or lower than the second temperature, and the first period of time may be shorter or longer than the second period of time.

The thermally treating step (300) is generally completed such that the aluminum alloy body achieves/maintains a predominately unrecrystallized microstructure, as defined below. As described in further detail below, a predominately unrecrystallized microstructure may achieve improved properties. In this regard, the thermally treating step (300) generally comprises heating the aluminum alloy body to an elevated temperature, but below the recrystallization temperature of the aluminum alloy body, i.e., the temperature at which the aluminum alloy body would not achieve a predominately unrecrystallized microstructure. For example, the thermally treating step (300) may comprise heating the 2xxx aluminum alloy body to a temperature in the range of from 150° F. to 425° F. (or higher), but below the recrystallization temperature of the aluminum alloy body. When thermally treating, especially in excess of 425° F., it may be necessary to limit the exposure period so that the produced aluminum alloy body realizes improved properties. As may be appreciated, when higher thermal treatment temperatures are used, shorter thermal exposure periods may be required to realize the predominately unrecrystallized microstructure and/or other desired properties (e.g., absence of undue softening due to removal of dislocations from high temperature exposure).

The thermally treating step (300) may be completed in any suitable manner that maintains the aluminum alloy body at one or more selected temperature(s) for one or more selected period(s) of time (e.g., in order to achieve a desired/selected property or combination of properties). In one embodiment, the thermally treating step (300) is completed in an aging furnace, or the like. In another embodiment, the thermally treating step (300) is completed during a paint-bake cycle. Paint-bake cycles are used in the automotive and other industries to cure an applied paint by baking it for a short period of time (e.g., 5-30 minutes). Given the ability for the presently described processes to produce aluminum alloy bodies having high strength within a short period of time, as described below, paint-bake cycles, and the like, may be used to complete the thermally treating step (300), thereby obviating the need for separate thermal treatment and paint-bake steps. Similarly, in another embodiment, the thermally treating step (300) may be completed during a coating cure step, or the like.

In one embodiment, a method comprises (i) receiving a solutionized aluminum alloy body, and (ii) then cold working the aluminum alloy body, and (iii) then thermally treating the aluminum alloy body, wherein the cold working and the thermally treating steps are accomplished to achieve an improved property as compared to one or more of (a) the aluminum alloy body in the as-cold worked condition and (b) a reference version of the aluminum alloy body in the T6 temper, such as achievement of any of the properties listed in the Properties section (Section H), above. Such a method may be applicable to, and thus employed with, any of the aluminum alloy products described in the Product Applications section (Section I), below.

In another embodiment, a method comprises (i) receiving an aluminum alloy body that has been solutionized and then cold worked by at least 25%, and (ii) then thermally treating the aluminum alloy body, wherein the cold working and the thermally treating steps are accomplished to achieve an improved property as compared to one or more of (a) the aluminum alloy body in the as-cold worked condition and (b) a reference version of the aluminum alloy body in the T6 temper, such as achievement of any of the properties listed in the Properties section (Section H), above. Such a method may be applicable to, and thus employed with, any of the aluminum alloy products described in the Product Applications section (Section I), below.

i. Completion of Cold Working and/or Thermally Treating Step(s) to Achieve One or More Preselected Precursor Conditions In one approach, an aluminum alloys body is processed such that it achieves a preselected precursor condition during at least one of the cold working step (200) and the thermally treating step (300). A preselected precursor condition is a condition that is selected in advance of production of the aluminum alloy body, and is a precursor to another condition (usually another known condition, such as a desired end condition or property of an aluminum alloy product). For example, and as explained in further detail below, an aluminum alloy supplier, having completed cold working step (200), may supply an aluminum alloy body (e.g., a sheet) in a preselected underaged condition by subjecting the body to a preselected heating practice as part of the thermal treatment step (300). A customer of the aluminum alloy supplier may receive this aluminum alloy body, and may further thermally process this aluminum alloy body, such as by warm forming the body into a predetermined shaped product, thereby completing the remaining portion of the thermal treatment step (300), and, in the process, further increasing the strength of the aluminum alloy body. Thus, an aluminum alloy supplier may tailor their first heating step such that the combination of their first heating step and the customer's later second heating step produce an aluminum alloy body having predetermined properties (e.g., near peak strength, a predetermined combination of strength and ductility, among others). Many other variations exist, many of which are explained in further detail below.

A. Multiple Thermal Treatment Steps

In one embodiment, and with reference now to FIG. 2*q*-1, a thermally treating step (300) includes a first heating step (320) and a second heating step (340). The first heating step (320) may be conducted to achieve a preselected condition (322) (e.g., a first selected condition). Similarly, the second heating step (340) may be conducted to achieve another preselected condition (342) (e.g., a second selected condition).

Referring now to FIG. 2*q*-2, the first selected condition (322) may be selected, for example, to achieve a predetermined strength, a predetermined elongation, or a predetermined combination of strength and elongation, among other properties (330). Thus, the selected condition (322) may be a predetermined underaged condition (324), a peaked aged condition (326), or a predetermined overaged condition (328). In one embodiment, the first heating step (320) is conducted for a first selected time and a first selected temperature to achieve the first selected condition (322).

Similarly, and referring now to FIG. 2*q*-3, the second heating step (340) may be selected to achieve a predetermined strength, a predetermined elongation, or a predetermined combination of strength and elongation, among other properties (350). Thus, the second heating step (340) may be conducted to achieve a second selected condition (342), such as any of a predetermined underaged condition (344), a peak age condition (346), or a predetermined overage condition (348). In some embodiments, the second heating step (340) is conducted for a second selected time and a second selected temperature to achieve the second selected condition (342).

Given that the first heating step (320) may be tailored to achieve one or more preselected conditions, tailored aluminum alloy bodies may be produced in the first heating step (320) and at a first location for subsequent processing via the second heating step (340). For example, an aluminum alloy supplier may conduct a first heating step at a first location to achieve the selected condition (322). The aluminum alloy supplier may then provide such aluminum alloy body to a customer (or other entity), who may subsequently conduct the second heating step (340) at a second location remote of the first location (e.g., to achieve the second selected condition (342)). Thus, tailored aluminum alloy bodies having predetermined properties may be achieved.

By way of example, and with reference now to FIG. 2*q*-4, a first heating step (320) may achieve a predetermined underaged condition (324). This predetermined underaged condition may be within a predetermined amount of a peak strength of the aluminum alloy body, such as within a predetermined amount of an ultimate tensile strength and/or a tensile yield strength of the aluminum alloy body. In one embodiment, the predetermined underaged condition (324) is within 30% of a peak strength of the aluminum alloy body.

In other embodiments, the predetermined underaged condition (324) is within 20%, or within 10%, or within 5%, or less, of a peak strength of the aluminum alloy body. In one embodiment, the predetermined underaged condition (324) is within 20 ksi of a peak strength of the aluminum alloy body. In other embodiments, the predetermined underaged condition (324) is within 15 ksi, or within 10 ksi, or within 5 ksi, or less, of a peak strength of the aluminum alloy body. Thus, the aluminum alloy body, having been subjected to the first heating step (320), may be supplied from a supplier to a customer, and in the predetermined underaged condition (324). In turn, the second heating step (340) may be completed by the customer to achieve a predetermined higher strength condition (372) relative to the prior predetermined underaged condition (324). This predetermined higher strength condition (372) may be within a predetermined amount of a peak strength of the aluminum alloy body, such as a peak ultimate tensile strength and/or a peak tensile yield strength of the aluminum alloy body. In one embodiment, the predetermined higher strength condition (372) is within 15% of a peak strength of the aluminum alloy body. In other embodiments, the predetermined higher strength condition (372) is within 10%, or within 8%, or within 6%, or within 4%, or within 2%, or within 1%, or less, of a peak strength of the aluminum alloy body. Similarly, the predetermined higher strength condition (372) may be within 15 ksi of a peak strength of the aluminum alloy body. In other embodiments, the predetermined higher strength condition (372) may be within 10 ksi, or within 8 ksi, or within 6 ksi, or within 4 ksi, or within 2 ksi, or within 1 ksi, or less, of a peak strength condition of the aluminum alloy body.

By way of illustration, a customer upon receipt of an aluminum alloy body that was subjected to a preparing step (100), a cold working step (200), and the first heating step (320), and thus being in a predetermined underaged condition (324), may subsequently conduct the second heating step (340) to achieve the second predetermined higher strength condition (372). For example, and with reference now to FIG. 2$q$-5, the second heating step (340) may be one or more of a warm forming process, a paint bake process, a drying process, and/or a tailored aging process conducted in an aging furnace, among others. Such second heating step (340) processes may be conducted in any order as appropriate to the specific aluminum alloy body and its corresponding final form.

In one non-limiting example, and as described in further detail below, an aluminum alloy sheet may be supplied to an automotive manufacturer after completing the first heating step (320). Thus, the automotive supplier may receive the aluminum alloy sheet in a predetermined selected condition (322) for later processing. The automotive manufacturer may then form this part into a predetermined shaped product during at least a part of the second heating step (340) ("warm forming", which is defined in Section F, below). After the warm forming step, an automotive manufacturer may paint bake and/or dry this predetermined shaped product, thereby subjecting the aluminum alloy body to additional thermal treatments as part of the second heating step (340) to achieve a second selected condition (342). Similarly, the automotive manufacturer may subject the predetermined shaped product to an aging furnace, or the like, before or after any of the other heating operations to tailor properties of the predetermined shaped product.

Given that, for any alloy, a peak strength will be known based on aging curves, the automotive manufacturer may be able to receive aluminum alloy bodies in a first selected condition (322), so that the automotive manufacturer's subsequent thermal processing achieves a second selected condition, such as a higher strength condition. In some embodiments, the automotive manufacturer may conduct a second heating step (340) so as to facilitate achievement of a peak strength or near peak strength condition (346), as described above. In other embodiments, the automotive manufacturer may select a predetermined overaged (348) and/or underaged condition (344) to achieve a predetermined set of properties (350). For example, in an overaged condition (348), an automotive manufacturer may achieve higher ductility at slightly lower strength relative to a peak strength condition, thus facilitating a different set of properties relative to a peak strength condition (346). Similarly, underaged properties (344) may provide a different set of mechanical properties that may be useful to an automotive manufacturer. Thus, tailored aluminum alloy bodies having predetermined properties may be achieved, such as any of the properties described in the Properties section (Section H), below.

Referring now to FIG. 2$q$-6, one specific embodiment of a thermal treatment practice is illustrated. In this embodiment, the aluminum alloy body may be supplied to a customer in either the as-cold worked condition or the T3 temper (i.e., the customer may receive the aluminum alloy after the cold working step (200), and without any thermal treatments being applied by the aluminum alloy supplier). In this embodiment, the customer may complete the thermal treatment step (300) and the optional final treatment step (400). As shown in the illustrated embodiment, the optional final treatment may include the forming of the predetermined shaped product (500) during the thermally treating step (300). That is to say, the customer completes all the thermal treatment steps, which may include a warm forming step (320'). Other or alternative thermal treatments may be employed by the customer, such as any of those illustrated in FIG. 2$q$-5, among others.

Referring back to FIG. 2$q$-1, since the first heating step (320) may be conducted at a first location, and the second heating step (340) may be conducted at a second location, the steps prior to the first heating step (320) may also be completed at the first location. That is, the preparing the aluminum alloy body for post-solutionizing cold work step (100) may be completed at the first location and/or the cold working the aluminum alloy body step (200) may be completed at the first location. However, such processing steps are not required to be completed at the first location. Similarly, it is possible that all of the steps could be completed at a single location. Furthermore, while the above examples are explained relative to automotive products, such methodologies are applicable to many aluminum applications, such as any of the products described in the Product Applications section (Section I), below.

Also, while FIGS. 2$q$-1 to 2$q$-5 have been described relative to achieving two preselected conditions (322), (342), it is not required that two selected conditions be employed. For example, an aluminum supplier may employ a first selected condition (322) based upon knowledge of a customer's processes to facilitate improvement of the customer's aluminum alloy products, and without the customer defining a second selected condition. Thus, in some embodiments, only a single preselected condition is employed (e.g., selected condition (322)). Furthermore, as described above relative to FIG. 2$a$, when the thermally treating step (300) is completed at a single location, it may include a plurality of treatment steps, such as treating at a first temperature for a first period of time, and treating at a second temperature for a second period of time, and this first temperature may be higher or lower than the second temperature, and the first period of time may be shorter or longer than the second period of time. Similarly, each of heating steps (320) and (340) may also include a plurality of treatment steps, such as treating at a first temperature for a first period of time, and treating at a second temperature for a second period of time, and this first temperature may be higher or lower than the second temperature, and the first period of time may be shorter or longer than the second period of time. Furthermore, while only two separate heating steps (320), (340) have been illustrated and described, it will be appreciated that any number of separate heating steps may be employed and at any suitable number of locations to achieve the thermally treating step (300), and that a preselected condition/property may be used with respect to one or more of these separate heating steps.

B. Multiple Cold Working Steps

Similar to the multiple thermal treatment step embodiments described above, multiple cold working steps may also be employed. In one embodiment, and with reference now to FIG. 2q-7, a cold working step (200) includes a first cold working step (220) and a second cold working step (240), with the combination of the first cold working step (220) and second cold working step (240) inducing at least 25% cold work in the aluminum alloy body. In one embodiment, the first cold working step, in of itself, induces at least 25% cold work in the aluminum alloy body. Thus, the first cold working step (220) may be conducted to achieve a preselected condition (222) (e.g., a first selected condition). Similarly, the second cold working step (240) may be conducted to achieve another preselected condition (242) (e.g., a second selected condition).

Referring now to FIG. 2q-8, the first selected condition (222) may be selected, for example, to achieve a predetermined strength, a predetermined elongation, or a predetermined combination of strength and elongation, among other properties (230). Similarly, the second selected condition (232) may be selected, for example, to achieve a predetermined strength, a predetermined elongation, or a predetermined combination of strength and elongation, among other properties (250).

Given that the first cold working step (220) may be tailored to achieve one or more preselected conditions, tailored aluminum alloy bodies may be produced in the first cold working step (220) and at a first location for subsequent processing via the second cold working step (240) and thermal treatment step (300). For example, an aluminum alloy supplier may conduct a first cold working step at a first location to achieve the selected condition (222). The aluminum alloy supplier may then provide such aluminum alloy body to a customer (or other entity), who may subsequently conduct the second cold working step (240) and the thermally treating step (300) at a second location (or more locations) remote of the first location (e.g., to achieve the second selected condition (342)). Thus, tailored aluminum alloy bodies having predetermined properties may be achieved, such as any of the properties described in the Properties section (Section H), below.

While FIGS. 2q-7 to 2q-8 have been described relative to achieving two preselected conditions (222), (242), it is not required that two selected conditions be employed. For example, an aluminum supplier may employ a first selected condition (222) based upon knowledge of a customer's processes to facilitate improvement of the customer's aluminum alloy products, and without the customer defining a second selected condition. Thus, in some embodiments, only a single preselected condition is employed (e.g., selected condition (222)). Furthermore, while only two cold working steps (220), (240) have been illustrated and described, it will be appreciated that any number of separate cold working steps may be employed and at any suitable number of locations to achieve the cold working step (200), and a preselected condition/property may be used with respect to one or more of these separate cold working steps.

C. Cold Working and Thermally Treating Multiple Times at Different Locations

In another embodiment, a first cold working step and a first thermal treatment step may be completed at a first location, and a second cold working step and a second thermal treatment step may be completed at a second location to achieve one or more predetermined properties. For example, and with reference now to FIG. 2q-9, to complete the cold working step (200) and the thermal treatment step (300), a first cold working step (220) and a first thermal treatment step (320) may be completed at a first location, and a second cold working step (240) and a second thermal treatment step (340) may be completed at a second location, with the combination of the first cold working step (220) and second cold working step (240) inducing at least 25% cold work in the aluminum alloy body. In one embodiment, the first cold working step, in of itself, induces at least 25% cold work in the aluminum alloy body.

By way of illustration, and with reference now to FIGS. 2q-1, 2q-2, and 2q-9, an aluminum alloy supplier may complete the first cold working step (220) and the first heating step (320), e.g., to achieve a preselected condition (322), such as a predetermined strength, a predetermined elongation, or a predetermined combination of strength and elongation (330), among others. A customer may receive the aluminum alloy body that was prepared for post-solutionizing cold work (100), first cold worked (220), and first heated (320). The customer may then complete the second cold working step (240) and the second thermally treating step (340) to complete the cold working step (200) and thermally treating step (300), optionally with final treatments (400), and optionally to achieve another preselected condition (242) (e.g., a second selected condition). Thus, tailored aluminum alloy bodies having predetermined properties may be achieved, such as any of the properties described in the Properties section (Section H), below. These embodiments may be useful, for example, in automotive, aerospace and container applications, among others.

While FIG. 2q-9 has been described relative to achieving two preselected conditions (322), (342), it is not required that two selected conditions be employed. For example, an aluminum supplier may employ a first selected condition (322) based upon knowledge of a customer's processes to facilitate improvement of the customer's aluminum alloy products, and without the customer defining a second selected condition. Thus, in some embodiments, only a single preselected condition is employed (e.g., selected condition (322)). Furthermore, while only two cold working steps (220), (240) and two heating steps (320), (340) have been illustrated and described, it will be appreciated that any number of separate cold working steps may be used to accomplish the cold working step (200) at any number of suitable locations, and any number of separate heating steps may be employed to accomplish the thermally treating step (300) and at any suitable number of locations, and a preselected condition/property may be used with respect to one or more of these separate cold working and/or separate heating steps.

D. Cold Working and Thermally-Treating Combination

The combination of the cold working step (200) and the thermally treating step (300) are capable of producing aluminum alloy bodies having improved properties. It is believed that the combination of the high deformation of the cold working step (200) in combination with the appropriate thermally treatment conditions (300) produce a unique microstructure (see, Microstructure, below) capable of achieving combinations of strength and ductility that have been heretofore unrealized. The cold working step (200) facilitates production of a severely deformed microstructure while the thermally treating step (300) facilitates precipitation hardening. When the cold working (200) is at least 25%, and preferably more than 50%, and when an appropriate thermal treatment step (300) is applied, improved properties may be realized.

In one approach, the cold working (200) and thermally treating (300) steps are accomplished such that the aluminum alloy body achieves an increase in strength (e.g., tensile yield strength ($R_{0.2}$) or ultimate tensile strength ($R_m$)). The strength increase may be realized in one or more of the L, LT or ST directions. "Accomplished such that", "accomplished to achieve", and the like, means that the referenced property or properties are determined after the referenced step or steps are concluded (e.g., properties are not measured in the middle of a thermally treating step, but are instead measured upon conclusion of the thermally treating step).

In one embodiment, the cold working (200) and thermally treating (300) steps are accomplished such that the aluminum alloy body achieves an increase in strength as compared to a reference-version of the aluminum alloy body in the "as-cold worked condition". In another embodiment, the cold working (200) and thermally treating (300) steps are accomplished such that the aluminum alloy body achieves an increase in strength as compared to a reference-version of the aluminum alloy body in the T6 temper. In yet another embodiment, the cold working (200) and thermally treating (300) steps are accomplished such that the aluminum alloy body achieves an increase in strength as compared to a reference-version of the aluminum alloy body in the T87 temper. In another embodiment, the cold working (200) and thermally treating (300) steps are accomplished such that the aluminum alloy body achieves an increase a higher R-value as compared to a reference-version of the aluminum alloy body in the T4 temper. These and other properties are described in the Properties section, below.

The "as-cold worked condition" (ACWC) means: (i) the aluminum alloy body is prepared for post-solutionizing cold work, (ii) the aluminum alloy body is cold worked, (iii) not greater than 4 hours elapse between the completion of the solutionizing step (140) and the initiation of the cold working step (200), and (iv) the aluminum alloy body is not thermally treated. The mechanical properties of the aluminum alloy body in the as-cold worked condition should be measured within 4-14 days of completion of the cold working step (200). To produce a reference-version of the aluminum alloy body in the "as-cold worked condition", one would generally prepare an aluminum alloy body for post-solutionizing cold work (100), and then cold work the aluminum alloy body (200) according to the practices described herein, after which a portion of the aluminum alloy body is removed to determine its properties in the as-cold worked condition per the requirements described above. Another portion of the aluminum alloy body would be processed in accordance with the new processes described herein, after which its properties would be measured, thus facilitating a comparison between the properties of the reference-version of the aluminum alloy body in the as-cold worked condition and the properties of an aluminum alloy body processed in accordance with the new processes described herein (e.g., to compare strength, ductility, fracture toughness). Since the reference-version of the aluminum alloy body is produced from a portion of the aluminum alloy body, it would have the same composition as the aluminum alloy body.

The "T6 temper" and the like means an aluminum alloy body that has been solutionized and then thermally treated to a maximum strength condition (within 1 ksi of peak strength); applies to bodies that are not cold worked after solutionizing, or in which the effect of cold work in flattening or straightening may not be recognized in mechanical property limits. As described in further detail below, aluminum alloy bodies produced in accordance with the new processes described herein may achieve superior properties as compared to the aluminum alloy body in a T6 temper. To produce a reference-version of the aluminum alloy body in a T6 temper, one would prepare an aluminum alloy body for post-solutionizing cold work (100), after which a portion of the aluminum alloy body would be processed to a T6 temper (i.e., a referenced aluminum alloy body in the T6 temper). Another portion of the aluminum alloy body would be processed in accordance with the new processes described herein, thus facilitating a comparison between the properties of the reference-version of the aluminum alloy body in the T6 temper and the properties of an aluminum alloy body processed in accordance with the new processes described herein (e.g., to compare strength, ductility, fracture toughness). Since the reference-version of the aluminum alloy body is produced from a portion of the aluminum alloy body, it would have the same composition as the aluminum alloy body. The reference-version of the aluminum alloy body may require work (hot and/or cold) before the solutionizing step (140) to place the reference-version of the aluminum alloy body in a comparable product form to the new aluminum alloy body (e.g., to achieve the same final thickness for rolled products)

The "T4 temper" and the like means an aluminum alloy body that has been solutionized and then naturally aged to a substantially stable condition; applies to bodies that are not cold worked after solutionizing, or in which the effect of cold work in flattening or straightening may not be recognized in mechanical property limits. To produce a reference-version of the aluminum alloy body in a T4 temper, one would prepare an aluminum alloy body for post-solutionizing cold work (100), after which a portion of the aluminum alloy body would be allowed to naturally age to a T4 temper (i.e., a referenced aluminum alloy body in the T4 temper). Another portion of the aluminum alloy body would be processed in accordance with the new processes described herein, thus facilitating a comparison between the properties of the reference-version of the aluminum alloy body in the T4 temper and the properties of an aluminum alloy body processed in accordance with the new processes described herein (e.g., to compare strength, ductility, fracture toughness). Since the reference-version of the aluminum alloy body is produced from a portion of the aluminum alloy body, it would have the same composition as the aluminum alloy body. The reference-version of the aluminum alloy body may require work (hot or cold) before the solutionizing step (140) to place the reference-version of the aluminum alloy body in a comparable product form to the new aluminum alloy body (e.g., to achieve the same thickness for rolled products).

The "T87 temper" and the like means an aluminum alloy body that has been solutionized, cold worked 10% (rolled or stretched), and then thermally treated to a maximum strength condition (within 1 ksi of peak strength). As described in further detail below, aluminum alloy bodies produced in accordance with the new processes described herein may achieve superior properties over a comparable aluminum alloy body in a T87 temper. To produce a reference-version of the aluminum alloy body in a T87 temper, one would prepare an aluminum alloy body for post-solutionizing cold work (100), after which a portion of the aluminum alloy body would be processed to a T87 temper (i.e., a referenced aluminum alloy body in the T87 temper). Another portion of the aluminum alloy body would be processed in accordance with the new processes described herein, thus facilitating a comparison between the properties of the reference-version of the aluminum alloy body in the T87 temper and the properties of an aluminum alloy body processed in accordance with the new processes described herein (e.g., to compare strength, ductility, fracture toughness). Since the reference-version of the aluminum alloy body is produced from a portion of the aluminum alloy body, it would have the same composition as the aluminum alloy body. The reference-version of the aluminum alloy body may require work (hot and/or cold) before the solutionizing step (140) to place the reference-version of the aluminum alloy body in a comparable product form to the new aluminum alloy body (e.g., to achieve the same thickness for rolled products).

The "T3 temper" and the like means an aluminum alloy body that has been solutionized, cold worked and then naturally aged (i.e., no thermal treatment has been applied at the time properties are measured). To produce a reference-version of the aluminum alloy body in a T3 temper, one would prepare an aluminum alloy body for post-solutionizing cold work (100), after which the aluminum alloy body is naturally aged (room temperature aged) until the strength stabilizes, usually after a few days or weeks. Another portion of the aluminum alloy body would be then thermally treated in accordance with the new processes described herein, thus facilitating a comparison between the properties of the reference-version of the aluminum alloy body in the T3 temper and the properties of an aluminum alloy body processed in accordance with the new processes described herein (e.g., to compare strength, ductility, fracture toughness). Since the reference-version of the aluminum alloy body is produced from a portion of the aluminum alloy body, it would have the same composition as the aluminum alloy body.

In one embodiment, the cold working step is initiated at a temperature of not greater than 400° (e.g., at a temperature of not greater than 250° F.) and the thermally treating step (300) is conducted at a temperature of at least 150° F. In these embodiments, the thermally treating step (300) and cold working step (200) may overlap (partially or fully) so long as they are conducted such that the new aluminum alloy bodies described herein are produced. In these embodiment, the thermally treating step (300) may be completed concomitant to the cold working step (200).

E. Microstructure i. Recrystallization

The cold working (200) and thermally treating (300) steps may be accomplished such that the aluminum alloy body achieves/maintains a predominately unrecrystallized microstructure. A predominately unrecrystallized microstructure means that the aluminum alloy body contains less than 50% of first type grains (by volume fraction), as defined below.

An aluminum alloy body has a crystalline microstructure. A "crystalline microstructure" is the structure of a polycrystalline material. A crystalline microstructure has crystals, referred to herein as grains. "Grains" are crystals of a polycrystalline material.

"First type grains" means those grains of a crystalline microstructure that meet the "first grain criteria", defined below, and as measured using the OIM (Orientation Imaging Microscopy) sampling procedure, described below. Due to the unique microstructure of the aluminum alloy body, the present application is not using the traditional terms "recrystallized grains" or "unrecrystallized grains", which can be ambiguous and the subject of debate, in certain circumstances. Instead, the terms "first type grains" and "second type grains" are being used where the amount of these types of grains is accurately and precisely determined by the use of computerized methods detailed in the OIM sampling procedure. Thus, the term "first type grains" includes any grains that meet the first grain criteria, and irrespective of whether those skilled in the art would consider such grains to be unrecrystallized or recrystallized.

The OIM analysis is to be completed from the T/4 (quarter-plane) location to surface of the L-ST plane. The size of the sample to be analyzed will generally vary by gauge. Prior to measurement, the OIM samples are prepared by standard metallographic sample preparation methods. For example, the OIM samples are generally polished with Buehler Si—C paper by hand for 3 minutes, followed by polishing by hand with a Buehler diamond liquid polish having an average particle size of about 3 microns. The samples are anodized in an aqueous fluoric-boric solution for 30-45 seconds. The samples are then stripped using an aqueous phosphoric acid solution containing chromium trioxide, and then rinsed and dried.

The "OIM sample procedure" is as follows:

The software used is TexSEM Lab OIM Data Collection Software version 5.31 (EDAX Inc., New Jersey, U.S.A.), which is connected via FIREWIRE (Apple, Inc., California, U.S.A.) to a DigiView 1612 CCD camera (TSL/EDAX, Utah, U.S.A.). The SEM is a JEOL JSM6510 (JEOL Ltd. Tokyo, Japan).

OIM run conditions are 70° tilt with a 18 mm working distance and an accelerating voltage of 20 kV with dynamic focusing and spot size of 1 times $10^{-7}$ amp. The mode of collection is a square grid. A selection is made such that orientations are collected in the analysis (i.e., Hough peaks information is not collected). The area size per scan (i.e., the frame) is 2.0 mm by 0.5 mm for 2 mm gauge samples and 2.0 mm by 1.2 mm for 5 mm gauge samples at 3 micron steps at 80×. Different frame sizes can be used depending upon gauge. The collected data is output in an *.osc file. This data may be used to calculate the volume fraction of first type grains, as described below.

Calculation of volume fraction of first type grains: The volume fraction of first type grains is calculated using the data of the *.osc file and the TexSEM Lab OIM Analysis Software version 5.31. Prior to calculation, data cleanup may be performed with a 15° tolerance angle, a minimum grain size=3 data points, and a single iteration cleanup. Then, the amount of first type grains is calculated by the software using the first grain criteria (below).

First grain criteria: Calculated via grain orientation spread (GOS) with a grain tolerance angle of 5°, minimum grain size is three (3) data points, and confidence index is zero (0). All of "apply partition before calculation", "include edge grains", and "ignore twin boundary definitions" should be required, and the calculation should be completed using "grain average orientation". Any grain whose GOS is ≤3° is a first type grain. If multiple frames are used, the GOS data are averaged.

"First grain volume" (FGV) means the volume of first type grains of the crystalline material.

"Percent Unrecrystallized" and the like is determined via the formula:

$$U_{RX}\% = (1-FGV)*100\%$$

As mentioned above, the aluminum alloy body generally comprises a predominately unrecrystallized microstructure, i.e., FGV<0.50 and $U_{RX}\% \geq 50\%$. In one embodiment, the aluminum alloy body contains (by volume fraction) not greater than 0.45 first type grains (i.e., the aluminum alloy body is at least 55% unrecrystallized ($U_{RX}\% \geq 55\%$), per the definitions provided above). In other embodiments, the aluminum alloy body may contain (by volume fraction) not greater than 0.40 first type grains ($U_{RX}\% \geq 60\%$), or not greater than 0.35 first type grains ($U_{RX}\% \geq 65\%$), or not greater than 0.30 first type grains ($U_{RX}\% \geq 70\%$), or not greater than 0.25 first type grains ($U_{RX}\% \geq 75\%$), or not greater than 0.20 first type grains ($U_{RX}\% \geq 80\%$), or not greater than 0.15 first type grains ($U_{RX}\% \geq 85\%$), or not greater than 0.10 first type grains ($U_{RX}\% \geq 90\%$), or less.

ii. Texture

The aluminum alloy body may achieve a unique microstructure. This unique microstructure may be illustrated by the R-values of the aluminum alloy body derived from crystallographic texture data. The microstructure of an aluminum alloy body relates to its properties (e.g., strength, ductility, toughness, corrosion resistance, among others).

For purposes of the present application, R-values are generated according to the R-value generation procedure, described below.

R-Value Generation Procedure:

Instrument: An x-ray generator with a computer-controlled pole figure unit (e.g., Rigaku Ultima III diffractometer (Rigaku USA, The Woodlands, Tex.) and data collection software and ODF software for processing pole figure data (e.g., Rigaku software included with the Rigaku diffractometer) is used. The reflection pole figures are captured in accordance with "Elements of X-ray Diffraction" by B. D. Cullity, $2^{nd}$ edition 1978 (Addison-Wesley Series in Metallurgy and Materials) and the Rigaku User Manual for the Ultima III Diffractometer and Multipurpose Attachment (or other suitable manual of other comparable diffractometer equipment).

Sample preparation: The pole figures are to be measured from the T/4 location to surface. Thus, the sample used for R-value generation is (preferably) ⅞ inch (LT) by 1¼ inches (L). Sample size may vary based on measurement equipment. Prior to measurement of the R-value, the sample may be prepared by:

1. machine the rolling plane from one side to 0.01" thicker than the T/4 plane (if thickness justifies); and
2. chemically etching to the T/4 location.

X-Ray measurement of pole figures: Reflection of pole figure (based on Schulz Reflection Method)

1. Mount a sample on the sample ring holder with an indication of the rolling direction of the sample
2. Insert the sample holder unit into the pole figure unit
3. Orient the direction of the sample to the same horizontal plane of the pole figure unit) ($\beta=0°$)
4. Use a normal divergence slit (DS), standard pole figure receiving slit (RS) with Ni $K_\beta$ filter, and standard scatter slit (SS) (slit determination will depend on radiation used, the 2θ of the peaks, and the breadth of the peaks). The Rigaku Ultima III diffractometer uses ⅔ deg DS, 5 mm RS, and 6 mm SS.

5. Set the power to recommended operating voltage and current (default 40 KV 44 mA for Cu radiation with Ni filter on the Ultima III)
6. Measure the background intensity from $\alpha=15°$, $\beta=0°$ to $\alpha=90°$, $\beta=355°$ of the $Al_{(111)}$, $Al_{(200)}$, and $Al_{(220)}$ peaks at 5° steps and counting for 1 second at each step (three pole figures are usually sufficient for an accurate ODF)
7. Measure the peak intensity from $\alpha=15°$, $\beta=0°$ to $\alpha=90°$, $\beta=355°$ of $Al_{(111)}$, $Al_{(200)}$, $Al_{(220)}$, and $Al_{(311)}$ peaks at 5° steps and counting for 1 second at each step
8. During measurements, the sample should be oscillated 2 cm per second to achieve a larger sampling area for improved sampling statistics
9. Subtract the background intensity from the peak intensity (this is usually done by the user-specific software)
10. Correct for absorption (usually done by the user-specific software)

The output data are usually converted to a format for input into ODF software. The ODF software normalizes the data, calculates the ODF, and recalculates normalized pole figures. From this information, R-values are calculated using the Taylor-Bishop-Hill model (see, Kuroda, M. et al., *Texture optimization of rolled aluminum alloy sheets using a genetic algorithm*, Materials Science and Engineering A 385 (2004) 235-244 and Man, Chi-Sing, On the r-value of textured sheet metals, International Journal of Plasticity 18 (2002) 1683-1706).

Aluminum alloy bodies produced in accordance with the presently described methods may achieve high normalized R-values as compared to conventionally produced materials. "Normalized R-value" and the like means the R-value as normalized by the R-value of the RV-control sample at an angle of 0° relative to the rolling direction. For example, if the RV-control sample achieves an R-value of 0.300 at an angle of 0° relative to the rolling direction, this and all other R-values would be normalized by dividing by 0.300.

"RV-control sample" and the like means a control sample taken from a reference-version aluminum alloy body in a T4 temper (defined above).

"Rolling direction" and the like means the L-direction for rolled products (see, FIG. 13). For non-rolled products, and in the context of R-values "rolling direction" and the like means the principle direction of extension (e.g., the extrusion direction). For purposes of the present application, the various R-values of a material are calculated from an angle of 0° to an angle of 90° relative to the rolling direction, and in increments of 5°. For purposes of simplicity, "orientation angle" is sometimes used to refer to the phrase "angle relative to the rolling direction".

"Maximum normalized R-value" and the like means the maximum normalized R-value achieved at any angle relative to the rolling direction.

"Max RV angle" and the like means the angle at which the maximum normalized R-value is achieved.

As a non-limiting example, a chart containing R-values (both non-normalized and normalized) of an RV-control sample and an aluminum alloy body processed in accordance with the new processes described herein is provided in Table 2, below.

TABLE 2

| Rolling Angle | R-value (Control) | Normalized R-value (Control) | R-value (New Process) (75% CW) | Normalized R-value (New Process) (75% CW) |
|---|---|---|---|---|
| 0 | 0.4423 | 1.000 | 0.9255 | 2.092 |
| 5 | 0.4418 | 0.999 | 0.9273 | 2.096 |
| 10 | 0.4351 | 0.984 | 0.9570 | 2.163 |
| 15 | 0.4215 | 0.953 | 1.1150 | 2.521 |
| 20 | 0.4249 | 0.961 | 1.4777 | 3.341 |
| 25 | 0.4497 | 1.017 | 1.8105 | 4.093 |
| 30 | 0.5112 | 1.156 | 2.2541 | 5.096 |
| 35 | 0.5312 | 1.201 | 2.7192 | 6.147 |
| 40 | 0.5527 | 1.249 | 3.3643 | 7.606 |
| 45 | 0.5742 | 1.298 | 3.6751 | 8.308 |
| 50 | 0.5390 | 1.219 | 3.9305 | 8.886 |
| 55 | 0.5208 | 1.177 | 3.8992 | 8.815 |
| 60 | 0.4816 | 1.089 | 3.6461 | 8.243 |
| 65 | 0.5029 | 1.137 | 2.8969 | 6.549 |
| 70 | 0.5126 | 1.159 | 2.1150 | 4.781 |
| 75 | 0.4898 | 1.107 | 1.5327 | 3.465 |
| 80 | 0.4404 | 0.996 | 1.2394 | 2.802 |
| 85 | 0.4229 | 0.956 | 1.0073 | 2.277 |
| 90 | 0.4130 | 0.934 | 0.9497 | 2.147 |

The normalized R-values for the Control and the 75% Cold Work samples are plotted as function of orientation angle in FIG. 10. FIG. 10 also contains the normalized R-values for aluminum alloy bodies with 25%, 50% and 85% cold work.

As illustrated in FIG. 10, the example aluminum alloy bodies achieve much higher R-values than the RV-control sample, especially between orientation angles of 20° and 70° relative to the rolling direction. For the 75% cold worked body, a maximum normalized R-value of 8.886 is achieved at a max RV angle of 50°. The RV-control sample achieves a maximum normalized R-value of 1.298 at a max RV angle of 45°. These R-values may be indicative of the texture (and hence microstructure) of the new aluminum alloy bodies as compared to conventionally produced aluminum alloy bodies.

In one approach, an aluminum alloy body processed in accordance with the new methods described herein may achieve a maximum normalized R-value of at least 2.0. In one embodiment, the new aluminum alloy body may achieve a maximum normalized R-value of at least 2.5. In other embodiments, the new aluminum alloy body may achieve a maximum normalized R-value of at least 3.0, or at least 3.5, or at least 4.0, or at least 4.5, or at least 5.0, at least 5.5, or at least 6.0, or at least 6.5, or at least 7.0, or at least 7.5, or at least 8.0, or at least 8.5, or at least 8.75, or higher. The maximum normalized R-value may be achieved at an orientation angle of from 20° to 70°. In some embodiments, the maximum normalized R-value may be achieved at an orientation angle of from 30° to 70°. In other embodiments, the maximum normalized R-value may be achieved at an orientation angle of from 35° to 65°. In yet other embodiments, the maximum normalized R-value may be achieved at an orientation angle of from 40° to 65°. In yet other embodiments, the maximum normalized R-value may be achieved at an orientation angle of from 45° to 60°. In other embodiments, the maximum normalized R-value may be achieved at an orientation angle of from 45° to 55°.

In another approach, an aluminum alloy body processed in accordance with the new methods described herein may achieve a maximum normalized R-value that is at least 200% higher than the RV-control sample at the max RV angle of the new aluminum alloy body. In this approach, the normalized R-value of the new aluminum alloy body is compared to the normalized R-value of the RV-control sample at the angle where the max RV angle of the new aluminum alloy body occurs. For example, as shown in FIG. 10 and Table 2, above, the 75% cold worked aluminum alloy body realizes a 729% increase in normalized R-value at its max RV angle of 50° as compared to the normalized R-value of the RV-control sample at the same angle of 50° (8.886/1.219=729%). In one embodiment, an aluminum alloy body may achieve a maximum normalized R-value that is at least 250% higher than the RV-control sample at the max RV angle of the new aluminum alloy body. In other embodiments, the aluminum alloy body may achieve a maximum normalized R-value that is at least 300% higher, or at least 350% higher, or at least 400% higher, or at least 450% higher, or at least 500% higher, or at least 550% higher, or at least 600% higher, or at least 650% higher, or at least 700% higher, or at least 750% higher, or more, than the RV-control sample at the max RV angle of the aluminum alloy body.

In another approach, an aluminum alloy body processed in accordance with the new methods described herein may achieve a maximum normalized R-value that is at least 200% higher than the maximum normalized R-value of the RV-control sample. In this approach, the maximum normalized R-value of the new aluminum alloy body is compared to the maximum normalized R-value of the RV-control sample, irrespective of the angle at which the maximum normalized R-values occur. For example, as shown in FIG. 10 and Table 2, above, the 75% cold worked aluminum alloy body alloy realizes a maximum normalized R-value of 8.886 at an orientation angle of 50°. The maximum normalized R-value of the RV-control sample is 1.298 at an orientation angle of 45°. Thus, the 75% cold worked aluminum alloy body realizes a 685% increase in maximum normalized R-value over the RV-control sample (8.886/1.298=1004%). In one embodiment, an aluminum alloy body may achieve a maximum normalized R-value that is at least 250% higher than the maximum normalized R-value of the RV-control sample. In other embodiments, the aluminum alloy body may achieve a maximum normalized R-value that is at least 300% higher, or at least 350% higher, or at least 400% higher, or at least 450% higher, or at least 500% higher, or at least 550% higher, or at least 600% higher, or at least 650% higher, or at least 700% higher, or more, than the maximum normalized R-value of the RV-control sample.

iii. Micrographs

Optical micrographs of some 2xxx aluminum alloys bodies produced in accordance with the new processes described herein are illustrated in FIGS. 11b-11e. FIG. 11a is a microstructure of a reference-version of the aluminum alloy body in the T6 temper. FIGS. 11b-11e are microstructures of new aluminum alloy bodies having 25%, 50%, 75% and 85% cold work, respectively. These micrographs illustrate some aspects of the unique microstructures that may be attained using the new processes described herein. As illustrated, the grains of the new aluminum alloy bodies appear to be non-equiaxed (elongated) grains. For the 75% and 85% cold-worked bodies, the grain structure appears fibrous/rope-like, and with a plurality of shear bands. These unique microstructures may contribute to the improved properties of the new aluminum alloy bodies.

F. Optional Post-Thermal Treatments

After the thermal treatment step (300), the 2xxx aluminum alloy body may be subjected to various optional final treatment(s) (400). For example, concomitant to or after the thermal treatments step (300), the 2xxx aluminum alloy body may be subjected to various additional working or finishing operations (e.g., (i) forming operations, (ii) flattening or straightening operations that do not substantially affect mechanical properties, such as stretching, and/or (iii) other operations, such as machining, anodizing, painting, polishing, buffing). The optional final treatment(s) step (400) may be absent of any purposeful/meaningful thermal treatment(s) that would materially affect the microstructure of the aluminum alloy body (e.g., absent of any anneal steps). Thus, the microstructure achieved by the combination of the cold working (200) and thermally treating (300) steps may be retained.

In one approach, one or more of the optional final treatment(s) (400) may be completed concomitant to the thermal treatment step (300). In one embodiment, the optional final treatment(s) step (400) may include forming, and this forming step may be completed concomitant to (e.g., contemporaneous to) the thermal treatment step (300). In one embodiment, the aluminum alloy body may be in a substantially final form due to concomitant forming and thermal treatment operations (e.g., forming automotive door outer and/or inner panels, body-in-white components, hoods, deck lids, and similar components during the thermal treatment step, among the other products listed in the Product Applications section (Section I), below). In one embodiment, an aluminum alloy body is in the form of a predetermined shaped product after the forming operation. In one embodiment, and with reference back to FIG. 2q-6, a thermal treatment step (300) may consist of the warm forming step (320'), and a predetermined shaped product may be produced.

Since optional final treatment(s) (400) may include forming operations (e.g., room temperature or warm forming operations for forming predetermined shaped products), some work (warm or cold) may be induced in the body due to such forming operations, but such forming operations are not included in the definition of "cold working" relative to step (200) when such forming operations either (i) occur after the thermally treatment step (300) is accomplished (completed), or (ii) occur before, during, or concomitant to the thermal treatment step (300) (i.e., before the thermal treatment step is accomplished (completed)), but induce less than 0.3322 equivalent plastic strain (i.e., less than 25% CW, per Table 1, above). Conversely, any forming operation that occurs at cold working temperature(s) (defined above) and induces at least 0.3322 equivalent plastic strain after solutionizing and prior to completion of the thermal treatment step is "cold working", per above, and is thus included in the definition of cold working step (200), and not in the definition of the optional final treatment step (400).

As used herein, a "predetermined shaped product" and the like means a product that is formed into a shape via a shape forming operation (e.g., drawing, ironing, warm forming, flow forming, shear forming, spin forming, doming, necking, flanging, threading, beading, bending, seaming, stamping, hydroforming, and curling, among others), and which shape was determined in advance of the shape forming operation (step). Examples of predetermined shaped products include automotive components (e.g., hoods, fenders, doors, roofs, and trunk lids, among others) and containers (e.g., food cans, bottles, among others), consumer electronic components (e.g., as laptops, cell phones, cameras, mobile music players, handheld devices, computers, televisions, among others), and many other aluminum alloy products described in the Product Applications section (Section I), below. For the purposes of this patent application, "predetermined shaped products" do not include mere sheet or plate products as produced after cold rolling, since rolling is not a "forming operation" as defined herein, and rolled products are thus not "formed into a shape by a shape forming operation". Instead rolled product are later shaped (formed) into the final product form by a customer. In one embodiment, the predetermined shaped product is in its final product form after the forming operation. The forming operation utilized to produce "predetermined shaped products" may occur before, after or concomitant to the thermally treating step (300), such as described in the Thermal Treatment section (Sections C, subsection i).

In one embodiment, a predetermined shaped product is a product produced by flow forming. Flow forming is an incremental metal forming technique in which a disk or tube of metal is formed over a mandrel by one or more rollers using pressure, where the roller deforms the workpiece, forcing it against the mandrel, usually both axially lengthening the workpiece while radially thinning the workpiece. By way of illustration, aluminum alloy bodies that may be produced via flow forming include aerospace components, bases (e.g., table, flag pole, lavatory), basins, bearing housings, bowls, bullet headlight shapes, clutch housings, cones, containers, covers, lids, caps, military parts, dishes, domes, engine parts, feeders, funnels, hemispheres, high pressure gas bottles/cylinders, hoppers, horns (sound projection), housings, mounting rings, musical instruments (e.g., trumpets, cymbals), nose cones, nozzles, oil seal components, pipe/tube ends, pots, pans, cups, cans, pails, buckets, canisters, pulleys, reflectors, rings, satellite/antenna dishes, separator parts, spheres, tank ends/heads/bottoms, venturi shapes, waste receptacles, hubs, rollers, struts, torque tubes, drive shafts, engine and motor shafts, munitions and wheels (automotive, truck, motorcycle, etc.), among others.

As noted above, the forming operation may be completed before, during, or after the thermal treatment step (300). In one embodiment, the forming operation is completed concomitant to the thermal treatment step (300), and thus may occur at a temperature of from 150° F. to below the recrystallization temperature of the rolled aluminum alloy product. These forming operations are referred to herein as "warm forming" operations. In one embodiment, a warm forming operation occurs at a temperature of from 200° F. to 550° F. In another embodiment, a warm forming operation occurs at a temperature of from 250° F. to 450° F. Since such forming operations are completed as part of the thermal treatment step (300), they may be used in combination with any of the embodiments described in the Thermal Treatment section (Section C), above, including any of the embodiments illustrated in FIGS. 2a, 3-5, 6a, 7-9, 2q-1 to 2q-9, among others, described above. Thus, in some embodiments, warm forming may be used to produce predetermined shaped products and in a predetermined condition, as described in the Thermal Treatment section (Section C), above, including any of the embodiments illustrated in FIGS. 2q-1 to 2q-9, among others, described above, which warm formed parts may have higher strength as compared to one or more of (i) their strength in the as-received condition and (ii) a reference version of the predetermined shaped product in the T6 temper. The "as-received condition" and the like includes the partially cold worked condition (per step 220), the as-cold worked condition (full completion of step 200, and per the definition of as-cold worked condition, below), the T3 condition (full completion of step 200, and per the definition of T3 temper, below), or the partially thermally treated condition (per step 320), and combinations thereof. The improved properties may be any of the improved properties described in the Properties section (Section H), below. Warm forming may facilitate production of defect-free predetermined shaped products. Defect-free means that the components are suitable for use as a commercial product, and thus may have little (insubstantial) or no cracks, wrinkles, Ludering, thinning and orange peel, to name a few. In other embodiments, room temperature forming may be used to produce defect-free predetermined shaped products.

In other embodiments, the forming operation may occur at temperatures of less than 150° F., such as at ambient conditions ("room temperature forming"), and thus are not a part of the thermal treatment step (300).

The above-described forming operations typically apply a strain to an aluminum alloy body (e.g., applying a strain to a rolled aluminum alloy product, such as an aluminum alloy sheet or aluminum alloy plate) to form the aluminum alloy body into the predetermined shaped product. The amount of strain may vary during the forming operation, but the maximum amount of strain applied during the forming operation is usually at least 0.01 EPS (equivalent plastic strain). In one embodiment, the maximum amount of strain applied during the forming operation is at least 0.05 EPS. In another embodiment, the maximum amount of strain applied during the forming operation is at least 0.07 EPS. In yet another embodiment, the maximum amount of strain applied during the forming operation is at least 0.10 EPS. In another embodiment, the maximum amount of strain applied during the forming operation is at least 0.15 EPS. In yet another embodiment, the maximum amount of strain applied during the forming operation is at least 0.20 EPS. In another embodiment, the maximum amount of strain applied during the forming operation is at least 0.25 EPS. In yet another embodiment, the maximum amount of strain applied during the forming operation is at least 0.30 EPS. In any of these embodiments, the maximum amount of strain applied during the forming operation may be less than 0.3322 EPS.

After the forming step, the predetermined shaped product may be distributed and/or otherwise used by the user of the forming step. For example, an automotive manufacturer may form an automotive component, and then assemble a vehicle using the automotive component. An aerospace vehicle manufacturer may form an aerospace component, and then assemble an aerospace vehicle using the aerospace component. A container manufacturer may form a container, and then provide such container to a food or beverage distributor for filing and distribution for consumption. Many other variations exist, and many of the aluminum alloy products listed in the Product Applications section (Section I), below can be formed by manufacturers and then otherwise used in an assembly and/or distributed.

G. Composition

As noted above, the aluminum alloy body is made from a 2xxx aluminum alloy. 2xxx aluminum alloys are aluminum alloys containing copper as the predominate alloying ingredient other than aluminum. For purposes of the present application, 2xxx aluminum alloys are aluminum alloys having at least 0.5 wt. % Cu, and up to 8.0 wt. % Cu, with the copper being the predominate alloying element other than aluminum. The 2xxx aluminum alloy may also include secondary elements, tertiary elements and/or other elements, as defined below. The copper, secondary elements and/or tertiary elements may promote a strain hardening response, a precipitation hardening response, and combinations thereof. In one embodiment, at least some of the alloying elements promote both a strain hardening response and a precipitation hardening response. In turn, improved properties may be realized.

In one embodiment, the 2xxx aluminum alloy includes at least 1.0 wt. % Cu. In another embodiment, the 2xxx aluminum alloy includes at least 2.0 wt. % Cu. In yet another embodiment, the 2xxx aluminum alloy body includes at least 2.5 wt. % Cu.

In one embodiment, the 2xxx aluminum alloy includes not greater than 7.0 wt. % Cu. In another embodiment, the 2xxx aluminum alloy includes not greater than 6.0 wt. % Cu. In another embodiment, the 2xxx aluminum alloy includes not greater than 5.0 wt. % Cu. In another embodiment, the 2xxx aluminum alloy includes not greater than 4.5 wt. % Cu.

The 2xxx aluminum alloy may include secondary elements. The secondary elements are selected from the group consisting of magnesium, silver, lithium, and zinc, and combinations thereof.

When magnesium is used, the 2xxx aluminum alloy generally includes at least 0.10 wt. % Mg. In one embodiment, the 2xxx aluminum alloy includes at least 0.20 wt. % Mg. The 2xxx aluminum alloy generally includes not greater than 3.0 wt. % Mg, such as not greater than 2.5 wt. % Mg. In one embodiment, the 2xxx aluminum alloy includes not greater than 2.0 wt. % Mg. In another embodiment, the 2xxx aluminum alloy includes not greater than 1.5 wt. % Mg. In other embodiments, magnesium may be present as an impurity, and in these embodiments is present at levels of 0.09 wt. % or less.

When silver is used, the 2xxx aluminum alloy generally includes at least 0.05 wt. % Ag. In one embodiment, the 2xxx aluminum alloy includes at least 0.10 wt. % Ag. In yet another embodiment, the 2xxx aluminum alloy includes at least 0.15 wt. % Ag. In another embodiment, the 2xxx aluminum alloy includes at least 0.20 wt. % Ag. The 2xxx aluminum alloy generally includes not greater than 3.0 wt. % Ag. In one embodiment, the 2xxx aluminum alloy includes not greater than 2.0 wt. % Ag. In other embodiments, the 2xxx aluminum alloy includes not greater than 1.0 wt. % Ag, or not greater than 0.75 wt. % Ag. In other embodiments, silver may be present as an impurity, and in these embodiments is present at levels of 0.04 wt. % or less.

When lithium is used, the 2xxx aluminum alloy generally includes at least 0.05 wt. % Li. In one embodiment, the 2xxx aluminum alloy includes 0.25 wt. % Li. In yet another embodiment, the 2xxx aluminum alloy includes at least 0.50 wt. % Li. In another embodiment, the 2xxx aluminum alloy includes at least 0.60 wt. % Li. The 2xxx aluminum alloy generally includes not greater than 3.0 wt. % Li. In one embodiment, the 2xxx aluminum alloy includes not greater than 2.5 wt. % Li. In other embodiments, the 2xxx aluminum alloy includes not greater than 2.0 wt. % Li. In other embodiments, lithium may be present as an impurity, and in these embodiments is present at levels of 0.04 wt. % or less.

When zinc is used, the 2xxx aluminum alloy generally includes at least 0.10 wt. % Zn. In one embodiment, the 2xxx aluminum alloy includes 0.25 wt. % Zn. In another embodiment, the 2xxx aluminum alloy includes at least 0.50 wt. % Zn. The 2xxx aluminum alloy generally includes not greater than 7.0 wt. % Zn. In one embodiment, the 2xxx aluminum alloy includes not greater than 6.0 wt. % Zn. In other embodiments, the 2xxx aluminum alloy includes not greater than 5.0 wt. % Zn, or not greater than 4.0 wt. % Zn, or not greater than 3.0 wt. % Zn, or not greater than 2.0 wt. % Zn. In other embodiments, zinc may be present as an impurity, and in these embodiments is present at levels of 0.09 wt. % or less.

The 2xxx aluminum alloy may include a variety of tertiary elements for various purposes, such as to enhance mechanical, physical or corrosion properties (i.e. strength, toughness, fatigue resistance, corrosion resistance), to enhance properties at elevated temperatures, to facilitate casting, to control cast or wrought grain structure, and/or to enhance machinability, among other purposes. When present, these tertiary elements may include one or more of: (i) up to 2.0 wt. % each of one or more of Mn, Si, Fe, Sn, Bi, Pb, Cd, and Ni, (ii) up to 1.0 wt. % each of one or more of Sr and Sb, and (iii) up to 0.5 wt. % each of one or more of V, Cr, Zr, Sc, Ti, Hf, Mo, Co, and rare earth elements. When present, a tertiary element is usually contained in the alloy by an amount of at least 0.01 wt. %.

The 2xxx aluminum alloy may include impurities, such as iron and silicon. When silicon and/or iron are not included in the alloy as a tertiary element, silicon and/or iron may be included in the 2xxx aluminum alloy as an impurity. In these embodiments, the 2xxx aluminum alloy generally includes not greater than 0.50 wt. % of either silicon and iron. In one embodiment, the 2xxx aluminum alloy includes not greater than 0.25 wt. % of either silicon and iron. In another embodiment, the 2xxx aluminum alloy includes not greater than 0.15 wt. % of either silicon and iron. In yet another embodiment, the 2xxx aluminum alloy includes not greater than 0.10 wt. % of either silicon and iron. In another embodiment, the 2xxx aluminum alloy includes not greater than 0.05 wt. % of at least one of silicon and iron.

The 2xxx aluminum alloy generally contains low amounts of "other elements" (e.g., casting aids and impurities, other than Fe and Si). Other elements means any other element of the periodic table that may be included in the 2xxx aluminum alloy, except for the aluminum, the zinc, the secondary elements (when included), the tertiary elements (when included), and the Fe and Si impurities (when included), described above. When any element of the secondary and/or tertiary elements is contained within the alloy only as an impurity, such elements fall within the scope of "other elements", except for iron and silicon. For example, if a 2xxx alloy includes zinc as an impurity, and not as an alloying addition, the zinc would fall within the scope of "other elements". As another example, if Mn, Ag, and Zr are included in the 2xxx alloy as alloying additions, those tertiary elements would not fall within the scope of other elements", but the other tertiary elements would be included within the scope of other elements since they would be included in the alloy only as an impurity. However, if silicon or iron is contained in the 2xxx alloy as an impurity, they would not fall within the scope of "other elements" since they have their own defined impurity limits, as described above.

Generally, the aluminum alloy body contains not more than 0.25 wt. % each of any element of the other elements, with the total combined amount of these other elements not exceeding 0.50 wt. %. In one embodiment, each one of these other elements, individually, does not exceed 0.10 wt. % in the 2xxx aluminum alloy, and the total combined amount of these other elements does not exceed 0.35 wt. %, in the 2xxx aluminum alloy. In another embodiment, each one of these other elements, individually, does not exceed 0.05 wt. % in the 2xxx aluminum alloy, and the total combined amount of these other elements does not exceed 0.15 wt. % in the 2xxx aluminum alloy. In another embodiment, each one of these other elements, individually, does not exceed 0.03 wt. % in the 2xxx aluminum alloy, and the total combined amount of these other elements does not exceed 0.1 wt. % in the 2xxx aluminum alloy.

In one approach, the 2xxx aluminum alloy includes:
0.5 to 8.0 wt. % Cu, wherein the Cu is the predominate alloying element other than aluminum;
optionally one or more of the secondary elements of:
0.10 to 3.0 wt. % Mg,
0.05 to 3.0 wt. % Ag,
0.05 to 3.0 wt. % Li, and
0.10 to 6.0 wt. % Zn,
optionally with one or more of the tertiary elements of:
(i) up to 2.0 wt. % each of one or more of Mn, Si, Fe, Sn, Bi, Pb, and Ni,
(ii) up to 1.0 wt. % each of one or more of Sr and Sb, and
(iii) up to 0.5 wt. % each of one or more of V, Cr, Zr, Sc, Ti, Hf, Mo, Co, and rare earth elements.
if not included in the 2xxx aluminum alloy as a tertiary element:
up to 0.5 wt. % Fe as an impurity;
up to 0.5 wt. % Si as an impurity;
the balance being aluminum and other elements, wherein the other elements are limited to not more than 0.25 wt. % each, and not more than 0.5 wt. % in total.

The total amount of the primary, secondary, and tertiary alloying elements should be chosen so that the aluminum alloy body can be appropriately solutionized (e.g., to promote hardening while restricting the amount of constituent particles).

In one embodiment, the 2xxx aluminum alloy is one of the following wrought 2xxx aluminum alloys, as defined by the Aluminum Association: 2001, 2002, 2004, 2005, 2006, 2007, 2007A, 2007B, 2008, 2009, 2010, 2011, 2011A, 2111, 2111A, 2111B, 2012, 2013, 2014, 2014A, 2214, 2015, 2016, 2017, 2017A, 2117, 2018, 2218, 2618, 2618A, 22198, 2319, 2419, 2519, 2021, 2022, 2023, 2024, 2024A, 2124, 2224, 2224A, 2324, 2424, 2524, 2025, 2026, 2027, 2028, 2028A, 2028B, 2028C, 2030, 2031, 2032, 2034, 2036, 2037, 2038, 2039, 2139, 2040, 2041, 2044, 2045, 2050, 2056, 2060, 2090, 2091, 2094, 2095, 2195, 2196, 2097, 2197, 2297, 2397, 2098, 2198, 2099, and 2199.

In one embodiment, the 2xxx aluminum alloy includes an amount of alloying elements that leaves the 2xxx aluminum alloy free of, or substantially free of, soluble constituent particles after solutionizing. In one embodiment, the 2xxx aluminum alloy includes an amount of alloying elements that leaves the aluminum alloy with low amounts of (e.g., restricted/minimized) insoluble constituent particles after solutionizing. In other embodiments, the 2xxx aluminum alloy may benefit from controlled amounts of insoluble constituent particles.

H. Properties

The new 2xxx aluminum alloy bodies produced by the new processes described herein may achieve (realize) an improved combination of properties.

i. Strength

As mentioned above, the cold working (200) and the thermally treating (300) steps may be accomplished to achieve an increase in strength as compared to the aluminum alloy body in the as cold-worked condition and/or the T6 temper. Strength properties are generally measured in accordance with ASTM E8 and B557, but may be measured in accordance with other applicable standards, as appropriate to the product form (e.g., use of NASM 1312-8 and/or NASM 1312-13 for fasteners).

In one approach, the aluminum alloy body achieves at least a 5% increase in strength (TYS and/or UTS) relative to a reference-version of the aluminum alloy body in the T6 condition. In one embodiment, the aluminum alloy body achieves at least a 6% increase in tensile yield strength relative to a reference-version of the aluminum alloy body in the T6 condition. In other embodiments, the aluminum alloy body achieves at least an 8% increase in tensile yield strength, or at least a 10% increase in tensile yield strength, or at least a 12% increase in tensile yield strength, or at least a 14% increase in tensile yield strength, or at least a 16% increase in tensile yield strength, or at least an 18% increase in tensile yield strength, or at least a 20% increase in tensile yield strength, or at least a 22% increase in tensile yield strength, or at least a 24% increase in tensile yield strength, or at least a 26% increase in tensile yield strength, or at least a 28% increase in tensile yield strength, or at least a 30% increase in tensile yield strength, or at least a 32% increase in tensile yield strength, or at least a 34% increase in tensile yield strength, or at least a 36% increase in tensile yield strength, or at least a 38% increase in tensile yield strength, or at least a 40% increase in tensile yield strength, or more, relative to a reference-version of the aluminum alloy body in the T6 condition. These increases may be realized in the L and/or LT directions. When the aluminum alloy body is a fastener, its tensile yield strength may be tested in accordance with NASM 1312-8, and may realize any of the improvements described above or below relative to tensile yield strength.

In a related embodiment, the aluminum alloy body may achieve at least a 6% increase in ultimate tensile strength relative to a reference-version of the aluminum alloy body in the T6 condition. In other embodiments, the aluminum alloy body may achieve at least an 8% increase in ultimate tensile strength, or at least a 10% increase in ultimate tensile strength, or at least a 12% increase in ultimate tensile strength, or at least a 14% increase in ultimate tensile strength, or at least a 16% increase in ultimate tensile strength, or at least an 18% increase in ultimate tensile strength, or at least a 20% increase in ultimate tensile strength, or at least a 22% increase in ultimate tensile strength, or at least a 24% increase in ultimate tensile strength, or at least a 26% increase in ultimate tensile strength, or at least a 28% increase in ultimate tensile strength, or at least a 30% increase in ultimate tensile strength, or at least a 32% increase in ultimate tensile strength, or more, relative to a reference-version of the aluminum alloy body in the T6 condition. These increases may be realized in the L and/or LT directions.

In a related embodiment, an aluminum alloy fastener may achieve at least a 2% increase in shear strength relative to a reference version of the aluminum alloy fastener, wherein the reference version of the aluminum alloy fastener is in one of a T6 temper and a T87 temper, wherein the shear strength is tested in accordance with NASM 1312-13. In other embodiments, the aluminum alloy fastener may achieve at least a 4% increase in shear strength, or at least a 6% increase in shear strength, or at least an 8% increase in shear strength, or at a 10% increase in shear strength, or at least a 12% increase in shear strength, or at least a 14% increase in shear strength, or a 16% increase in shear strength, or at least an 18% increase in shear strength, or at least a 20% increase in shear strength, or at least a 22% increase in shear strength, or at least a 24% increase in shear strength, or at least a 26% increase in shear strength, or at least a 28% increase in shear strength, or at least a 30% increase in shear strength, or at least a 32% increase in shear strength, or more, relative to the reference version of the aluminum alloy fastener, wherein the reference version of the aluminum alloy fastener is in one of a T6 temper and a T87 temper.

In one approach, the aluminum alloy body achieves at least equivalent tensile yield strength as compared to a reference-version of the aluminum alloy body in the as-cold worked condition. In one embodiment, the aluminum alloy body achieves at least a 2% increase in tensile yield strength as compared to a reference-version of the aluminum alloy body in the as-cold worked condition. In other embodiments, the aluminum alloy body achieves at least a 4% increase in tensile yield strength, or at least a 6% increase in tensile yield strength, or at least an 8% increase in tensile yield strength, or at least a 10% increase in tensile yield strength, or at least a 12% increase in tensile yield strength, or at least a 14% increase in tensile yield strength, or at least a 16% increase in tensile yield strength, or at least an 18% increase in tensile yield strength, or at least a 20% increase in tensile yield strength, or at least a 22% increase in tensile yield strength, or at least a 24% increase in tensile yield strength, or at least a 26% increase in tensile yield strength, or at least a 28% increase in tensile yield strength, or at least a 30% increase in tensile yield strength, or more, as compared to a reference-version of the aluminum alloy body in the as-cold worked condition. Similar results may be obtained relative to ultimate tensile strength. These increases may be realized in the L or LT directions.

In one approach, an aluminum alloy body achieves at least a 5% increase in tensile yield strength relative to the aluminum alloy body in the T87 condition. In one embodiment, the aluminum alloy body achieves at least a 6% increase in tensile yield strength relative to the aluminum alloy body in the T87 condition. In other embodiments, the aluminum alloy body may achieve at least an 8% increase in tensile yield strength, or at least a 10% increase in tensile yield strength, or at least a 12% increase in tensile yield strength, or at least a 14% increase in tensile yield strength, or at least a 16% increase in tensile yield strength, or at least an 18% increase in tensile yield strength, or at least a 20% increase in tensile yield strength, or at least a 22% increase in tensile yield strength, or at least a 24% increase in tensile yield strength, or more, relative to the aluminum alloy body in the T87 condition. These increases may be realized in the L and/or LT directions. Similar results may be obtained relative to ultimate tensile strength.

In one embodiment, a new 2xxx aluminum alloy body realizes a typical tensile yield strength in the LT direction of at least 65 ksi. In other embodiments, a new 2xxx aluminum alloy body realizes a typical tensile yield strength in the LT direction of at least 66 ksi, or at least 67 ksi, or at least 68 ksi, or at least 69 ksi, or at least 70 ksi, or at least 71 ksi, or at least 72 ksi, or at least 73 ksi, or at least 74 ksi, or at least 75 ksi, or at least 76 ksi, or at least 77 ksi, or at least 78 ksi, or at least 79 ksi, or at least 80 ksi, or at least 81 ksi, or at least 82 ksi, or at least 83 ksi, or at least 84 ksi, or at least 85 ksi, or at least 86 ksi, or at least 87 ksi, or at least 88 ksi, or at least 89 ksi, or at least 90 ksi, or at least 91 ksi, or at least 92 ksi, or at least 93 ksi, or at least 94 ksi, or more. Similar results may be achieved in the longitudinal (L) direction.

In a related embodiment, a new 2xxx aluminum alloy body realizes a typical ultimate tensile strength in the LT direction of at least 68 ksi. In other embodiments, a new 2xxx aluminum alloy body realizes a typical ultimate tensile strength in the LT direction of at least 69 ksi, or at least 70 ksi, or at least 71 ksi, or at least 72 ksi, or at least 73 ksi, or at least 74 ksi, or at least 75 ksi, or at least 76 ksi, or at least 77 ksi, or at least 78 ksi, or at least 79 ksi, or at least 80 ksi, or at least 81 ksi, or at least 82 ksi, or at least 83 ksi, or at least 84 ksi, or at least 85 ksi, or at least 86 ksi, or at least 87 ksi, or at least 88 ksi, or at least 89 ksi, or at least 90 ksi, or at least 91 ksi, or at least 92 ksi, or at least 93 ksi, or at least 94 ksi, or at least 95 ksi, or at least 96 ksi, or at least 97 ksi, or at least 98 ksi, or at least 99 ksi, or at least 100 ksi, or more. Similar results may be achieved in the longitudinal (L) direction.

The new 2xxx aluminum alloy bodies may achieve a high strength and in a short time period relative to a reference-version of the 2xxx aluminum alloy body in the T6 and/or T87 temper. In one embodiment, a new 2xxx aluminum alloy body realizes its peak strength at least 10% faster than a reference-version of the aluminum alloy body in the T6 and/or T87 temper. As an example of 10% faster processing, if the T6-version of the 2xxx aluminum alloy body realizes its peak strength in 35 hours of processing, the new 2xxx aluminum alloy body would realize its peak strength in 31.5 hours or less. In other embodiments, the new 2xxx aluminum alloy body realizes it peak strength at least 20% faster, or at least 25% faster, or at least 30% faster, or at least 35% faster, or at least 40% faster, or at least 45% faster, or at least 50% faster, or at least 55% faster, or at least 60% faster, or at least 65% faster, or at least 70% faster, or at least 75% faster, or at least 80% faster, or at least 85% faster, or at least 90% faster, or more, as compared to a reference-version of the aluminum 2xxx aluminum alloy body in the T6 and/or T87 temper.

In one embodiment, a new 2xxx aluminum alloy body realizes its peak strength in less than 10 hours of thermal treatment time. In other embodiments, a new 2xxx aluminum alloy body realizes its peak strength in less than 9 hours, or less than 8 hours, or less than 7 hours, or less than 6 hours, or less than 5 hours, or less than 4 hours, or less than 3 hours, or less than 2 hours, or less than 1 hour, or less than 50 minutes, or less than 40 minutes, or less than 30 minutes, or less than 20 minutes, or less than 15 minutes, or less than 10 minutes of thermal treatment time, or less. Due to the short thermal treatment times, it is possible that paint baking cycles or coating cures could be used to thermally treat the new 2xxx aluminum alloy bodies.

ii. Ductility

The aluminum alloy body may realize good ductility and in combination with the above-described strengths. In one approach, the aluminum alloy body achieves an elongation (L and/or LT) of more than 4%. In one embodiment, the aluminum alloy body achieves an elongation (L and/or LT) of at least 5%. In other embodiments, the aluminum alloy body may achieve an elongation (L and/or LT) of at least 6%, or at least 7%, or at least 8%, or at least 9%, or at least 10%, or at least 11%, or at least 12%, or at least 13%, or at least 14%, or at least 15%, or at least 16%, or more.

iii. Fracture Toughness

The new 2xxx aluminum alloy bodies may realize good fracture toughness properties. Toughness properties are generally measured in accordance with ASTM E399 and ASTM B645 for plane-strain fracture toughness (e.g., $K_{IC}$ and $K_Q$) and in accordance with ASTM E561 and B646 for plane-stress fracture toughness (e.g., $K_{app}$ and $K_{R25}$).

In one embodiment, the new 2xxx aluminum alloy body realizes a toughness decrease of not greater than 10% relative to a reference-version of the aluminum alloy body in the T6 and/or T87 temper. In other embodiments, the new 2xxx aluminum alloy body realizes a toughness decrease of not greater than 9%, or not greater than 8%, or not greater than 7%, or not greater than 6%, or not greater than 5%, or not greater than 4%, or not greater than 3%, or not greater than 2%, or not greater than 1% relative to a reference-version of the 2xxx aluminum alloy body in the T6 and/or T87 temper. In one embodiment, the new 2xxx aluminum alloy body realizes a toughness at least equivalent to that of a reference-version of the 2xxx aluminum alloy body in the T6 temper.

In other embodiments, an aluminum alloy body achieves an improvement in fracture toughness. In these embodiments, the new aluminum alloy body achieves at least a 1% increase in fracture toughness relative to the aluminum alloy body in the T6 and/or T87 temper. In one embodiment, the new aluminum alloy body achieves at least a 3% increase in fracture toughness relative to the aluminum alloy body in the T6 and/or T87 temper. In other embodiments, the new aluminum alloy body achieves at least a 5% increase in fracture toughness, or at least a 7% increase in fracture toughness, or at least a 9% increase in fracture toughness, or at least an 11% increase in fracture toughness, or at least a 13% increase in fracture toughness, or at least a 15% increase in fracture toughness, or at least a 17% increase in fracture toughness, or at least a 19% increase in fracture toughness, or at least a 21% increase in fracture toughness, or at least a 23% increase in fracture toughness, or at least a 25% increase in fracture toughness, or more, relative to the aluminum alloy body in the T6 and/or T87 temper. These increases may be realized in the L-T and/or T-L directions, and may be relative to plane strain fracture toughness (e.g., $K_{IC}$ or $K_Q$) and/or relative to plane stress fracture toughness (e.g., $K_{app}$ or $K_{R25}$).

iv. Stress Corrosion Cracking

The new 2xxx aluminum alloy bodies may realize good stress corrosion cracking resistance. Stress corrosion cracking (SCC) resistance is generally measured in accordance with ASTM G47. For example, a new 2xxx aluminum alloy body may achieve a good strength and/or toughness, and with good SCC corrosion resistance. In one embodiment, a new 2xxx aluminum alloy body realizes a Level 1 corrosion resistance. In another embodiment, a new 2xxx aluminum alloy body realizes a Level 2 corrosion resistance. In yet another embodiment, a new 2xxx aluminum alloy body realizes a Level 3 corrosion resistance. In yet another embodiment, a new 2xxx aluminum alloy body realizes a Level 4 corrosion resistance.

| Corrosion Resistance Level | Short-transverse stress (ksi) for 20 days (minimum) without failure |
| --- | --- |
| 1 | ≥15 |
| 2 | ≥25 |
| 3 | ≥35 |
| 4 | ≥45 | v. Appearance

Aluminum alloy bodies processed in accordance with the new processes disclosed herein may realize improved appearance. The below appearance standards may be measured with a Hunterlab Dorigon II (Hunter Associates Laboratory INC, Reston, Va.), or comparable instrument.

Aluminum alloy bodies processed in accordance with the new processes disclosed herein may realize at least 5% higher specular reflectance as compared to the referenced aluminum alloy body in the T6 temper. In one embodiment, the new aluminum alloy bodies realize at least 6% higher specular reflectance as compared to the referenced aluminum alloy body in the T6 temper. In other embodiments, the new aluminum alloy bodies realize at least 7% higher specular reflectance, or at least 8% higher specular reflectance, or at least 9% higher specular reflectance, or at least 10% higher specular reflectance, or at least 11% higher specular reflectance, or at least 12% higher specular reflectance, or at least 13% higher specular reflectance, or more, as compared to the referenced aluminum alloy body in the T6 temper.

Aluminum alloy bodies processed in accordance with the new processes disclosed herein may realize at least 10% higher 2 degree diffuseness as compared to the referenced aluminum alloy body in the T6 temper. In one embodiment, the new aluminum alloy bodies realize at least 12% higher 2 degree diffuseness as compared to the referenced aluminum alloy body in the T6 temper. In other embodiments, the new aluminum alloy bodies realize at least 14% higher 2 degree diffuseness, or at least 16% higher 2 degree diffuseness, or at least 18% higher 2 degree diffuseness, or at least 20% higher 2 degree diffuseness, or at least 22% higher 2 degree diffuseness, or more, as compared to the referenced aluminum alloy body in the T6 temper.

Aluminum alloy bodies processed in accordance with the new processes disclosed herein may realize at least 15% higher 2 image clarity as compared to the referenced aluminum alloy body in the T6 temper. In one embodiment, the new aluminum alloy bodies realize at least 18% higher 2 image clarity as compared to the referenced aluminum alloy body in the T6 temper. In other embodiments, the new aluminum alloy bodies realize at least 21% higher 2 image clarity, or at least 24% higher 2 image clarity, or at least 27% higher 2 image clarity, or at least 30% higher 2 image clarity, or more, as compared to the referenced aluminum alloy body in the T6 temper.

Aluminum alloy bodies processed in accordance with the new processes disclosed herein may realize improved gloss properties. In one embodiment, an intended viewing surface of an aluminum alloy body processed in accordance with the new processes disclosed realizes at least an equivalent 60° gloss value as compared to the intended viewing surface of a reference version of the aluminum alloy body in the T6 temper. In one embodiment, the new aluminum alloy bodies realize at least a 2% higher 60° gloss value as compared to the intended viewing surface of a reference version of the aluminum alloy body in the T6 temper. In other embodiments, an intended viewing surface of the new aluminum alloy body realizes at a 4% higher 60° gloss value, or at least a 6% higher 60° gloss value, or at least an 8% higher 60° gloss value, or more, as compared to the intended viewing surface of a reference version of the aluminum alloy body in the T6 temper. A "60° gloss value" and the like means the 60° gloss value obtained from measuring the intended viewing surface of the aluminum alloy body using 60° angle of gloss and a BYK Gardner haze-gloss Reflectometer (or comparable gloss meter) operated according to manufacturer recommended standards.

vi. Surface Roughness

Aluminum alloy bodies processed in accordance with the new processes disclosed herein may have low surface roughness (e.g., low or no Ludering, low or no orange peel, among others). In one embodiment, an aluminum alloy body realizes a surface roughness (Ra) of not greater than 100 micro-inch (Ra) as measured in the LT direction. In another embodiment, the aluminum alloy body realizes a surface roughness (Ra) of not greater than 90 micro-inch (Ra) as measured in the LT direction. In yet another embodiment, the aluminum alloy body realizes a surface roughness (Ra) of not greater than 80 micro-inch (Ra) as measured in the LT direction. In another embodiment, the aluminum alloy body realizes a surface roughness (Ra) of not greater than 70 micro-inch (Ra) as measured in the LT direction. In yet another embodiment, the aluminum alloy body realizes a surface roughness (Ra) of not greater than 60 micro-inch (Ra) as measured in the LT direction. In another embodiment, the aluminum alloy body realizes a surface roughness (Ra) of not greater than 50 micro-inch (Ra) as measured in the LT direction, or less. For purpose of this subsection (H)(vi), surface roughness is to be measured on a specimen that has been pulled to fracture via a tensile test conducted in accordance with ASTM E8 and B557.

I. Product Applications

The new processes described herein may have applicability in a variety of product applications. In one embodiment, a product made by the new processes described herein is used in an aerospace application, such as wing skins (upper and lower) or stringers/stiffeners, fuselage skin or stringers, ribs, frames, spars, seat tracks, bulkheads, circumferential frames, empennage (such as horizontal and vertical stabilizers), floor beams, seat tracks, doors, and control surface components (e.g., rudders, ailerons) among others. Many potential benefits could be realized in such components through use of the products including higher strength, superior corrosion resistance, improved resistance to the initiation and growth of fatigue cracks, and enhanced toughness to name a few. Improved combinations of such properties can result in weight savings or reduced inspection intervals or both.

In another embodiment, a product made by the new processes described herein is used in a munitions/ballistics/military application, such as in ammunition cartridges and armor, among others. Ammunition cartridges may include those used in small arms and cannons or for artillery or tank rounds. Other possible ammunition components would include sabots and fins. Artillery, fuse components are another possible application as are fins and control surfaces for precision guided bombs and missiles. Armor components could include armor plates or structural components for military vehicles. In such applications, the products could offer weight savings or improved reliability or accuracy.

In another embodiment, a product made by the new processes described herein is used in a fastener application, such as bolts, rivets, screws, studs, inserts, nuts, and lockbolts, which may be used in the industrial engineering and/or aerospace industries, among others. In these applications, the products could be used in place of other heavier materials, like titanium alloys or steels, for weight reduction. In other cases, the products could provide superior durability.

In another embodiment, a product made by the new processes described herein is used in an automotive application, such as closure panels (e.g., hoods, fenders, doors, roofs, and trunk lids, among others), wheels, and critical strength applications, such as in body-in-white (e.g., pillars, reinforcements) applications, among others. In some of these applications the products may allow down-gauging of the components and weight savings.

In another embodiment, a product made by the new processes described herein is used in a marine application, such as for ships and boats (e.g., hulls, decks, masts, and superstructures, among others). In some of these applications the products could be used to enable down-gauging and weight reductions. In some other cases, the products could be used to replace products with inferior corrosion resistance resulting in enhanced reliability and lifetimes.

In another embodiment, a product made by the new processes described herein is used in a rail application, such as for hopper tank and box cars, among others. In the case of hopper or tank cars, the products could be used for the hoppers and tanks themselves or for the supporting structures. In these cases, the products could provide weight reductions (through down-gauging) or enhanced compatibility with the products being transported.

In another embodiment, a product made by the new processes described herein is used in a ground transportation application, such as for truck tractors, box trailers, flatbed trailers, buses, package vans, recreational vehicles (RVs), all-terrain vehicles (ATVs), and the like. For truck tractors, buses, package vans and RV's, the products could be used for closure panels or frames, bumpers or fuel tanks allowing down-gauging and reduced weight. Correspondingly, the bodies could also be used in wheels to provided enhanced durability or weight savings or improved appearance.

In another embodiment, a product made by the new processes described herein is used in an oil and gas application, such as for risers, auxiliary lines, drill pipe, choke-and-kill lines, production piping, and fall pipe, among others. In these applications the product could allow reduced wall thicknesses and lower weight. Other uses could include replacing alternate materials to improve corrosion performance or replacing alternate materials to improve compatibility with drilling or production fluids. The products could also be used for auxiliary equipment employed in exploration like habitation modules and helipads, among others.

In another embodiment, a product made by the new processes described herein is used in a packaging application, such as for lids and tabs, food cans, bottles, trays, and caps, among others. In these applications, benefits could include the opportunity for down-gauging and reduced package weight or cost. In other cases, the product would have enhanced compatibility with the package contents or improved corrosion resistance.

In another embodiment, a product made by the new processes described herein is used in a reflector, such as for lighting, mirrors, and concentrated solar power, among others. In these applications the products could provide better reflective qualities in the bare, coated or anodized condition at a given strength level.

In another embodiment, a product made by the new processes described herein is used in an architecture application, such as for building panels/facades, entrances, framing systems, and curtain wall systems, among others. In such applications, the product could provide superior appearance or durability or reduced weight associated with down-gauging.

In another embodiment, a product made by the new processes described herein is used in an electrical application, such as for connectors, terminals, cables, bus bars, and wires, among others. In some cases the product could offer reduced tendency for sag for a given current carrying capability. Connectors made from the product could have enhanced capability to maintain high integrity connections over time. In other wires or cables, the product could provide improved fatigue performance at a given level of current carrying capability.

In another embodiment, a product made by the new processes described herein is used in a fiber metal laminate application, such as for producing high-strength sheet products used in the laminate, among others which could result in down-gauging and weight reduction.

In another embodiment, a product made by the new processes described herein is used in an industrial engineering application, such as for tread-plate, tool boxes, bolting decks, bridge decks, and ramps, among others where enhanced properties could allow down-gauging and reduced weight or material usage.

As is specifically relates to tread sheet or tread plate, the new methods disclosed herein may result in improved tread sheet or tread plate products ("rolled tread products"). A rolled tread product is a product having predetermined pattern of raised buttons on an outer surface of a sheet or plate product. A tread sheet has a thickness of 0.040 inch to 0.249 inch, and a tread plate has a thickness of 0.250 inch to 0.750 inch. The predetermined pattern may be introduced into the rolled tread product during cold rolling of an aluminum alloy body using a roll having a plurality of indentations therein that correspond to the predetermined pattern, wherein the cold rolling achieves at least 25% cold work. Each of the buttons of the predetermined pattern generally has predetermined height, such as a height in the range of 0.197 to 0.984 inch. After the cold rolling step (200), the rolled tread product is thermally treated (300), and the combination of the cold rolling step (200) and thermally treating step (300) are accomplished such that the rolled tread product realizes improved long-transverse tensile yield strength as compared the tread sheet or tread plate in the as cold worked condition. In one embodiment, the rolled tread product realizes at least 5% higher LT tensile yield strength over a referenced rolled tread product, wherein the referenced tread sheet or tread plate has the same composition as the rolled tread product, but the referenced rolled tread product is processed to a T6 temper (i.e., cold rolled to final gauge, then solutionized, and then aged to within 1 ksi of its peak tensile yield strength), such as any of the LT yield strength percentage improvements described in the Properties section (Section H(i)), above, relative to a reference version in the T6 temper. In one embodiment, the produced tread product is defect-free as defined by EN 1386:1996.

In another embodiment, a product made by the new processes described herein is used in a fluid container (tank), such as for rings, domes, and barrels, among others. In some cases the tanks could be used for static storage. In others, the tanks could be parts of launch vehicles or aircraft. Benefits in these applications could include down-gauging or enhanced compatibility with the products to be contained.

In another embodiment, a product made by the new processes described herein is used in consumer product applications, such as laptops, cell phones, cameras, mobile music players, handheld devices, computers, televisions, microwaves, cookware, washer/dryer, refrigerators, sporting goods, or any other consumer electronic products requiring durability or desirable appearance. In another embodiment, a product made by the new processes described herein is used in a medical device, security systems, and office supplies, among others.

In another embodiment, the new process is applied to a cold hole expansion process, such as for treating holes to improve fatigue resistance, among others, which may result in a cold work gradient and tailored properties, as described above. This cold hole expansion process may be applicable to forged wheels and aircraft structures, among others.

In another embodiment, the new process is applied to cold indirect extrusion processes, such as for producing cans, bottles, aerosol cans, and gas cylinders, among others. In these cases the product could provide higher strength which could provide reduced material usage. In other cases, improved compatibility with the contents could result in greater shelf life.

In another embodiment, a product made by the new processes described herein is used in a heat-exchanger application, such as for tubing and fins, among others where higher strength can be translated into reduced material usage. Improved durability and longer life could also be realized.

In another embodiment, the new process is applied to a conforming processes, such as for producing heat-exchanger components, e.g., tubing where higher strength can be translated into reduced material usage. Improved durability and longer life could also be realized.

Some specific embodiments of some of these product applications are described in the below subsections.

(i) Ammunition Cartridges/Cases

In one approach, the new methods disclosed herein may result in improved aluminum ammunition cartridges (also called cases or casings). One embodiment of a new process for producing aluminum alloy ammunition cartridges according to the new methods described herein is illustrated in FIG. 2r. In this method, an aluminum alloy body (2r-1), such as a sheet, plate or extruded rod or bar, may used as a starting material. This material may then be extruded or drawn into member 2r-2 having a base with an intermediate thickness T1. Member 2r-2 may then be solutionized, after which the base may be cold worked to a final thickness of T2 (e.g., via cold heading, cold forging, cold flow forming, and the like), wherein is T2 chosen so as to induce at least 25% cold work in the base due to the cold forming operation (2r-3). In one embodiment, T2 is chosen so as to induce at least 35% cold work in the base, such as at least 50% cold work in the base, or more, due to the cold forming operation. The amount of cold working may be any of the cold working amounts described in the Cold Work section (Section B), above. Due to the amount of work in the base and the subsequent thermal treatment (300), such cartridges may have a strong base, which may be useful, for example, to restrict distortion in the firing process and/or facilitate cartridge extraction. Aluminum alloy cartridges produced via these methods may have a uniform sidewall (2r-3 and 2r-4), such as for shotgun casings and large diameter casings, such as 50-150 mm casings, and the like, among others. In one embodiment, the sidewall is also produced with a high amount of cold work, such as by drawing, ironing, or flow forming, among others. In such embodiments, the sidewall and the base may receive cold work at the same time (e.g., via flow forming), or the base and sidewall may receive cold work in separate steps via separate cold working operations. Thus, aluminum alloy cartridges produced with the new processes disclosed herein may realize improved properties in the base, the sidewall, or both, such as any of the improved properties described in the Properties section (Section H), above. In one embodiment, and as described in the Thermal Treatment section (Sections C, subsection i), the aluminum alloy body (2r-1) may be solutionized, or solutionized and partially cold worked, prior to being formed into the ammunition cartridge.

Aluminum alloy cartridges produced via the method of FIG. 2r may have a neck portion (2r-5). This neck portion may be produced after the cold working step by conventional operations. Local softening at the neck may be required to facilitate projectile insertion and crimping to secure projectile in position.

(ii) Armor Components

The new methods disclosed herein may also be useful in producing improved armor products, bodies and components. In one embodiment, a method comprises receiving an aluminum alloy armor product, body or component, and attaching the aluminum alloy armor product, body or component as an armor component of an assembly. In this embodiment, the as-received aluminum alloy armor product, body or component may have been prepared by the methods described herein, i.e., by solutionizing, then cold working and then thermally treating, such as via any of the methods described in Sections (A)-(C), above. In one embodiment, the assembly is a vehicle. In one embodiment, the vehicle is a military vehicle. In another embodiment, the vehicle is a commercial vehicle, such as an automotive vehicle, van, bus, tractor trailer, and the like. In another embodiment, the assembly is a body armor assembly.

An armor component is a component that is designed for use in an assembly, and with the main purpose of stopping one or more projectiles, such as armor piercing projectiles, blasts, and/or fragments. Armor components are usually used in applications where such projectiles could injure one or more persons, if not stopped. In one embodiment, an aluminum alloy armor component has at least 1% higher V50 ballistics limit as compared to a reference version of the aluminum alloy armor component in the T6 temper, wherein the V50 ballistics limits is tested in accordance with MIL-STD-662F(1997) (the impact velocity with a 50% probability for perforation for a given alloy and). The V50 ballistics limit may be for either armor piercing projectiles (AP) and/or fragment simulating projectiles (FSP).

In one embodiment, the V50 ballistics limit is armor piercing resistance, and the aluminum alloy armor component has at least 5% higher V50 AP resistance as compared to a reference version of the aluminum alloy armor component in the T6 temper. In other embodiments, the aluminum alloy armor component has at least 6% higher, or at least 7% higher, or at least 8% higher, or at least 9% higher, or at least 10% higher V50 AP resistance, or more, as compared to a reference version of the aluminum alloy armor component in the T6 temper.

In another embodiment, this V50 ballistics limit is fragment simulating projectile resistance, and the aluminum alloy product has at least 2% higher V50 FSP resistance as compared to a reference version of the aluminum alloy armor component in the T6 temper. In other embodiments, the aluminum alloy armor component has at least 3% higher, or at least 4% higher, or at least 5% higher V50 FSP resistance, or more, as compared to a reference version of the aluminum alloy product in the T6 temper.

In one embodiment, a new aluminum alloy armor component has a thickness of from 0.025 inch to 4.0 inch and realizes at least 5% higher V50 armor piercing resistance as compared to a reference version of the aluminum alloy armor component in the T6 temper. In one embodiment, the aluminum alloy armor component comprises a predominately unrecrystallized microstructure. In one embodiment, the armor component is a plate or forging having a thickness in the range of from 0.250 inch to 4.0 inch. In another embodiment, the armor component is a plate or forging having a thickness in the range of from 1.0 inch to 2.5 inch. In another embodiment, the armor component is a sheet having a thickness of 0.025 to 0.249 inch (e.g., for body armor).

(iii) Consumer Electronics

The new methods disclosed herein may also be useful in producing improved aluminum alloy products for consumer electronic devices. In one embodiment, a method comprises cold working a solutionized aluminum alloy body and then thermally treating the aluminum alloy body. The method may comprise forming the aluminum alloy into a predetermined shaped product in the form of an outer component for a consumer electronic product. The forming step may be completed before, after or during the thermally treating step (300), such as described in the Thermal Treatment section (Section C, subsection i), and/or the Optional Post-Thermal Treatments section (Section F), above.

An "outer component for a consumer electronic product" and the like means a product that is generally visible to a consumer of the consumer electronic product during normal course of use. For example, an outer component may be an outer cover (e.g., façade) of a consumer electronic product, or a stand or other non-façade portion of the consumer electronic product. The outer component may have a thickness of from 0.015 inch to 0.50 inch. In one embodiment, the outer component is an outer cover for the consumer electronics product and has a thickness of from 0.015 inch to 0.063 inch.

In one embodiment, a method comprises receiving a rolled or forged aluminum alloy body, wherein the aluminum alloy body was prepared by solutionizing and then cold working to final gauge, wherein the cold induced at least 25% cold work in the aluminum alloy body, wherein the cold working was one of cold rolling and cold forging, and then forming the rolled aluminum alloy body into an outer component for a consumer electronic product. In one embodiment, the method comprises thermally treating the aluminum alloy. In one embodiment, the thermally treating step occurs after the receiving step. In one embodiment, the thermally treating step occurs concomitant to the forming step. In one embodiment, during the forming step, the aluminum alloy body is subjected to a temperature in the range of from at least 150° F. to below the recrystallization temperature of the aluminum alloy body, as per the Thermal Treatment section (Section C), above.

In another embodiment, the thermally treating step occurs before the receiving step, i.e., the aluminum alloy body was at least partially thermally treated upon receipt. In one embodiment, the forming step is completed at less than 150° F. In one embodiment, the forming step is completed at ambient conditions.

In any of the above embodiments, the forming step may include applying strain to at least a portion of the aluminum alloy body to achieve the outer component, wherein the maximum amount of the strain of the applying step is equivalent to at least 0.01 equivalent plastic strain, such as any of the forming equivalent plastic strain values listed in the Optional Post-Thermal Treatments section (Section F), above. The cold working, thermally treating and forming steps should be accomplished such that the outer component comprises a predominately unrecrystallized microstructure.

The new methods described herein may be useful in producing a variety of outer components for consumer electronic products, including any of the consumer electronic products listed above. In one embodiment, the consumer electronic product is one of a laptop computer, mobile phone, camera, mobile music player, handheld device, desktop computer, television, microwave, washer, dryer, a refrigerator, and combinations thereof. In another embodiment, the consumer electronic product is one of a laptop computer, a mobile phone, a mobile music player, and combinations thereof, and the outer component is an outer cover having a thickness of from 0.015 to 0.063 inch.

The new methods described herein may produce outer components having improved properties. In one embodiment, the outer component realizes at least 5% higher normalized dent resistance as compared to a reference version of the aluminum alloy outer component in the T6 temper. "Normalized dent resistance" means the dent resistance of an aluminum alloy body as normalized by dividing the inverse of the dent amount (DA) by the thickness of the aluminum alloy body (i.e., (1/DA)/thickness. For example, if a dent amount was 0.0250 inch and the product had a thickness of 0.0325 inch, its normalized dent resistance would be 94.67 per inch. "Dent amount" means the dent size of the dent produced by the dent test procedure, described below. In other embodiments, the outer component of a consumer electronic product made from a new aluminum alloy processed according to the new methods described herein realizes at least 10% higher, or at least 15% higher, or at least 20% higher, or at least 25% higher, or at least 30% higher, or more, normalized dent resistance than a reference version of the outer component in the T6 temper.

In one embodiment, an outer component of a consumer electronic product made from a new aluminum alloy processed according to the new methods described herein realizes at least 5% higher normalized dent resistance than the same outer component made from alloy 6061 processed to the T6 temper. In other embodiments, the outer component of a consumer electronic product made from a new aluminum alloy processed according to the new methods described herein realizes at least 10% higher, or at least 15% higher, or more, normalized dent resistance than the same outer component made from alloy 6061 processed to the T6 temper.

In one embodiment, an outer component of a consumer electronic product made from a new aluminum alloy processed according to the new methods described herein realizes at least 10% higher normalized dent resistance than the same outer component made from alloy 5052 processed to the H32 temper. In other embodiments, the outer component of a consumer electronic product made from a new aluminum alloy processed according to the new methods described herein realizes at least 30% higher, or at least 50% higher, or more, normalized dent resistance than the same outer component made from alloy 5052 processed to the H32 temper.

The outer component may have an intended viewing surface, and this intended viewing surface may be free of visually apparent surface defects. "Intended viewing surface" and the like means surfaces that are intended to be viewed by a consumer during normal use of the product. Internal surfaces (e.g., the inside of an outer cover) are generally not intended to be viewed during normal use of the product. For example, internal surfaces of a mobile electronic device cover are not normally viewed during normal use of the product (e.g., when using to send text messages and/or when using to converse telephonically), but such internal surfaces may be occasionally viewed during non-normal usage, such as when changing the battery, and, thus, such internal surfaces are not intended viewing surfaces. "Free of visually apparent surface defects" and the like means that the intended viewing surface of the cover is substantially free of surface defects as viewed by human eyesight, with 20/20 vision, when the cover is located at least 18 inches away from the eyes of the human viewing the cover. Examples of visually apparent surface defects include those cosmetic defects that can be viewed due to the forming process and/or the alloy microstructure, among others. The presence of visually apparent surface defects is generally determined after anodizing (e.g., immediately after anodizing, or after application of a coating or other dye/colorant, for instance). In one embodiment, the outer component realizes maintained or improved appearance properties, such as any of the appearance properties listed in the Properties section (Section H), above. In one embodiment, the intended viewing surface of the outer component realizes at least an equivalent 60° gloss value as compared to an intended viewing surface of the reference version reference version of the aluminum alloy outer component in the T6 temper. A "60° gloss value" and the like means the 60° gloss value obtained from measuring the intended viewing surface of the aluminum alloy body using 60° angle of gloss and a BYK Gardner haze-gloss Reflectometer (or comparable gloss meter) operated according to manufacturer recommended standards.

(iv) Containers

The new methods disclosed herein may also be useful in producing new aluminum alloy containers having improved properties. One method of producing a container is illustrated in FIG. 2s-1, and includes cold working a solutionized aluminum alloy body into a container (200-C) and then thermally treating the container (300-C), optionally with final treatments (400-C). Examples of cold working steps (200-C), thermal treatment steps (300-C) and optional final treatment(s) (400-C) that may be employed to achieve the new aluminum alloy containers are described in further detail below.

The following definitions apply to this subsection (I)(iv):

The terms "top", "bottom", "below", "above", "under", "over", etc. are relative to the position of a finished aluminum alloy container resting on a flat surface, regardless of the orientation of the aluminum alloy container during cold working or forming processes. In some embodiments, the top of the container has an opening.

A "container" is any type of container that may be made from an aluminum alloy, including but not limited to, beverage cans, bottles, food cans, aerosol cans, one-piece cans, two-piece cans and three-piece cans.

A "finished aluminum alloy container" is an aluminum alloy container that will not undergo additional cold working or forming steps before it is used by an end consumer.

"Drawing" means pulling aluminum alloy in the form of a cup and may include initial drawing, redrawing and deep drawing.

"Ironing" means stretching and thinning the walls of a cup via a punch pushing the sidewall of the cup against ironing rings.

"Doming" means producing the base of the container. the base of the container may be shaped like a dome, may be flat, or may have an alternate geometry.

"Necking" means narrowing the diameter of a portion of the container.

"Flanging" means producing a flange on the container.

"Threading" means producing threads on the container.

"Beading" means producing a circumferential bead on the sidewall of the container.

"Seaming" is a method of attaching a lid to the container, such as mechanically bonding and the like.

"Curling" means producing a top edge of the container to accept a closure, such as a lid, an end, lug, threaded closure, a crown, a roll-on pilfer proof closure, etc.

"A reference version of the container in the as cold worked condition" means a version of the aluminum alloy container that is prepared identically to the claimed container, but whose mechanical properties are tested after completion of the cold working step and prior to the thermal treatment step. Preferably, the mechanical properties of the reference version of the container in the as-formed condition are measured within 4-14 days of completion of the cold working step. To produce a reference version of the container in the as-cold worked condition, one would cold work the aluminum alloy body into a container according to the practices described herein, after which a portion of the aluminum alloy container is removed to determine its properties in the as cold worked condition per the requirements described above. Another portion of the aluminum alloy container would be thermally treated in accordance with the new processes described herein, after which its properties would be measured, thus facilitating a comparison between the properties of a reference version of the container in the as cold worked condition and the properties of a container processed in accordance with the new processes described herein (e.g., to compare dome reversal pressure, vacuum strength, strength, and/or elongation, among others). Since the both the new container and the reference version of container in the as cold worked condition are produced from the same aluminum alloy container, they would have the same composition. Thus, a reference-version of the container is comprised of the same alloy, gauge and geometry as the new container.

"Dome reversal pressure" means the threshold pressure above which the base of the can 'pops out' and becomes convex instead of concave. In some embodiments, the aluminum alloy may be sufficiently strong to enable the base of the container to be flat instead of concave. In this case, the dome reversal pressure means the threshold pressure above which the base of the can 'pops out' and becomes convex instead of flat. Dome reversal pressure may be measured using an Altek Company beverage can and lid tester Model 9009C5

A "sidewall" is a wall of the side of the container.

A "a sidewall of a reference-version of the container in the T6 temper" and the like means a sidewall of a container that has been solutionized and then thermally treated to a maximum strength condition (within 1 ksi of peak strength). As described in further detail below, an aluminum alloy container produced in accordance with the new processes described herein may achieve superior properties as compared to the aluminum alloy body in a T6 temper. To produce a sidewall of a reference-version of the aluminum alloy container in a T6 temper, one would obtain a sidewall of an aluminum alloy container, after which a portion of the sidewall would be processed to a T6 temper (i.e., solutionized and then thermally treated to a maximum strength condition, within 1 ksi of peak strength). Another portion of the sidewall would be processed (or may have already been processed) in accordance with the new processes described herein, thus facilitating a comparison between the properties of the sidewall of the reference-version of the aluminum alloy container in the T6 temper and the properties of an aluminum alloy container processed in accordance with the new processes described herein (e.g., to compare dome reversal pressure, vacuum strength, strength, and/or elongation, among others). Since both sidewalls are obtained from the same aluminum alloy container, they would have the same composition, gauge and geometry.

"Vacuum strength" means the threshold vacuum pressure above which the sidewall of the container collapses inwardly. Vacuum strength may be measured by an Altek Company food Panel Strength (sidewall collapse resistance) tester—Model 9025.

As mentioned above, the new aluminum alloy containers may be prepared by cold working (200-C) and then thermally treating (300-C). In one embodiment, an aluminum alloy body, such as a sheet or a slug, is cold worked at least 25% (e.g., by one or more of drawing, ironing and impact extruding), and this cold working step induces at least 25% cold work into at least a portion of the container, such as by any of the cold work amounts disclosed in the Cold Working section (Section B), above. In one embodiment, the at least 25% cold work is induced in a part of (or the whole of) the sidewall. In one embodiment, the at least 25% cold work is induced in a part of (or the whole of) the base. In some embodiments, the cold working step (200-C) comprises cold working at least a portion of the aluminum alloy body into a container. In some embodiments, the cold working step (200-C) comprises cold working at least a portion of the aluminum alloy body into a container, and the cold working induces at least 35% cold work, or at least 50% cold work, or at least 75% cold work, or more, into at least a portion of the container. In one embodiment, the cold working operation is initiated at a temperature of less than 150° F.

In one embodiment, the aluminum alloy body is in sheet form prior to the cold working. In any of these embodiments, the aluminum alloy sheet can be of a thickness appropriate for the container. In some embodiments, because the dome reversal pressure, vacuum strength and/or tensile yield strength of the base and/or the sidewall may be greater than that of prior art containers having the same gauge and geometry, the gauge of the container may be reduced as compared to a prior art container having the same geometry, while the minimum performance requirements of the container may be maintained. This ability to down-gauge may result in reduced container weight and cost. For example, with respect to producing a beverage container, the sheet may have a thickness of less than 0.0108 inch, or less than 0.0100 inch, or less than 0.0098 inch, or less than 0.0095 inch or less than 0.0094 inch or less than 0.0605 inch. With respect to food cans, the sheet may have a thickness of less than 0.0084 inch, or less than 0.0080 inch, or less than 0.0076 inch, or less than 0.0074 inch. With respect to aerosol cans, the sheet may have a thickness of less than 0.008 inch. In some embodiments, the aluminum alloy sheet is pre-coated, i.e., the aluminum alloy sheet is coated with a coating before the cold working step (200-C).

After the cold working step (200-C), the container may be thermally treated (300-C). The thermally treating step (300-C) may be accomplished as per the Thermal Treatment section (Section C), above. In some embodiments, the thermally treating step (300-C) comprises heating the aluminum alloy container in the range of from 150° F. to below the recrystallization temperature of the aluminum alloy body. In one embodiment, the thermally treating step (300-C) is completed at a temperature of from 150° F. to 600°. In one embodiment, the thermally treating step (300-C) is completed at a temperature of not greater than 550° F., such as not greater than 500° F., or not greater than 450° F., or not greater than 425° F. In some embodiments, the cold working step (200-C) and the thermally treating step (300-C) are performed such that the aluminum alloy container retains or realizes a predominately unrecrystallized microstructure (defined in the Microstructure section (Section E), above). As may be appreciated, when higher thermal treatment temperatures are used, shorter exposure periods may be required to realize the predominantly unrecrystallized microstructure and/or other desired properties. In one embodiment, the as-received aluminum alloy body may have a predominantly unrecrystallized microstructure, such as when the as-received aluminum alloy sheet was post-solutionized cold rolled by at least 25%. The cold working step (200-C) and thermally treating step (300-C) may be accomplished to realize or retain a predominantly unrecrystallized microstructure (although the microstructure of the container and body may be different, they have a predominantly unrecrystallized microstructure, per the definition of Section E). In one embodiment, and with reference now to FIG. 2s-2, the thermally treating step (300-C) may include steps that already occur in standard container making processes, such as inserting the container into an oven (320-C). For example, after a container has been produced via cold working (e.g., by drawing (220-C) and (optionally) ironing (240-C), or impact extruding (not shown)), the thermally treating step (300-C) may include inserting the container into an oven (or other heating apparatus) (320-C) so as to, for example, dry the container after washing, cure a coating that was applied to the inside of the container and/or to dry paint applied to the outside of the container.

As shown in FIG. 2s-1, the optional final treatment(s) step (400-C) may be used to produce the container. In some instances, and as illustrated in FIG. 2s-1, at least some of the optional final treatments (400) may occur after the thermal treatment step (300-C). In some or other instances, and with reference now to FIG. 2s-3, some final treatments (400-C') occur before or during thermal treatment (300-C). For instance, and as described in further detail below, paint and/or coatings may be applied after the cold working step (200-C), after which such paint and/or coatings may be cured. In one embodiment, and as described in the above paragraph, the thermally treating step (300-C) may be used to cure such paint and/or coatings, and thus at least a portion of the final treatment step (400-C) may occur concomitant to at least a portion of the thermal treatment step (300-C).

In other embodiments, the paint and/or coatings may be cured at low temperatures so as to avoid initiation of thermal treatment (300-C), and potential hardening of the containers. That is, ovens used to heat the container (or other heating apparatus) may be avoided until the container is in its final form. Since strength may increase upon thermal treatment, avoiding heat may enable the aluminum alloy container to remain relatively soft until after the container has been finally formed (e.g., via necking, flanging, curling, threading and/or beading or otherwise forming into its final shape). For example, and with reference now to FIGS. 2s-4 and 2s-5, at least some finishing and/or forming operations (400-C') may be performed in advance of the thermal treatment step (300-C). In the illustrated embodiments, paint and/or coatings, if applied, may be cured via radiation, such as UV light, and in the absence of purposeful conductive heating and/or convective heating of the container. In this embodiment, the curing would not thermally treat (300-C) the container because such radiation step would not materially heat the aluminum alloy body. In one example, as illustrated in FIG. 2s-4, the cold working a solutionized aluminum alloy sheet into a container step (200-C) may comprise drawing the container (220-C) and optionally, ironing the container (240-C). After the cold working step (200-C), the container may be painted (410-C), then cured via radiation (420-C), and then necked and/or beaded (430-C), after which it is thermally treated (300-C). Similarly, and with reference now to FIG. 2s-5, the cold working a solutionized aluminum alloy sheet into a container step (200-C) may comprise drawing the container (220-C) and optionally, ironing the container (240-C). After the cold working step (200-C), an inside of the container may be coated (410-C), then cured via radiation (420-C), and then necked and/or beaded (430-C). Thus, the optional final treatment(s) (400-C and/or 400-C') step may include "forming operations" (defined in Section F, above), which may include necking, flanging, beading, curling and/or threading, or otherwise forming the container into its final shape before, during or after the thermally treating step (300-C).

In some embodiments, since the aluminum alloy may become stronger during the container production process, it is possible to start the process with an aluminum alloy body that is softer and more formable. Such aluminum alloy bodies may, therefore, be easier to form into complex shapes and/or may be produced in fewer steps than the same container made by prior art processes.

Due to the unique processing techniques, improved properties may be realized, such as one or more of an improvement in column buckling strength, dome reversal pressure and vacuum strength, among others. In one embodiment, the new aluminum alloy containers realize improved properties over a reference version of the aluminum alloy container in the as-cold worked condition. In another embodiment, the new aluminum alloy containers realize improved properties over a reference version of the aluminum alloy container in the T6 temper.

In one embodiment, the cold working and the thermally treating steps are accomplished to achieve at least a 5% increase in dome reversal pressure as compared to a reference version of the container in the as-cold worked condition. In some of these embodiments, the cold working and the thermally treating steps are accomplished such that the container has a dome reversal strength of at least 90 lbs/sq. inch.

In one approach, the cold working step induces at least 25% cold work in at least a portion of a sidewall of a container. In one embodiment, the cold working and the thermally treating steps may be accomplished to achieve at least a 5% increase in tensile yield strength relative to the portion of the sidewall having the at least 25% cold work as compared to the tensile yield strength of the same sidewall portion of a reference-version of the container in the T6 temper, such as any of the tensile yield strength improvements described in the Properties section (Section H), above. In another embodiment, the cold working and the thermally treating steps are accomplished to achieve at least a 5% increase in tensile yield strength relative to the portion of the sidewall having the at least 25% cold work as compared to the tensile yield strength of the same sidewall portion of the container in the as-cold worked condition, such as any of the tensile yield strength improvements described in the Properties section (Section H), above. In another embodiment, the cold working and the thermally treating steps are accomplished to achieve at least a 5% improvement in vacuum strength as compared to the container in the as cold-worked condition. In some embodiments, the cold working and the thermally treating steps are accomplished such that the container has a vacuum strength of at least 24 psi, at least 28 psi, or at least 30 psi, or more. In some embodiments, the sidewall of the container is more puncture resistant than (i) a prior art container of the same gauge and geometry, (ii) a container in the as-cold worked condition, and/or (iii) a reference version of the container in the T6 temper.

Even though some embodiments result in a container having enhanced strength, the formability of the container may be maintained, or even improved. For example, in some embodiments, the applicable portion of (or the whole of) the aluminum alloy container may realize an elongation of at least 4%, or at least 5%, or at least 6%, or at least 7%, or at least 8%, or more.

In any of the above described embodiments, the aluminum alloy body may contain sufficient solute to promote at least one of a strain hardening response and a precipitation hardening response to achieve the improved property or properties. The potentially improved strength realized by containers made by the presently disclosed methods may also facilitate production of containers having a flat base or a larger dome window.

In all of the above embodiments of a method of producing a container, the sheet may have been cold worked, for example via cold rolling, prior to cold working into a container, as per the Cold Work section (Section B) and/or the Thermal Treatment section (Section C).

Referring to FIG. 2s-6, in some embodiments, the container (800-C) has sidewalls (820-C) and a bottom (840-C), also known as a base or a dome. The aluminum alloy container comprising (800-C) the sidewalls (820-C) and bottom (840-C) may be a single, continuous aluminum alloy sheet. In other embodiments, and with reference now to FIGS. 2s-7, the container is a closure (900-C). In some embodiments, the closure is a lid.

(v) Fasteners

In one approach, the new methods disclosed herein may result in improved fastener products. A "fastener" is a product made from a rolled, extruded, or drawn stock that has the primary purpose of connecting two or more components. Fasteners made according to the new processes described herein may be prepared for post-solutionizing cold work (100), and then cold worked by more than 25% (200) and then thermally treated (300). In one embodiment, a cold working step (200) comprises cold working an aluminum alloy body into a fastener by one of cold forging, cold swaging and cold rolling. In one embodiment, a first portion of the cold working step produces a fastener feed stock (e.g., cold worked rod (including wire) or bar), and a second portion of the cold working step produces the fastener (e.g., via cold forging or cold swaging). Such partial cold working, and similar methods, may be completed as described in the Thermal Treatment section (Section C, subsection i).

A fastener may be one-piece or a multiple-piece system. A one-piece fastener may have a body and a head. A fastening system has at least two components, such as a first piece with a body and a head, and a second piece (locking member) designed to attach to the first piece, such as a nut or collar. Examples of fasteners having a body and a head include rivets, screws, nails, and bolts (e.g., lock bolts). Part of a fastener may have one or more threads. Fasteners have at least 2 primary failure modes, the first being tension where the primary loading direction is parallel to the centerline of the fastener and shear where the primary loads are perpendicular to the centerline of the fasteners. The longitudinal ultimate tensile strength of the body of the fastener is the primary factor in determining its failure load in tension and the shear strength is the primary factor in determining its failure load in shear. In one approach, a new aluminum alloy fastener realizes a tensile yield strength and/or ultimate tensile strength that is at least 2% higher than a reference version of the aluminum alloy fastener in the as-cold worked condition and/or the T6 condition, such as any of the tensile yield strength and/or ultimate tensile strength values described in the Properties section (Section H(i)), above. In one embodiment, a new aluminum alloy fastener realizes a shear strength that is at least 2% greater than a reference version of the fastener, such as any of the shear strength values described in the Properties section (Section H(i)), above, wherein the reference version of the fastener is in a T6 temper. The improved strength properties may relate to one or more of the pin, head or locking mechanism of the fastener. In one embodiment, the improved strength relates to the pin of the fastener. In another embodiment, the improved strength relates to the head of the fastener. In yet another embodiment, the improved strength relates to the locking mechanism of the fastener. In one approach, a new aluminum alloy fastener had a predominately unrecrystallized microstructure, as described in the Microstructure section (Section E(i)), above.

In one embodiment, a method comprises first cold working an aluminum alloy body into a fastener stock. The method may further comprise second cold working the fastener stock into a fastener. This second cold working step may produce the head, the pin and/or the locking member. A third cold working step may optionally be employed, wherein at least one thread ("threaded portion") is produced in the fastener (e.g., in the pin and/or the locking member). The combination of the first, second and optional third cold working steps may result in the fastener having at least 25% cold work. The aluminum alloy fastener may then be thermally treated, as provided above. In one embodiment, the first cold working step induces at least 25% cold work into the fastener stock. In one embodiment, the second cold working step induces at least 25% cold work into the fastener. In one embodiment, the third cold working step induces at least 25% cold work into the threaded portion. Thus, one or more portions of the fastener may have more than 25% cold work, such as any of the cold work amounts described in the Cold Work section (Section B), above, depending on processing.

(vi) Rods

In one approach, the new methods disclosed herein may result in improved rod products. A rod product is a rod or wire product, as defined the Aluminum Association. In one embodiment, a method comprises preparing an aluminum alloy rod for post-solutionizing cold work, described above, after the preparing step, cold working the aluminum alloy rod to final gauge, wherein the cold working induces at least 25% cold work into the rod, and, after the cold working step, thermally treating the aluminum alloy rod, wherein the cold working and the thermally treating steps are accomplished to achieve an increase in longitudinal ultimate tensile strength as compared to a reference-version of the aluminum alloy rod in the as cold-worked condition and/or the T6 temper and/or the T87 temper, or any other of the improved properties described in the Properties section (Section H), above. Such improved properties may be realized in a shorter period of time, as described in the Properties section (Section H), above. In one embodiment, the cold working step may comprise of one cold drawing, cold rod rolling and cold swaging. In one embodiment, after the cold working, the rod is at wire gauge. In one approach, a new aluminum alloy rod realizes an ultimate tensile strength that is higher than a reference version of the aluminum alloy rod, wherein the reference version is in one of the T6 temper and the T87 temper, such as any of the ultimate tensile strength values described in the Properties section (Section H), above. In one approach, a new aluminum alloy rod had a predominately unrecrystallized microstructure, as described in the Microstructure section (Section E(i)), above.

(vii) Wheels

The new methods described herein may also be useful in producing improved wheel products. Referring now to FIGS. 2*t*-1 and 2*t*-2, one embodiment of wheel (110-W) that may be produced via the new methods described herein is illustrated. The illustrated wheel (110-W) comprises a disk face (112-W), a rim (114-W), a drop well (116-W), a bead seat (118-W) and a mounting flange (120-W). The rim (112-W) is the outer part of the wheel on which a tire may be mounted. The mounting flange (120-W) is the location of the wheel attached directly to a vehicle (e.g., in contact with). The disk face (112-W) is located between the rim and the mounting flange. The wheel shown in FIGS. 2*t*-1 and 2*t*-2 is an auto wheel. However, it should be appreciated that the new methods described herein may be applicable to commercial wheels, or any other type of wheel that may be formed by cold working by at least 25%. Also, those skilled in the art know that wheels may have more or fewer parts.

In one embodiment, a solutionized aluminum alloy body (e.g., a solutionized aluminum alloy feedstock, such as ingot) may be cold worked (200), as described in the Cold Work section (Section B), above, wherein the cold working induces at least 25% cold work into at least a portion of the wheel. For example, during production of the wheel (110-W), this cold working step may induce at least 25% cold work in at least one of the disk face (112-W), the rim (114-W), the drop well (116-W), the bead seat (118-W) and the mounting flange (120-W). In one embodiment, the cold working induces at least 25% cold work in the disk face (112-W). In one embodiment, the cold working induces at least 25% cold work in the rim (114-W). In one embodiment, the cold working induces at least 25% cold work in the drop well (116-W). In one embodiment, the cold working induces at least 25% cold work in bead seat (118-W). In one embodiment, the cold working induces at least 25% cold work in the mounting flange (120-W). Higher levels of cold work may be induced, such as any of the cold working amounts described in the Cold Work section (Section B), above. In one embodiment, the cold working step induces at least 35% cold work in at least a portion of the wheel, which portion may be a part of (or the whole of) any of the above-described wheel parts. In another embodiment, the cold working step induces at least 50% cold work, or at least 75% cold work, or at least 90% cold work, in at least a portion of the wheel, which portion may be a part of (or the whole of) any of the above-described wheel parts. In yet another embodiment, the cold working step induces at least 90% cold work in at least a portion of the wheel, which portion may be a part of (or the whole of) any of the above-described wheel parts.

The cold working step may utilize one or more of the following operations to cold work and produce the wheel: spinning, rolling, burnishing, flow forming, shear forming, pilgering, swaging, radial forging, cogging, forging, extruding, nosing, hydrostatic forming and combinations thereof. In one embodiment, the cold working comprises flow forming.

In one embodiment, the cold working step (200) forms a wheel using one or more forming techniques. The geometric complexity of a desired cold-formed output shape (e.g., a wheel) has two major forming process considerations: (1) the overall shape may be subdivided into sub-regions that can be processed more conveniently; and (2) the deformation character will be one of redundant work and high deformation pressures.

The intermediate manufacturing geometry may be subdivided into two regions. The first region is the disk face (also called the wheel face, head or hub region) that extends from the centerline of the geometry to the outer radial portion. Second is the wheel rim region (also called the tube well or skirt region) that is similar to a short thick-walled cylinder. In this embodiment, consider the disk face and rim regions as connected in a one-piece wheel design. Although connected, these regions can be regarded as independent regions where independent deformation processes could form the final output shapes of both connected regions. In embodiments where these two regions are separate pieces of a multi-piece wheel design, then independent deformation processes could be used to form each piece before joining. In some embodiments the pieces of the multi-piece wheel could be comprised of different aluminum alloys, with at least one of the alloys being a heat treatable aluminum alloy.

In some embodiments, the geometric transformation to the desired cold-formed output shape requires the use of forming processes with inherent redundant deformation.

These processes impart effective strains that are greater than those computed by considering only initial and final section dimensions. This results in correspondingly higher flow stresses. The material's post-solutionized cold flow stress is significantly higher than its pre-solutionized cold flow stress counterpart. Thus, imparting the minimum necessary cold work to form the output geometry from the intermediate manufacturing geometry is a significantly greater challenge in terms of equipment loading than any pre-solutionization deformation forming the intermediate manufacturing geometry.

There are three general deformation categories available to form the disk face and rim regions. Some of these operations can be combined or completed multiple times to generate both the local thickness and contour of the desired geometry.

Incremental Forming—These deformation options are those where the forming load is concentrated in a small local area on the component to achieve high forming pressures that can deform a component. Options to dimension and contour the rim region include: flow forming, shear forming, spinning, rolling, pilgering, swaging, cold forging and radial forging. Options to dimension and contour the face region include: flow forming, spinning, shear forming, radial forging and cogging (radial and/or circumferential).

Bulk Forming—These deformation options place the component in open or closed die cavities and exert force via a tool motion to deform and shape the part. Options to dimension and contour the rim region include: forging, extrusion, swaging and pilgering. Options to dimension and contour the disk face region include: forging, nosing, channeled angular extrusion, radial and/or circumferential cogging.

Hydrostatic Forming—These deformation options place the component in a closed cavity pressurized by a fluid, but some surface of the component is not exposed to the pressurized fluid causing deformation. Hydrostatic fluid pressures several times greater than the flow stress of the cold solutionized material are needed to cause deformation. The flow stresses are dependent on the starting solutionized preform geometry.

Flow forming is an incremental metal forming technique in which a disk or tube of metal is formed over a mandrel by one or more rollers using pressure, where the roller deforms the workpiece, forcing it against the mandrel, usually both axially lengthening the workpiece while radially thinning the workpiece. Flow forming subjects the workpiece to friction and deformation. These two factors may heat the workpiece, and this a cooling fluid may be required in some instance. Flow forming is often used to manufacture automobile wheels and other axisymetric shaped products and can be used to draw a wheel to net width from a machined blank. During flow forming, the workpiece is cold worked, changing its mechanical properties, so its strength becomes similar to that of forged metal.

In one embodiment, a wheel is formed incrementally staring with a flat cylinder having a diameter less than that of the rim, but thick enough to be deformed at least 25% to form the final face thickness. First, the face may be flow formed against the mandrel's face surface to achieve the final disk thickness and contour. This flow forming operation may also displace enough metal outward radially beyond the final rim outer diameter to make the rim. Alternately, the starting flat cylinder can be formed by cross-rolling a plate to the desired face thickness. The needed rim material could be available by having an appropriately sized larger starting diameter. Second, the skirt may be flow formed into a rim and contoured against a mandrel's rim face. When flow forming a multi-piece wheel, the parts, such as the disk face and rim, can be formed separately using similar incremental forming processes.

In one embodiment involving bulk forming, a starting cylinder of solutionized material is forged to form the disk face region and extrude a straight rim. The rim may then be flow formed to the final thickness and contour. Another option is to swage the rim to the final shape. Alternatively, a solutionized thick-walled cylinder may be forged into a blind face cavity, where it turns radially inward by channeled angular indirect extrusion to form the face region.

In one embodiment involving hydrostatic forming, a solutionized preform has: (1) the top side dished so that there is more material on the outer diameter with a minimum height to achieve the minimum cold reduction, and (2) the bottom side with an annular projection about the size of the wheel rim. The preform may then be placed into a hydrostatic chamber with a bottom annular chamber opening corresponding to the preform's bottom annular projection. The preform's annular projection may be tapered to match the chamber's bottom annular opening to quickly form a seal under pressure. Next, the chamber may be pressurized so the fluid pushes the top surface causing metal flow to exit the annular opening. The extra material at the outer radial region supplies metal forming the rim while the middle thinner region thins and pushes metal radially outward to convert the top dish shape to a flatter shape while cold working the wheel face region.

After the cold working, the wheel may be thermally treated (300), as per the Thermal Treatment section (Section C), above. In one embodiment, the wheel is thermally treated at a temperature of from 150° F. to below its recrystallization temperature. In one embodiment, the thermally treating step comprises heating the wheel at a temperature of not greater than 425° F. In one embodiment, the thermally treating step comprises heating the wheel at a temperature of not greater than 400° F. In one embodiment, the thermally treating step comprises heating the wheel at a temperature of not greater than 375° F. In one embodiment, the thermally treating step comprises heating the wheel at a temperature of not greater than 350° F. In one embodiment, the thermally treating step comprises heating the wheel at a temperature of at least 200° F. In one embodiment, the thermally treating step comprises heating the wheel at a temperature of at least 250° F. In one embodiment, the thermally treating step comprises heating the wheel at a temperature of at least 300° F.

The cold working step (200) and the thermally treating step (300) may be accomplished to achieve a wheel having improved properties, as described in the Cold working and thermally-treating combination section (Section D, above). In one embodiment, the cold working and thermally treating steps are accomplished to achieve at least a 5% improvement in longitudinal (L) tensile yield strength in the cold worked portion of the wheel as compared to the longitudinal tensile yield strength in the cold worked portion of the wheel in the as-cold worked condition. In another embodiment, the cold working and thermally treating steps are accomplished to achieve at least a 10% improvement in longitudinal tensile yield strength, or at least a 15% improvement in longitudinal tensile yield strength, or at least a 16% improvement in longitudinal tensile yield strength, or at least a 17% improvement in longitudinal tensile yield strength, or at least a 18% improvement in longitudinal tensile yield strength, or at least a 19% improvement in longitudinal tensile yield strength, or at least a 20% improvement in longitudinal tensile yield strength, or at least a 21% improvement in longitudinal tensile yield strength, or at least a 22% improvement in longitudinal tensile yield strength, or at least a 23% improvement in longitudinal tensile yield strength, or at least a 24% improvement in longitudinal tensile yield strength, or at least a 25% improvement in longitudinal tensile yield strength, or more, in the cold worked portion of the wheel as compared to the longitudinal tensile yield strength in the cold worked portion of the wheel in the as-cold worked condition. In some embodiments, after the thermally treating step, the cold worked portion of the wheel has a longitudinal elongation of at least 4%, such as any of the elongation values described in the Properties section (Section H), above. In one embodiment, after the thermally treating step, the cold worked portion of the wheel may have a longitudinal elongation of at least 6%. In other embodiments, after the thermally treating step, the cold worked portion of the wheel realizes an elongation of at least 8%, such as at least 10%, or at least 12%, or at least 14%, or at least 16%, or more.

Aluminum alloy wheel products made by the new processes disclosed herein may realize another or alternative improved property or properties in the portion of the wheel having the at least 25% cold work. For example, the portion of the wheel having the at least 25% cold work may realize at least at least a 5% higher longitudinal tensile yield strength as compared to the longitudinal tensile yield strength of the same portion of a reference version of the wheel processed to the T6 temper, such as any of the T6 improvements described in the Properties section (Section H), above.

In any of the above-described embodiments, the aluminum alloy body may contain sufficient solute to promote at least one of a strain hardening response and a precipitation hardening response to achieve the improved property or properties.

The new wheel products may realize a predominately unrecrystallized microstructure in the portion of the wheel receiving the at least 25% cold work, such as any of the microstructures described in the Microstructure section (Section E), above. In some embodiments, the portion of the wheel receiving the at least 25% cold work is at least 75% unrecrystallized.

In one embodiment a wheel, or other predetermined shaped product, can be an assembly containing at least one component manufactured by the techniques described herein. In the case of a multi-piece wheel, one component could comprise the rim, drop well and bead seats and another could comprise the disk face and or mounting flange. In one embodiment, the assembly could contain different aluminum alloys manufactured using the techniques described herein, with at least one of the aluminum alloys being a heat treatable aluminum alloy.

(viii) Multi-Layer Products

The new 2xxx aluminum alloy products may find use in multi-layer applications. For example it is possible that a multi-layer product may be formed using a 2xxx aluminum alloy body as a first layer and any of the 1xxx-8xxx alloys being used as a second layer. FIG. 12 illustrates one embodiment of a method for producing multi-layered products. In the illustrated embodiment, a multi-layered product may be produced (107), after which it is homogenized (122), hot rolled (126), solutionized (140) and then cold rolled (220), as described above relative to FIG. 9. The multi-layered products may be produced via multi-alloy casting, roll bonding, adhesive bonding, welding, and metallurgical bonding, among others. Multi-alloy casting techniques include those described in U.S. Patent Application Publication No. 20030079856 to Kilmer et al., U.S. Patent Application No. 20050011630 to Anderson et al., U.S. Patent Application No. 20080182122 to Chu et al., and WO2007/098583 to Novelis (the so-called FUSION™ casting process).

For example, a first layer may be a 2xxx aluminum alloy product processed in accordance with the new processes disclosed herein. A second layer may be any of a 1xxx-8xxx aluminum alloy product, including another 2xxx aluminum alloy product (which may be the same alloy or a different alloy than the first 2xxx aluminum alloy product). The first and second layers may have the same thickness, or may be of different thicknesses. Thus, the multi-layer product may realize tailored properties with the first layer realizing a first set of properties, and the second layer realizing a second set of properties. Processing of the at least two different layers to produce a multi-layer product is discussed in further detail below.

In one approach, the second layer comprises a non-heat treatable alloy, such as any of the 1xxx, 3xxx, 4xxx, 5xxx and some 8xxx aluminum alloys. In this approach, a multi-layer product comprises a first layer of a 2xxx aluminum alloy product processed in accordance with the new processes disclosed herein, and at least a second layer of a non-heat treatable alloy, i.e., a 2xxx-NHT product, where the 2xxx is the first layer and the NHT is the second layer of a non-heat treatable aluminum alloy.

In one embodiment, the second layer comprises a corrosion resistant type alloy, such as any of the 1xxx, 3xxx, 5xxx and some 8xxx aluminum alloys. In these embodiments, the first layer may provide improved strength properties, and the second layer may provide corrosion resistant properties. Since a non-heat treatable alloy is used as the second layer, this second layer may not naturally age, and thus may retain its ductility. Thus, in some instances, the second layer may have higher ductility and/or a different strength than the first layer. Hence, a multi-layer product with a tailored ductility differential (or gradient) and/or a tailored strength differential (or gradient) may be produced. In one embodiment, the second layer is the outer layer of a multi-layer product, and the second layer's resistance to ductility changes may be useful in hemming operations (e.g., for automotive sheet applications, such as inner and/or outer door panel applications, among others). In one embodiment, the second layer is a 5xxx aluminum alloy having at least 3 wt. % Mg. In one embodiment, the second layer comprises an aluminum alloy having improved appearance properties as compared to the first aluminum alloy layer, such as when the second layer is a 1xxx, 3xxx or a 5xxx aluminum alloy.

In another approach, the second layer comprises a heat treatable alloy, such as any of a 6xxx aluminum alloy, the same or another 2xxx aluminum alloy, a 7xxx aluminum alloy, an Al—Li alloy, and some 8xxx aluminum alloys, i.e., a 2xxx-HT product, where the 2xxx is the first layer and where the HT is the second layer of the heat treatable aluminum alloy. Since the second layer is a heat treatable aluminum alloy, it may be processed according to the new processes disclosed herein and realize improved properties over conventionally processed materials. However, it is not required that the second layer be processed according to the new processes disclosed herein, i.e., the second layer of heat treatable material may be conventionally processed. As used herein, an Al—Li alloy is any aluminum alloy containing 0.25-5.0 wt. % Li. Processing of the at least two different layers to produce a multi-layer product is discussed in further detail below.

In one embodiment, the multi-layer product is a 2xxx(1)-2xxx(2) product, where 2xxx(1) is a first layer of 2xxx aluminum alloy product produced according to the processes disclosed herein, and 2xxx(2) is a second first layer of 2xxx aluminum alloy product, which second layer may be conventionally processed or may be produced according to the processes disclosed herein. In this embodiment, the first and second layers have at least one compositional difference or at least one processing difference. In one embodiment, 2xxx(1) has a different composition than 2xxx(2). In one embodiment, 2xxx(1) receives a different amount of cold work relative to 2xxx(2). In one embodiment, 2xxx(1) receives a different thermal treatment practice relative to 2xxx(2). Such multi-layer products may find applicability in automotive applications, among others. In another embodiment, the 2xxx(1) layer may comprise a low Si and/or a low Mg 2xxx, such as for improved formability applications (e.g., hemming of automotive components). In one embodiment, the first and second 2xxx layers are selected such that they do not impact recyclability (e.g., for scrap stream purposes).

In one embodiment, a multi-layer product is a 2xxx-7xxx product, where the 2xxx is a first layer of 2xxx aluminum alloy product produced according to the processes disclosed herein, and the 7xxx is a second layer of a 7xxx aluminum alloy product, which may or may not be produced in accordance with the processes disclosed herein. Such multi-layer products may find applicability in automotive, aerospace and armor applications, among others.

In one embodiment, a multi-layer product is a 2xxx-6xxx product, where the 2xxx is a first layer of 2xxx aluminum alloy product produced according to the processes disclosed herein, and the 6xxx is a second layer of a 6xxx aluminum alloy product, which may or may not be produced in accordance with the processes disclosed herein. Such multi-layer products may find applicability in automotive, aerospace and armor applications, among others.

In one embodiment, a multi-layer product is a 2xxx-Al—Li product, where the 2xxx is a first layer of 2xxx aluminum alloy product produced according to the processes disclosed herein, and the Al—Li is a second layer of a Al—Li aluminum alloy product, which may or may not be produced in accordance with the processes disclosed herein. Such multi-layer products may find applicability in automotive, aerospace and armor applications, among others.

In one embodiment, a multi-layer product is a 2xxx-8xxx (HT) product, where the 2xxx is a first layer of 2xxx aluminum alloy product produced according to the processes disclosed herein, and the 8xxx(HT) is a second layer of a heat treatable 8xxx aluminum alloy product, which may or may not be produced in accordance with the processes disclosed herein. Such multi-layer products may find applicability in packaging, automotive, aerospace and armor applications, among others.

In one embodiment, the second layer comprises an aluminum alloy having improved weldability (e.g., for spot welding) as compared to the first aluminum alloy layer. This second layer may be any aluminum alloy, heat treatable or non-heat treatable, that has good weldability. Examples of alloys having good weldability include 3xxx, 4xxx, 5xxx, 6xxx, and some low-Cu 7xxx alloys. In one embodiment, the second layer has a lower melting point than the first layer. Thus, during the welding of the first and second layers, the second layer may melt thereby creating a bond between the first layer and the second layer (i.e., the welding process results in creating an adhesive bond). In another embodiment, the second layer has a lower resistance than the first layer, which may be useful in spot welding applications.

The multi-layer products may be produced in a variety of manners. In one embodiment, the first and second layers are either (i) created together or (ii) coupled to one another prior to the cold working step (200). The first and second layers may be created together during casting, such as via the casting techniques described in U.S. Patent Application Publication No. 20030079856 to Kilmer et al., U.S. Patent Application No. 20050011630 to Anderson et al., U.S. Patent Application No. 20080182122 to Chu et al., and WO2007/098583 to Novelis (the so-called FUSION™ casting process). The first and second layers may be coupled together (i.e., cast separately and then joined) via adhesive bonding, roll binding, and similar techniques. Since the first and second layers are adjacent one another prior to the cold working step, both layers will receive at least 25% cold working due to the subsequent cold working step (200). The multi-layer product may then be subsequently thermally treated (300).

In one embodiment, when the second layer is a non-heat treatable alloy, the thermally treating step (300) may result in this second layer having higher ductility but lower strength as compared to the properties of that second layer in the as-cold worked condition. Conversely, since the first layer is a 2xxx aluminum alloy processed in accordance with the processes disclosed herein, the first layer may realize both improved strength and ductility as compared to the properties of the first layer in the as-cold worked condition. Thus the multi-layer product may have tailored lower strength, higher ductility properties on the outer surface of the multi-layer product, but with higher strength properties towards the inside of the multi-layer product. This may be useful, for example, in armor applications, with the first layer resisting penetration by a projectile and the second layer resisting spalling.

In another embodiment, the first and second layers are coupled to one after the cold working step (200) and prior to the thermally treating step. In this embodiment, each layer may receive a tailored amount of post-solutionizing cold work (if any for the second layer), but with the first layer receiving at least 25% cold working due to the cold working step (200). The multi-layer product may then be subsequently thermally treated (300). In some embodiments, the thermally treating step (300) may be used to achieve the coupling of the two layers (e.g., as the as an adhesive bonding curing step; that is, a thermally treating step may assist in adhesive bonding, which steps would be completed concomitant to one another in this embodiment).

In yet another embodiment, the first and second layers are coupled to one after the thermally treating step (300). In this embodiment, each layer may receive a tailored amount of cold work and a tailored amount of thermal treatment, but with the first layer receiving at least 25% cold working due to the cold working step (200), and the first layer being thermally treated to achieve at least one improved property (e.g., a higher strength as compared to the as cold worked condition, or as compared to a reference version of the product in the T6 temper).

The multi-layer products may include a third layer, or any number of additional layers. In one approach, a multi-layer product includes at least three layers. In one embodiment, a layer of 2xxx aluminum alloy product processed in accordance with the processes disclosed herein is "sandwiched" in between two outer layers. These two outer layers may be the same alloy (e.g., both the same 1xxx alloy), or these two outer layers may be different alloys (e.g., one a 1xxx aluminum alloy and the other another type of 1xxx alloy; as another example, one a 1xxx alloy, the other a 5xxx alloy, so on and so forth).

In one approach, the multi-layer product is a NHT-2xxx-NHT product, where NHT stands for a layer of non-heat treatable alloy, as described above, and the 2xxx is a layer of 2xxx aluminum alloy product produced according to the processes disclosed herein. In one embodiment, the multi-layer product is a 3xxx-2xxx-3xxx product, with the outer layers being 3xxx aluminum alloy product and with the inner layer being a 2xxx aluminum alloy product processed according to the processes disclosed herein. Such multi-layer products may find utility in packaging (e.g., containers (cans, bottles, closures), trays or other configurations), in automotive applications (e.g., panels or body-in-white), aerospace applications (e.g., fuselage skin, stringers, frames, bulkheads, spars, ribs, and the like), and marine structural applications (e.g., bulkheads, frames, hulls, decks, and the like), to name a few). Similarly, 5xxx-2xxx-5xxx products could be used for the same or similar purposes. Other combinations of NHT-2xxx-NHT may be employed, and it is not required that the same NHT be used on both sides of the 2xxx layer, i.e., different NHT alloys may be used to sandwich the 2xxx layer.

In another approach, the multi-layer product is a 2xxx(1)-HT-2xxx(2) product, where HT stands for a layer of heat treatable alloy, as described above, and where at least one of the 2xxx(1) and 2xxx(2) is a layer of 2xxx aluminum alloy product produced according to the new processes disclosed herein, which layers may have the same composition or different compositions. In one embodiment, both 2xxx(1) and 2xxx(2) layers have the same composition and are produced according to the new processes disclosed herein. The 2xxx(1)-HT-2xxx(2) Such products may be useful in automotive applications in closure panels, body-in-white (BIW) structure, seating systems or suspension components, among others. Such products might also be useful in commercial or military aerospace components, including launch vehicle or payload components. Such components might further be useful for commercial transportation products in light, medium or heavy duty truck structure or buses. The 2xxx-HT-2xxx products could be useful in multi-piece wheels for autos, trucks or buses. Such products could also be useful for building panels. Such products could further be useful for armor components.

In another approach, the multi-layer product is a 2xxx-NHT-2xxx product, where NHT stands for a layer of a non-heat treatable alloy, as described above, and the 2xxx is a layer of 2xxx aluminum alloy product produced according to the processes disclosed herein. Such products may be useful in components used in marine applications for ships or boats and amphibious military vehicles. Such products might also be useful for automotive applications in closure panels, BIW structure, seating systems or suspension components, among others. Such products might further be useful for packaging systems (e.g., containers (cans, bottles, closures), trays). The 2xxx-NHT-2xxx products might also be useful for lighting components. In particular, if the 2xxx alloy is combined with a HT alloy of lower strength, this could be useful in automotive crashworthy or energy-absorbing applications.

In another approach, the multi-layer product is a HT(1)-2xxx-HT(2) product, where HT stands for layers of a heat treatable alloy, as described above, which layers (HT(1) and HT(2)) may have the same or different compositions, and where the 2xxx is a layer of 2xxx aluminum alloy product produced according to the processes disclosed herein. Such products may be useful in commercial or military aerospace components, including launch vehicle or payload components. In particular, if the 2xxx alloy is combined with a HT alloy of higher strength, this could be useful in automotive crashworthy or energy-absorbing applications In another approach, the multi-layer product is a HT-2xxx-NHT product, where HT stands for a layer of heat treatable alloy, as described above, 2xxx is a layer of 2xxx aluminum alloy product produced according to the processes disclosed herein, and NHT stands for a layer of a non-heat treatable alloy, as described above. Such products may be useful in commercial or military aerospace components, including launch vehicle or payload components. Such products might also be useful for automotive applications in closure panels, BIW structure, seating systems or suspension components. Such products could be useful in automotive crashworthy or other energy-absorbing applications. Such components might further be useful for commercial transportation products in light, medium or heavy duty truck structure or buses. Such products could further be useful for armor components.

In another approach, the multi-layer product is a 2xxx-NHT-HT product, where the 2xxx is a layer of 2xxx aluminum alloy product produced according to the processes disclosed herein, the NHT stands for a layer of a non-heat treatable alloy, as described above, and HT stands for a layer of heat treatable alloy, as described above. Such products may be useful in commercial or military aerospace components, including launch vehicle or payload components. Such products might also be useful for automotive applications in closure panels, BIW structure, seating systems or suspension components. Such components might further be useful for commercial transportation products in light, medium or heavy duty truck structure or buses. Such products could be useful in automotive crashworthy or other energy-absorbing applications.

In another approach, the multi-layer product is a 2xxx-HT-NHT product, where the 2xxx is a layer of 2xxx aluminum alloy product produced according to the processes disclosed herein, the HT stands for a layer of heat treatable alloy, as described above, and NHT stands for a layer of a non-heat treatable alloy, as described above. Such products may be useful in components used in marine applications for ships or boats and amphibious military vehicles. Such products might also be useful for automotive applications in closure panels, BIW structure, seating systems or suspension components. Such products might further be useful for packaging systems (e.g., containers (cans, bottles, closures), trays). Such products could also be useful for building panels. Such products could further be useful for armor components. The 2xxx-HT-NHT products might also be useful for lighting components.

In one approach, a method comprises casting an aluminum alloy body, wherein, after the casting, the aluminum alloy body comprises a first layer of a first heat treatable alloy, and a second layer of either a second heat treatable alloy or a non-heat treatable alloy (e.g., using the techniques described in commonly-owned U.S. Patent Publication No. US 2010/0247954 to Chu et al., which patent application is incorporated herein by reference in its entirety), (b) solutionizing the aluminum alloy body, (c) cold working the aluminum alloy body, wherein the cold working induces at least 25% cold work in the aluminum alloy body, and (d) thermally treating the aluminum alloy body. Thus, an aluminum alloy body having a first layer and a second layer may be produced, and which layers may be distinct from one another. In one embodiment, the second layer comprises a second heat treatable alloy. In one embodiment, the second heat treatable alloy is different than the first heat treatable alloy. In another embodiment, the second heat treatable alloy is the same as the first heat treatable alloy (but are distinct layers). This aluminum alloy body may realize improved strength, ductility, or other properties, such as any of the properties described in the Properties section (Section H), above. In one embodiment, the method comprises, after the thermally treating step, assembling an assembly having this aluminum alloy body having the at least first and second layers. In one embodiment, this aluminum alloy body having the at least first and second layers is an armor component. In another embodiment, this aluminum alloy body having the at least first and second layers is an automotive component.

In another embodiment, a method comprises casting an aluminum alloy body, wherein, after the casting, the aluminum alloy body comprises a composition gradient, wherein a first region comprises a first composition, and a second region comprises a second composition, the second composition being more than just nominally different than the first composition (e.g., a compositional gradient beyond mere macrosegregation effects). Techniques available to produce such aluminum alloy bodies are described in commonly-owned U.S. Patent Publication No. 2010/0297467 to Sawtell et al., which patent application is incorporated herein by reference in its entirety. In one embodiment, the first composition is a composition that makes it a heat treatable aluminum alloy (i.e., capable of precipitation hardening), and the second region of the body has more than a nominally different composition than the heat treatable alloy of the first region. In one embodiment, a continuous concentration gradient exists between the first and second regions. The continuous concentration between the first and second regions gradient may be linear, or may be exponential. In one embodiment, the aluminum alloy body comprises a third region. In one embodiment, the third region comprises the same concentration as the first region but is separated from the first region by the second region. In one embodiment, the concentration gradient between the first and second regions is linear. In some of these embodiments, the concentration gradient between the second and third regions is linear. In some of the embodiments, the concentration gradient between the second and third regions is exponential. In one embodiment, the aluminum alloy body having the purposeful composition gradient may be solutionized, and then cold worked, wherein the cold working induces at least 25% cold work in the aluminum alloy body, and then thermally treated. Thus, an aluminum alloy body having a tailored composition gradient may be produced. This aluminum alloy body may realize improved strength, ductility, or other properties, such as any of the properties described in the Properties section (Section H), above. In one embodiment, the method comprises, after the thermally treating step, assembling an assembly having this aluminum alloy body having the first region and the second region. In one embodiment, this aluminum alloy body having the at least first and second regions is an armor component. In another embodiment, this aluminum alloy body having at the first and second regions is an automotive component. In another embodiment this aluminum alloy body having at the first and second regions is an aerospace component.

As mentioned above, any number of additional aluminum alloy layers may be used in any of the above-described multi-layer approaches and/or embodiments. Furthermore, any number of non-aluminum alloy layers (e.g., plastic layers, resins/fiber layers) may be added to any of the above-described multi-layer approaches and/or embodiments. Furthermore, any of the above-described multi-layer products may be employed with the cold work gradient processing techniques described in the Cold Work section (Section B(iii)), above.

Examples of multi-layer product styles that may be employed with products made by the new processes disclosed herein include those described in, for example, U.S. Patent Application Publication Nos. 2008/0182122 to Chu et al., 2010/0247954 to Chu et al., 2010/0279143 to Kamat et al., 2011/0100579 to Chu et al., and 2011/0252956 to Rioja et al.

J. Combinations

The preparing, cold working, thermally treating, and optional final treatment apparatus and methodologies described above in Sections A, B, C, and F, respectively, may be combined in any suitable manner as described herein to achieve any of the improved aluminum alloy bodies and/or properties described in Sections D and H, any of the microstructures described in Section E, and to achieve any of the aluminum alloy bodies and products described in any of Sections A-I, and the compositions provided for in Section G may be tailored, as appropriate to achieve such aluminum alloy bodies. Thus, all such combinations of the methodologies and apparatus described in these Sections A-I are recognized as being combinable for such purposes, and therefore can be combined and claimed in any suitable combination to protect such inventive combinations. Furthermore, these and other aspects, advantages, and novel features of this new technology are set forth in part in the description that follows and will become apparent to those skilled in the art upon examination of the description and figures, or may be learned by practicing one or more embodiments of the technology provided for by the patent application.

BRIEF DESCRIPTION OF THE DRAWINGS

FIGS. 2b-2c are schematic views of example aluminum alloy bodies that may be cold worked to produce differential cold work zones or gradients.

FIGS. 2d-2f illustrate various manners of cold working the aluminum alloy bodies of FIGS. 2b-2c to produce cold worked aluminum alloy bodies having tailored cold worked zones, as well as the produced bodies themselves.

FIGS. 2g-2i illustrate other examples of aluminum alloy bodies that may be cold worked to produce differential cold work zones or gradients, one example of cold working such bodies, and the produced bodies themselves.

FIGS. 2j-2l illustrate various manners of producing cold rolled products having differential cold work zones or gradients.

FIG. 2m is a top-down view of the rolled aluminum alloy product produced via the process of FIG. 2j.

FIGS. 2p-1 to 2p-3 are exploded views of an automotive vehicle, illustrating various types of automotive components that may be produced in accordance with the new methods described herein.

FIGS. 2q-1 to 2q-9 are flow charts illustrating various example methods for producing improved aluminum alloy bodies.

FIGS. 2s-1 to 2s-5 are flow charts illustrating various example methods for producing improved aluminum alloy containers.

FIG. 2s-6 is a schematic side view illustrating one embodiment of an aluminum alloy container that may be produced in accordance with the new methods described herein.

FIG. 2s-7 is a schematic side view illustrating one embodiment of an aluminum alloy closure that may be produced in accordance with the new methods described herein.

FIGS. 2t-1 to 2t-2 are schematic views illustrating one perspective view and a cross-sectional view, respectively, of an aluminum alloy wheel that may be produced in accordance with the new methods described herein.

FIGS. 3-5 are flow charts illustrating various embodiments of preparing an aluminum alloy body for post-solutionizing cold work.

FIGS. 6b-1 and 6b-2 are schematic views illustrating one embodiment of a continuous casting apparatus for preparing aluminum alloy bodies for post-solutionizing cold work in accordance with FIG. 6a.

FIGS. 6c-6f and 6l-6k are graphs illustrating data associated with aluminum alloy bodies produced in accordance with the continuous casting apparatus of FIGS. 6b-1 and 6b-2.

FIGS. 6g-6j and 6m are micrographs of aluminum alloy bodies produced in accordance with the continuous casting apparatus of FIGS. 6b-1 and 6b-2.

FIGS. 6n and 6o are schematic views illustrating an optional strip support mechanism that may be employed with the continuous casting apparatus of FIGS. 6b-1 and 6b-2.

FIGS. 7-8 are flow charts illustrating embodiments of preparing an aluminum alloy body for post-solutionizing cold work.

FIG. 9 is a flow chart illustrating one embodiment of a method for producing a rolled aluminum alloy body.

FIG. 10 is a graph illustrating R-values as a function of orientation angle for various aluminum alloy bodies.

FIGS. 14-15 are graphs illustrating the thermal treatment response of various 2xxx+Ag aluminum alloy bodies.

FIGS. 16-17 are graphs illustrating the strength-toughness performance of various 2xxx+Ag aluminum alloy bodies.

DETAILED DESCRIPTION

Example 1

Alloys 2324 and 2024

Figure 1:
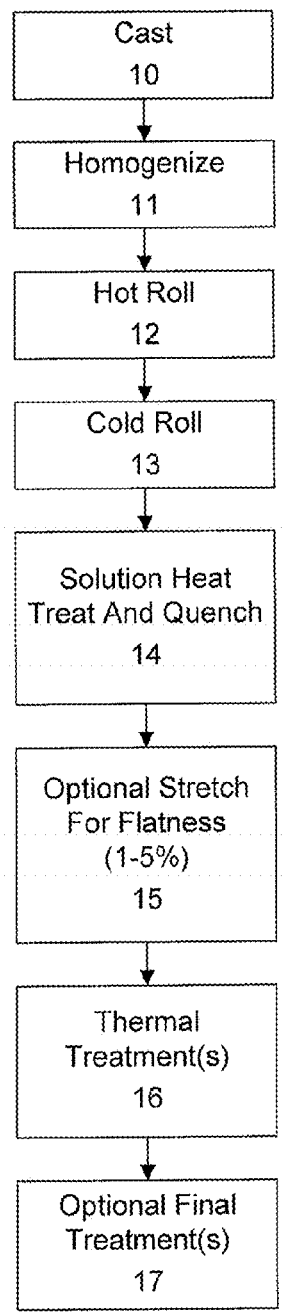
FIG. 1 is a flow chart illustrating a conventional process for producing aluminum alloy products.
Figure 2A:
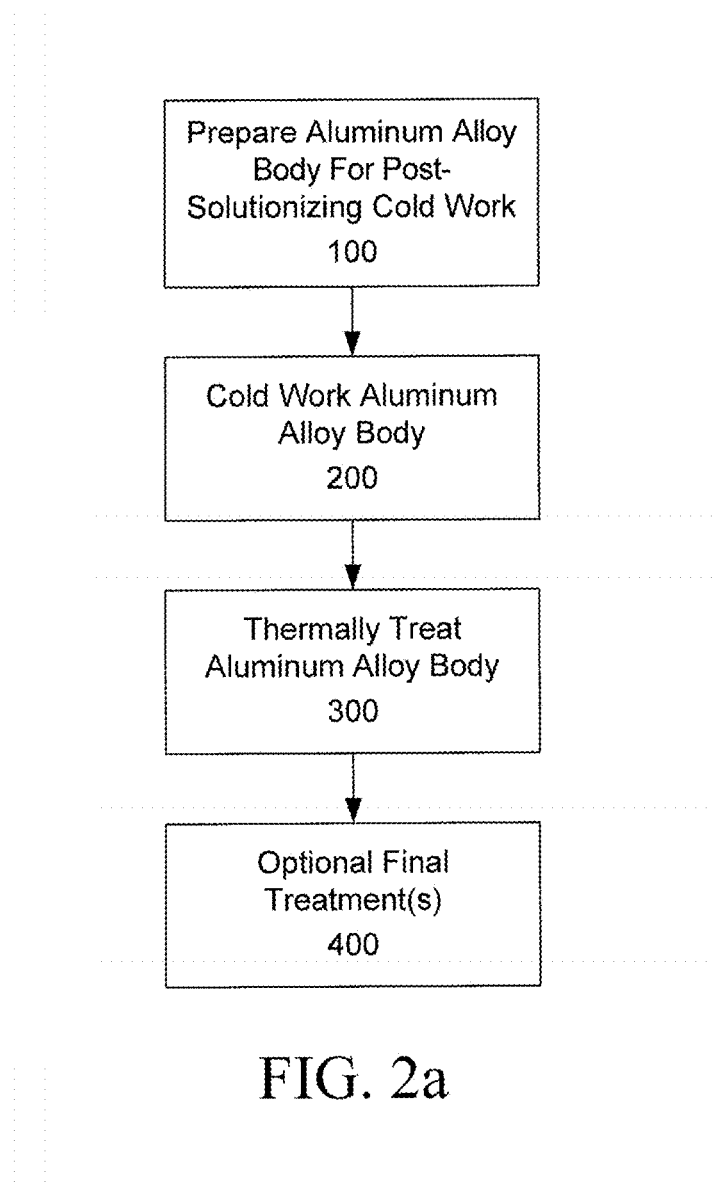
FIG. 2a is a flow chart illustrating a new process for producing aluminum alloy products.
Figure 2D:
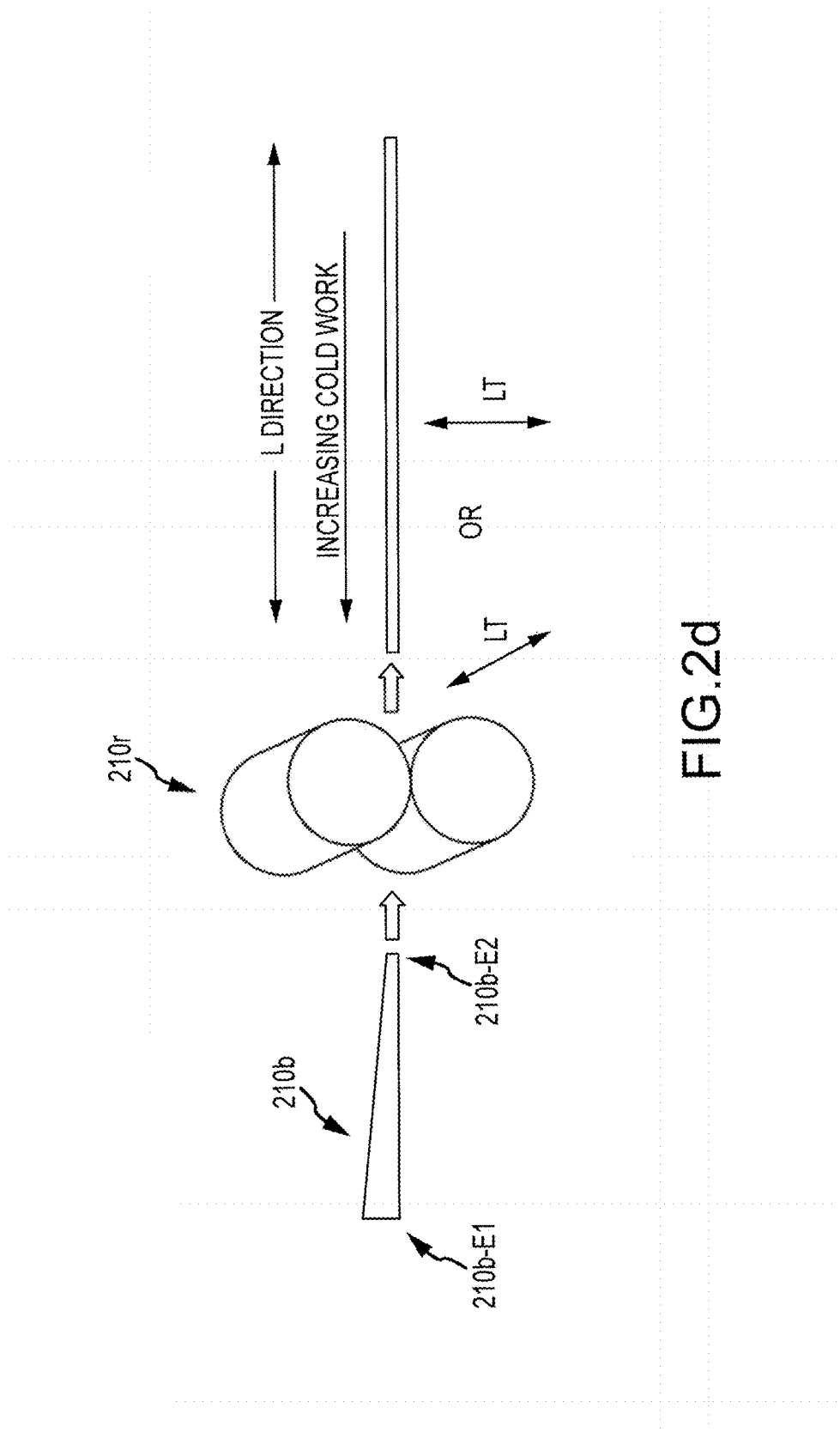
Figure 2E:
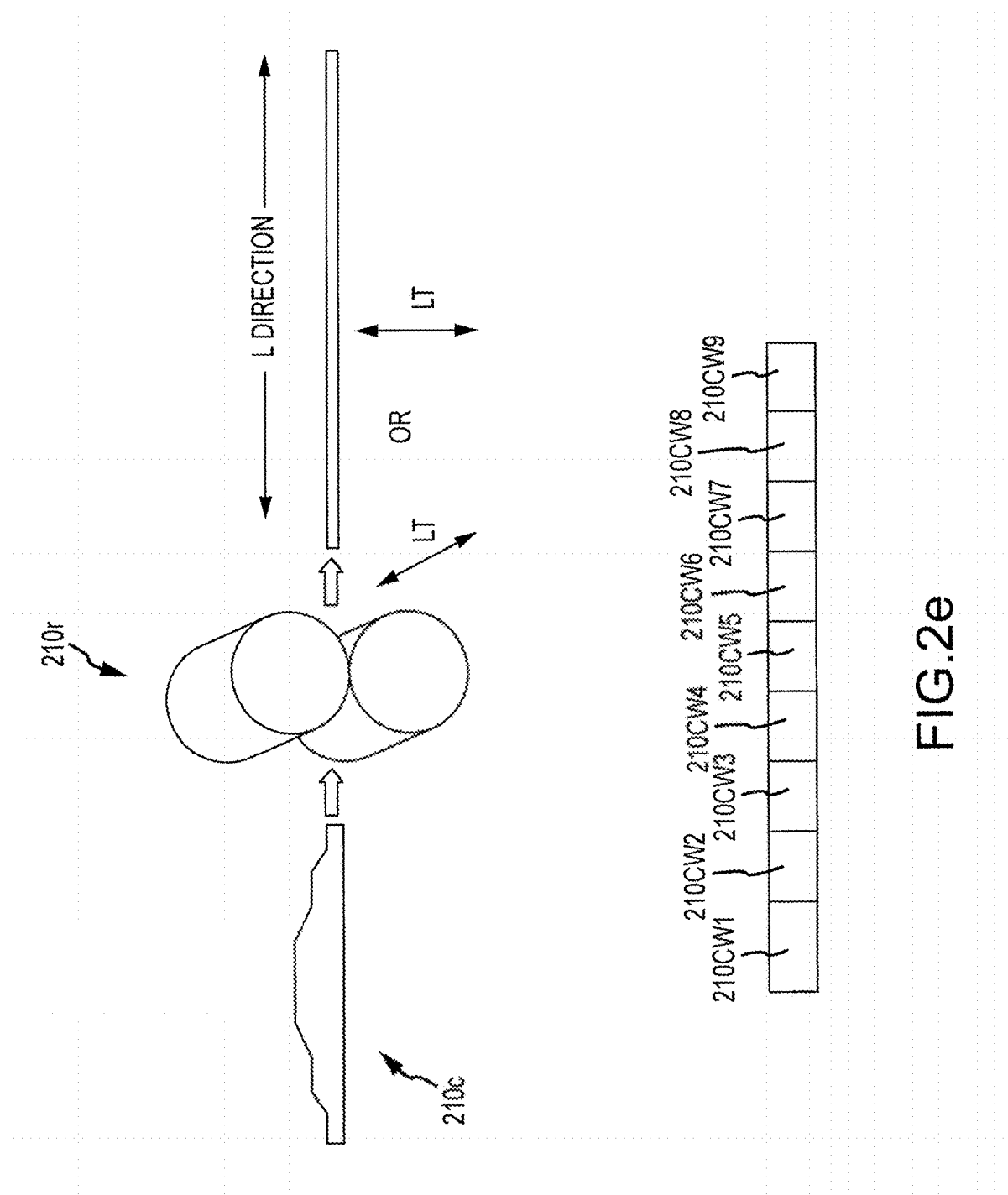
Figure 2I:
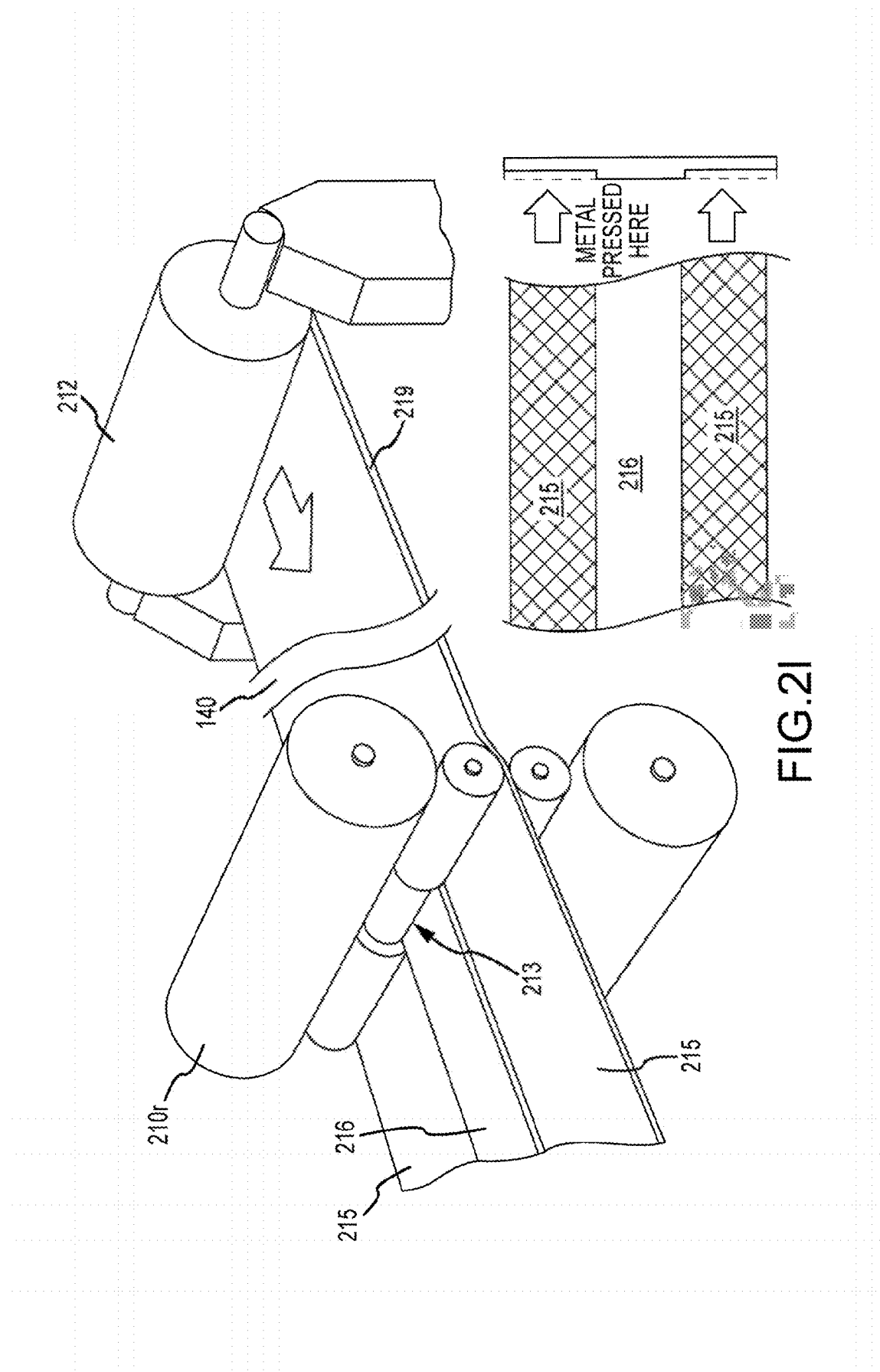
Figure 2N:
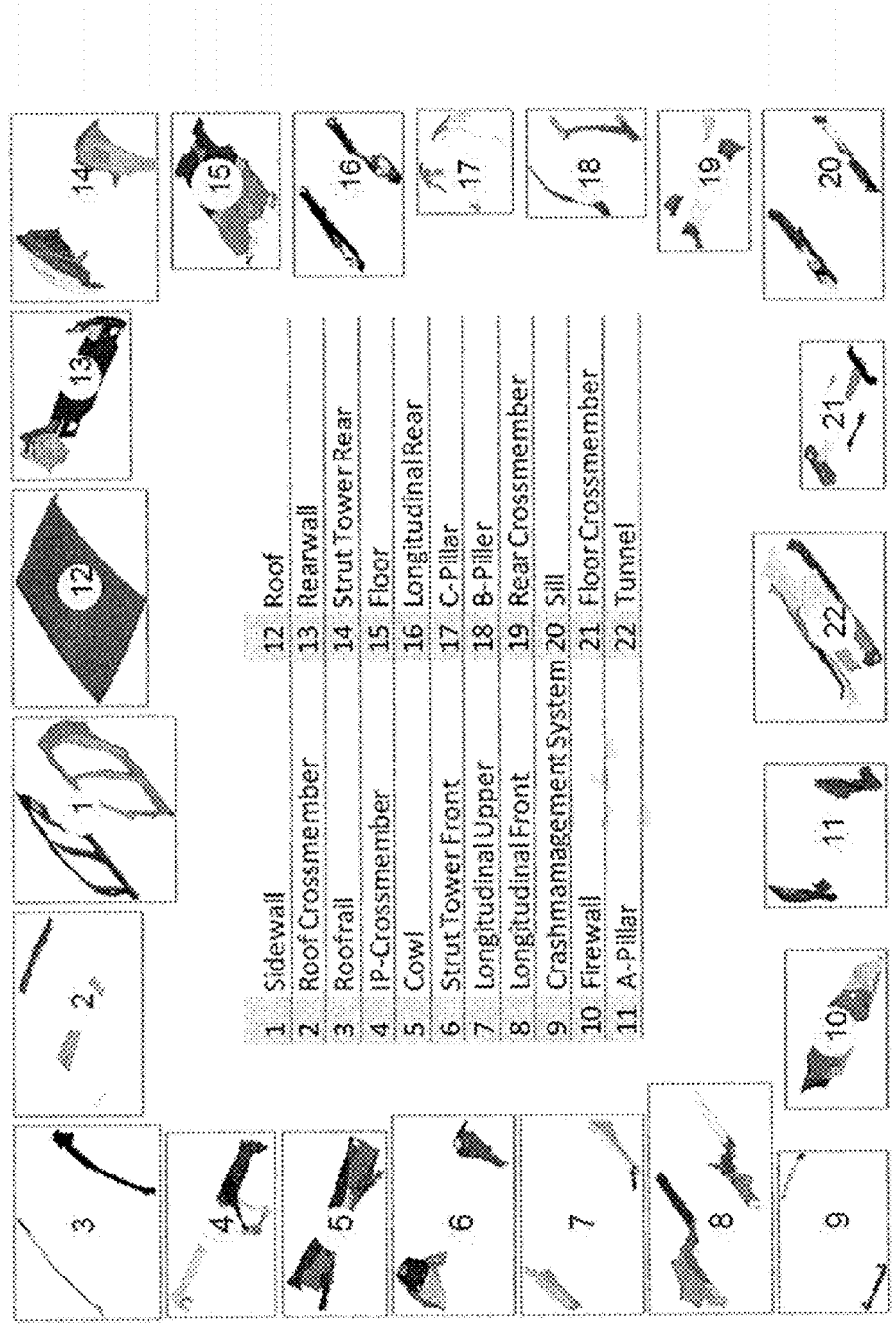
FIGS. 2n-2o illustrate various types of automotive components that may be produced in accordance with the new methods described herein.
Figure 2O:
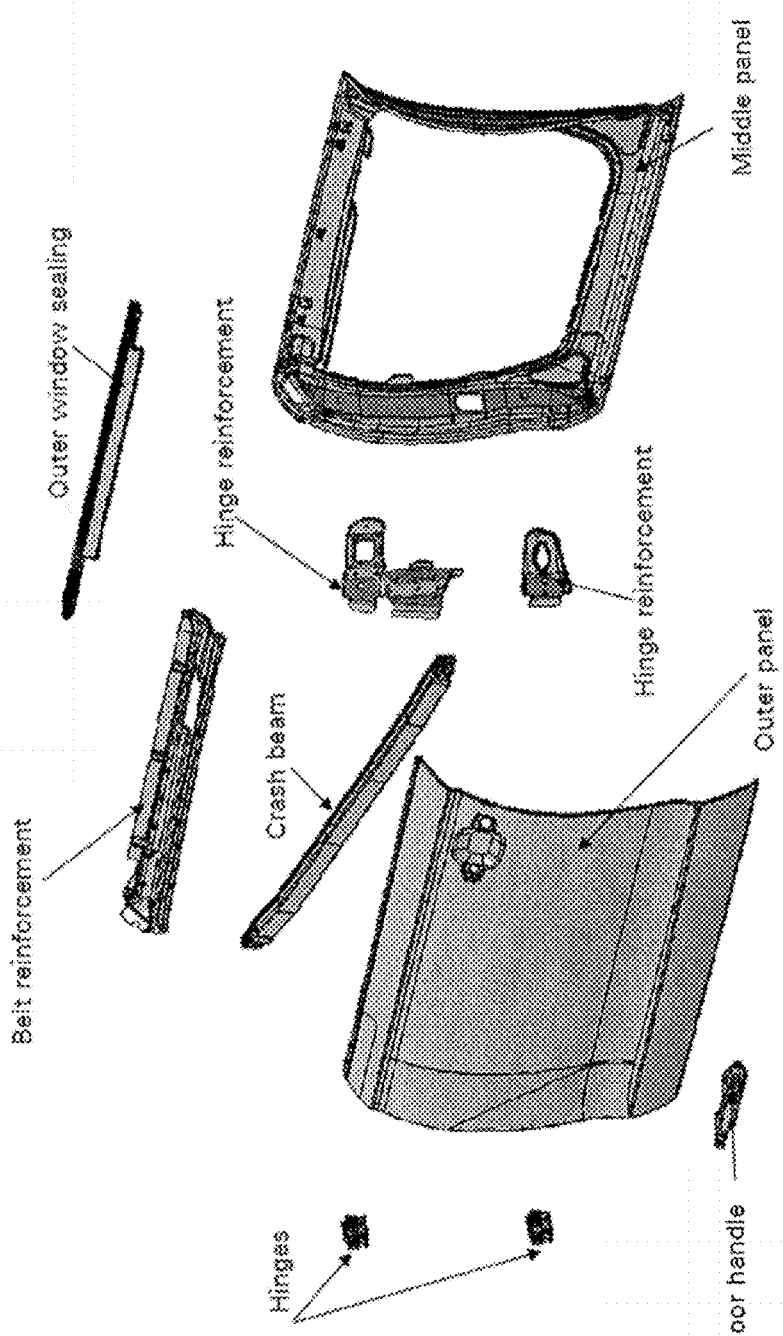
Figures 2, 2P:
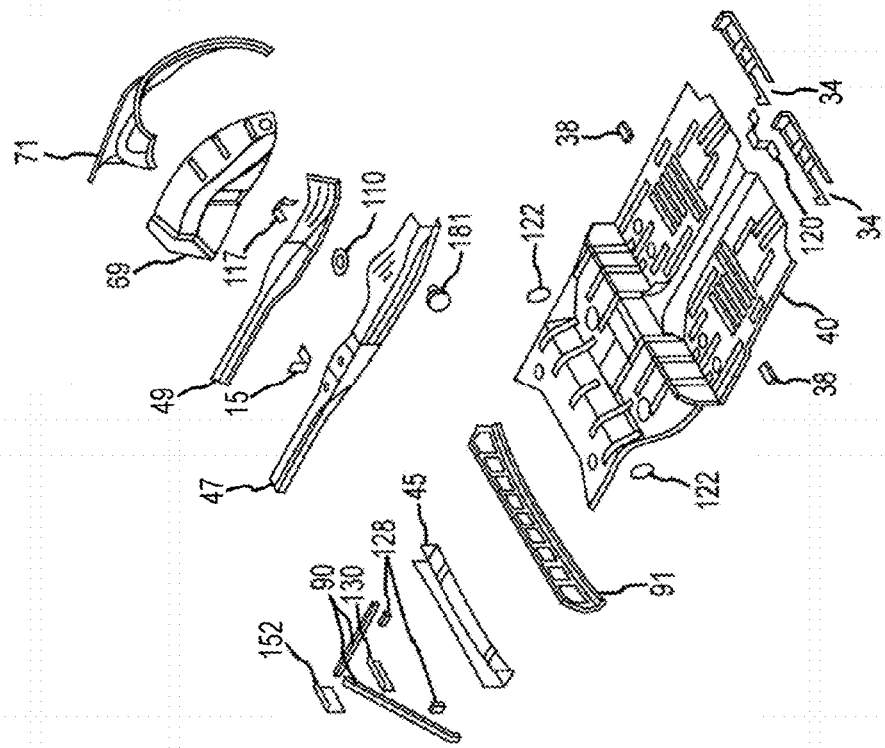
Figures 2, 2P, 3:
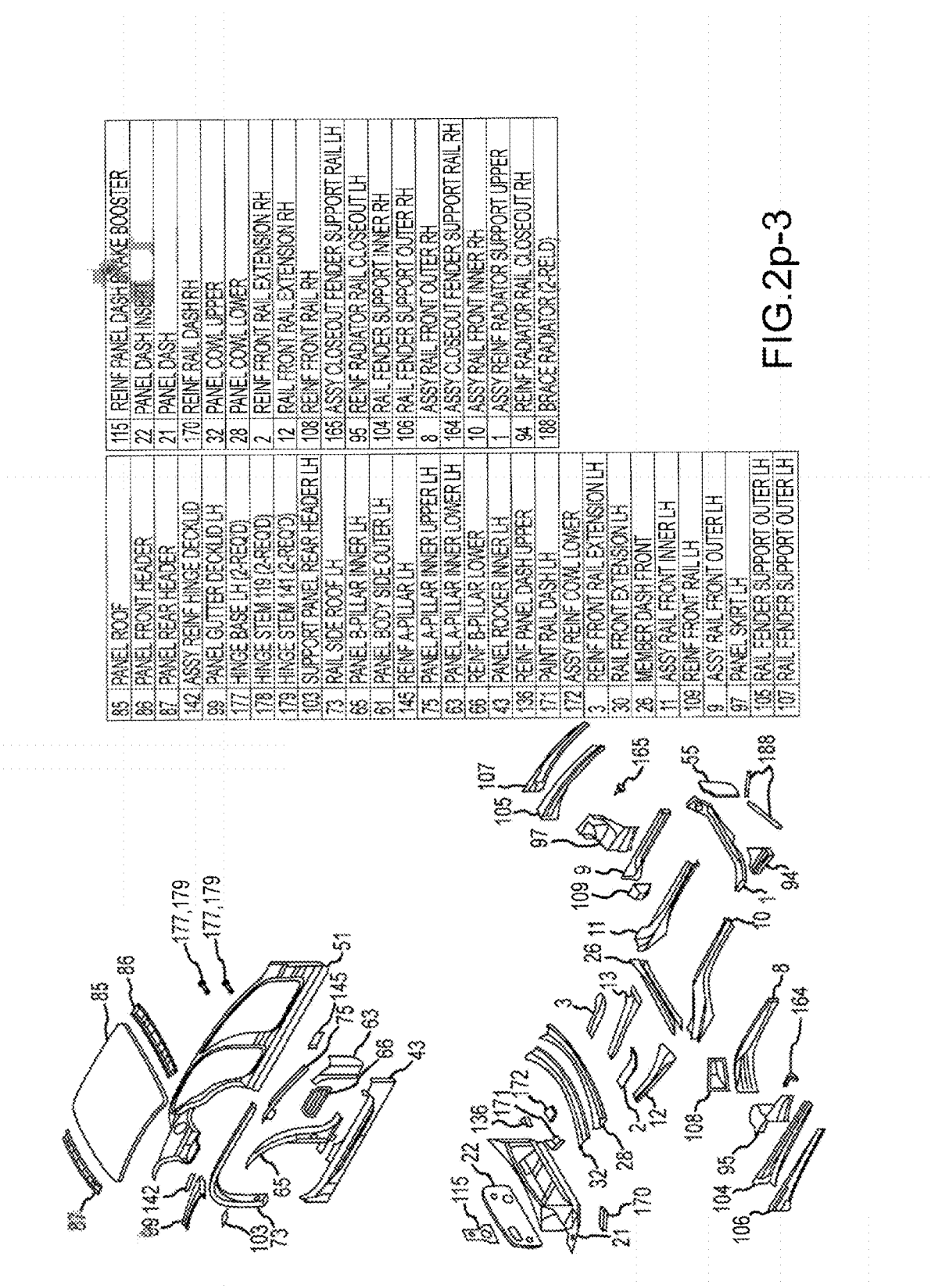
Figures 1, 2Q:
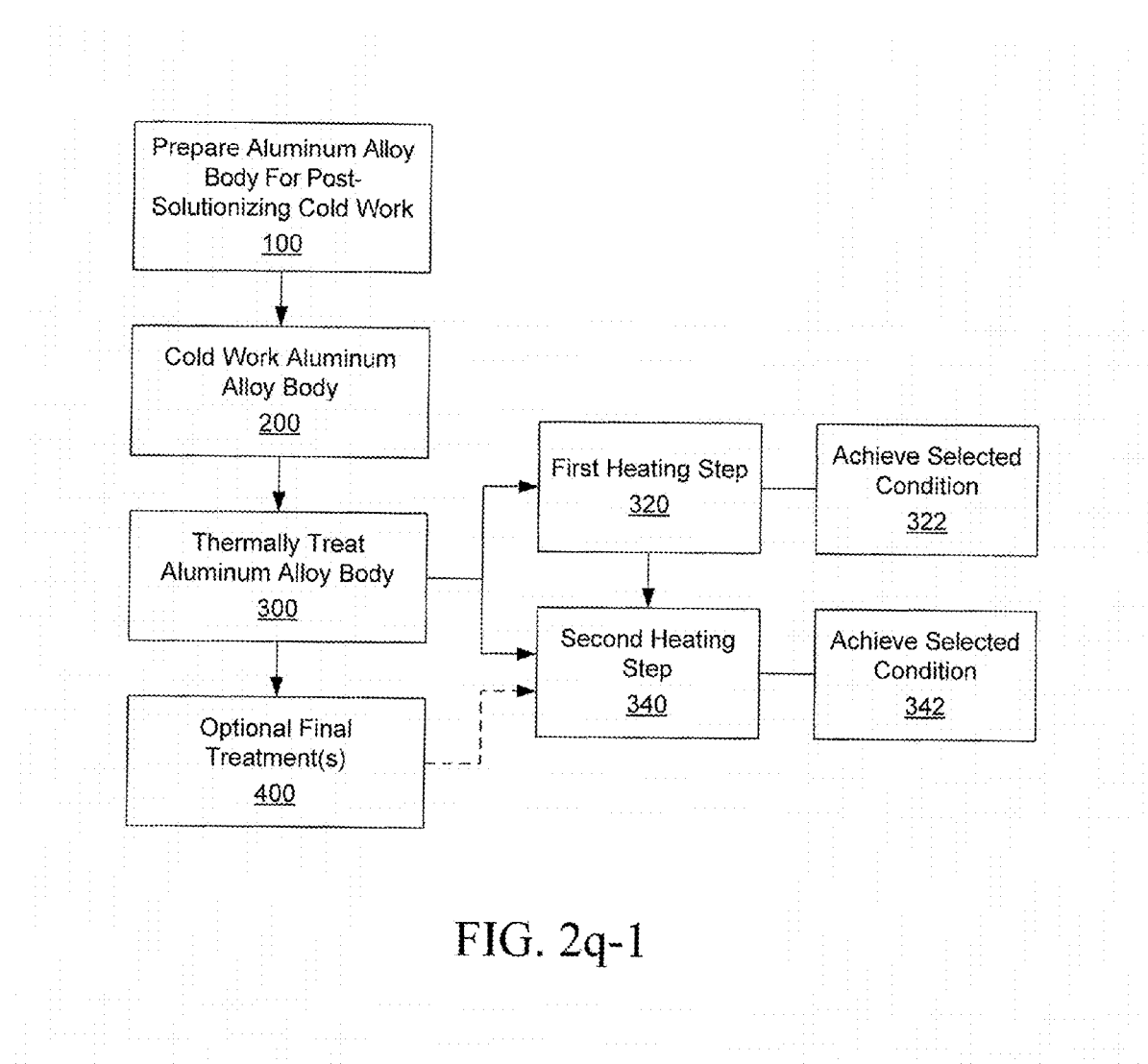
Figures 2, 2Q:
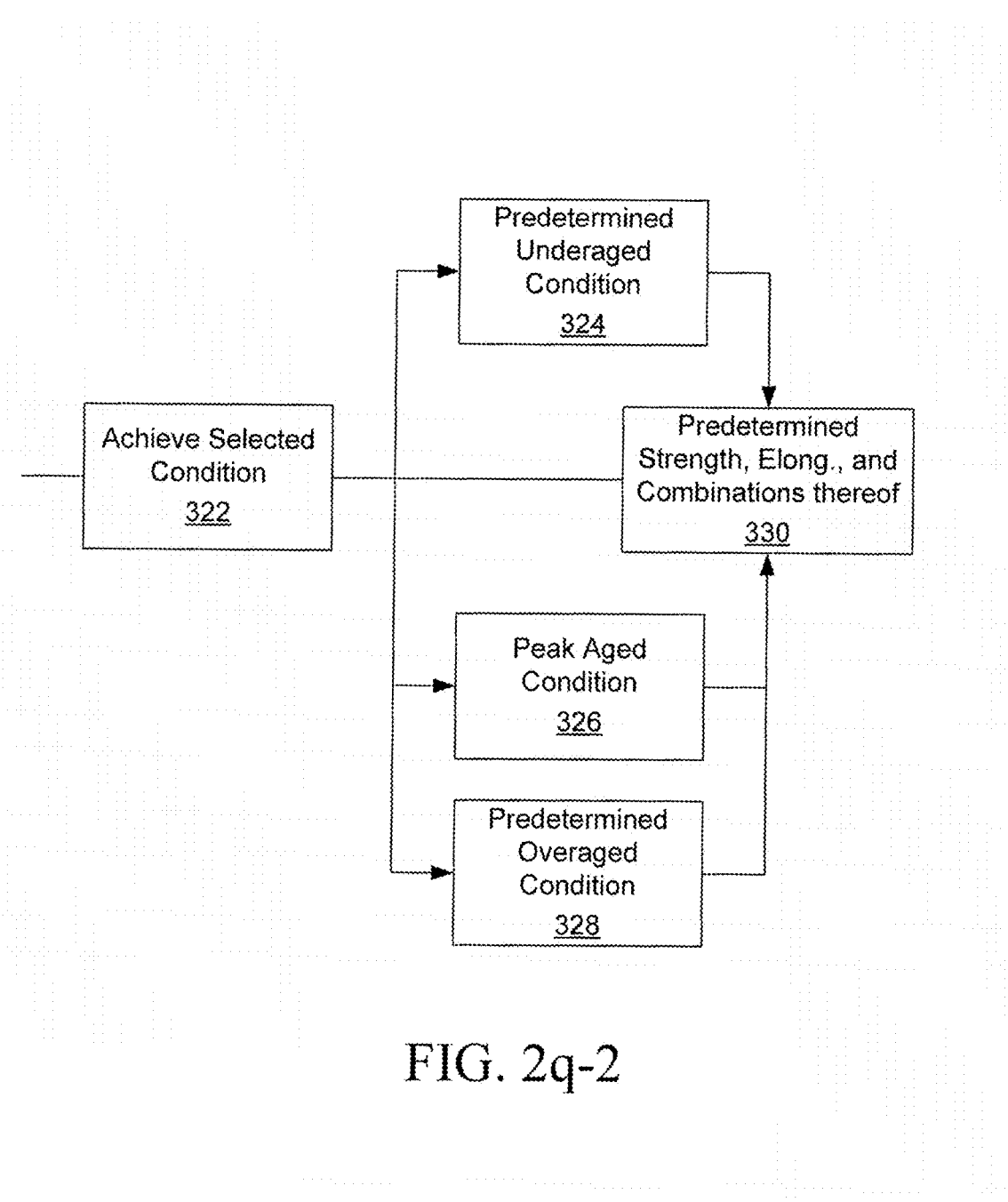
Figures 2, 2Q, 3:
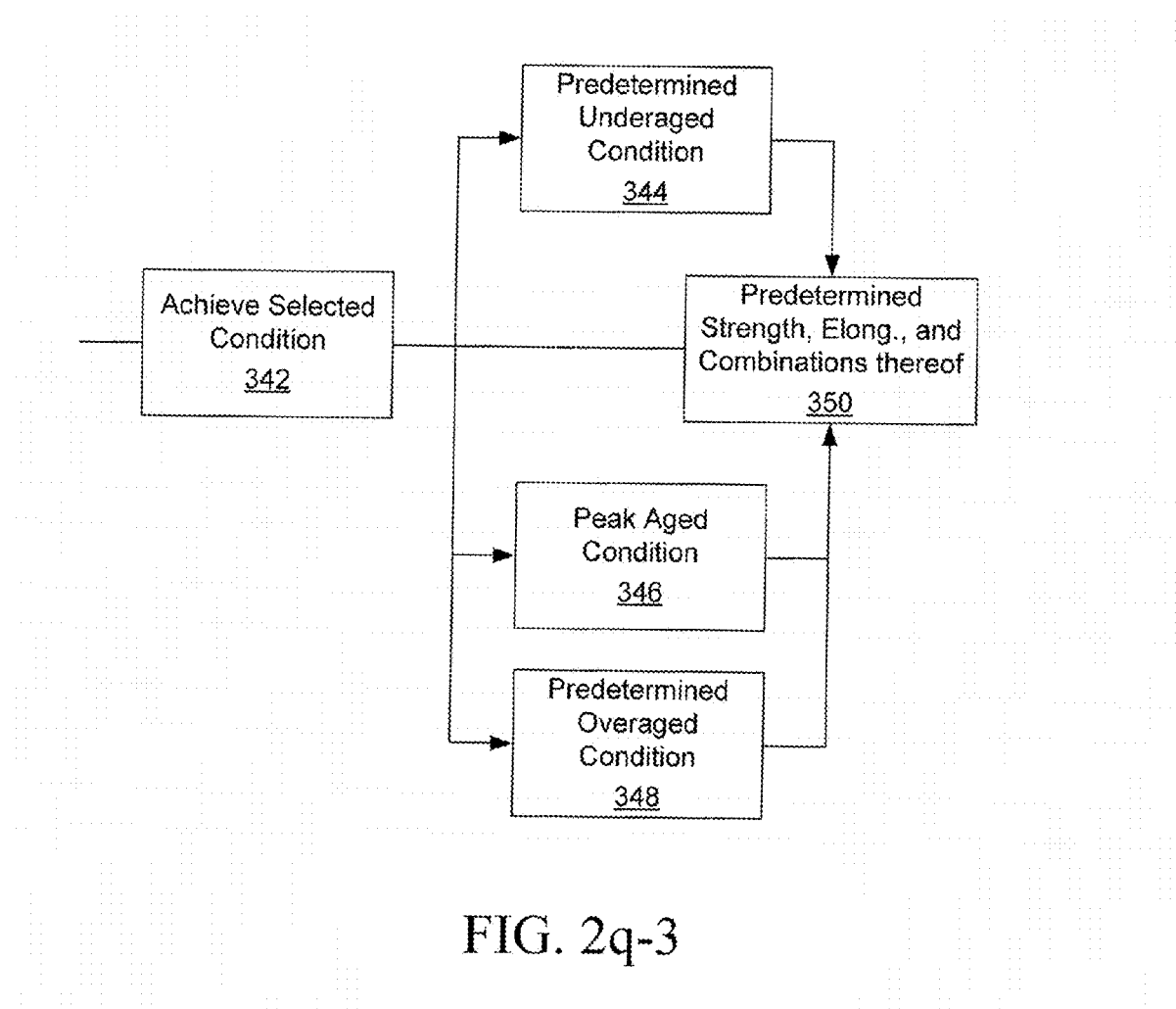
Figures 2, 2Q, 3, 4:
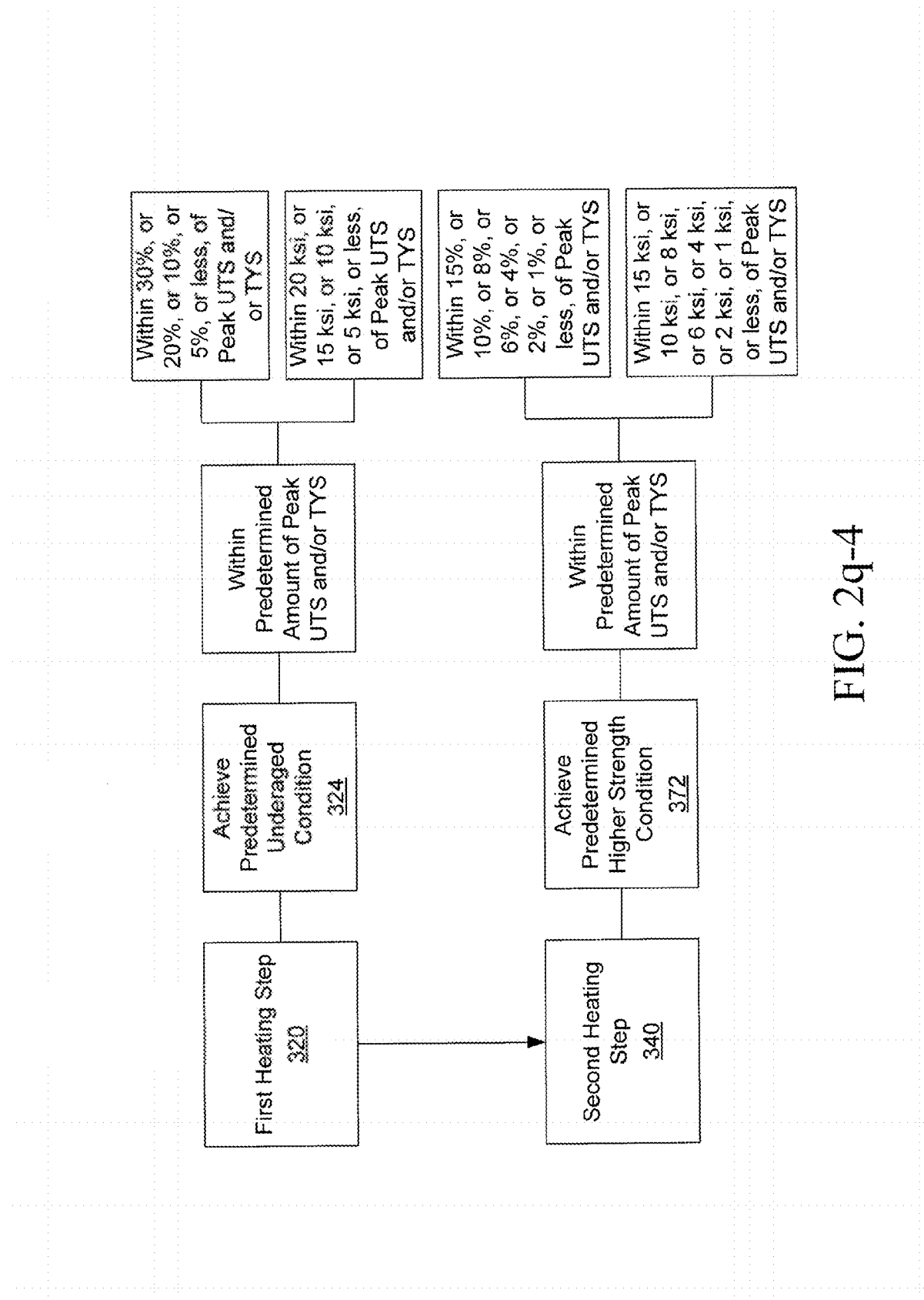
Figures 2, 2Q, 3, 4, 5:
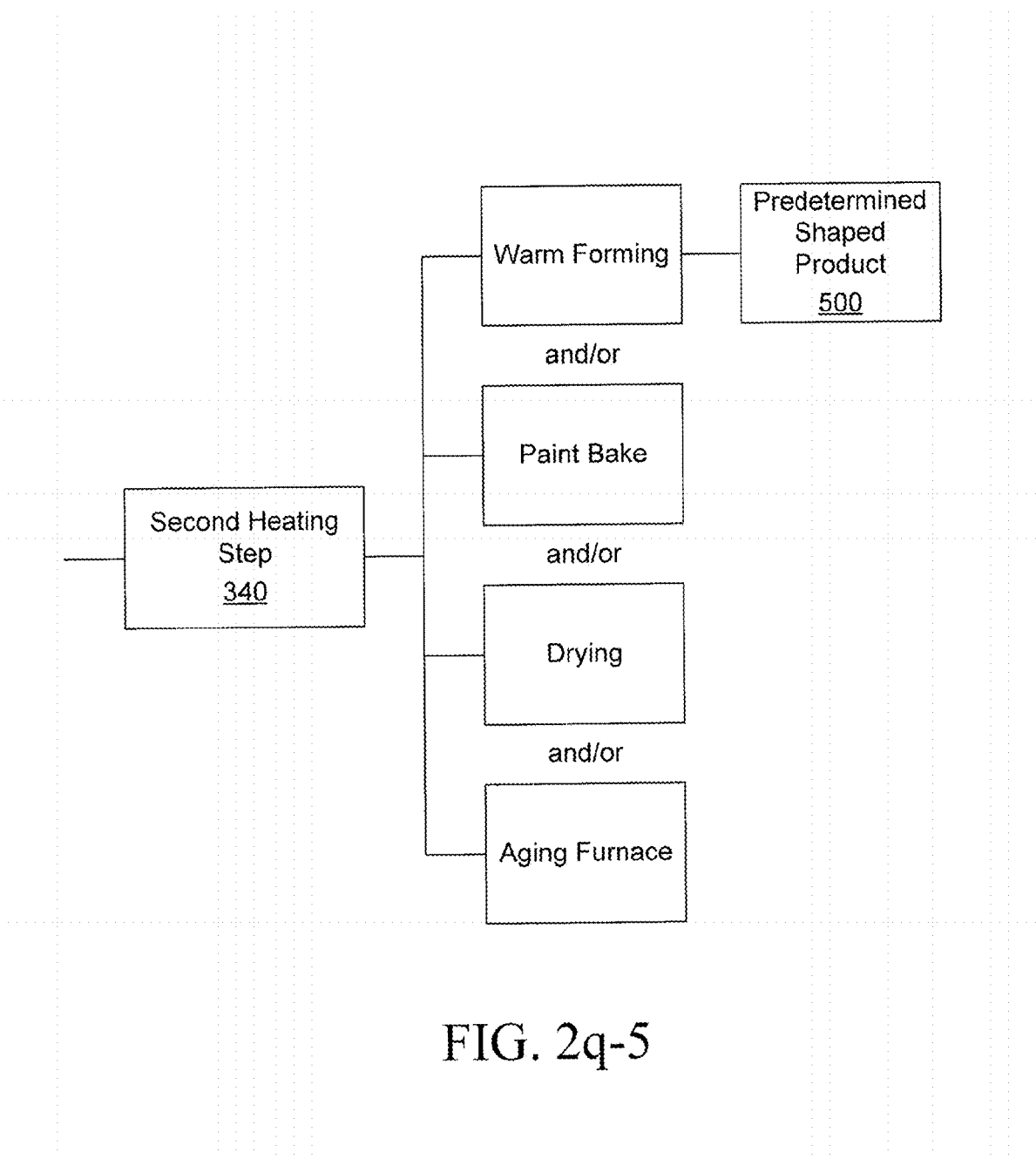
Figures 2, 2Q, 3, 4, 5, 6:
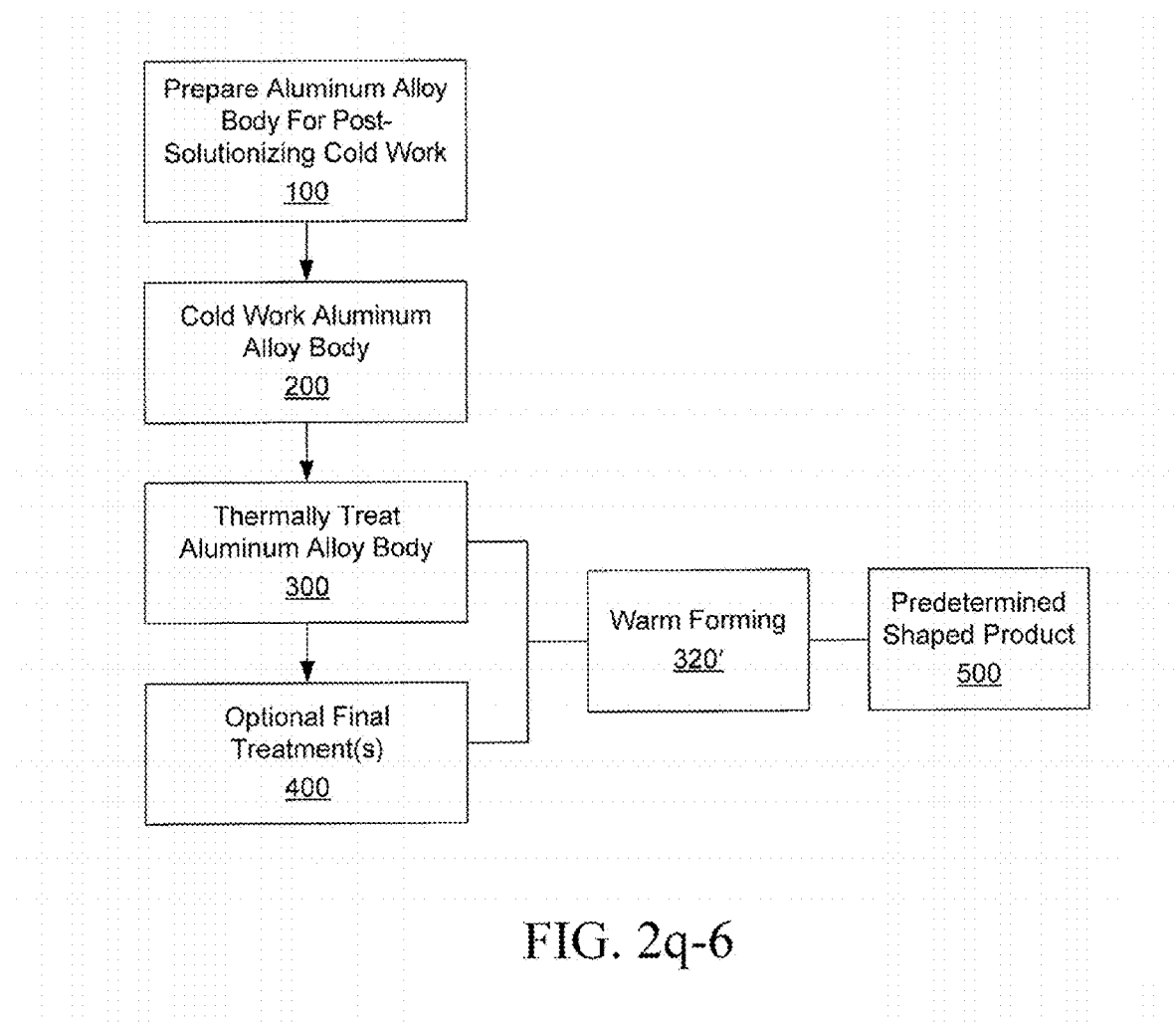
Figures 2, 2Q, 3, 4, 5, 6, 7:
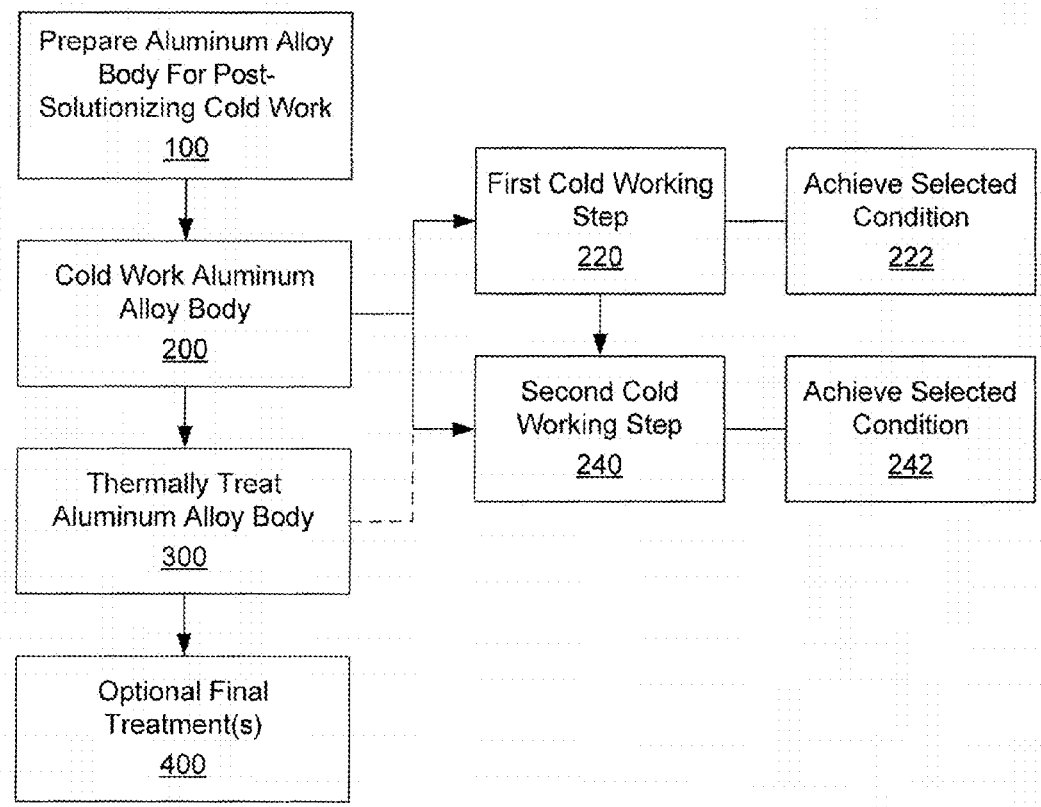
Figures 2, 2Q, 3, 4, 5, 6, 7, 8:
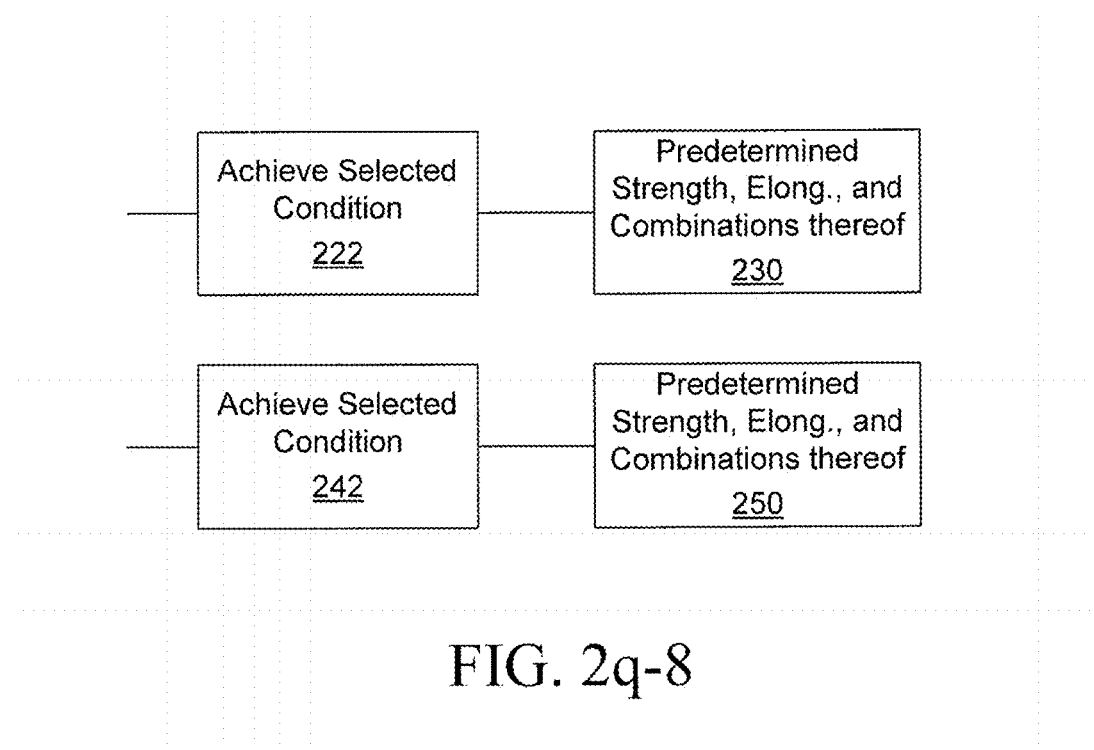
Figures 2, 2Q, 3, 4, 5, 6, 7, 8, 9:
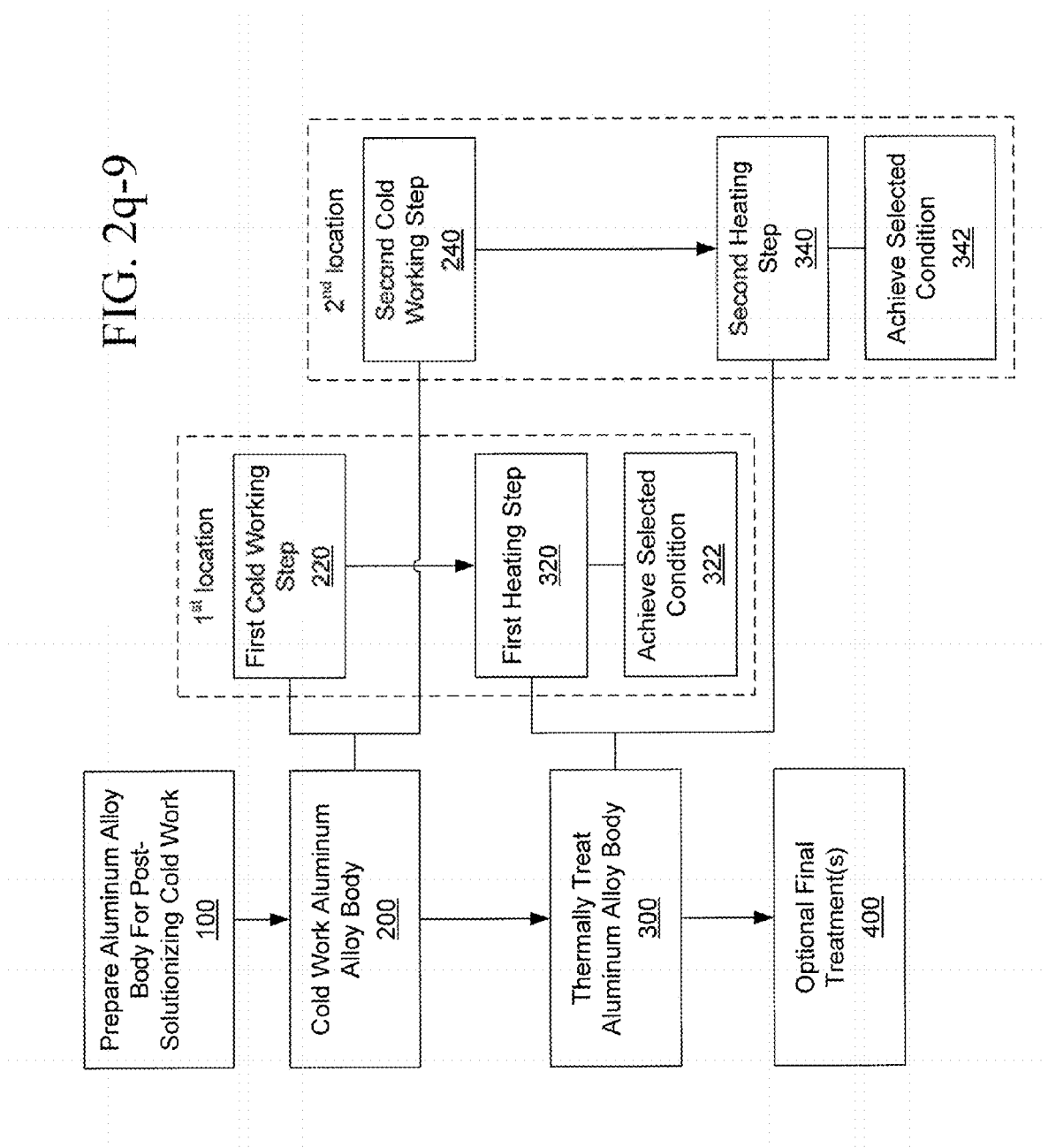
Figure 2R:
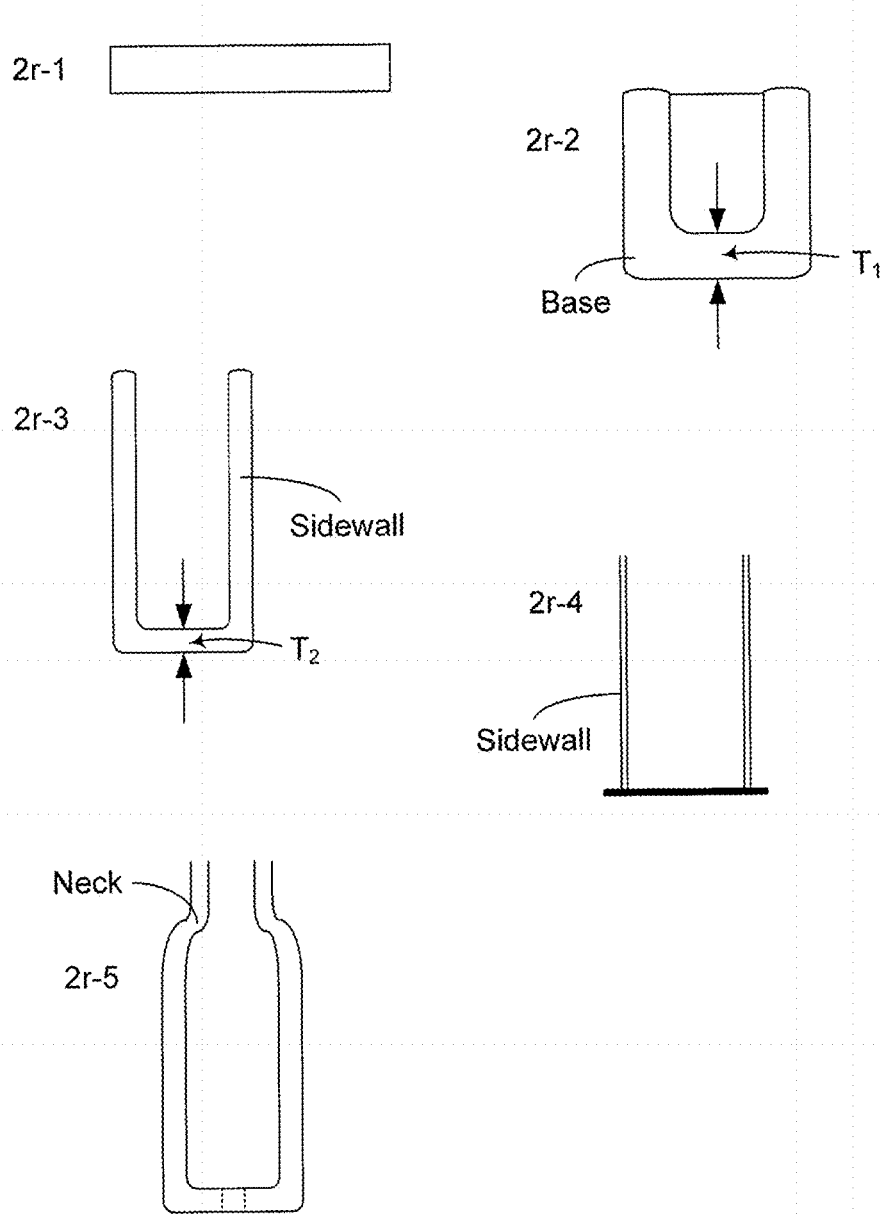
FIG. 2r illustrates various schematic views of various aluminum alloy ammunition cartridges, in intermediate and final forms.
Figures 1, 2S:
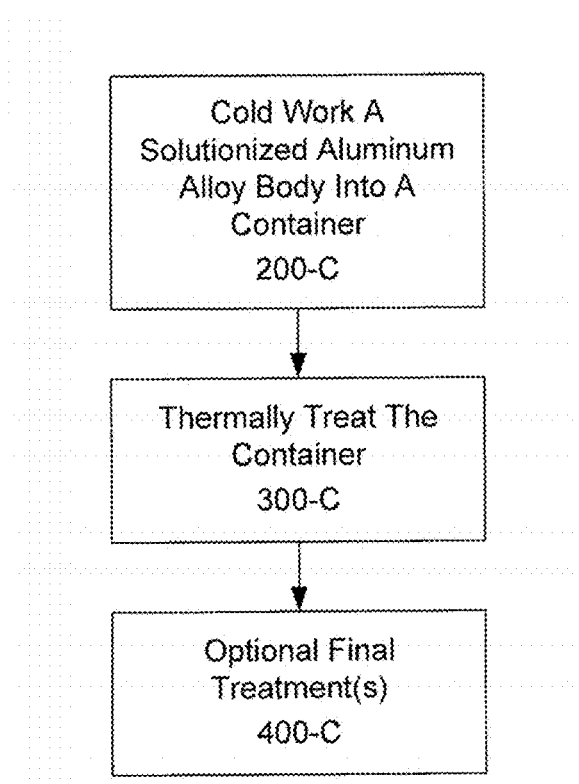
Figures 2, 2S:
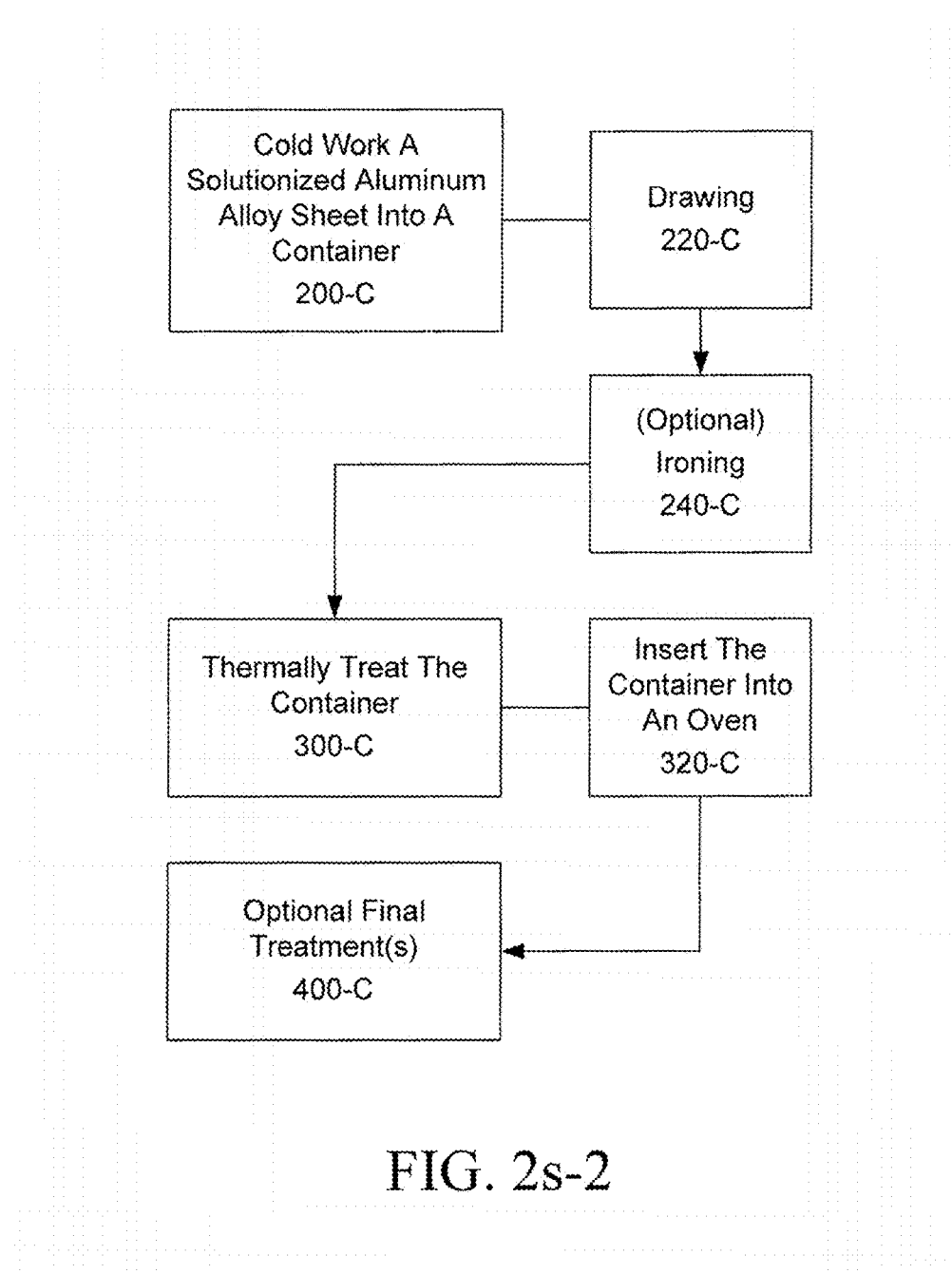
Figures 2, 2S, 3:
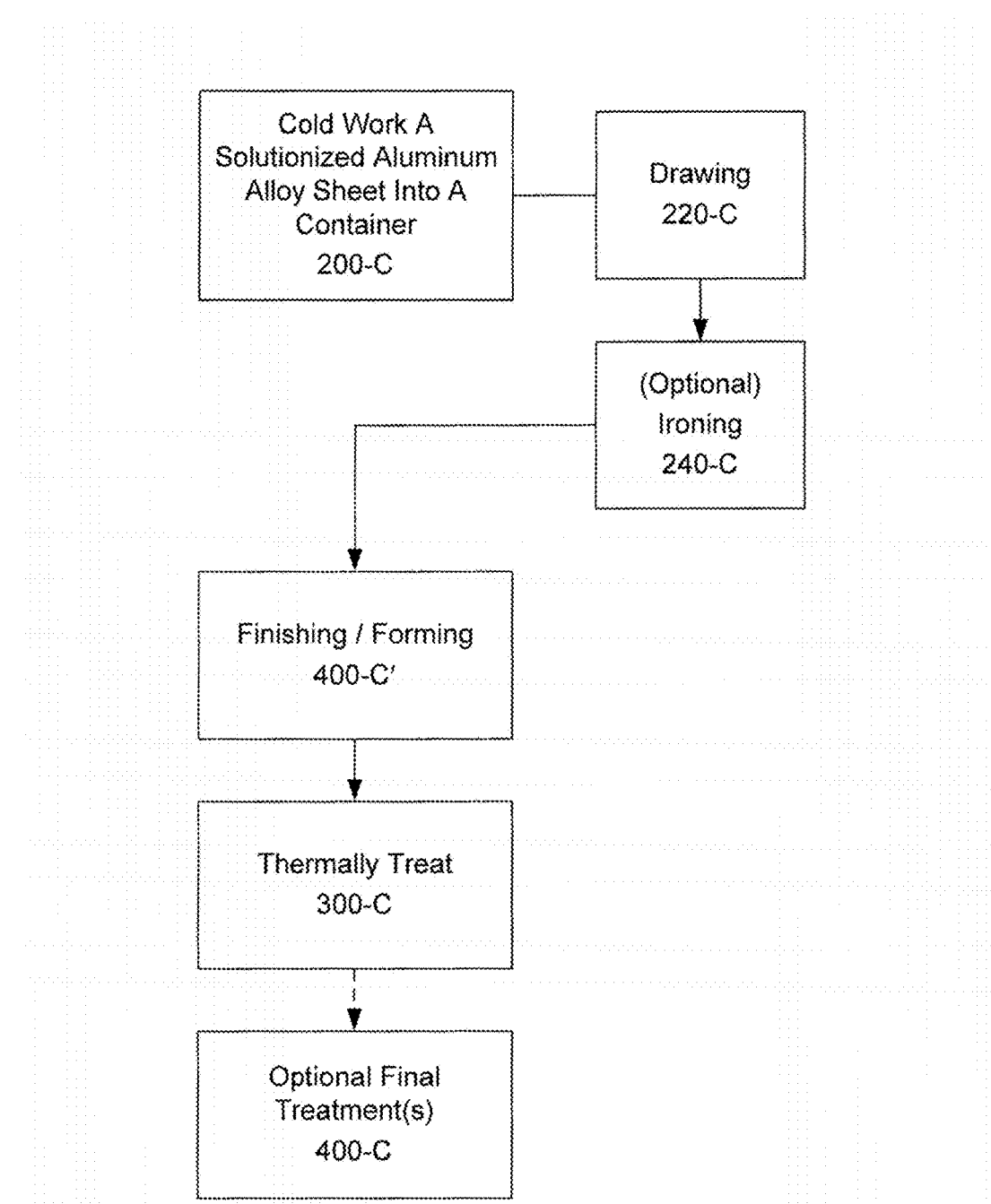
Figures 2, 2S, 3, 4:
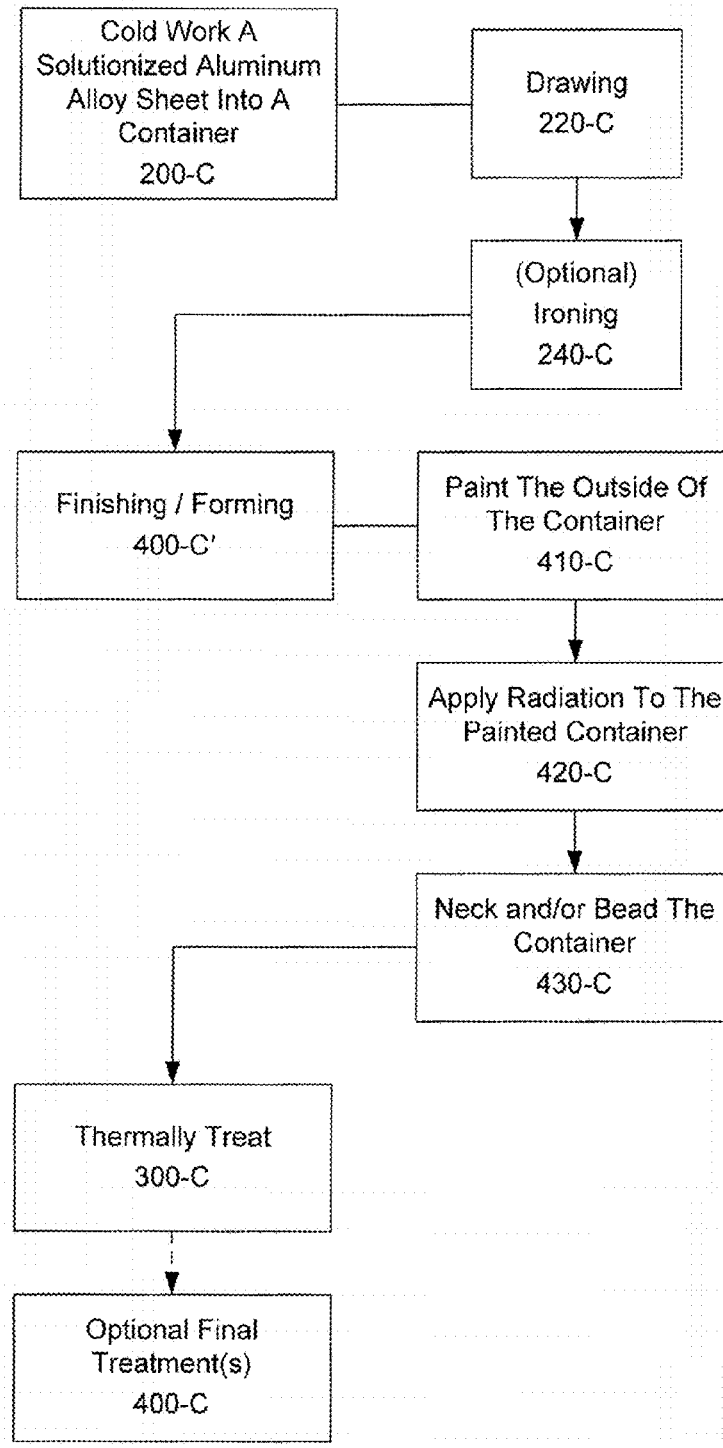
Figures 2, 2S, 3, 4, 5:
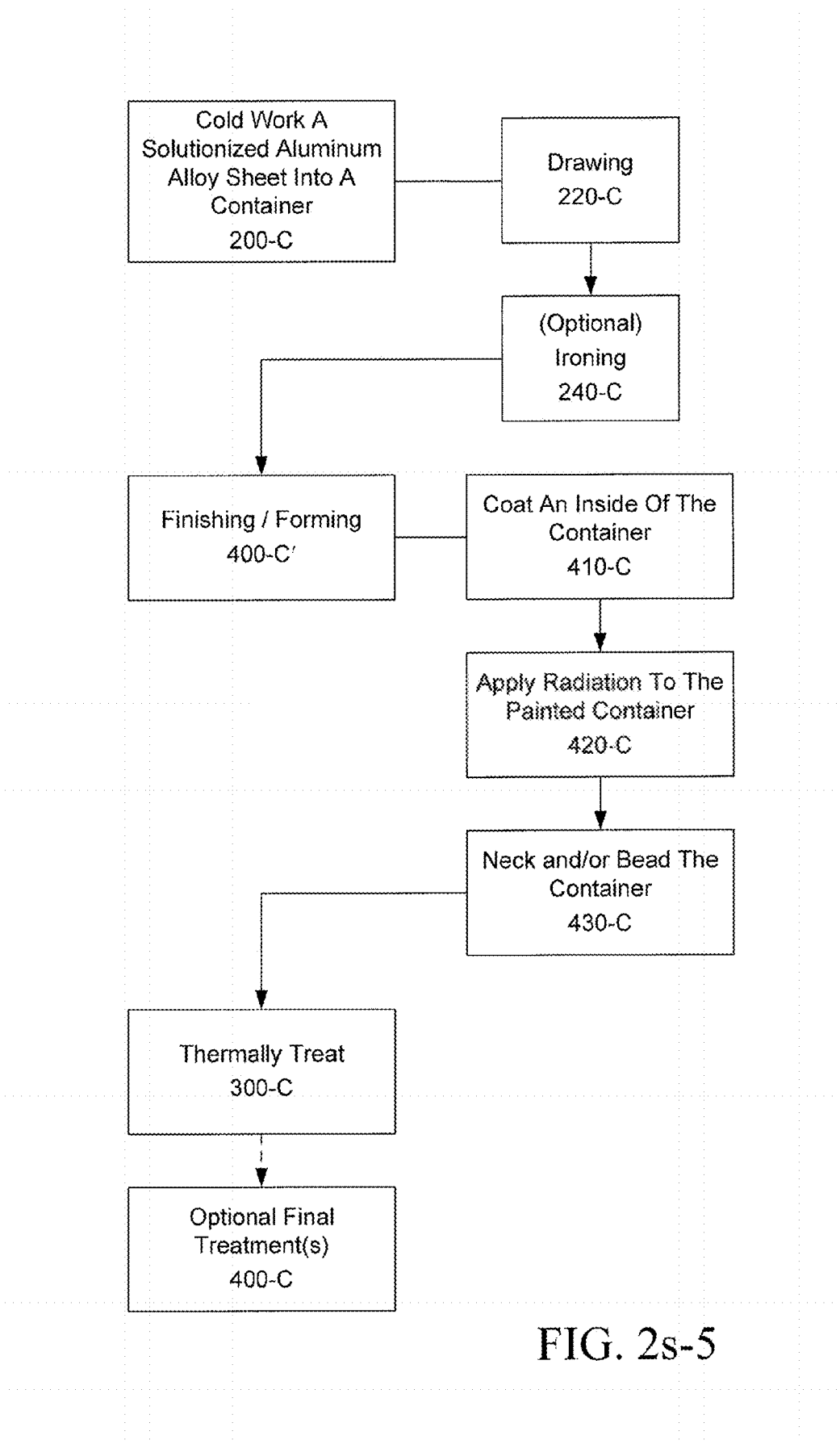
Figures 1, 2, 2T:
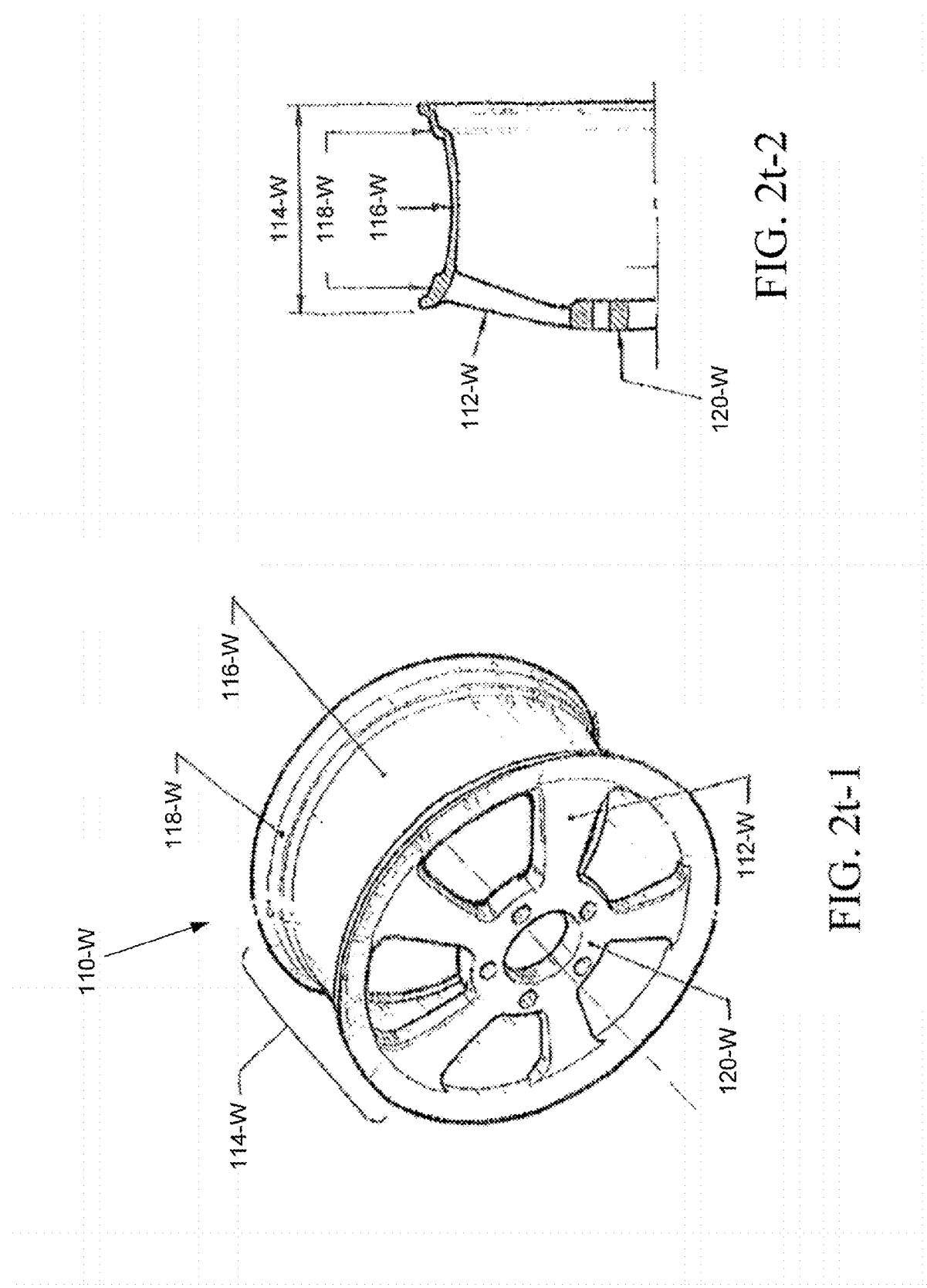
Figure 3:
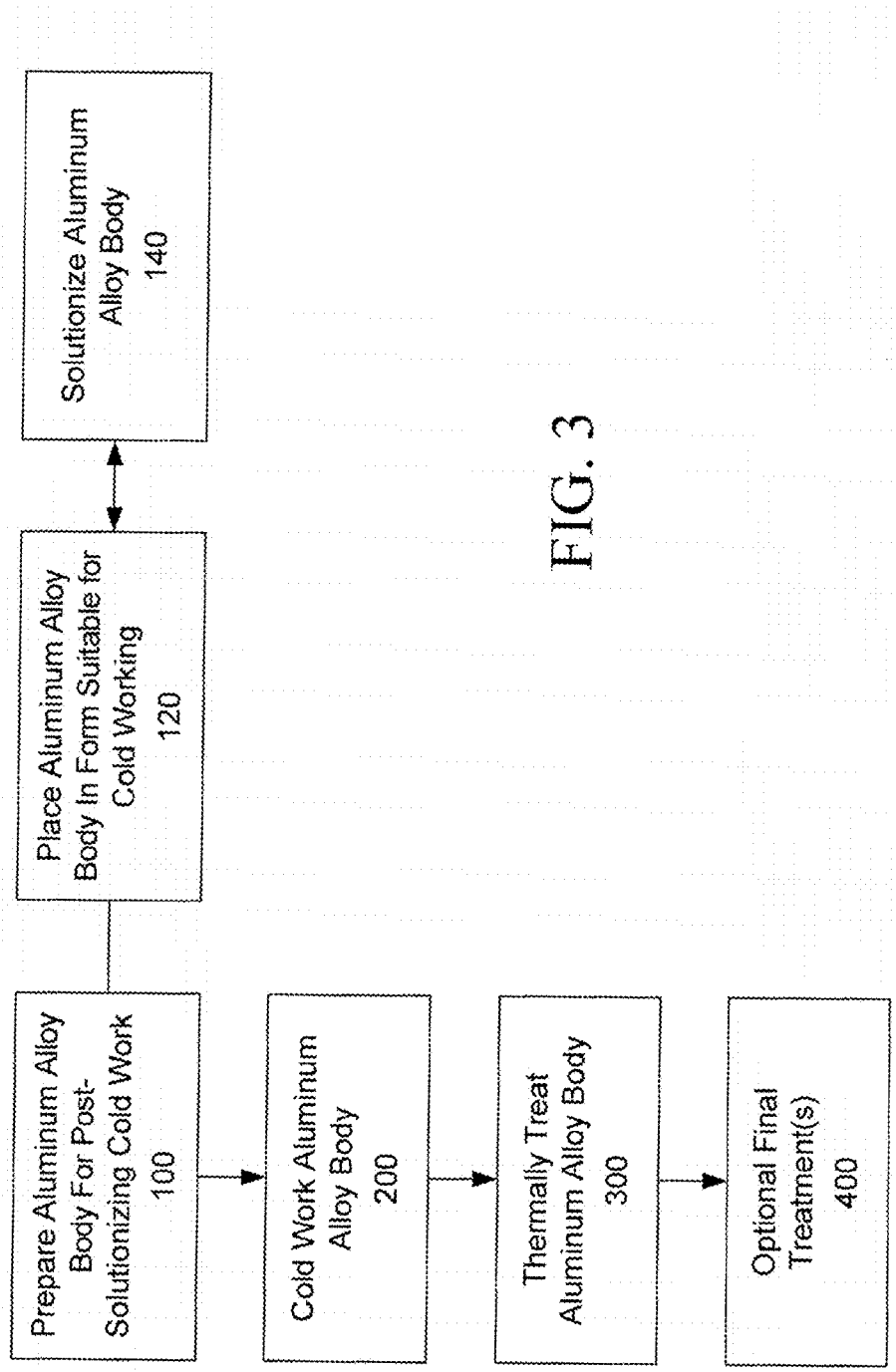
Figure 4:
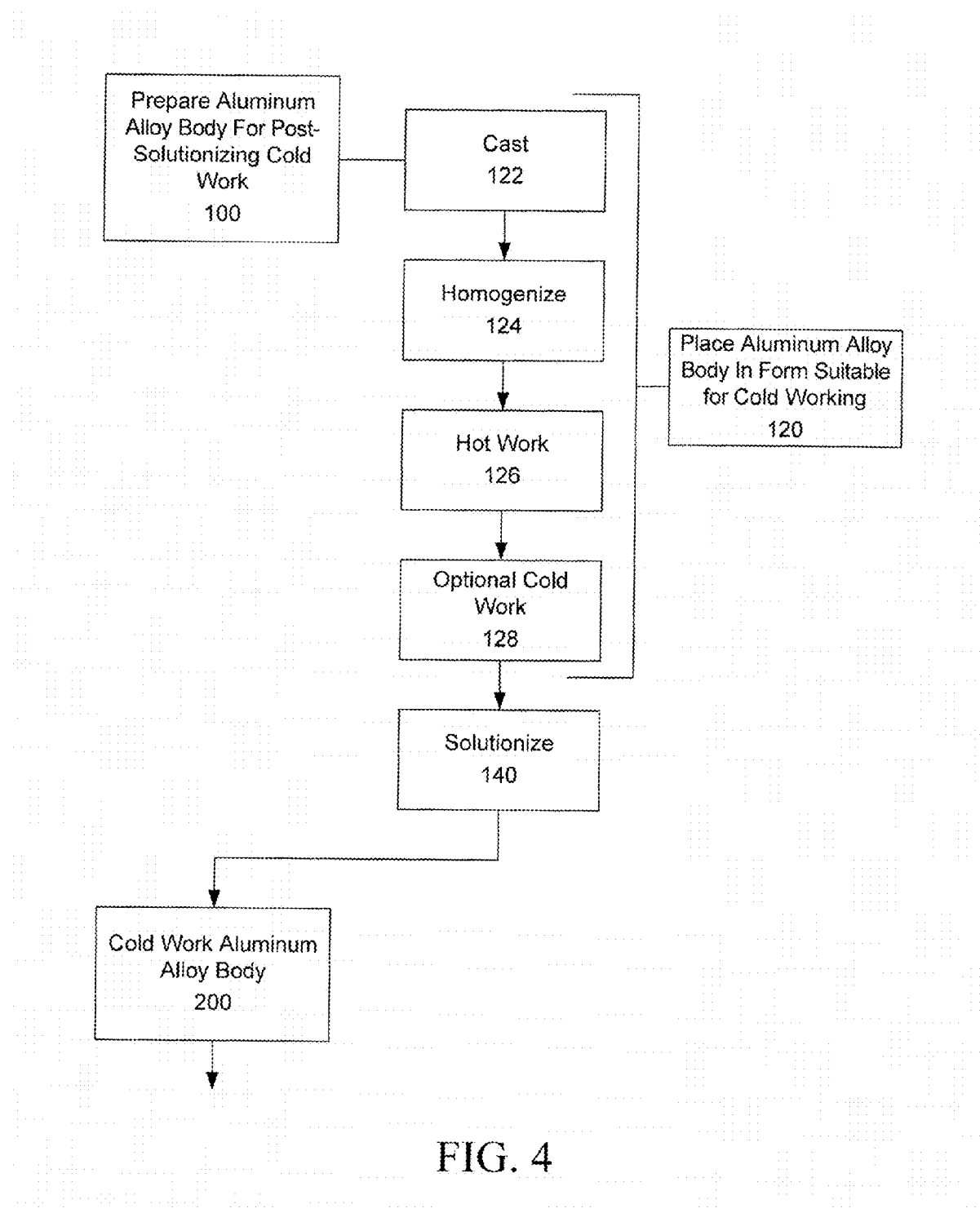
Figure 5:
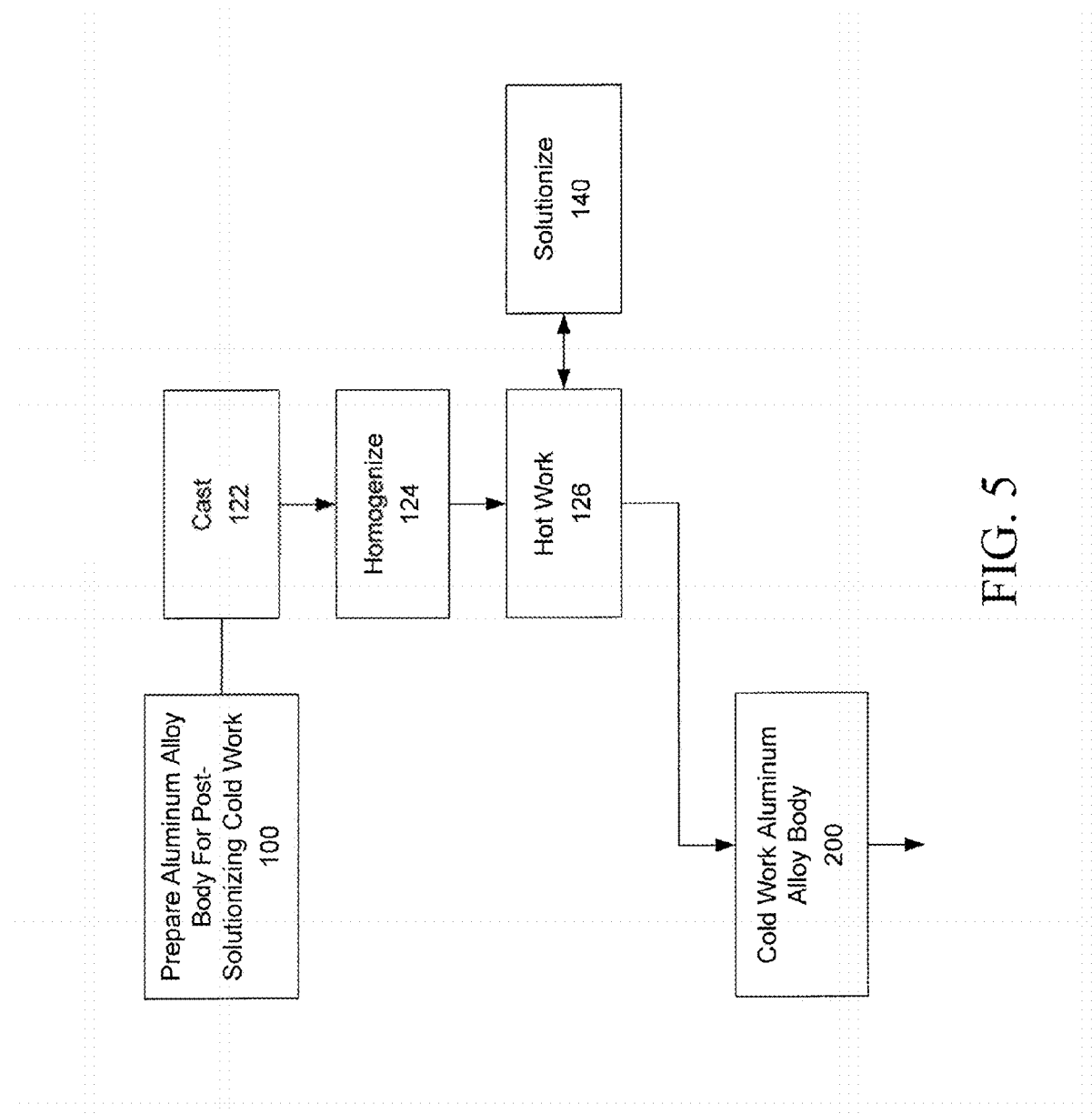
Figure 6A:
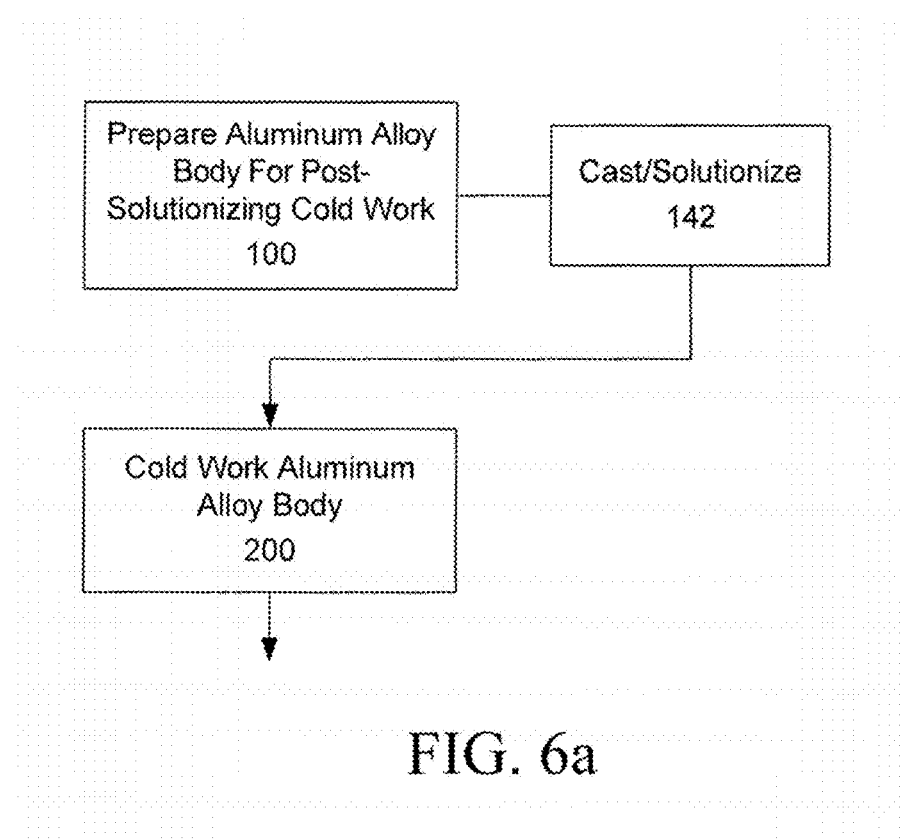
FIG. 6a is a flow chart illustrating one embodiment of preparing an aluminum alloy body for post-solutionizing cold work, where the solutionizing step is completed concomitant to a placing step (e.g., concomitant to a continuous casting step).
Figures 1, 6B:
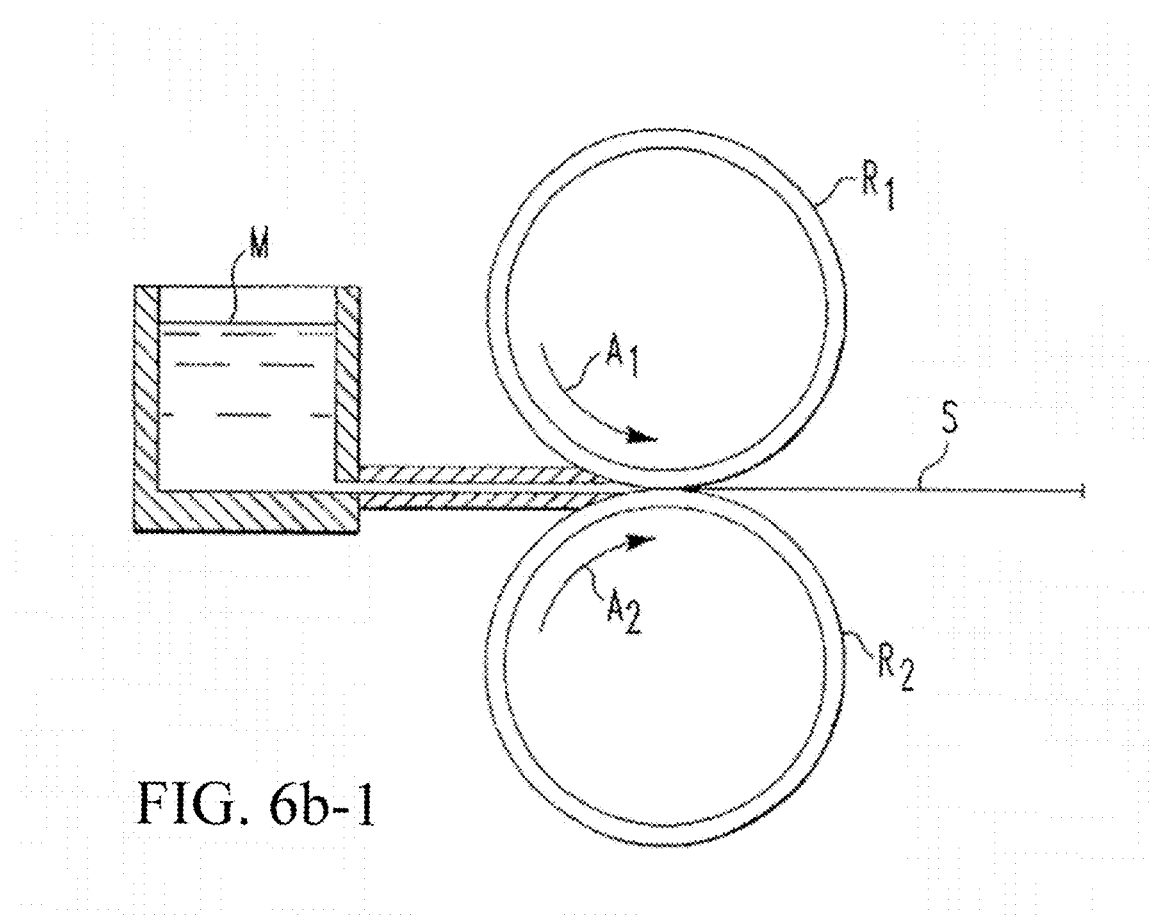
Figures 2, 6B:
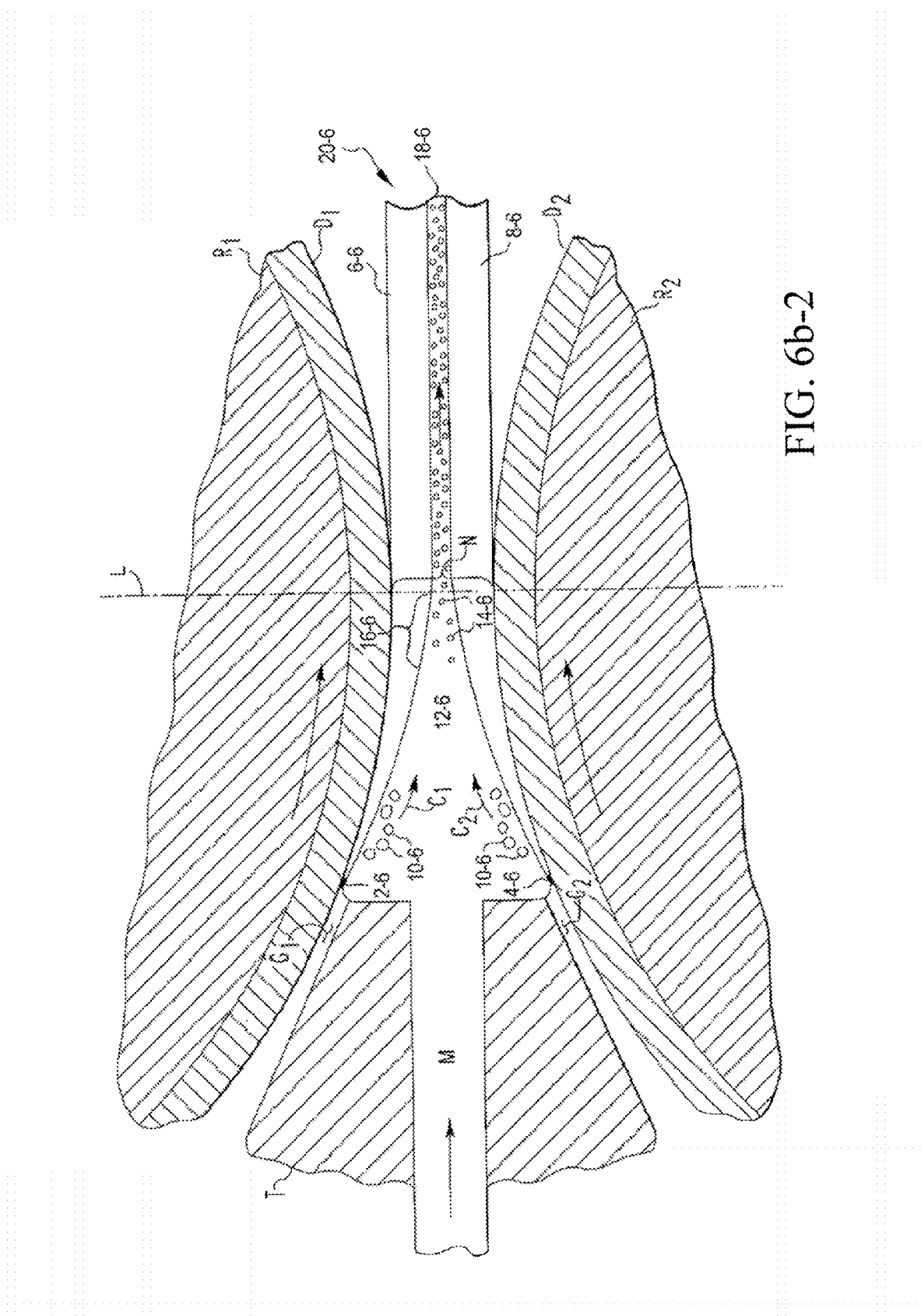
Figure 6G:
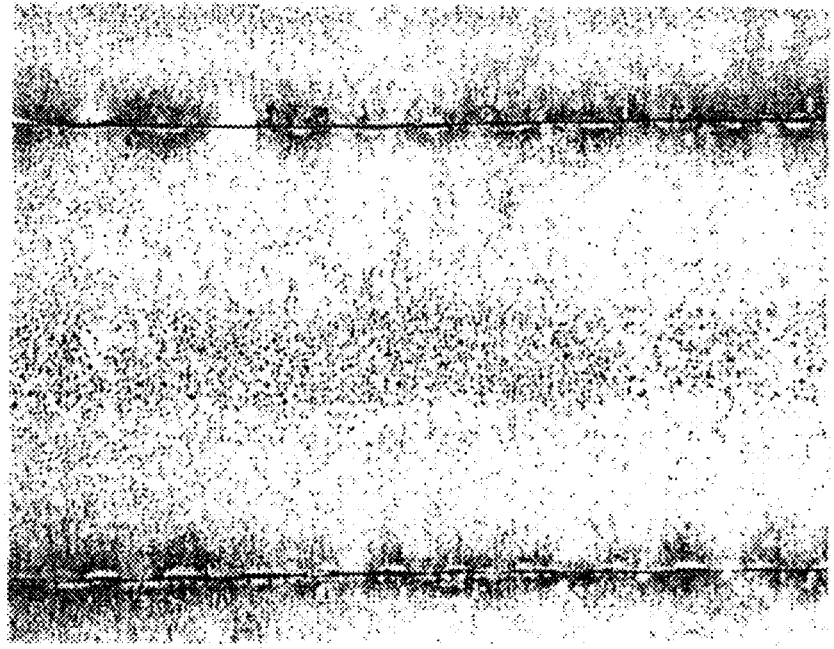
Figure 6H:
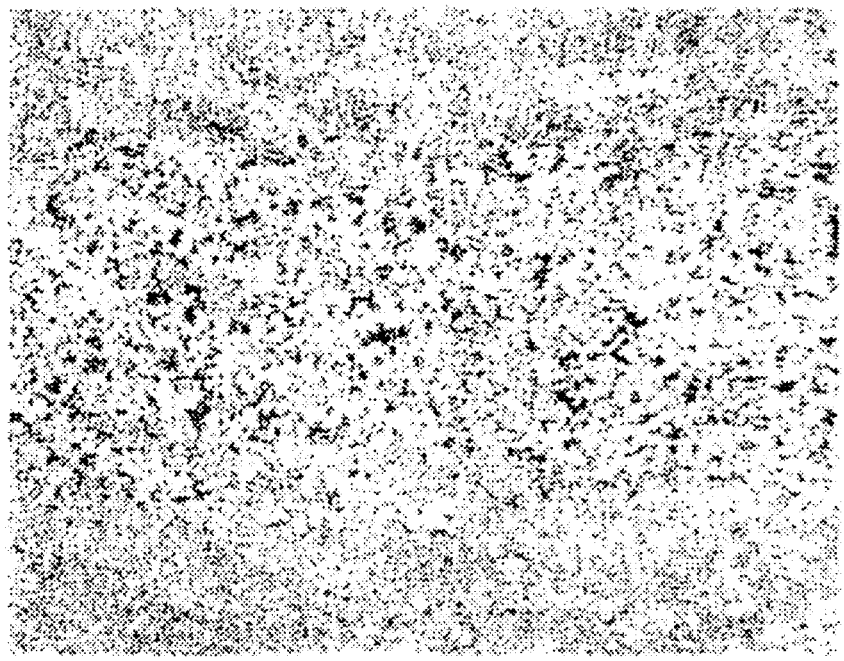
Figure 6K:
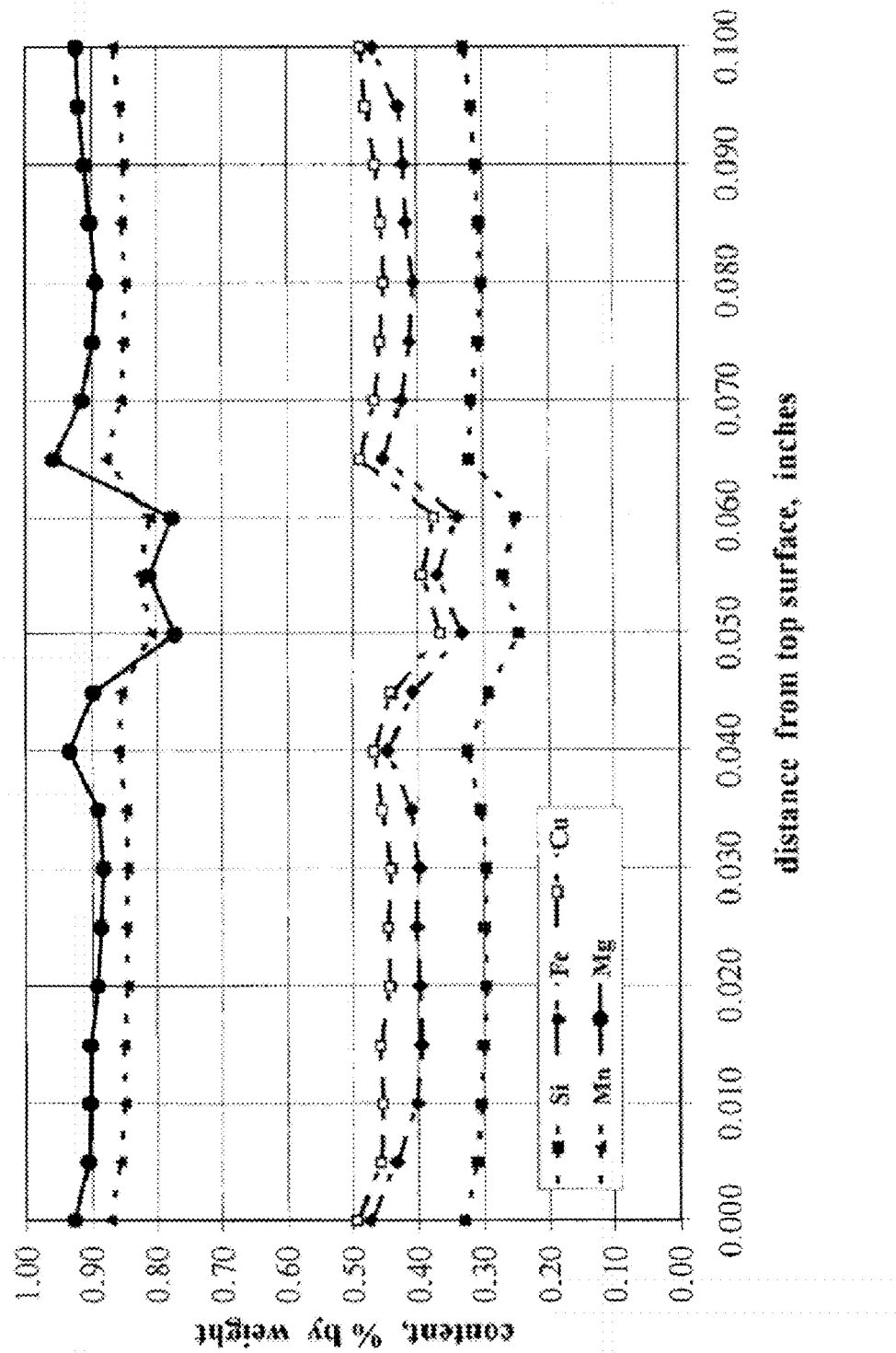
Figure 61:
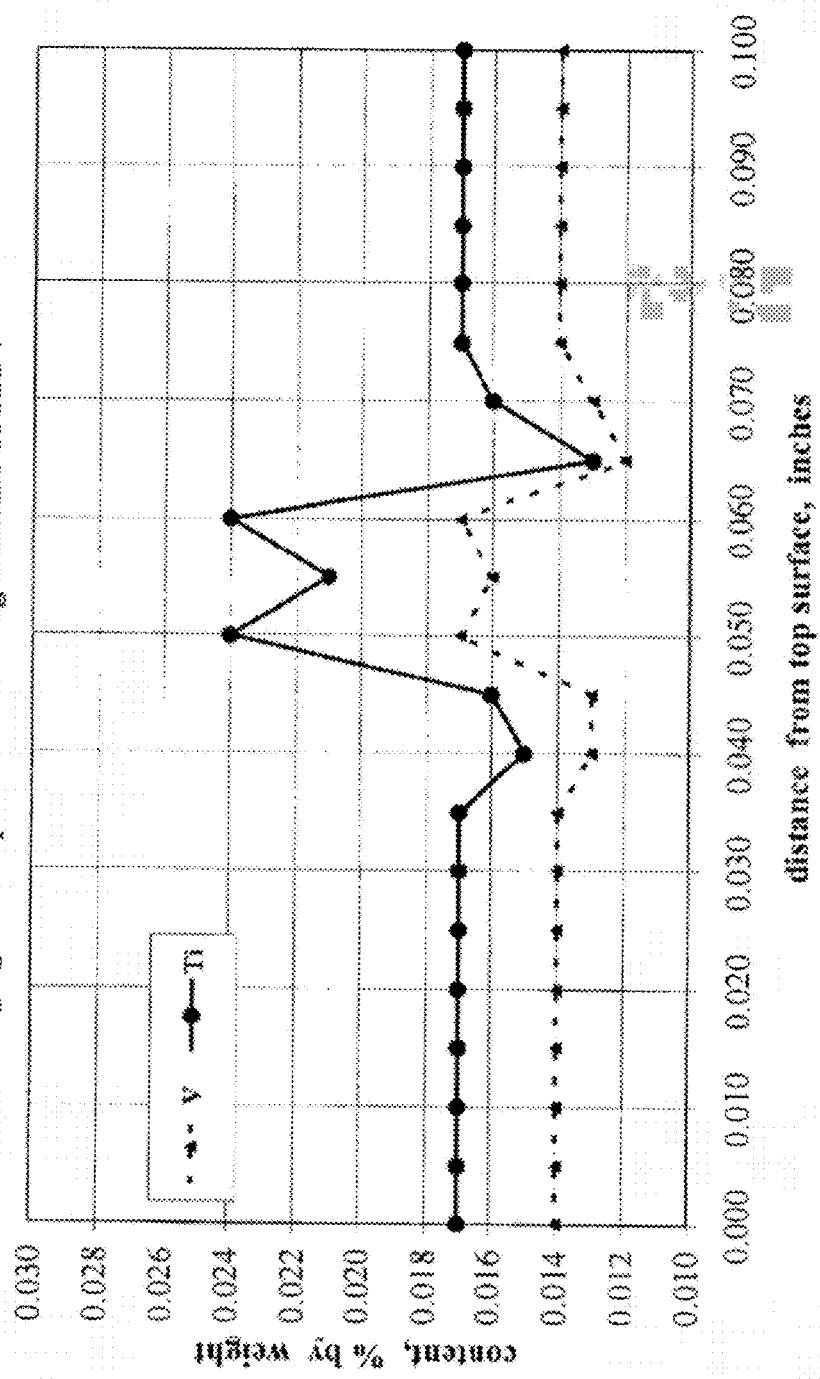
Figure 6M:
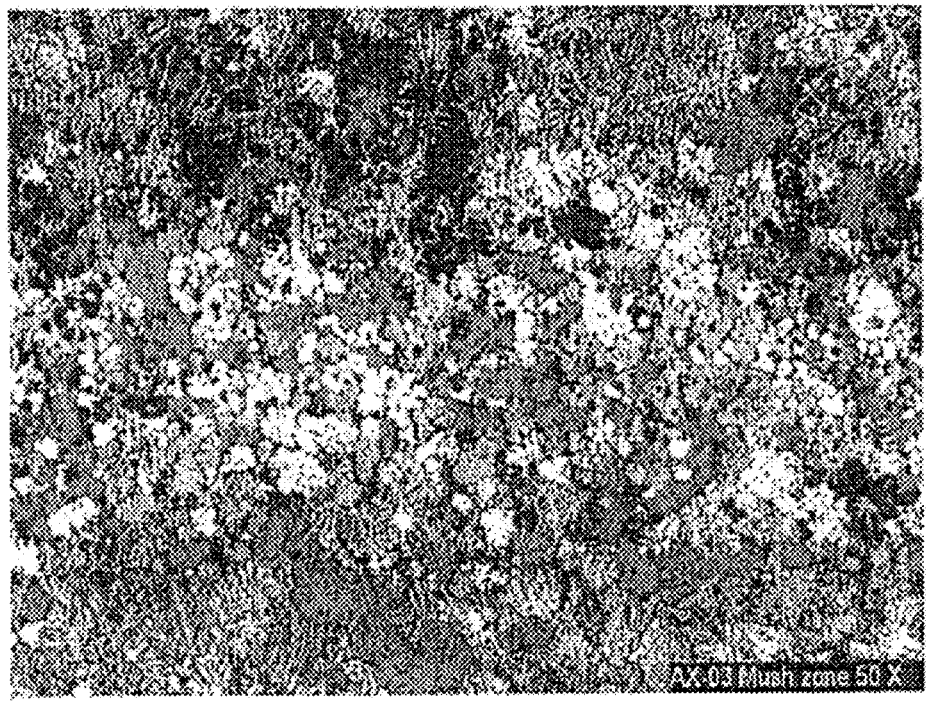
Figure 6P:
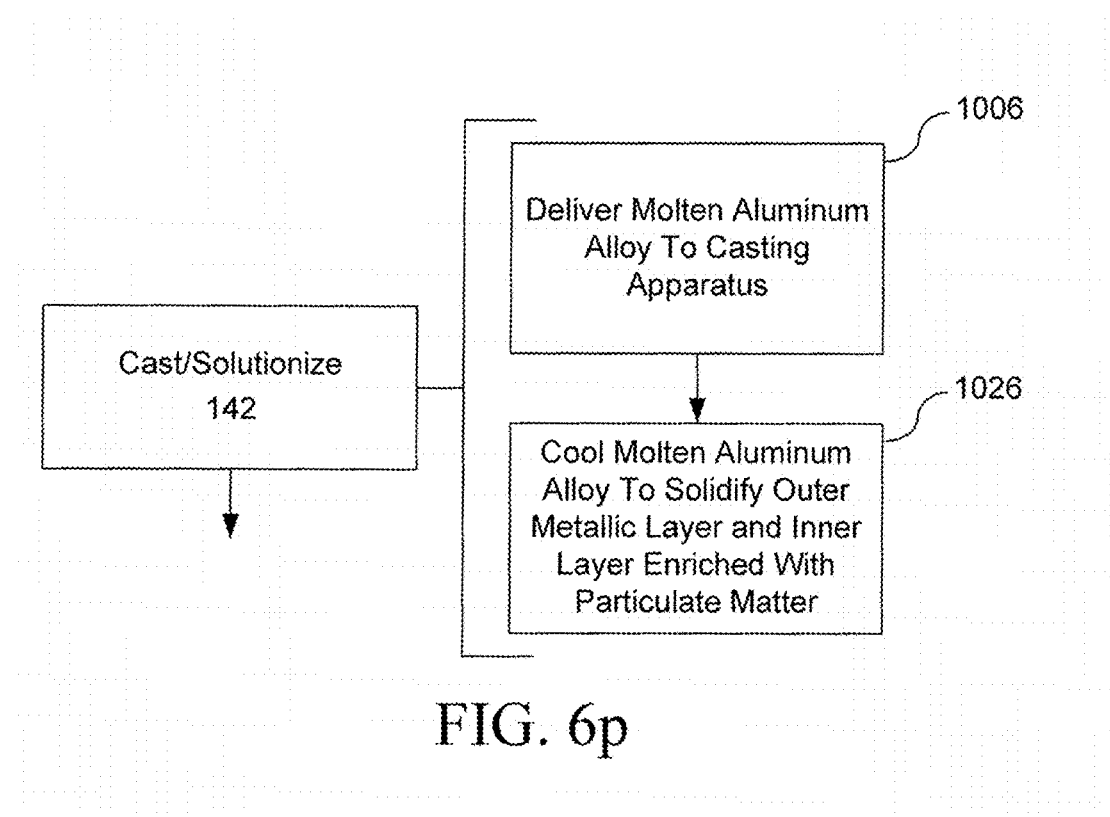
FIG. 6p is a flow chart illustrating one embodiment of completing a concomitant casting and solutionizing step to produce an aluminum alloy body having particulate matter therein.
Figure 6Q:
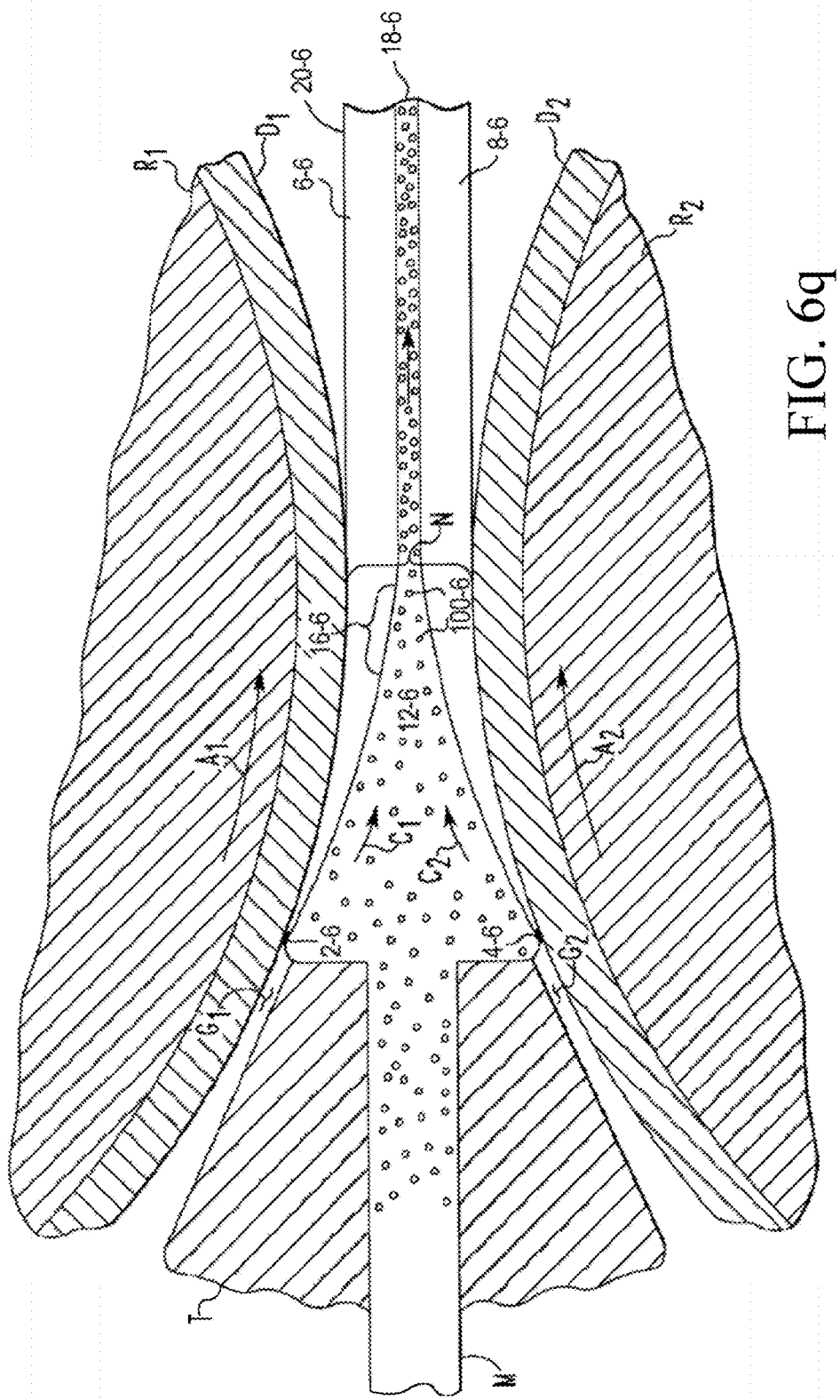
FIG. 6q is a schematic view illustrating one embodiment of a continuous casting apparatus for preparing aluminum alloy bodies for post-solutionizing cold work in accordance with FIGS. 6a and 6p, where such aluminum alloy bodies contain particulate matter therein.
Figure 6R:
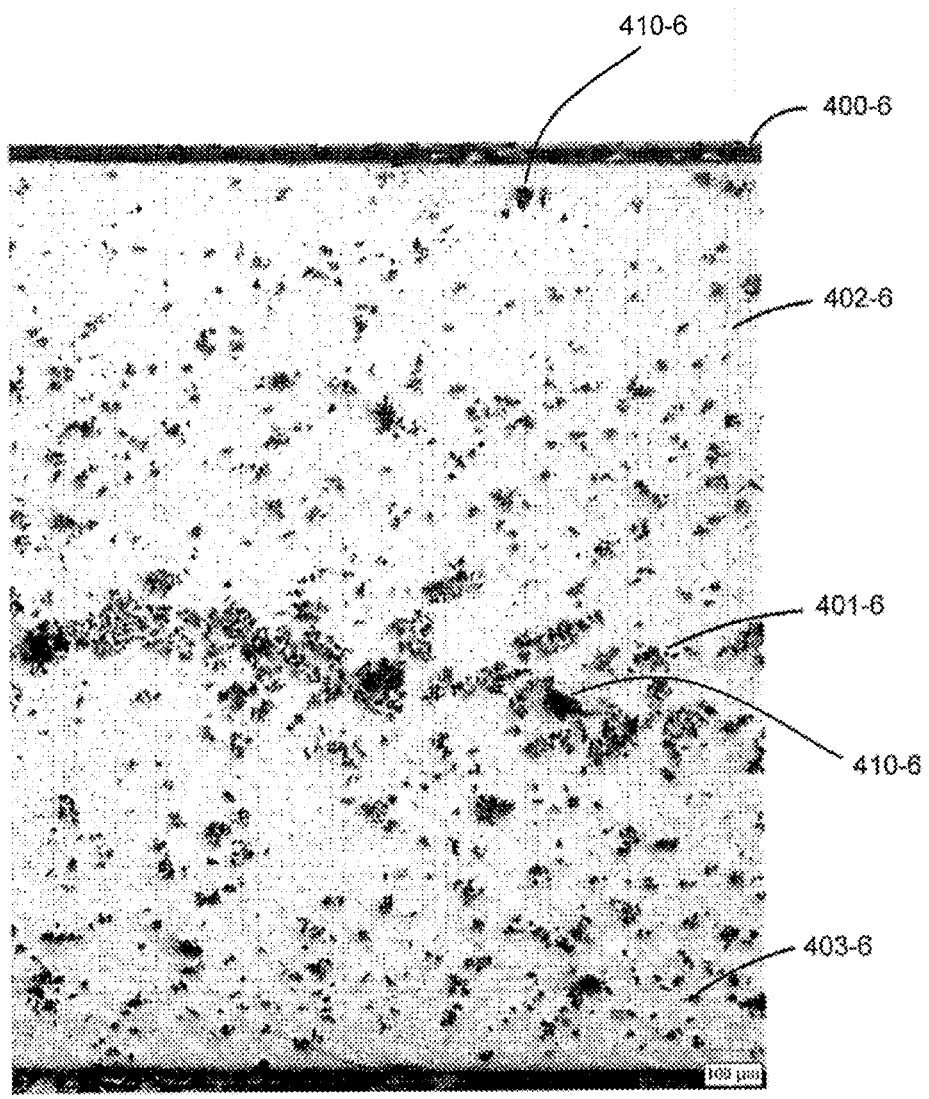
FIGS. 6r-6s are micrographs of aluminum alloy bodies produced in accordance with the continuous casting apparatus of FIG. 6q having particulate matter therein.
Figure 6S:
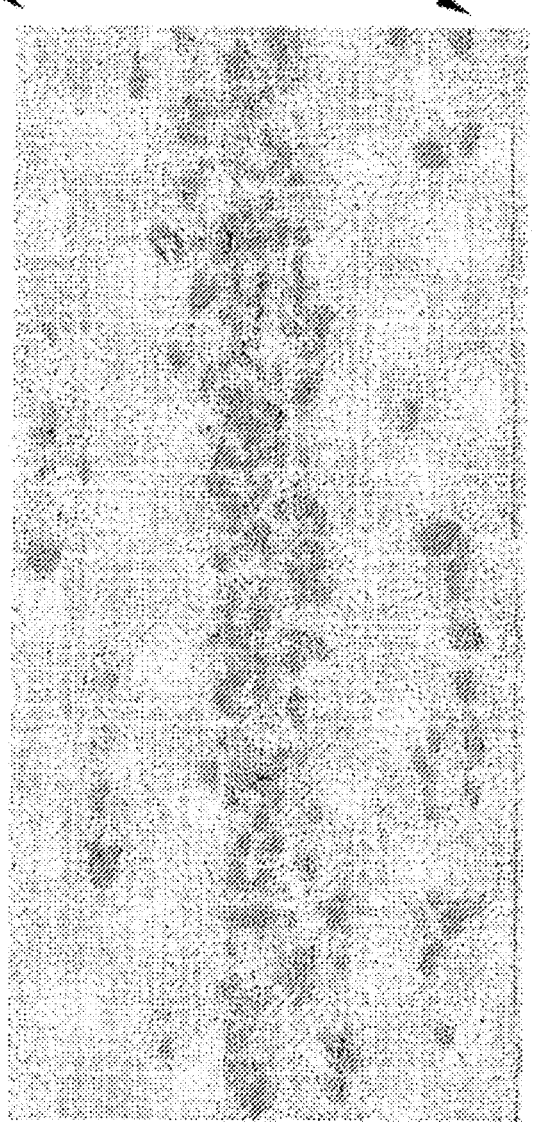
Figure 6T:
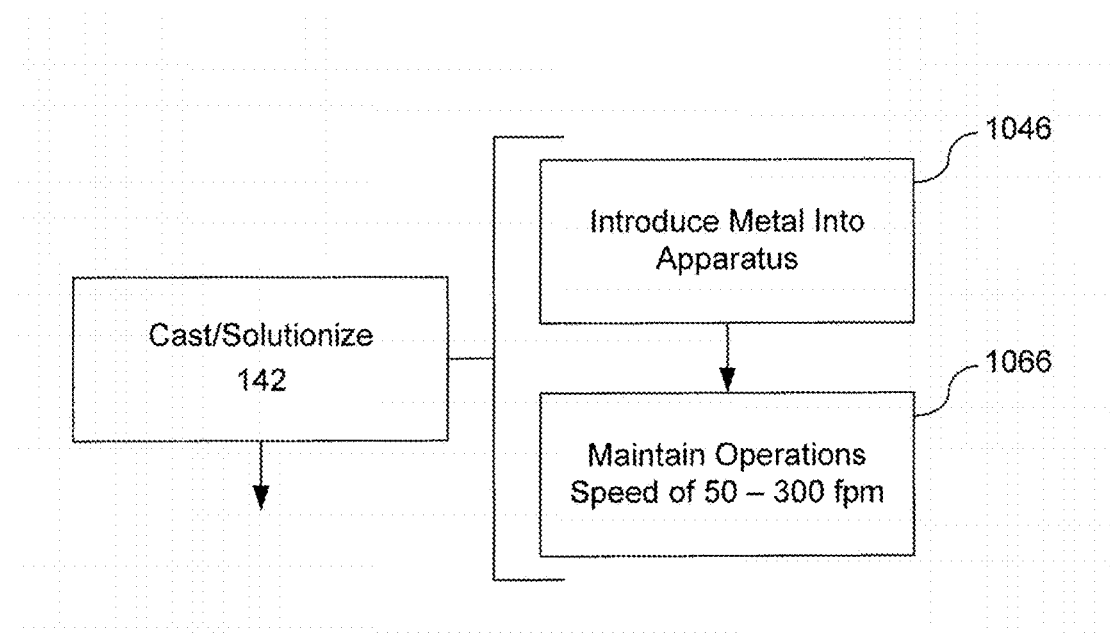
FIG. 6t is a flow chart illustrating one embodiment of completing a concomitant casting and solutionizing step to produce an aluminum alloy body having immiscible metal therein.
Figure 6U:
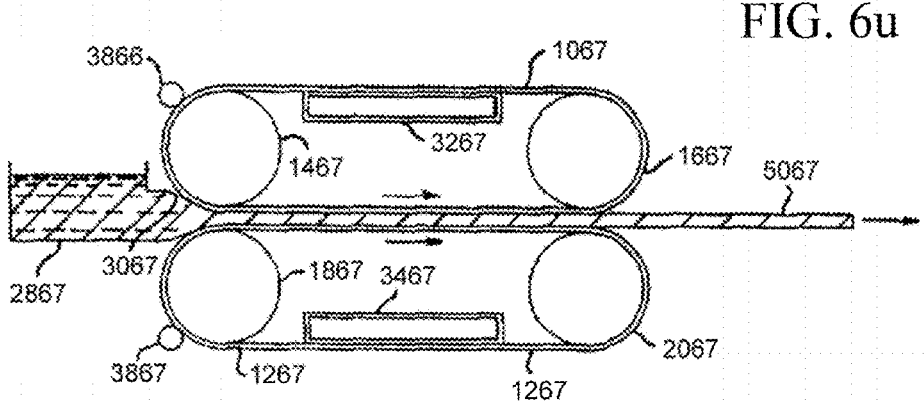
FIGS. 6u-6w are schematic views illustrating one embodiment of a continuous casting apparatus for preparing aluminum alloy bodies for post-solutionizing cold work in accordance with FIGS. 6a and 6t, where such aluminum alloy bodies contain immiscible metal therein.
Figure 6V:
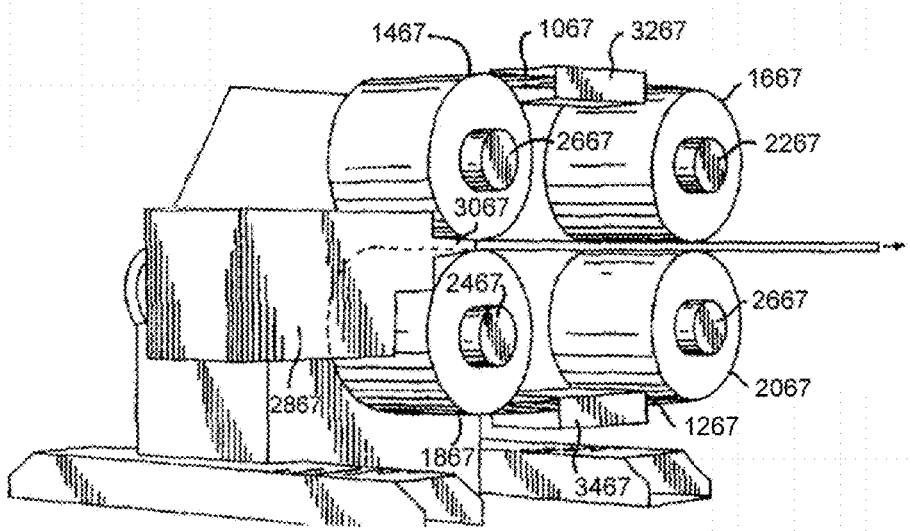
Figure 6W:
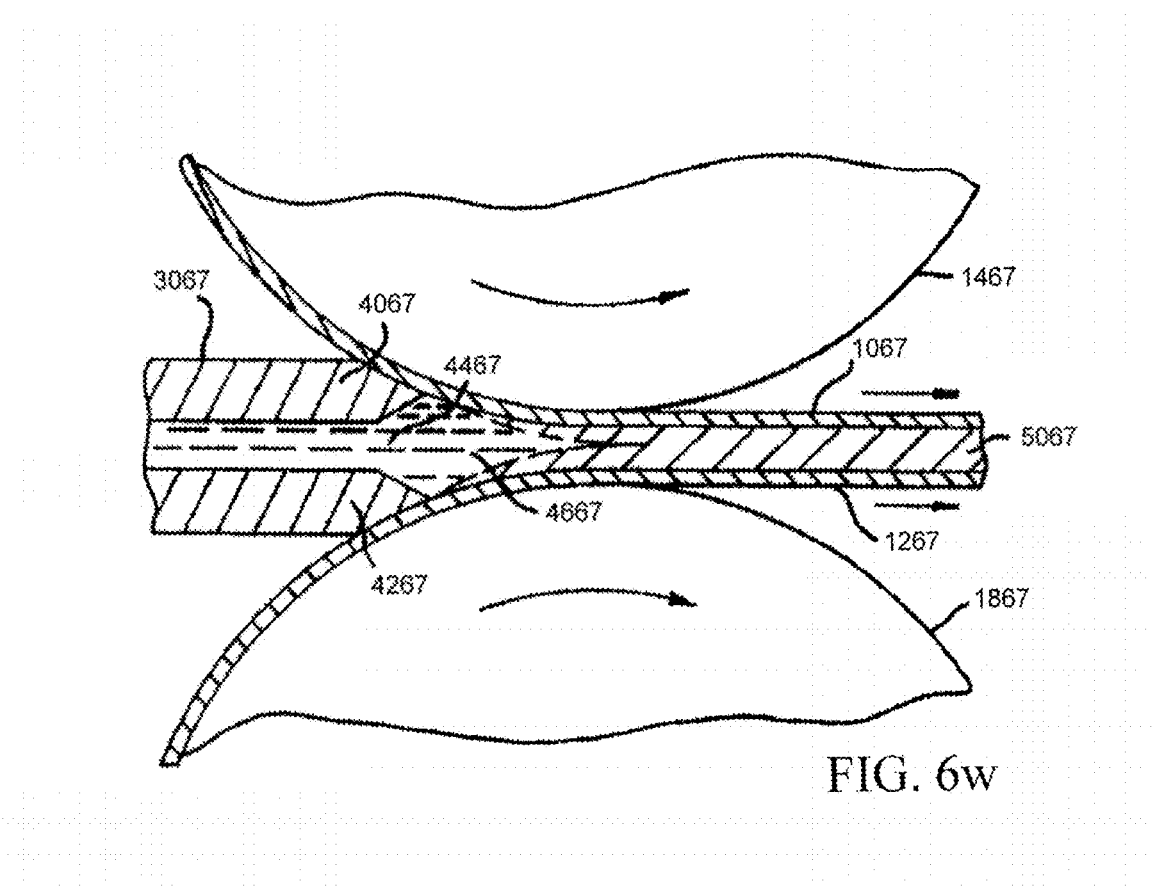
Figure 6X:
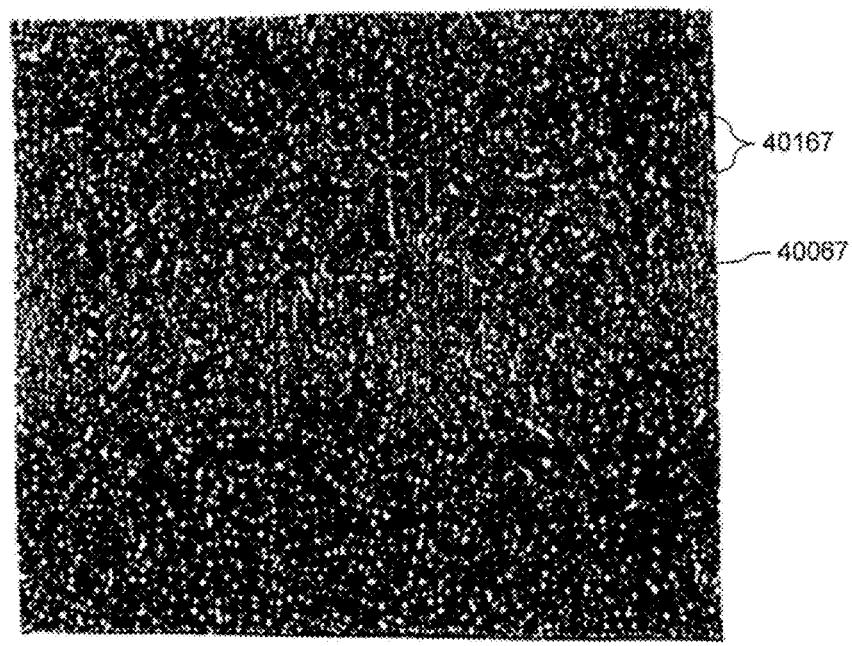
FIG. 6x is a micrograph of an aluminum alloy body produced in accordance with the continuous casting apparatus of FIGS. 6u-w having immiscible metal therein.
Figure 7:
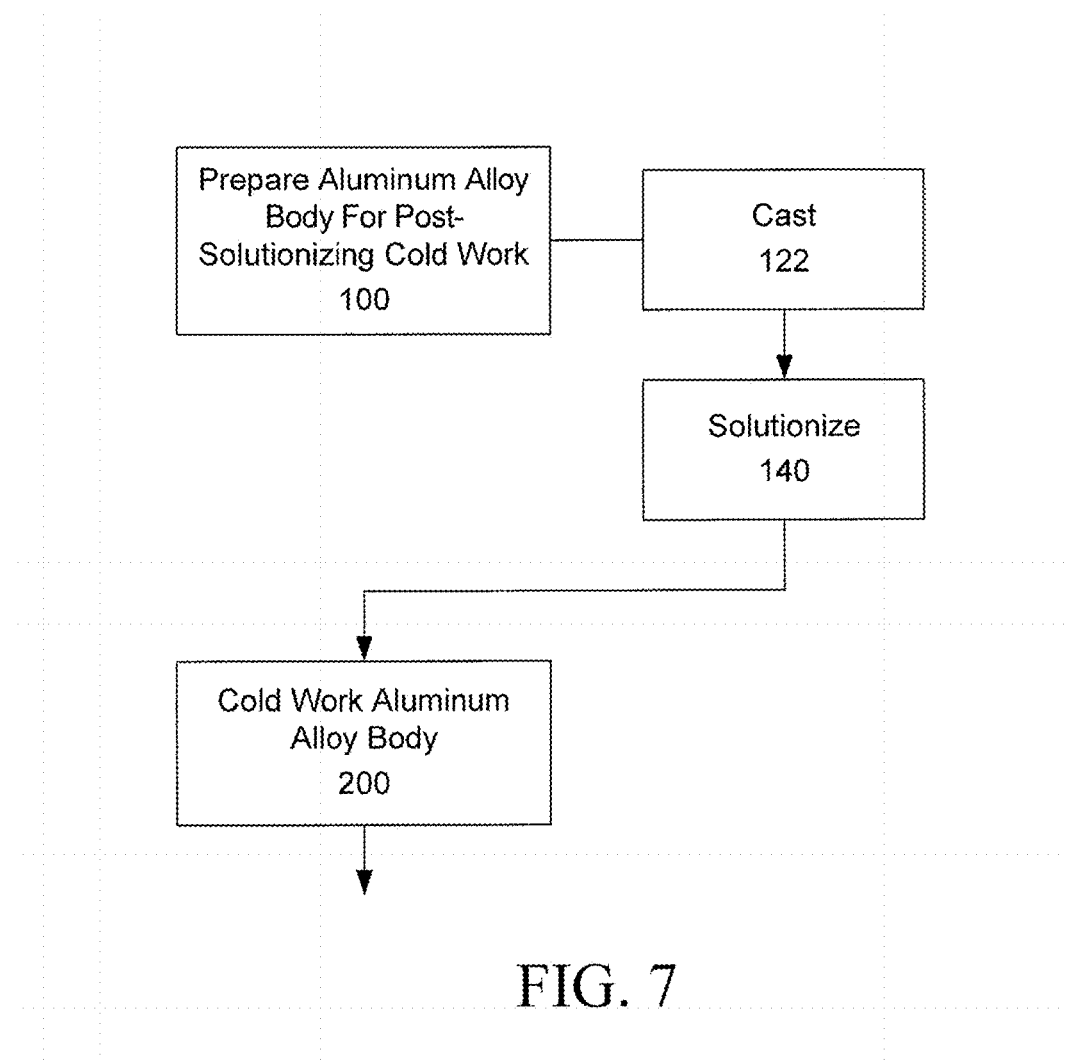
Figure 8:
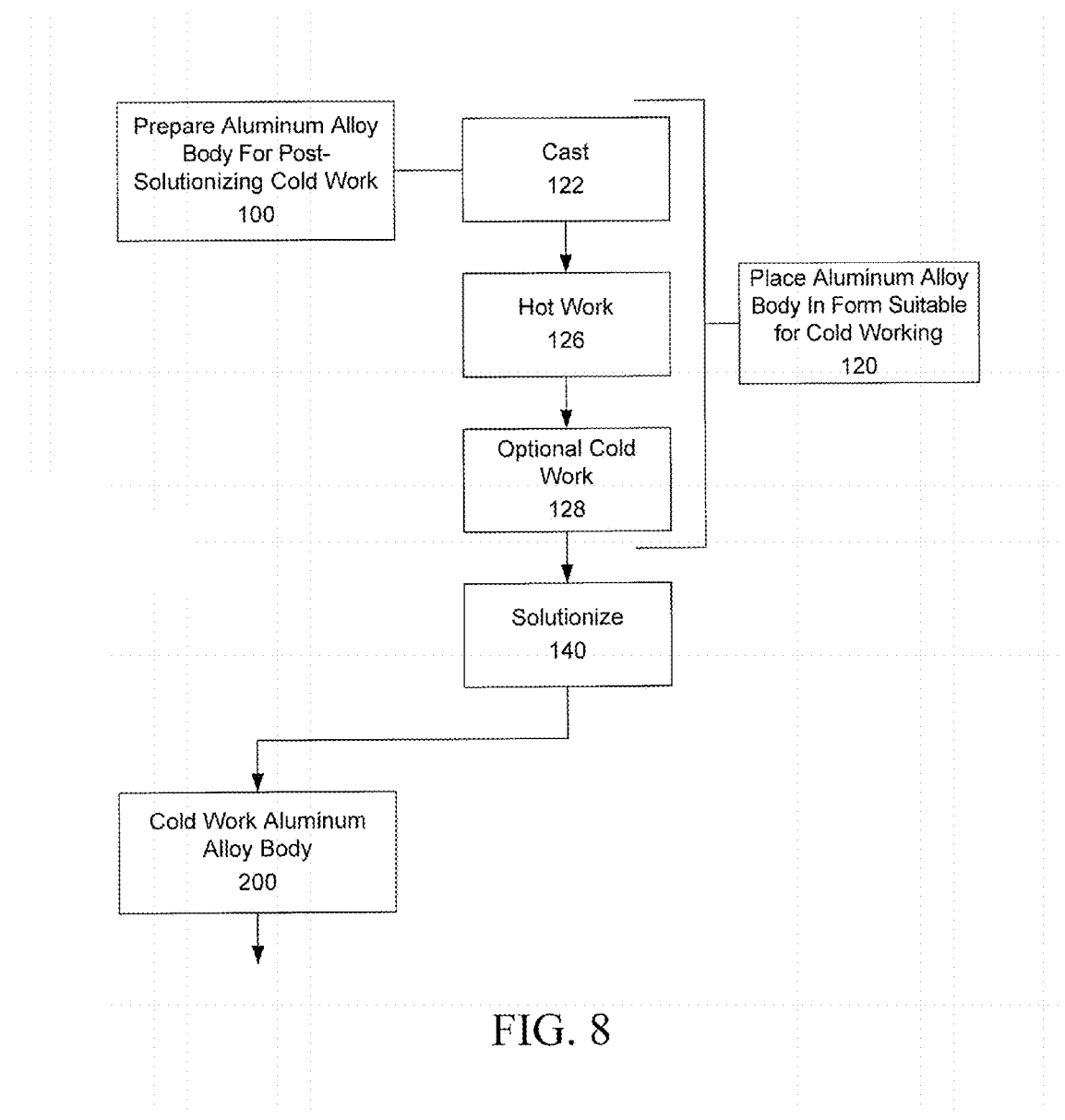
Figure 9:
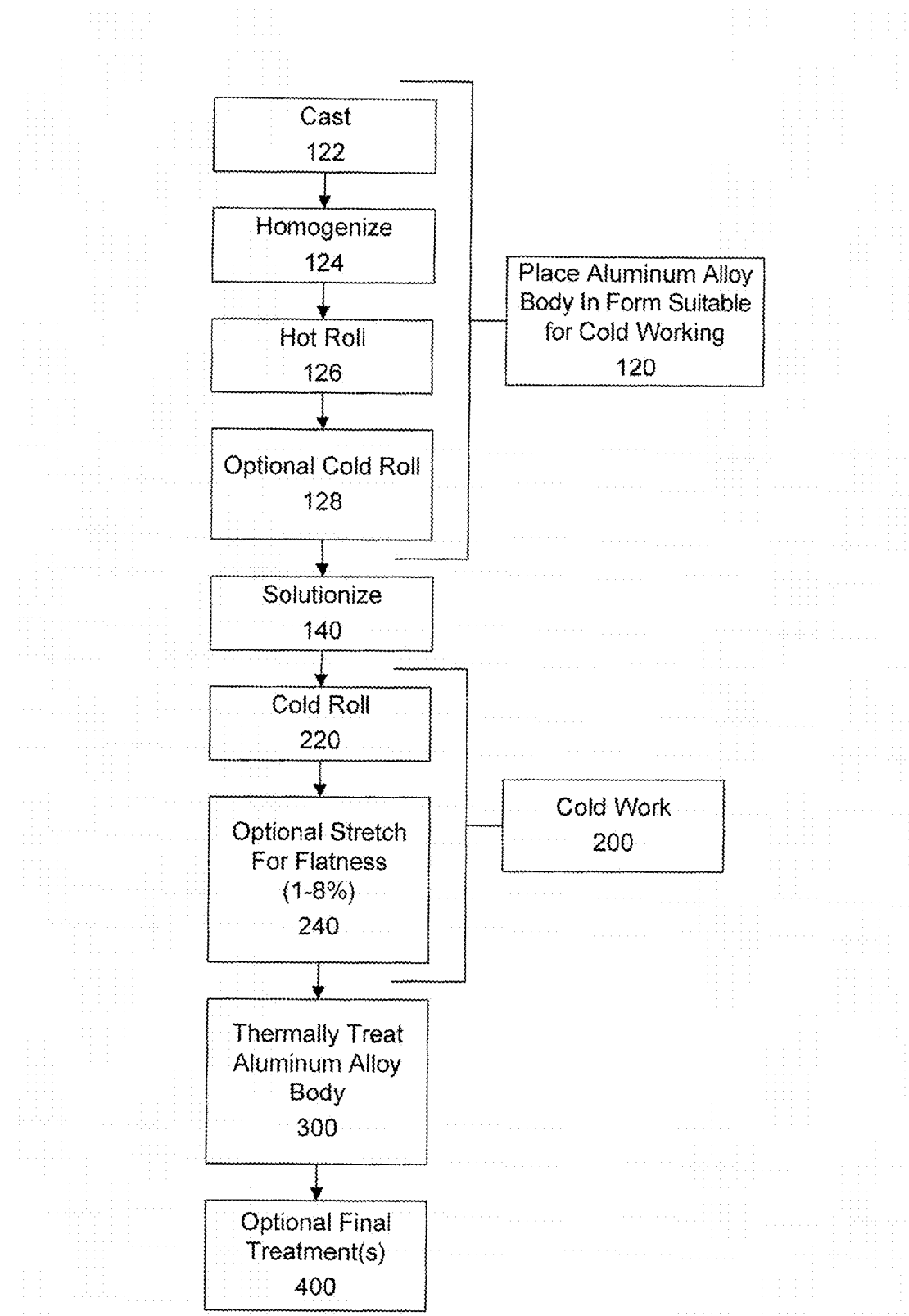
Figure 11A:
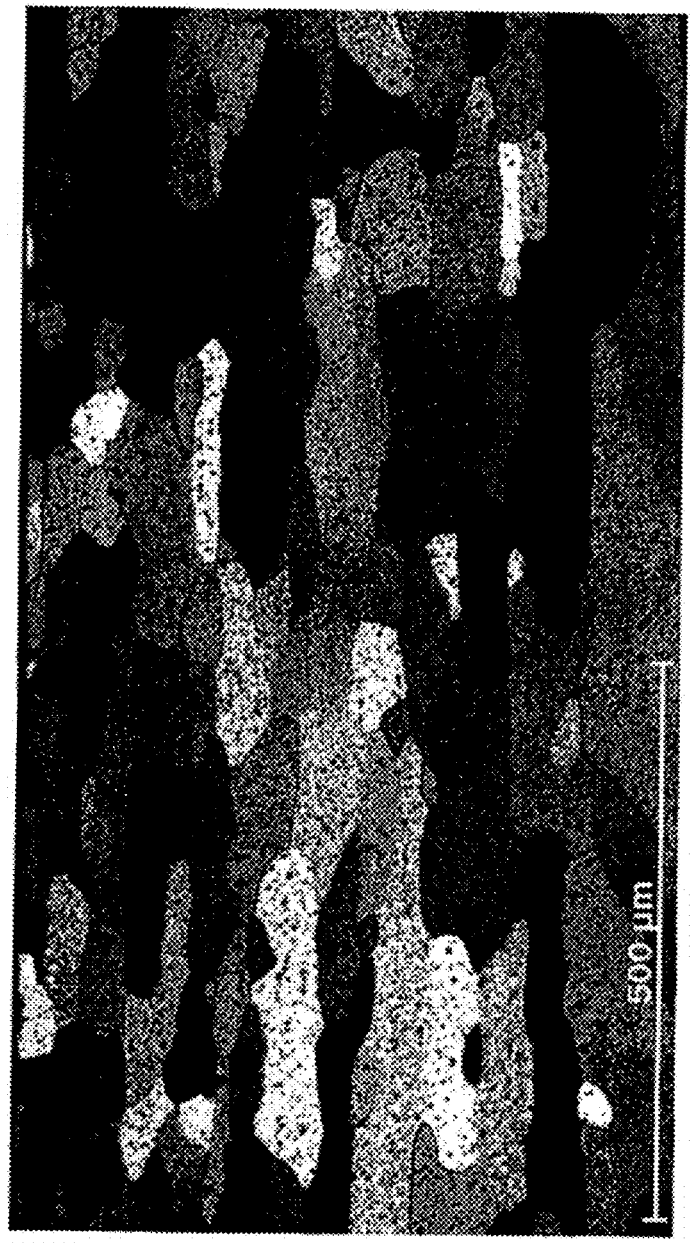
FIGS. 11a-11e are optical micrographs illustrating aluminum alloy body microstructures; the optical micrographs were obtained by anodizing the samples and viewing them in polarized light.
Figure 11B:
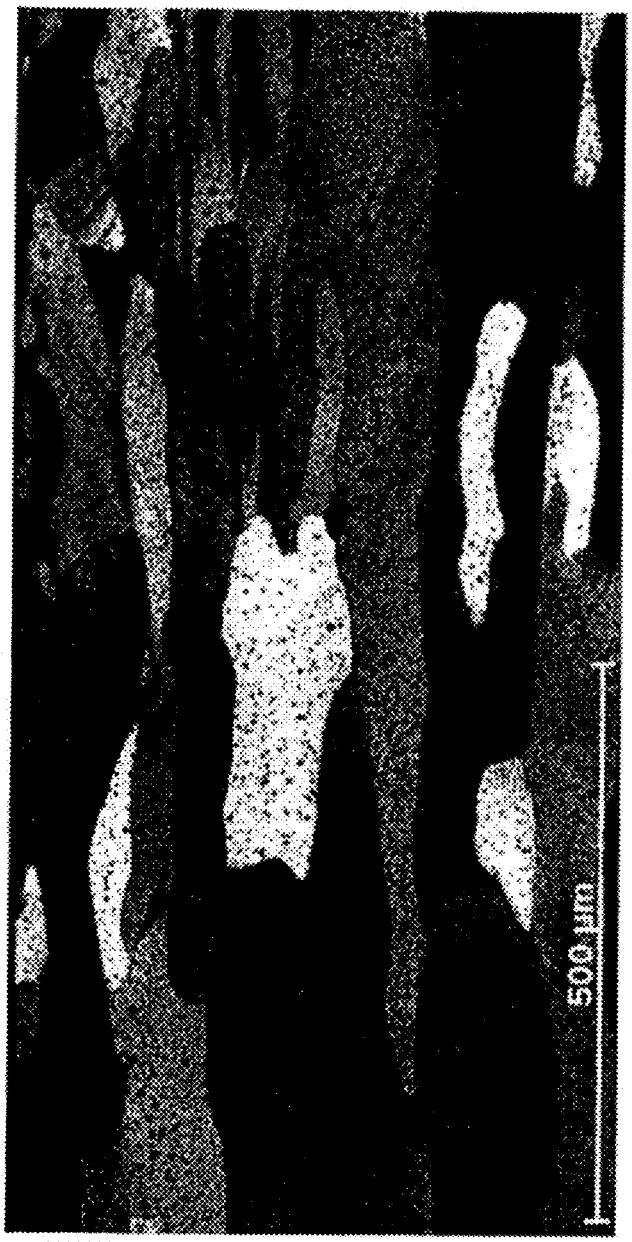
Figure 11C:
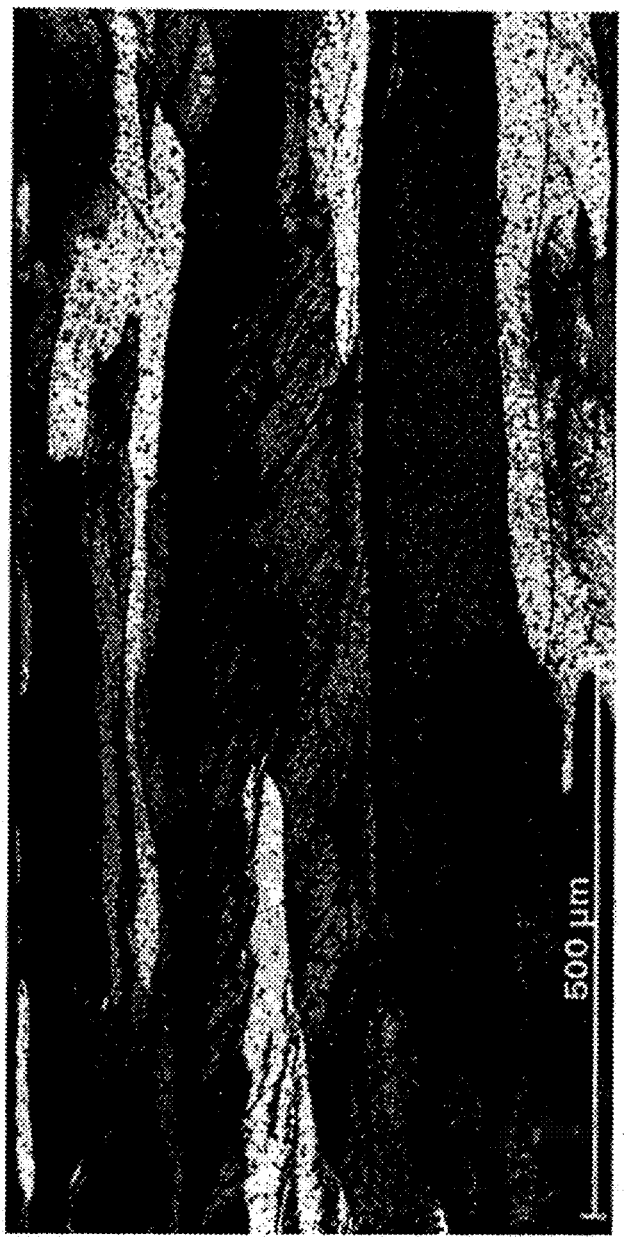
Figure 11D:
Figure 11E:
Figure 12:
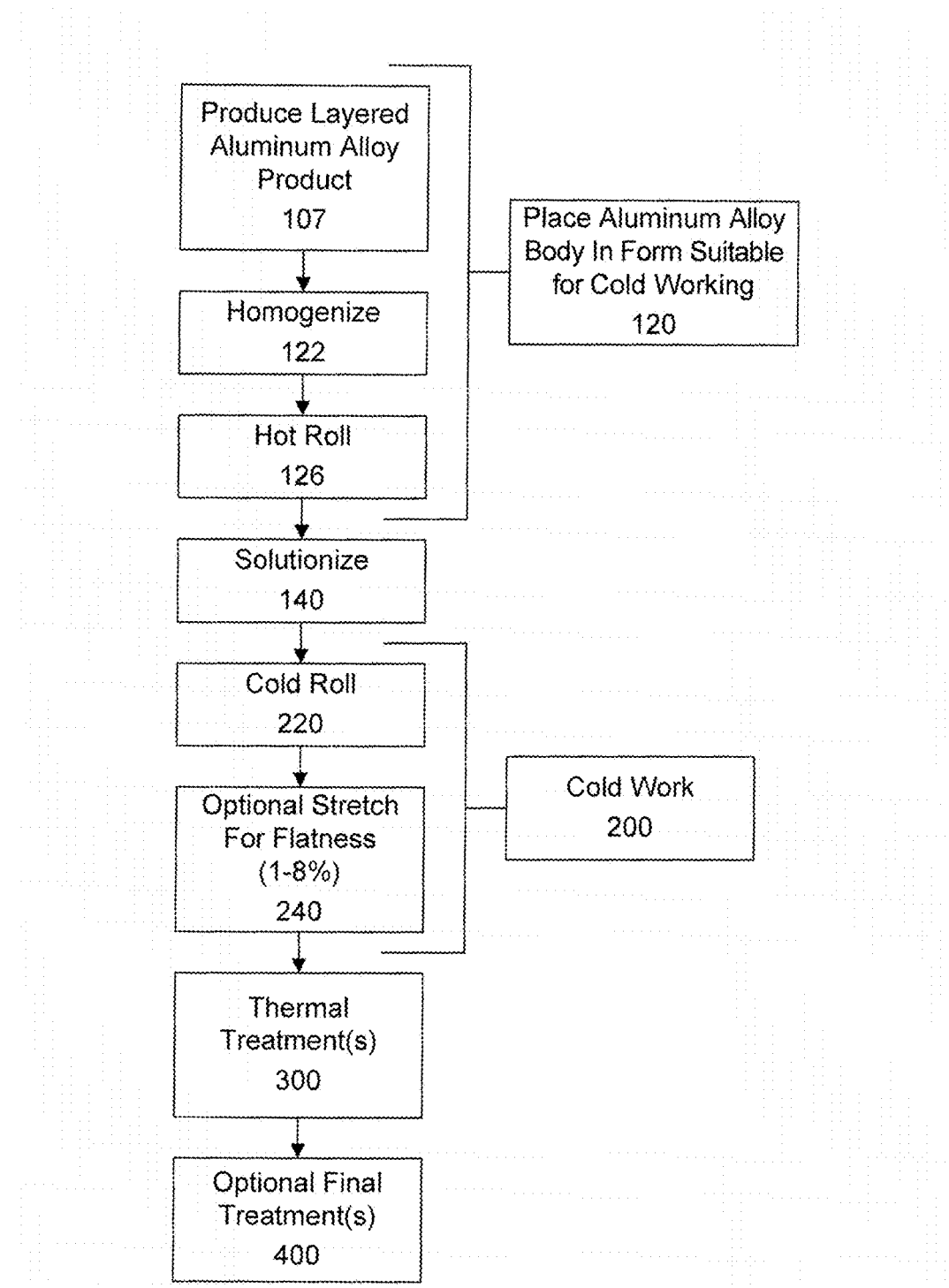
FIG. 12 is a flow chart illustrating one method of producing multi-layered aluminum alloy products.
Figure 13:
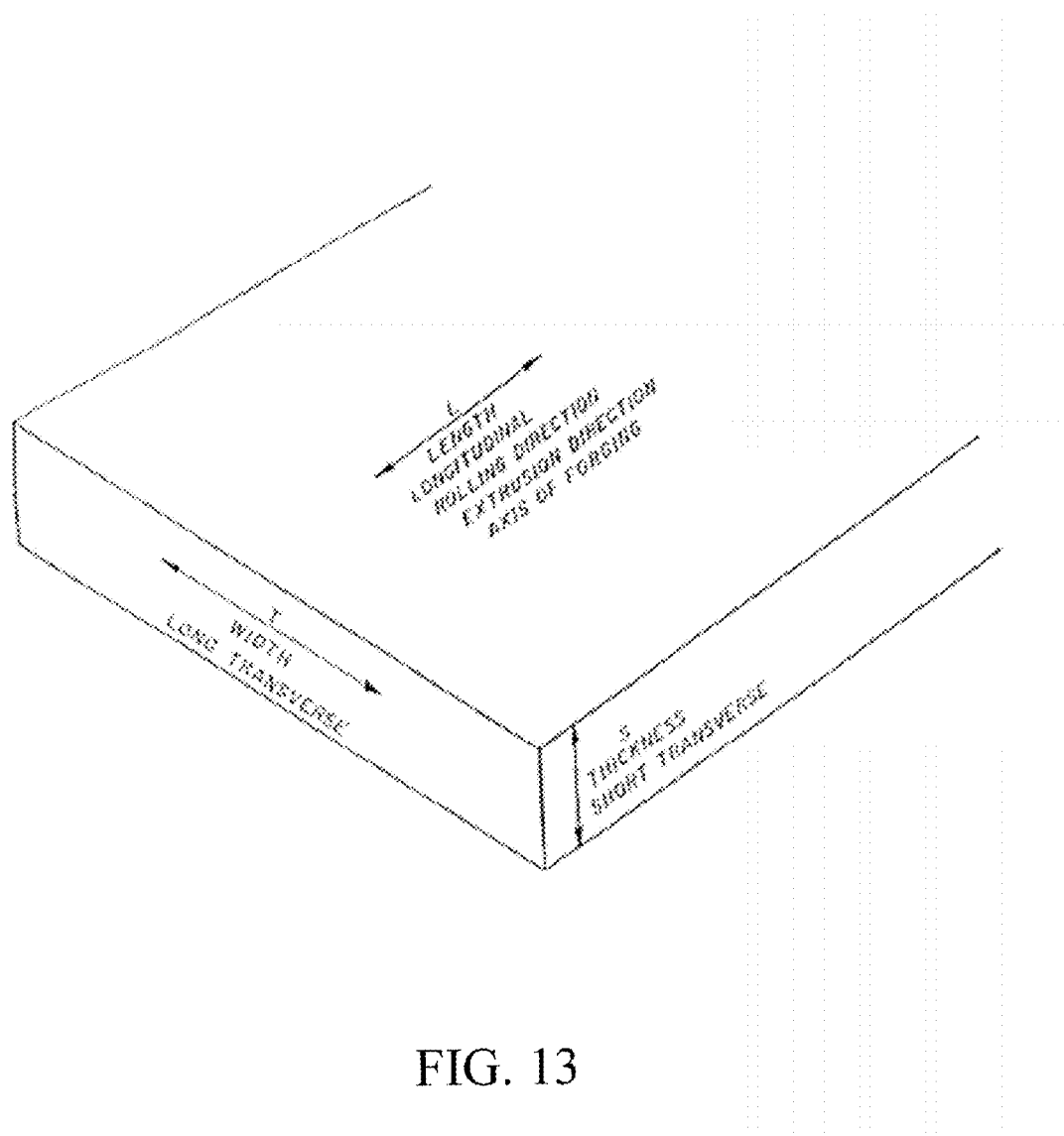
FIG. 13 is a schematic view illustrating the L, LT and ST directions of a rolled product.

Two 2xxx aluminum alloys, 2324 and 2024, are direct chill cast as an ingot. These alloys are processed similar to that illustrated in FIG. 9, and receive a thermal treatment (300) at a temperature of 320° F. to 350° F. for 20 minutes after the cold work step (200). The mechanical properties (strength, elongation) and toughness properties (unit propagation energy) of these aluminum alloy bodies are provided in Tables 3-4, below.

TABLE 3

Mechanical Properties of 2324 with various processing

| % Cold Roll | Condition | TYS (ksi) | Elong. (%) | UPE (in-lb/in$^2$) |
|---|---|---|---|---|
| 0 | T4 temper | 43.0 | 21.0 | 1055 |
| 4.5 | CR | 56.2 | 15.5 | 860 |
| 4.5 | CR + T | 47.8 | 17.0 | 1020 |
| 4.5 | CR + S | 66.1 | 12.0 | 605 |
| 4.5 | CR + S + T | 56.0 | 13.5 | 725 |
| 7.5 | CR | 59.1 | 13.0 | 690 |
| 7.5 | CR + T | 51.8 | 16.0 | 870 |
| 7.5 | CR + S | 67.4 | 12.5 | 570 |
| 7.5 | CR + S + T | 58.5 | 15.5 | 750 |
| 12.5 | CR | 65.8 | 9.5 | 500 |
| 12.5 | CR + T | 58.7 | 14.6 | 700 |
| 26 | CR | 71.1 | 7.0 | 260 |
| 26 | CR + T | 64.1 | 12.5 | 390 |
| 26 | CR + S | 78.4 | 7.0 | 235 |
| 26 | CR + S + T | 69.2 | 11.5 | 345 |
| 44 | CR | 77.6 | 5.5 | 180 |
| 44 | CR + T | 71.8 | 11.5 | 260 |
| 44 | CR + S | 83.9 | 5.0 | 150 |
| 44 | CR + S + T | 76.2 | 9.0 | 260 |
| 68 | CR | 84.2 | 5.0 | 110 |
| 68 | CR + T | 79.3 | 7.8 | 230 |
| 90 | CR | 92.3 | 1.5 | 70 |
| 90 | CR + T | 87.6 | 2.2 | 120 |

LEGEND
CR = Cold Roll
T = Thermally Treated
S = 2% Stretch

TABLE 4

Mechanical Properties of Alloy 2024 with various processing

| Temper Prior to Rolling | Cold Work (%) | Thermal Treatment (° F.) for 20 mins | TYS (ksi) | UTS (ksi) | Elong (%) |
|---|---|---|---|---|---|
| W | 0 | — | 27.4 | 59.1 | 21.5 |
| T4 | 0 | — | 47.0 | 72.4 | 19.5 |
| W | 63 | — | 78.7 | 86.4 | 6.0 |
| W | 63 | 350° F. | 79.0 | 89.5 | 10.0 |
| T4 | 63 | — | 85.5 | 91.8 | 5.0 |
| T4 | 63 | 350° F. | 82.1 | 91.9 | 9.5 |
| W | 90 | — | 92.8 | 95.8 | 2.0 |
| W | 90 | 350° F. | 89.6 | 96.1 | 7.0 |
| T4 | 90 | — | 97.2 | 100.9 | 3.0 |
| T4 | 90 | 350° F. | 93.7 | 100.8 | 7.5 |

The aluminum alloy bodies realize strength increases with increasing cold work, and with elongation values usually above 4%. The post-cold working thermal treatment increases the elongation.

Example 2

Testing of 2xxx+Ag Alloy with New Process

A 2xxx+Ag alloy having the composition listed in Table 5, below, is cast, homogenized, and hot rolled into plate/sheet having intermediate gauges of about 0.53 inch, 0.32 inch, 0.16 inch (×2), and 0.106 inch, respectively. One of the 0.16 inch samples (the control) is then cold rolled to a final gauge of about 0.08 inch, solution heat treated by soaking at about 970° F. for about 60 minutes, followed by a cold water quench, and then stretching of 1-2% for stress relief. The control is naturally aged for about four days, and then thermally treated to a T6-style temper.

The other samples are first solution heat treated (by the same process) and then cold rolled to a final gauge of 0.08 inch, representing about 85%, 75%, 50%, and 25% cold work, respectively. All samples are naturally aged for about four days, and then thermally treated at two temperatures (290° F. and 330° F.) for various times. Mechanical and electrical conductivity tests are then conducted, the results of which are provided in Tables 6-7 for each thermal treatment temperature.

TABLE 5

Composition of 2xxx + Ag alloy (all values in weight percent)

| Si | Fe | Cu | Mg | Zr | Ag | Mn | Ti | Other Each | Others Total | Bal. |
|---|---|---|---|---|---|---|---|---|---|---|
| 0.02 | 0.02 | 3.71 | 0.96 | 0.11 | 0.43 | 0.29 | 0.02 | ≤0.05 | ≤0.15 | Al |

TABLE 6

Strength of 2xxx + Ag alloy at various thermal treatment times (290° F.)

| Time (hr) | Sheet A (T6) (ksi) | | Sheet B (new) 85% CW (ksi) | | Sheet C (new) 75% CW (ksi) | | Sheet D (new) 50% CW (ksi) | | Sheet E (new) 25% CW (ksi) | |
|---|---|---|---|---|---|---|---|---|---|---|
| | TYS | UTS | TYS | UTS | TYS | UTS | TYS | UTS | TYS | UTS |
| 0 | 43.5 | 58.6 | 75.5 | 85.6 | 69.7 | 81 | 60.4 | 72.3 | 55.7 | 80.3 |
| 0.5 | 40.2 | 56.4 | 73 | 86.2 | 66.2 | 81.8 | 57.6 | 72.9 | 52.5 | 81 |
| 8 | 40.8 | 57.5 | 77.2 | 86.7 | 71.2 | 82.5 | 60.7 | 74.4 | 54.9 | 81.3 |
| 24 | 43.3 | 58.6 | 82.1 | 87.6 | 76.4 | 83.6 | 66.6 | 76.4 | 60.7 | 82.8 |
| 72 | 57.4 | 64.9 | 83.4 | 87.1 | 79.6 | 84.3 | 74 | 79.5 | 70.3 | 83.2 |
| 96 | 60.1 | 66.3 | 82.5 | 86 | 80 | 83.5 | — | 79.9 | 72.1 | 82.7 |

TABLE 7

Strength of 2xxx + Ag alloy at various thermal treatment times (330° F.)

| Time (hr) | Sheet A (T6) (ksi) | | Sheet B (new) 85% CW (ksi) | | Sheet C (new) 75% CW (ksi) | | Sheet D (new) 50% CW (ksi) | | Sheet E (new) 25% CW (ksi) | |
|---|---|---|---|---|---|---|---|---|---|---|
| | TYS | UTS | TYS | UTS | TYS | UTS | TYS | UTS | TYS | UTS |
| 0 | 43.5 | 58.6 | 75.5 | 85.6 | 69.7 | 81 | 58.4 | 72.3 | 55.7 | 80.3 |
| 0.5 | 37.9 | 54.8 | 74.3 | 86 | 67.4 | 81.1 | 58.4 | 74.2 | 52.2 | 80.6 |
| 4 | 42.1 | 57.5 | 82.8 | 87.1 | 77 | 83.4 | 69 | 77.6 | 62.8 | 81.9 |
| 8 | 50.4 | 61.1 | 82.9 | 86.3 | 79.2 | 83.3 | 73.7 | 79 | 68.8 | 82.4 |
| 36 | 61.1 | 66.3 | 75 | 79.5 | 75.1 | 79.1 | 74.5 | 78.2 | 72.8 | 78.5 |
| 72 | 59.4 | 65.6 | 69 | 74.9 | 69.2 | 74.7 | 70 | 75.1 | 68.9 | 74.3 |

As illustrated in Tables 6-7, above, and FIGS. 14-15, Sheets B through E made by the new process realize an increase in strength. Indeed, Sheet B with 85% CW and thermally treated at 330° F. realizes a strength of 82.8 ksi after only 4 hours of thermal treatment. The conventionally processed alloy (Sheet A) in the T6 temper reaches its measured highest strength around 36 hours of thermal treatment, and then only realizes a strength of about 61.1 ksi. In other words, new Sheet B achieves about a 35% increase in tensile yield strength over the conventionally prepared material strength, and with only 4 hours of thermal treatment (i.e., 88.9% faster; $(1-4/36)*100\%=88.9\%$). Stated differently, new Sheet B achieves about a 35% increase in strength over conventional Sheet A and in about $1/10^{th}$ of the time required for Sheet A to achieve its highest measured strength of 61.1 ksi.

Given these strength increases, a significant drop in ductility would be expected for Sheets B-E. However, as shown in Table 8, below, good elongation values are measured. All elongation values are in percent. Similar elongation values are measured for the samples thermally treated at 290° F.

TABLE 8

Elongation (%) for 2xxx + Ag alloy at various thermal treatment times (330° F.)

| Time (hr) | Sheet A (T6) | Sheet B (new) 85% CW | Sheet C (new) 75% CW | Sheet D (new) 50% CW | Sheet E (new) 25% CW |
|---|---|---|---|---|---|
| 0 | 19 | 8 | 7.5 | 8.5 | 9.5 |
| 0.5 | 24 | 13.5 | 16.5 | 13 | 13.5 |
| 4 | 25 | 10.5 | 11.5 | 12.5 | 13 |
| 8 | 18 | 9 | 9 | 8.5 | 9 |
| 36 | 10.5 | 7.5 | 7.5 | 6.5 | 6.5 |
| 72 | 9 | 8 | 7 | 6.5 | 6.5 |

The measured electrical conductivity values at 330° F. are provided in Table 9, below. All electrical conductivity values are in percent IACS (International Annealed Copper Standard). Similar electrical conductivity values are measured for the samples thermally treated at 290° F.

TABLE 9

Elec. Cond. of 2xxx + Ag alloy at various thermal treatment times (330° F.)

| Time (hr) | Sheet A (T6) | Sheet B (new) 85% CW | Sheet C (new) 75% CW | Sheet D (new) 50% CW | Sheet E (new) 25% CW |
|---|---|---|---|---|---|
| 0 | 31.2 | 31 | 31.1 | 31.3 | 31.3 |
| 0.5 | 31.5 | 31.4 | 31.4 | 31.8 | 31.8 |
| 12 | 32.6 | 33.7 | 33.7 | 33.9 | 33.8 |
| 24 | 34.6 | 35.5 | 35.3 | 35.2 | 35.4 |
| 48 | 38.2 | 39.6 | 39 | 38.3 | 38.1 |
| 72 | 39.2 | 40.8 | 40.2 | 39.4 | 39.3 |

The results of Example 2 illustrate that the cold working and thermal treatment steps must be appropriately accomplished to achieve improved properties (e.g., strength). As shown in FIGS. 14-15, alloys that are thermally treated for an insufficient period of time may not realize the improved properties, as illustrated by the reduction in strength as compared to the as-cold worked condition. As shown in FIGS. 14-15, alloys that are thermally treated for an excessive period may also not realize the improved properties, as illustrated by the reduction in strength as compared to the as-cold worked condition.

Additional mechanical properties of this 2xxx+Ag aluminum alloy were tested, the results of which are provided in Tables 10-11, below. Specifically, the strength, elongation, and fracture toughness properties were tested. In this instance, the aluminum alloy bodies were thermally treated at 290° F. for 72 hours. These results show that similar strength and elongation properties may be realized by 2xxx+Ag aluminum alloy bodies in the L and LT directions.

TABLE 10

Additional Mechanical Properties of the 2xxx + Ag alloy (LT)

| Cold work | TYS (LT) (ksi) | UTS (LT) (ksi) | Elong. (LT) (%) | $K_Q$ (T-L) (ksi√in) | $K_{R25}$ (T-L) (ksi√in) |
|---|---|---|---|---|---|
| 85% CW | 83.4 | 87.5 | 10 | 38.6 | 87.8 |
| 75% CW | 79.3 | 84.1 | 9 | 39.5 | 87.6 |
| 50% CW | 72.4 | 78.6 | 9 | 41.9 | 91.1 |
| 25% CW | 68.7 | 75.2 | 10 | 51.4 | 84.5 |
| Control (T6) | 59.0 | 65.7 | 12.5 | 33.6 | 81.1 |

TABLE 11

Additional Mechanical Properties of the 2xxx + Ag aluminum alloy (L)

| Cold work | TYS (L) (ksi) | UTS (L) (ksi) | Elong. (L) (%) |
|---|---|---|---|
| 85% CW | 81.1 | 84.7 | 6.5 |
| 75% CW | 79.6 | 83.4 | 6.5 |
| 50% CW | 75.3 | 79.7 | 9 |
| 25% CW | 71.7 | 76.3 | 9 |
| Control (T6) | 60.6 | 66.1 | 12.5 |

The fracture toughness tests were conducted in accordance with ASTM test standards ASTM E561 and ASTM B646 (for $K_{app}$ and $K_{R25}$), and E399 and B645 ($K_{IC}/K_Q$). A middle crack fracture specimen (M(T)) was used for the $K_{app}$ measurement. The specimen width (W) was 6.3 inches, thickness (B) was 0.08 inch and the initial crack length ($2a_0$) was 1.573 inches, i.e. 2 $a_0/W=0.25$. A compact tension fracture specimen (C(T)) was used for $K_{R25}$ and $K_Q$ measurements. The specimen width (W) was 2.5 inches and thickness (B) was 0.07 inch, with a nominal initial crack length ($a_0$) of 1.25 and ($a_0$)/W=0.50.

Those skilled in the art will appreciate that the numerical values of $K_Q$, $K_{app}$ and $K_{R25}$ typically increase as the test specimen width increases. $K_Q$, $K_{app}$ and $K_{R25}$ are also influenced by specimen thickness, initial crack length and test coupon geometry. Thus, $K_Q$, $K_{app}$ and $K_{R25}$ values usually can be reliably compared only from test specimens of equivalent geometry, width, thickness and initial crack length.

The 2xxx+Ag aluminum alloy bodies may realize improved fracture toughness. Despite the significant increase in strength over the control body, the new 2xxx+Ag aluminum alloy bodies also realize improved fracture toughness over the control alloys. This is illustrated in FIGS. 16-17. For example, the 75% CW sheet realizes a 34.4% improvement in tensile yield strength (LT) and with a corresponding 17.6% improvement in plane-strain toughness ($K_Q$ T-L) and a 8.1% improvement in plane-stress toughness ($K_{R25}$ T-L) over the control sheet. The 75% CW sheet also realizes a 31.4% improvement in tensile yield strength (L) over the control sheet. These combinations of strength and toughness are also realized with good ductility, with the new aluminum alloy bodies all realizing an elongation of 6.5-10%.

The 2xxx+Ag aluminum alloy bodies are also tested for grain structure as per the OIM procedure, described above. The results are provided in Table 12, below.

TABLE 12

Microstructure (OIM) Properties of the 2xxx + Ag aluminum alloy

| Sample | Measurement Location | First Type Grains per OIM (vol. fraction) | Percent Unrecrystallized |
|---|---|---|---|
| Control | T/4 to surface | 0.88 | 12% |
| 25% CW | T/4 to surface | 0.50 | 50% |
| 50% CW | T/4 to surface | 0.07 | 93% |
| 75% CW | T/4 to surface | 0.13 | 87% |
| 85% CW | T/4 to surface | 0.25 | 75% |

The new 2xxx+Ag aluminum alloy bodies with more than 25% cold work have a predominately unrecrystallized microstructure, having a volume fraction of not greater than 0.25 first type grains (i.e., 75% unrecrystallized) in all instances. Conversely, the control body is nearly fully recrystallized having a volume fraction of 0.88 first type grains (i.e., 12% unrecrystallized).

The R-values of the 2xxx+Ag aluminum alloy bodies are also tested as per the R-value generation procedure, described above. The results are illustrated in FIG. 10, described above. The new 2xxx+Ag aluminum alloy bodies have high normalized R-values, achieving a peak (maximum) normalized R-value at an orientation angle of 50°. These high R-values are indicative of the unique texture, and thus microstructure, of the new 2xxx aluminum alloy bodies described herein. The new 2xxx+Ag aluminum alloy bodies realize about 322% to 729% higher maximum R-values as compared to the R-value of the control body (for the purpose of measuring R-values, the control is in the T4 temper, not the T6 temper).

Example 3

Production of AA2040 Rod

Rods were manufactured from aluminum alloy 2040 by preparing an intermediate material for post-solutionizing cold work, then cold working the intermediate material to final gauge (induced an equivalent plastic strain of about 0.46 EPS), and then thermally treating at 330° F. for various times. Alloy 2040 was also conventionally prepared by cold working, then solutionized, and then thermally treating at 330° F. for various times. The ultimate tensile strength (L) and elongation (L) of the rods were determined according to ASTM E8 and B557 for a variety of thermal treatments, the results of which are provided in Table 13, below.

TABLE 13

Mechanical Properties of 2040 Rod

| Alloy | Thermal Treatment Time (hours) | UTS (ksi) | Elong (%) |
|---|---|---|---|
| Conv. 2040 | 0 | 68.0 | 24.5 |
| Conv. 2040 | 4 | 71.3 | 12.3 |
| Conv. 2040 | 8 | 71.4 | 13.0 |
| Conv. 2040 | 16 | 71.5 | 12.0 |
| Conv. 2040 | 36 | 71.7 | 11.5 |
| Conv. 2040 | 72 | 70.7 | 11.0 |
| New 2040 | 0 | 76.4 | 8.0 |
| New 2040 | 0.5 | 75.8 | 12.8 |
| New 2040 | 4 | 81.9 | 10.0 |
| New 2040 | 8 | 80.9 | 7.0 |
| New 2040 | 16 | 81.6 | 5.0 |
| New 2040 | 24 | 79.5 | 3.0 |
| New 2040 | 36 | 77.7 | 2.8 |

The new rods achieved improved properties over the conventionally prepared rod materials. Indeed, the new 2040 rods achieve up to 14% higher ultimate tensile strength as compared to the conventional 2040-T6 rods. The new rods also achieve ductility, having an elongation of about 10% at peak strength. The new rods also achieve improved ultimate tensile strength as compared to the as-cold worked condition, realizing about a 7.2% increase in ultimate tensile strength, and with higher elongation.

The shear strengths of a new rod (16 hours of thermal treatment) and one conventional rod (36 hours of thermal treatment), both near peak strength, were tested in accordance with NASM 1312-13. The new rod achieved a shear strength of the new rod is 50.7 ksi, whereas the conventional rod achieved a shear strength of 44.4 ksi. Thus, the new rod achieves 14.2% higher shear strength than the conventional rod. Since rod material may be used as a starting stock for fasteners, the improved fastener products may also be produced according to the new processes described herein.

While various specific embodiments of new processes for preparing aluminum alloy bodies having improved properties are described in detail, it should be recognized that the features described with respect to each embodiment may be combined, in any combination, with features described in any other embodiment, to the extent that the features are compatible. For example, any of the aluminum alloy bodies, predetermined shaped products, components and assemblies described herein, and corresponding processes techniques for making the same may be combined, in any appropriate combination, and they and their associated improved properties may be appropriately claimed in this or a continuing patent application or a divisional patent application, as appropriate. Also, additional apparatus and/or process steps may be incorporated to the extent they do not substantially interfere with operation of the new processes disclosed herein. Other modifications will become apparent to those skilled in the art. All such modifications are intended to be within the scope of the present invention. Furthermore, it is apparent that modifications and adaptations of those embodiments will occur to those skilled in the art. However, it is to be expressly understood that such modifications and adaptations are within the spirit and scope of the present disclosure.

What is claimed is:
1. A method comprising:
    (a) receiving an aluminum alloy body, wherein the aluminum alloy body comprises 0.5 to 8.0 wt. % copper, wherein the copper is the predominate alloying element of the aluminum alloy body other than aluminum, wherein the aluminum alloy body was prepared by solutionizing, and then cold working, wherein the cold working induced at least 25% cold work in the aluminum alloy body, and then first thermally treating to achieve a first predetermined selected condition of the aluminum alloy body;
    (b) second thermally treating the aluminum alloy body;
        (i) wherein the second thermally treating step is accomplished to achieve a second predetermined selected condition of the aluminum alloy body; and
        (ii) wherein the combination of the at least 25% cold work, the first thermally treating, and the second thermally treating are accomplished such that the aluminum alloy body realizes a higher tensile yield strength over a reference version of the aluminum alloy body in the T87 temper.
2. The method of claim 1, comprising:
    forming the aluminum alloy body into a predetermined shaped product.
3. The method of claim 2, wherein the forming occurs during the second thermally treating step.

4. The method of claim 1, wherein the first predetermined selected condition is a predetermined first strength and the second predetermined selected condition is a predetermined second strength.

5. The method of claim 4, wherein the predetermined second strength is higher than the predetermined first strength.

6. The method of claim 1, wherein the receiving step (a) and the second thermally treating step (b) are performed by an automotive manufacturer or an aerospace manufacturer.

7. The method of claim 6, wherein the cold working and the first thermally treating were completed by a supplier of the aluminum alloy body prior to the receiving step (a).

8. The method of claim 7, comprising supplying, by the supplier, the aluminum alloy body to the aerospace manufacturer after the first thermally treating and the cold working.

* * * * *